US008589273B2

(12) United States Patent
Creeden et al.

(10) Patent No.: US 8,589,273 B2
(45) Date of Patent: Nov. 19, 2013

(54) METHODS AND SYSTEMS FOR MANAGING RISK MANAGEMENT INFORMATION

(75) Inventors: Denis Michael Creeden, Sandy Hook, CT (US); Jesse Glionna, Stamford, CT (US); Martha Cecilia Poulter, Newtown, CT (US); John Stephen Kaptinski, Stamford, CT (US); James Robert Persico, Stamford, CT (US); William Roy Doolittle, Trumbull, CT (US); Ryan Stuart Cascade, Scarsdale, NY (US); Amanda Jenks van Heyst, Norwalk, CT (US); David Andrew Ernst, Alpharetta, GA (US); Kathleen Mary Chomienne, Alpharetta, GA (US); Robert Wayne Bellish, Ossining, NY (US); Robert Francis Crowley, Armonk, NY (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 1966 days.

(21) Appl. No.: 10/329,309

(22) Filed: Dec. 23, 2002

(65) Prior Publication Data

US 2004/0122756 A1 Jun. 24, 2004

(51) Int. Cl.
*G06Q 40/00* (2012.01)

(52) U.S. Cl.
USPC .......................................... 705/36 R; 705/35

(58) Field of Classification Search
CPC ...................................................... G06Q 40/00
USPC ........... 705/35, 36 R, 38, 30, 7.37, 7.36, 7.31
See application file for complete search history.

(56) References Cited

U.S. PATENT DOCUMENTS

| | | | | |
|---|---|---|---|---|
| 5,644,727 | A | 7/1997 | Atkins | |
| 5,864,828 | A | 1/1999 | Atkins | |
| 5,875,437 | A | 2/1999 | Atkins | |
| 5,970,479 | A | 10/1999 | Shepherd | |
| 6,078,905 | A | 6/2000 | Pich-LeWinter | |
| 6,112,190 | A | 8/2000 | Fletcher et al. | |
| 6,134,536 | A | 10/2000 | Shepherd | |
| 6,347,307 | B1 | 2/2002 | Sandhu et al. | |
| 7,039,575 | B2 * | 5/2006 | Juneau | 703/18 |
| 7,424,452 | B2 * | 9/2008 | Feilbogen et al. | 705/37 |
| 7,617,169 | B1 * | 11/2009 | Owen et al. | 706/46 |
| 7,747,517 | B2 * | 6/2010 | Sugano et al. | 705/38 |
| 7,752,090 | B2 * | 7/2010 | Trainer | 705/30 |
| 7,912,769 | B2 * | 3/2011 | Ostergard | 705/35 |
| 7,983,945 | B2 * | 7/2011 | DiBernardino et al. | 705/7.36 |
| 2001/0049646 | A1 * | 12/2001 | Wilkinson | 705/36 |

(Continued)

OTHER PUBLICATIONS

Culp et al. "Derivative diagnosis " May/Jun. 1999 International Economy v13n3 pp. 36-37+.*

(Continued)

*Primary Examiner* — Kelly Campen
(74) *Attorney, Agent, or Firm* — Armstrong Teasdale LLP

(57) ABSTRACT

A server system is coupled to a centralized database and at least one client system. Business information relating to at least one second business entity is received at the server system from the client system. The business information received at the server system is stored in the centralized database. The business information stored in the centralized database is tracked, and the centralized database is periodically updated with newly received business information to maintain the business information. The business information is provided in response to an inquiry.

53 Claims, 135 Drawing Sheets

(56) References Cited

U.S. PATENT DOCUMENTS

| | | | | |
|---|---|---|---|---|
| 2002/0023045 | A1* | 2/2002 | Feilbogen et al. | 705/37 |
| 2002/0103730 | A1* | 8/2002 | Perley et al. | 705/30 |
| 2003/0160818 | A1* | 8/2003 | Tschiegg et al. | 345/743 |
| 2003/0182212 | A1* | 9/2003 | Moscone et al. | 705/30 |
| 2003/0208397 | A1* | 11/2003 | VanDusen | 705/14 |
| 2004/0024674 | A1* | 2/2004 | Feldman | 705/36 |
| 2004/0059627 | A1* | 3/2004 | Baseman et al. | 705/10 |
| 2004/0122756 | A1* | 6/2004 | Creeden et al. | 705/35 |
| 2005/0080701 | A1* | 4/2005 | Tunney et al. | 705/35 |
| 2006/0085205 | A1* | 4/2006 | Kumar | 705/1 |
| 2006/0235774 | A1* | 10/2006 | Campbell et al. | 705/30 |
| 2006/0287937 | A1* | 12/2006 | Flinn et al. | 705/35 |
| 2008/0172272 | A1* | 7/2008 | Back et al. | 705/7 |
| 2008/0228640 | A1* | 9/2008 | Brown et al. | 705/39 |
| 2009/0070169 | A1* | 3/2009 | Cohen | 705/7 |
| 2010/0004963 | A1* | 1/2010 | Ficery et al. | 705/7 |
| 2010/0198657 | A1* | 8/2010 | Singh | 705/10 |
| 2011/0112986 | A1* | 5/2011 | Flinn et al. | 705/36 R |

OTHER PUBLICATIONS

Trembley, Ara Raising the Level of Risk Assessment ( Ernst & Young has developed Horizon, a new Web-based risk identification and assessment software product ) May 1, 2000, National Underwriter Life & Health-Financial Services Edition , v 104 , n 18 , p. 31.*

* cited by examiner figure 6A

320

| | | | | | | | | | | | | | |
|---|---|---|---|---|---|---|---|---|---|---|---|---|---|
| Amicale | 17 | Watchlist, Increased Monitoring | $21.6 | $15.2 | $0.1 | 0.4% | 0.2x | $8.6 | 17.0x | 18.1x | CCC+ | 03/19/2002 | 2231 | KW |
| Remee | 17 | Watchlist, Increased Monitoring | $10.5 | $9.0 | $0.3 | 3.5% | (-3.1)x | $4.8 | (-3.8)x | (-5.0)x | | 02/26/2002 | 3357 | RM |
| Webber | 17 | Watchlist, High Maintenance | $10.5 | $4.5 | $2.9 | 99.8% | 0.8x | $7.2 | 2.2x | 5.9x | BBB | 01/21/2002 | 5983 | JZ |
| Durham | 16 | Moderate, High Maintenance | $3.8 | $1.8 | $0.4 | 16.9% | 2.1x | $0.4 | 1.2x | 1.2x | | 02/19/2002 | 3823 | LB |
| Custom | 15 | Watchlist, High Maintenance | $12.0 | $10.6 | $0.4 | 4.1% | 1.3x | $6.2 | 1.2x | 3.2x | | 01/02/2002 | 3089 | WO |
| TURBINE | 15 | Non-earning - other | $21.5 | $20.9 | $(-13.1) | (-165.0)% | 0.4x | $(-24.1) | 24.0x | 24.0x | | 07/12/2001 | 5088 | WO |

Opening page https://www. Internet

Start Inbox... D:\Data... Microsoft... Microso.. 5:50 PM

| Background | Recent Events & Loan Activities |
|---|---|
| Date Placed on Non-Earning: N/A | • 02/06/02 - Was notified |

Guarantors / Security Go to Top

| Guarantor Name | Amount $(MMs) | Collateralized | Comment |
|---|---|---|---|
| Subsidiaries | 15.0 | No | Standard cross guaranty documentation |
| Security | Secured by 100% of Assets (Existing and Future) | | |
| Stock | | | |
| Other Interests | | | |

GECC (Globalnet) Exposure Go to Top

No Data Available

Capital Structure: As of 11/27/2002 Go to Top

| (MMs) | Commitment Total | Commitment GECC | Outstanding Total | Outstanding GECC | LTM EBITDA Multiple | Rate | Maturity | Amort. Next 12 Months |
|---|---|---|---|---|---|---|---|---|
| Revolver-GEBC line | 15.0 | 15.0 | 2.6 | 3.4 | NM | P+2.875% | 05/18/03 | 0.0 |
| Notes Payable-Deferred Payment | 3.2 | 0.0 | 3.0 | 0.0 | NM | 0 | | 0.0 |
| Common Equity-Shareholders | 11.7 | 0.0 | 12.1 | 0.0 | NM | 0 | | 0.0 |
| Total Capital Structure | | | 17.7 | 3.4 | | | | |
| Current Revolver Outstandings: | | | 2.6 | 3.4 | | | | |
| Sr. Debt % of Total Capital Structure: | | | 14.7% | | | | | |

Capital Structure Comments:

Fee Structure Go to Top

| | |
|---|---|
| Audit per Diem | 750.0 |
| Unused Line | .25% |
| Collection Day | 1.0 |
| Collateral Monitor | No |
| Wire Fee | 20.0 |
| Prepayment | .5% |

Internet

| | | | | | | | | |
|---|---|---|---|---|---|---|---|---|
| FCF (after Sponsor Mgmt Fees) | 1.8 | 5.3 | (-0.5) | (-0.6) | (-1.4) | 0.6 | (-0.3) | (-0.3) |
| Net Income | (-1.1) | 1.7 | (-3.9) | (-2.4) | (-4.1) | (-1.5) | (-1.7) | (-1.0) |
| Cash Interest Expense | 0.0 | 0.6 | 1.1 | 0.9 | 1.3 | 0.6 | 0.8 | 0.7 |
| Scheduled Principal Payments & Other Fixed Charges | 0.8 | 0.0 | 0.5 | 0.0 | 0.1 | 0.4 | 0.0 | 0.1 |

| | |
|---|---|
| Accounts Payable | 5.8 |
| CPLTD | 0.0 |
| Accrued Liabilities | 0.0 |
| Other Current Liabs. | 0.0 |
| Total Current Liabs. | 5.8 |
| Long Term Debt | 5.3 |
| Other Liabilities | 0.4 |
| Total Liabilities | 11.4 |
| Preferred Stock | 0.0 |
| Common & RE | 9.3 |
| Total Liabs & SHE | 20.7 |

Financial Commentary: Go to Top

Preliminary Financial Results (FYE 12/01):

Borrowing Base Go to Top

| (MMs) | AR | Inventory | Total SLC | Total |
|---|---|---|---|---|
| Gross | 6.8 | 0.0 | 0.0 | 6.8 |

Covenants: As of 06/30/2001 Go to Top

| | ACTUAL | REQUIRED |
|---|---|---|
| FCC | 0.88 | 0.9 |
| Max CAPEX | 432000 | 1500000 |

Internet figure 16E →

FIG. 16D

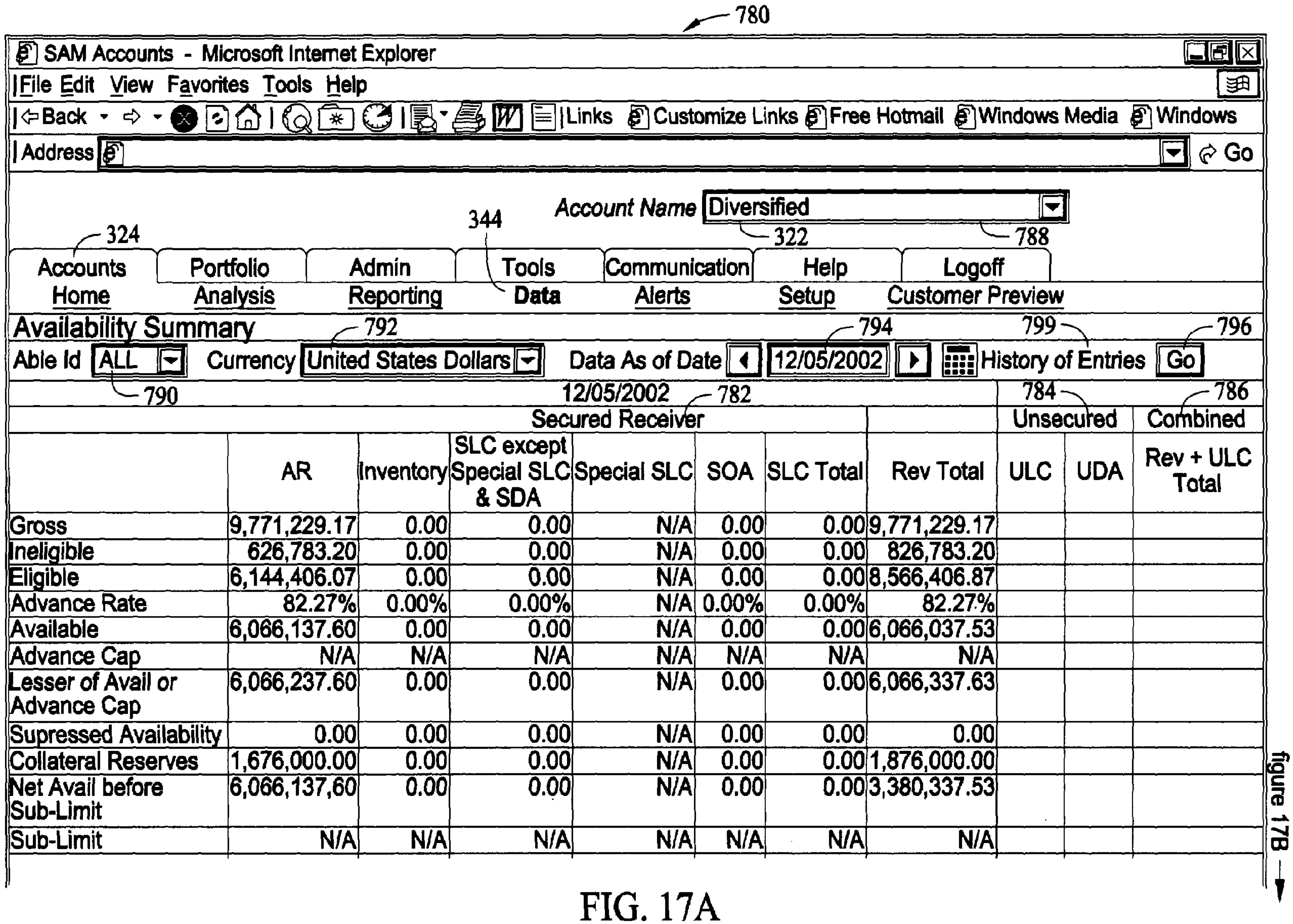

| 12/05/2002 | | | | | | | | | | | |
|---|---|---|---|---|---|---|---|---|---|---|---|
| | Secured Receiver | | | | | | | Unsecured | | Combined |
| | AR | Inventory | SLC except Special SLC & SDA | Special SLC | SOA | SLC Total | Rev Total | ULC | UDA | Rev + ULC Total |
| Gross | 9,771,229.17 | 0.00 | 0.00 | N/A | 0.00 | 0.00 | 9,771,229.17 | | | |
| Ineligible | 626,783.20 | 0.00 | 0.00 | N/A | 0.00 | 0.00 | 826,783.20 | | | |
| Eligible | 6,144,406.07 | 0.00 | 0.00 | N/A | 0.00 | 0.00 | 8,566,406.87 | | | |
| Advance Rate | 82.27% | 0.00% | 0.00% | N/A | 0.00% | 0.00% | 82.27% | | | |
| Available | 6,066,137.60 | 0.00 | 0.00 | N/A | 0.00 | 0.00 | 6,066,037.53 | | | |
| Advance Cap | N/A | N/A | N/A | N/A | N/A | N/A | N/A | | | |
| Lesser of Avail or Advance Cap | 6,066,237.60 | 0.00 | 0.00 | N/A | 0.00 | 0.00 | 6,066,337.63 | | | |
| Supressed Availability | 0.00 | 0.00 | 0.00 | N/A | 0.00 | 0.00 | 0.00 | | | |
| Collateral Reserves | 1,676,000.00 | 0.00 | 0.00 | N/A | 0.00 | 0.00 | 1,876,000.00 | | | |
| Net Avail before Sub-Limit | 6,066,137,60 | 0.00 | 0.00 | N/A | 0.00 | 0.00 | 3,380,337.53 | | | |
| Sub-Limit | N/A | N/A | N/A | N/A | N/A | N/A | N/A | | | |

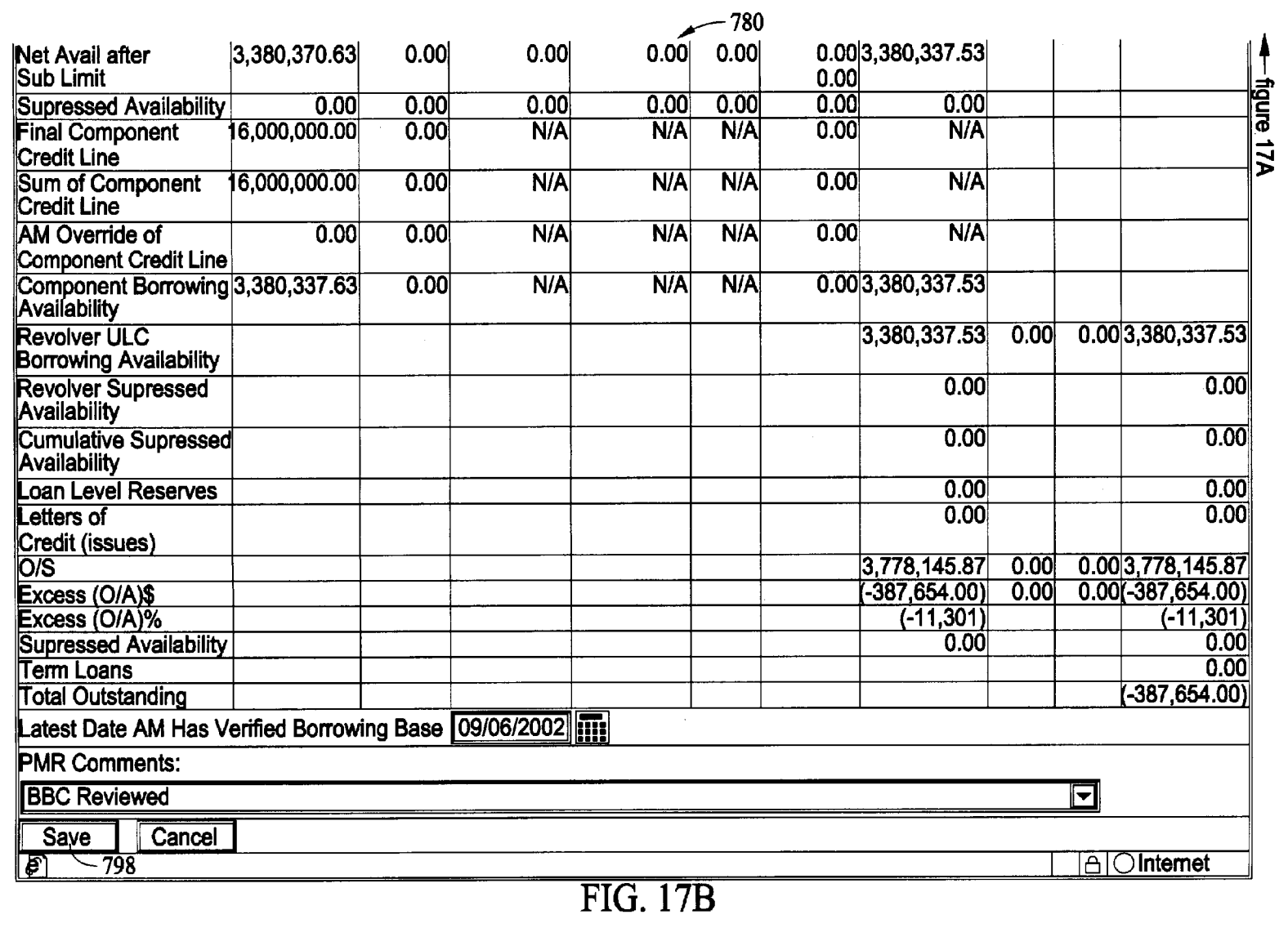

| | | | | | | | | | | |
|---|---|---|---|---|---|---|---|---|---|---|
| Net Avail after Sub Limit | 3,380,370.63 | 0.00 | 0.00 | 0.00 | 0.00 | 0.00 0.00 | 3,380,337.53 | | | |
| Supressed Availability | 0.00 | 0.00 | 0.00 | 0.00 | 0.00 | 0.00 | 0.00 | | | |
| Final Component Credit Line | 16,000,000.00 | 0.00 | N/A | N/A | N/A | 0.00 | N/A | | | |
| Sum of Component Credit Line | 16,000,000.00 | 0.00 | N/A | N/A | N/A | 0.00 | N/A | | | |
| AM Override of Component Credit Line | 0.00 | 0.00 | N/A | N/A | N/A | 0.00 | N/A | | | |
| Component Borrowing Availability | 3,380,337.63 | 0.00 | N/A | N/A | N/A | 0.00 | 3,380,337.53 | | | |
| Revolver ULC Borrowing Availability | | | | | | | 3,380,337.53 | 0.00 | 0.00 | 3,380,337.53 |
| Revolver Supressed Availability | | | | | | | 0.00 | | | 0.00 |
| Cumulative Supressed Availability | | | | | | | 0.00 | | | 0.00 |
| Loan Level Reserves | | | | | | | 0.00 | | | 0.00 |
| Letters of Credit (issues) | | | | | | | 0.00 | | | 0.00 |
| O/S | | | | | | | 3,778,145.87 | 0.00 | 0.00 | 3,778,145.87 |
| Excess (O/A)$ | | | | | | | (-387,654.00) | 0.00 | 0.00 | (-387,654.00) |
| Excess (O/A)% | | | | | | | (-11,301) | | | (-11,301) |
| Supressed Availability | | | | | | | 0.00 | | | 0.00 |
| Term Loans | | | | | | | | | | 0.00 |
| Total Outstanding | | | | | | | | | | (-387,654.00) |

Latest Date AM Has Verified Borrowing Base 09/06/2002

PMR Comments:

BBC Reviewed

Save Cancel

798

Internet

FIG. 17B

| | 05/01 | 06/01 | 07/01 | 08/01 | 09/01 | 10/01 | 11/01 | 12/01 | 01/02 | 02/02 | 03/02 | 04/02 | 05/02 |
|---|---|---|---|---|---|---|---|---|---|---|---|---|---|
| Past Due | 26.1 | 78.0 | 111.8 | 170.2 | 187.3 | 202.1 | 191.9 | 216.5 | 118.6 | 173.6 | 87.9 | 56.1 | 56.1 |
| Cross-Aging | 0.0 | 0.0 | 0.0 | 0.0 | 0.0 | 0.0 | 0.0 | 0.0 | 0.0 | 0.0 | 0.0 | 0.0 | 0.0 |
| Tot Past Due | 26.1 | 78.0 | 111.8 | 170.2 | 187.3 | 202.1 | 191.9 | 216.5 | 118.6 | 173.6 | 87.9 | 56.1 | 56.1 |
| Affiliates | 0.0 | 0.0 | 0.0 | 0.0 | 0.0 | 0.0 | 0.0 | 0.0 | 0.0 | 0.0 | 0.0 | 0.0 | 0.0 |
| Service Chgs | 0.0 | 0.0 | 0.0 | 0.0 | 0.0 | 0.0 | 0.0 | 0.0 | 0.0 | 0.0 | 0.0 | 0.0 | 0.0 |
| Retainage | 0.0 | 0.0 | 0.0 | 0.0 | 0.0 | 0.0 | 0.0 | 0.0 | 0.0 | 0.0 | 0.0 | 0.0 | 0.0 |
| Contras | 62.2 | 15.9 | 31.1 | 0.0 | 0.0 | 0.0 | 0.0 | 0.0 | 0.0 | 0.0 | 0.0 | 0.0 | 0.0 |
| CREDIT BAL >90 | 0.0 | 0.0 | 0.0 | 0.0 | 0.0 | 0.0 | 0.0 | 0.0 | 0.0 | 0.0 | 0.0 | 0.0 | 0.0 |
| PTFLX OVER 25 | 21.0 | 0.0 | 0.0 | 0.0 | 0.0 | 0.0 | 0.0 | 0.0 | 0.0 | 0.0 | 0.0 | 0.0 | 0.0 |
| FOREIGN | 0.0 | 0.0 | 0.0 | 0.0 | 0.0 | 0.0 | 0.0 | 0.0 | 0.0 | 0.0 | 0.0 | 0.0 | 0.0 |
| EXTENDED TERM | 0.0 | 0.0 | 0.0 | 0.0 | 0.0 | 0.0 | 0.0 | 0.0 | 0.0 | 0.0 | 0.0 | 0.0 | 0.0 |
| BANKRUPTCY | 0.0 | 0.0 | 0.0 | 0.0 | 0.0 | 0.0 | 52.1 | 0.0 | 0.0 | 0.0 | 0.0 | 22.7 | 22.7 |
| Total | 109.3 | 93.9 | 142.9 | 170.2 | 187.3 | 202.1 | 244.1 | 216.5 | 118.6 | 173.6 | 87.9 | 78.8 | 78.8 |

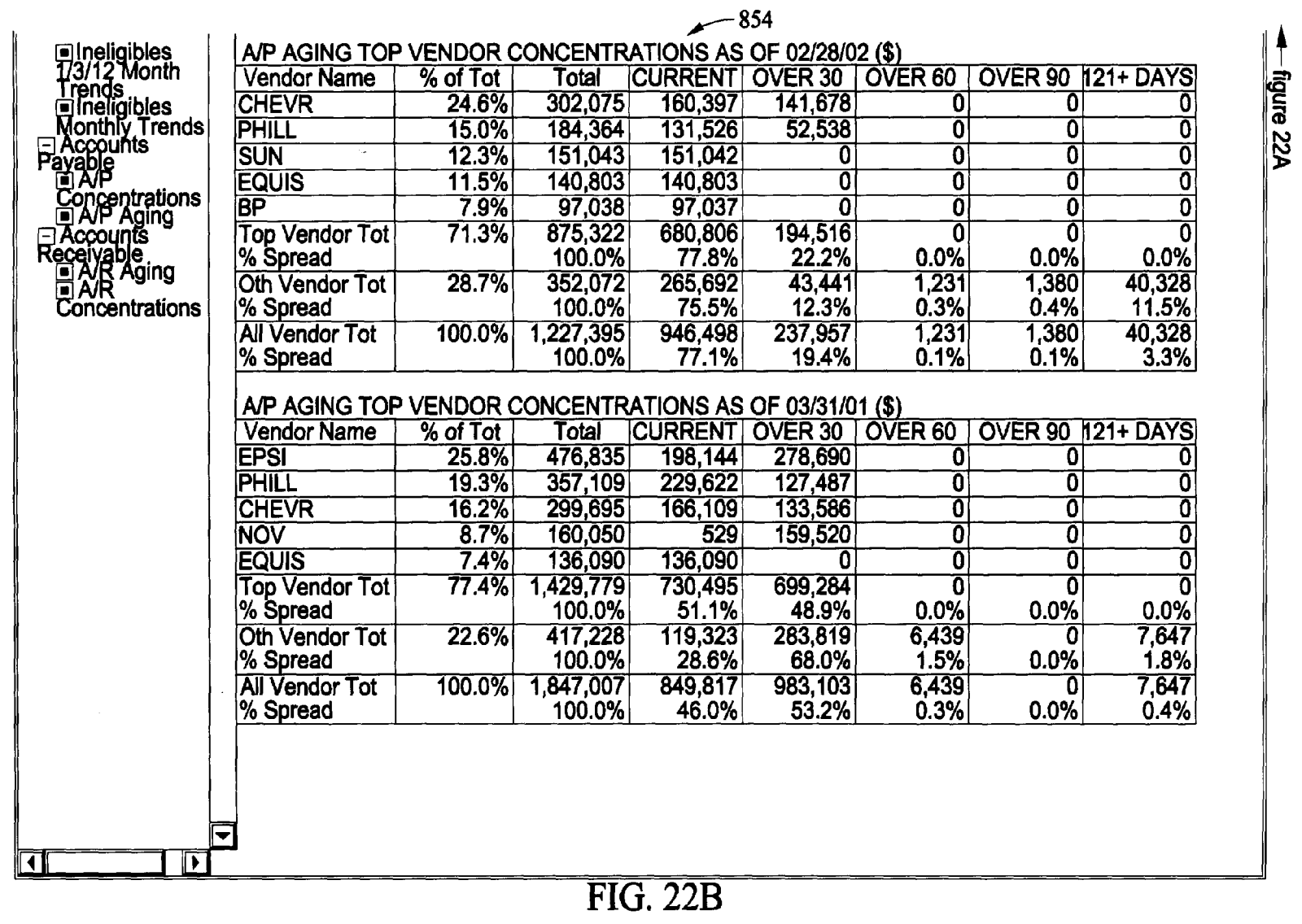

- Ineligibles 1/3/12 Month Trends
- Ineligibles Monthly Trends
- Accounts Payable
  - A/P Concentrations
  - A/P Aging
- Accounts Receivable
  - A/R Aging
  - A/R Concentrations

A/P AGING TOP VENDOR CONCENTRATIONS AS OF 02/28/02 ($)

| Vendor Name | % of Tot | Total | CURRENT | OVER 30 | OVER 60 | OVER 90 | 121+ DAYS |
|---|---|---|---|---|---|---|---|
| CHEVR | 24.6% | 302,075 | 160,397 | 141,678 | 0 | 0 | 0 |
| PHILL | 15.0% | 184,364 | 131,526 | 52,538 | 0 | 0 | 0 |
| SUN | 12.3% | 151,043 | 151,042 | 0 | 0 | 0 | 0 |
| EQUIS | 11.5% | 140,803 | 140,803 | 0 | 0 | 0 | 0 |
| BP | 7.9% | 97,038 | 97,037 | 0 | 0 | 0 | 0 |
| Top Vendor Tot | 71.3% | 875,322 | 680,806 | 194,516 | 0 | 0 | 0 |
| % Spread | | 100.0% | 77.8% | 22.2% | 0.0% | 0.0% | 0.0% |
| Oth Vendor Tot | 28.7% | 352,072 | 265,692 | 43,441 | 1,231 | 1,380 | 40,328 |
| % Spread | | 100.0% | 75.5% | 12.3% | 0.3% | 0.4% | 11.5% |
| All Vendor Tot | 100.0% | 1,227,395 | 946,498 | 237,957 | 1,231 | 1,380 | 40,328 |
| % Spread | | 100.0% | 77.1% | 19.4% | 0.1% | 0.1% | 3.3% |

A/P AGING TOP VENDOR CONCENTRATIONS AS OF 03/31/01 ($)

| Vendor Name | % of Tot | Total | CURRENT | OVER 30 | OVER 60 | OVER 90 | 121+ DAYS |
|---|---|---|---|---|---|---|---|
| EPSI | 25.8% | 476,835 | 198,144 | 278,690 | 0 | 0 | 0 |
| PHILL | 19.3% | 357,109 | 229,622 | 127,487 | 0 | 0 | 0 |
| CHEVR | 16.2% | 299,695 | 166,109 | 133,586 | 0 | 0 | 0 |
| NOV | 8.7% | 160,050 | 529 | 159,520 | 0 | 0 | 0 |
| EQUIS | 7.4% | 136,090 | 136,090 | 0 | 0 | 0 | 0 |
| Top Vendor Tot | 77.4% | 1,429,779 | 730,495 | 699,284 | 0 | 0 | 0 |
| % Spread | | 100.0% | 51.1% | 48.9% | 0.0% | 0.0% | 0.0% |
| Oth Vendor Tot | 22.6% | 417,228 | 119,323 | 283,819 | 6,439 | 0 | 7,647 |
| % Spread | | 100.0% | 28.6% | 68.0% | 1.5% | 0.0% | 1.8% |
| All Vendor Tot | 100.0% | 1,847,007 | 849,817 | 983,103 | 6,439 | 0 | 7,647 |
| % Spread | | 100.0% | 46.0% | 53.2% | 0.3% | 0.0% | 0.4% |

FIG. 22B

| | 05/01 | 06/01 | 07/01 | 08/01 | 09/01 | 10/01 | 11/01 | 12/01 | 01/02 | 02/02 | 03/02 | 04/02 |
|---|---|---|---|---|---|---|---|---|---|---|---|---|
| As Of | 04/30/01 | 05/31/01 | 06/30/01 | 07/31/01 | 08/31/01 | 09/30/01 | 10/31/01 | 11/30/01 | 12/31/01 | 01/31/02 | 02/28/02 | 03/31/02 |
| Received | 05/04/01 | 06/06/01 | 07/06/01 | 08/06/01 | 09/07/01 | 10/04/01 | 11/05/01 | 12/05/01 | 01/04/02 | 02/06/02 | 03/06/02 | 04/01/02 |
| CURRENT | 573.8 | 622.5 | 1545.1 | 776.6 | 912.8 | 1415.2 | 1155.8 | 971.5 | 882.2 | 1250.8 | 946.5 | 1388.4 |
| % spread | 34 | 62 | 89 | 45 | 78 | 84 | 72 | 76 | 61 | 88 | 77 | 73 |
| OVER 30 | 915.2 | 366.9 | 190.8 | 932.1 | 263.3 | 263.1 | 444.8 | 295.7 | 548.6 | 148.1 | 238.0 | 500.6 |
| % spread | 54 | 36 | 11 | 54 | 22 | 16 | 28 | 23 | 38 | 10 | 19 | 26 |
| OVER 60 | 200.2 | 14.6 | -0.1 | 9.5 | 0.0 | 0.8 | 0.1 | 11.5 | 6.6 | 4.1 | 1.2 | 1.1 |
| % spread | 12 | 1 | 0 | 1 | 0 | 0 | 0 | 1 | 0 | 0 | 0 | 0 |
| OVER 90 | 1.1 | 0.0 | 0.0 | 0.5 | 0.0 | 0.0 | -0.1 | 0.0 | 0.0 | 1.4 | 1.4 | 0.0 |
| % spread | 0 | 0 | 0 | 0 | 0 | 0 | 0 | 0 | 0 | 0 | 0 | 0 |
| 121+ DAYS | 6.9 | 2.3 | 1.9 | 1.2 | 0.2 | 0.2 | -0.6 | -0.6 | 10.9 | 10.5 | 40.3 | 12.9 |
| % spread | 0 | 0 | 0 | 0 | 0 | 0 | 0 | 0 | 1 | 1 | 3 | 1 |
| Total | 1697.1 | 1006.3 | 1737.8 | 1719.8 | 1176.3 | 1679.3 | 1600.0 | 1278.1 | 1448.2 | 1414.9 | 1227.4 | 1903.0 |

| | 05/01 | 06/01 | 07/01 | 08/01 | 09/01 | 10/01 | 11/01 | 12/01 | 01/02 | 02/02 | 03/02 | 04/02 |
|---|---|---|---|---|---|---|---|---|---|---|---|---|
| As Of | 04/30/01 | 05/31/01 | 06/30/01 | 07/31/01 | 08/31/01 | 09/30/01 | 10/31/01 | 11/30/01 | 12/31/01 | 01/31/02 | 02/28/02 | 03/31/02 |
| Received | 05/04/01 | 06/06/01 | 07/06/01 | 08/06/01 | 09/07/01 | 10/04/01 | 11/05/01 | 12/05/01 | 01/04/02 | 02/06/02 | 03/06/02 | 04/01/02 |
| 0-30 DAYS | 2093.4 | 2039.7 | 3299.7 | 1973.1 | 2147.9 | 1903.8 | 1861.2 | 1846.1 | 1584.5 | 2083.3 | 1656.4 | 1780.5 |
| % spread | 51 | 47 | 45 | 55 | 53 | 43 | 48 | 50 | 48 | 59 | 45 | 57 |
| 31-60 DAYS | 1604.8 | 1527.4 | 2940.5 | 963.3 | 1499.5 | 1610.4 | 1397.5 | 1301.8 | 1256.4 | 1044.3 | 1424.4 | 997.9 |
| % spread | 39 | 35 | 40 | 27 | 37 | 36 | 36 | 35 | 38 | 30 | 38 | 32 |
| 61-90 DAYS | 353.8 | 672.8 | 796.6 | 502.8 | 233.7 | 738.9 | 467.1 | 335.2 | 319.7 | 230.0 | 540.4 | 300.5 |
| % spread | 9 | 16 | 11 | 14 | 6 | 17 | 12 | 9 | 10 | 7 | 15 | 10 |
| 91-120 DAYS | 9.5 | 63.2 | 234.3 | 78.2 | 96.7 | 106.2 | 59.1 | 69.8 | 20.1 | 59.5 | 41.7 | -0.1 |
| % spread | 0 | 1 | 3 | 2 | 2 | 2 | 2 | 2 | 1 | 2 | 1 | 0 |
| 121+ DAYS | 16.6 | 14.7 | 28.1 | 91.9 | 90.7 | 95.9 | 132.8 | 146.7 | 98.4 | 114.1 | 46.2 | 56.2 |
| % spread | 0 | 0 | 0 | 3 | 2 | 2 | 3 | 4 | 3 | 3 | 1 | 2 |
| Total | 4078.1 | 4317.8 | 7299.3 | 3609.4 | 4068.4 | 4455.2 | 3917.8 | 3699.6 | 3279.1 | 3531.2 | 3709.2 | 3135.0 |

856 figure 24A

- Ineligibles 1/3/12 Month Trends
- Ineligibles Monthly Trends
- Accounts Payable
  - A/P Concentrations
  - A/P Aging
- Accounts Receivable
  - A/R Aging
  - A/R Concentrations A/R01: A/R Aging Totals for Top Debtors (M)

| | 05/01 | 06/01 | 07/01 | 08/01 | 09/01 | 10/01 | 11/01 | 12/01 | 01/02 | 02/02 | 03/02 | 04/02 | 05/02 |
|---|---|---|---|---|---|---|---|---|---|---|---|---|---|
| Debtors Trkd | 10 | 10 | 10 | 10 | 10 | 10 | 10 | 10 | 10 | 10 | 10 | 10 | 10 |
| 0-30 DAYS | 1116.4 | 929.7 | 1870.8 | 1096.1 | 1192.5 | 997.8 | 902.0 | 1002.6 | 890.2 | 1293.2 | 995.8 | 947.0 | 0.0 |
| % of Cat Tot | 53 | 46 | 57 | 56 | 56 | 52 | 48 | 54 | 56 | 62 | 60 | 53 | 0 |
| 31-60 DAYS | 1013.0 | 853.1 | 1012.7 | 670.7 | 948.3 | 914.7 | 962.8 | 791.3 | 829.5 | 720.4 | 939.3 | 619.6 | 0.0 |
| % of Cat Tot | 63 | 56 | 34 | 70 | 63 | 57 | 69 | 61 | 66 | 69 | 66 | 62 | 0 |
| 61-90 DAYS | 278.1 | 349.5 | 559.7 | 314.0 | 68.0 | 521.3 | 347.9 | 247.9 | 163.6 | 87.8 | 435.7 | 199.1 | 0.0 |
| % of Cat Tot | 79 | 52 | 70 | 62 | 29 | 71 | 74 | 74 | 51 | 38 | 81 | 66 | 0 |
| 91-120 DAYS | 0.0 | 37.4 | 38.8 | 34.4 | 0.0 | 48.3 | 0.0 | 0.0 | 0.0 | 0.0 | 3.0 | 0.0 | 0.0 |
| % of Cat Tot | 0 | 59 | 17 | 44 | 0 | 45 | 0 | 0 | 0 | 0 | 7 | 0 | 0 |
| 121+ DAYS | 0.0 | 0.0 | 0.0 | 0.0 | 0.0 | 0.0 | 0.0 | 0.0 | 0.0 | 0.0 | 0.0 | 0.0 | 0.0 |
| % of Cat Tot | 0 | 0 | 0 | 0 | 0 | 0 | 0 | 0 | 0 | 0 | 0 | 0 | 0 |
| Total | 2407.5 | 2169.7 | 3482.1 | 2115.1 | 2208.9 | 2482.0 | 2212.7 | 2041.7 | 1883.3 | 2101.4 | 2373.9 | 1765.7 | 0.0 |
| % of Cat Tot | 59 | 50 | 48 | 59 | 54 | 56 | 56 | 55 | 57 | 60 | 64 | 56 | 0 |

Figures 25A, 25B:
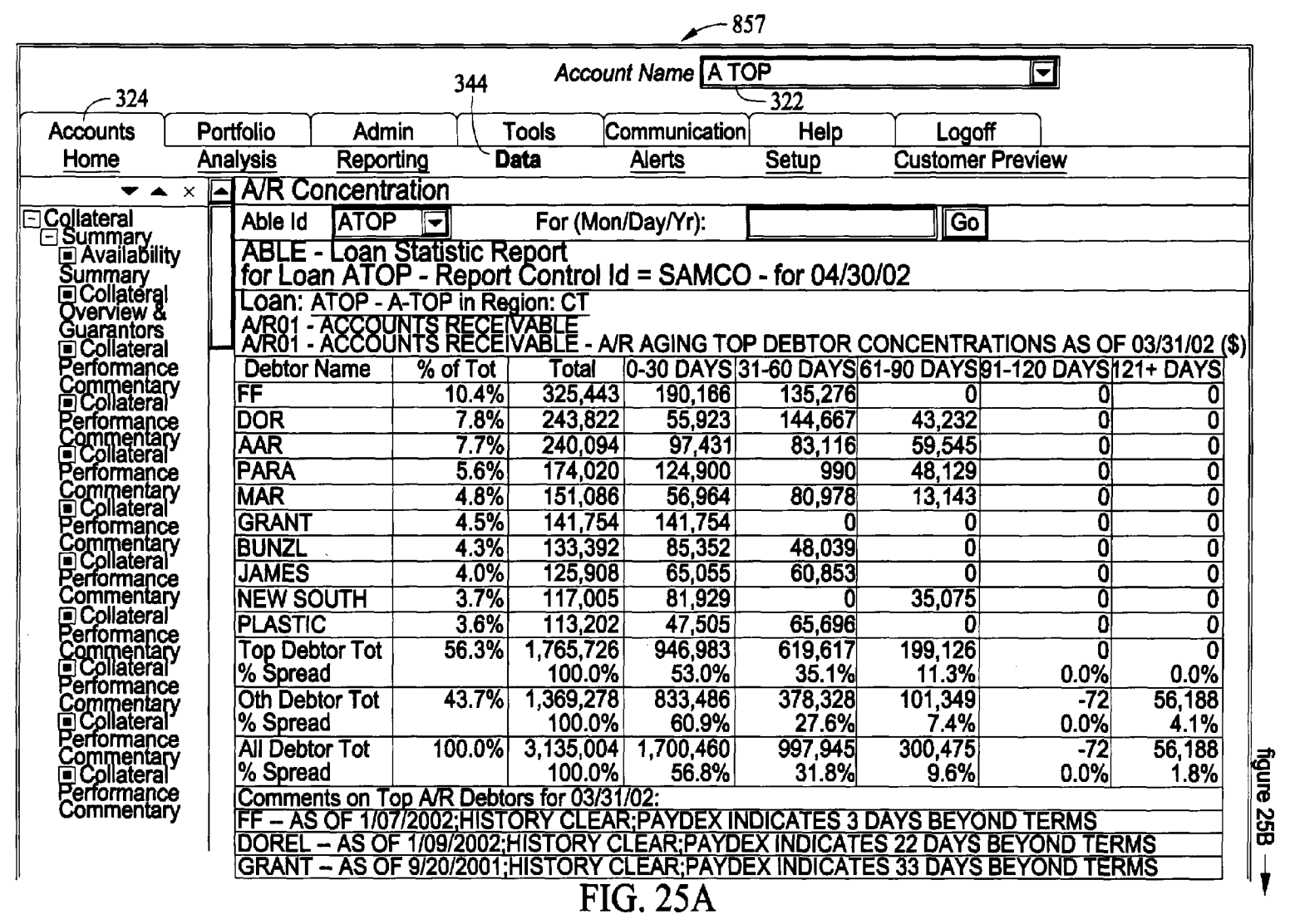

Account Name A TOP 322

324 344

Accounts | Portfolio | Admin | Tools | Communication | Help | Logoff

Home | Analysis | Reporting | Data | Alerts | Setup | Customer Preview

- Collateral
  - Summary
    - Availability Summary
    - Collateral Overview & Guarantors
    - Collateral Performance Commentary
    - Collateral Performance Commentary
    - Collateral Performance Commentary
    - Collateral Performance Commentary
    - Collateral Performance Commentary
    - Collateral Performance Commentary
    - Collateral Performance Commentary
    - Collateral Performance Commentary
    - Collateral Performance Commentary A/R Concentration Able Id ATOP For (Mon/Day/Yr): Go ABLE - Loan Statistic Report
for Loan ATOP - Report Control Id = SAMCO - for 04/30/02

Loan: ATOP - A-TOP in Region: CT
A/R01 - ACCOUNTS RECEIVABLE
A/R01 - ACCOUNTS RECEIVABLE - A/R AGING TOP DEBTOR CONCENTRATIONS AS OF 03/31/02 ($)

| Debtor Name | % of Tot | Total | 0-30 DAYS | 31-60 DAYS | 61-90 DAYS | 91-120 DAYS | 121+ DAYS |
|---|---|---|---|---|---|---|---|
| FF | 10.4% | 325,443 | 190,166 | 135,276 | 0 | 0 | 0 |
| DOR | 7.8% | 243,822 | 55,923 | 144,667 | 43,232 | 0 | 0 |
| AAR | 7.7% | 240,094 | 97,431 | 83,116 | 59,545 | 0 | 0 |
| PARA | 5.6% | 174,020 | 124,900 | 990 | 48,129 | 0 | 0 |
| MAR | 4.8% | 151,086 | 56,964 | 80,978 | 13,143 | 0 | 0 |
| GRANT | 4.5% | 141,754 | 141,754 | 0 | 0 | 0 | 0 |
| BUNZL | 4.3% | 133,392 | 85,352 | 48,039 | 0 | 0 | 0 |
| JAMES | 4.0% | 125,908 | 65,055 | 60,853 | 0 | 0 | 0 |
| NEW SOUTH | 3.7% | 117,005 | 81,929 | 0 | 35,075 | 0 | 0 |
| PLASTIC | 3.6% | 113,202 | 47,505 | 65,696 | 0 | 0 | 0 |
| Top Debtor Tot<br>% Spread | 56.3% | 1,765,726<br>100.0% | 946,983<br>53.0% | 619,617<br>35.1% | 199,126<br>11.3% | 0<br>0.0% | 0<br>0.0% |
| Oth Debtor Tot<br>% Spread | 43.7% | 1,369,278<br>100.0% | 833,486<br>60.9% | 378,328<br>27.6% | 101,349<br>7.4% | -72<br>0.0% | 56,188<br>4.1% |
| All Debtor Tot<br>% Spread | 100.0% | 3,135,004<br>100.0% | 1,700,460<br>56.8% | 997,945<br>31.8% | 300,475<br>9.6% | -72<br>0.0% | 56,188<br>1.8% |

Comments on Top A/R Debtors for 03/31/02:
FF – AS OF 1/07/2002;HISTORY CLEAR;PAYDEX INDICATES 3 DAYS BEYOND TERMS
DOREL – AS OF 1/09/2002;HISTORY CLEAR;PAYDEX INDICATES 22 DAYS BEYOND TERMS
GRANT – AS OF 9/20/2001;HISTORY CLEAR;PAYDEX INDICATES 33 DAYS BEYOND TERMS figure 25B →

▣ Collateral
Performance
Commentary
▣ Collateral
Performance
Commentary
▣ Collateral
Performance
Commentary
▣ Collateral
Performance
Commentary
▣ Collateral
Performance
Commentary
▣ Collateral
Performance
Commentary
▣ Collateral
Performance
Commentary
▣ Collateral
Performance
Commentary
▣ Collateral
Performance
Commentary
▣ Collateral
Performance
Commentary
▣ Collateral
Performance
Commentary
▣ Collateral
Performance
Commentary

A/R01 - ACCOUNTS RECEIVABLE

857

A/R01 - ACCOUNTS RECEIVABLE - A/R AGING TOP DEBTOR CONCENTRATIONS AS OF 02/28/02 ($)

| Debtor Name | % of Tot | Total | 0-30 DAYS | 31-60 DAYS | 61-90 DAYS | 91-120 DAYS | 121+ DAYS |
|---|---|---|---|---|---|---|---|
| DOREL | 17.9% | 663,421 | 145,567 | 273,710 | 244,143 | 0 | 0 |
| FF | 9.0% | 332,731 | 154,160 | 175,556 | 0 | 3,014 | 0 |
| NEW | 7.9% | 291,480 | 0 | 138,320 | 153,160 | 0 | 0 |
| MAR | 5.6% | 208,844 | 94,121 | 114,722 | 0 | 0 | 0 |
| BUNZL | 5.5% | 204,737 | 109,784 | 94,952 | 0 | 0 | 0 |
| AARON | 5.3% | 197,518 | 83,116 | 76,002 | 38,398 | 0 | 0 |
| NORTH | 4.1% | 152,809 | 152,808 | 0 | 0 | 0 | 0 |
| JAMES | 3.3% | 121,713 | 121,712 | 0 | 0 | 0 | 0 |
| GRANT | 3.0% | 111,192 | 111,191 | 0 | 0 | 0 | 0 |
| MICRON | 2.4% | 89,455 | 23,368 | 66,086 | 0 | 0 | 0 |
| Top Debtor Tot | 64.0% | 2,373,090 | 995,832 | 939,350 | 435,702 | 3,014 | 0 |
| % Spread | | 100.0% | 41.9% | 39.6% | 18.4% | 0.1% | 0.0% |
| Oth Debtor Tot | 36.0% | 1,335,275 | 660,595 | 485,091 | 104,708 | 38,700 | 46,180 |
| % Spread | | 100.0% | 49.5% | 36.3% | 7.8% | 2.9% | 3.5% |
| All Debtor Tot | 100.0% | 3,709,173 | 1,656,427 | 1,424,441 | 540,410 | 41,715 | 46,180 |
| % Spread | | 100.0% | 44.7% | 38.4% | 14.6% | 1.1% | 1.2% |

| Debtor Name | Total | Terms |
|---|---|---|
| DOREL | 663,421 | – |
| FF | 332,731 | – |
| NEW | 291,480 | |
| MAR | 208,844 | ES |
| BUNZL | 204,737 | |
| AARON | 197,518 | 1R3 |
| NORTH | 152,809 | |
| JAMES | 121,713 | |
| GRANT | 111,192 | |
| MICRON | 89,455 | |
| Tot Debtor Tot | 2,373,898 | |

| Comments on Top A/R Debtors for 02/28/02: |
|---|
| DOREL – AS OF 1/07/2002;HISTORY CLEAR;PAYDEX INDICATES 3 DAYS BEYOND TERMS |
| FF – AS OF 1/09/2002;HISTORY CLEAR;PAYDEX INDICATES 22 DAYS BEYOND TERMS |
| AARON – AS OF 9/20/2001;HISTORY CLEAR;PAYDEX INDICATES 33 DAYS BEYOND TERMS | figure 25C →

FIG. 25B figure 25B

Figures 25B, 25C:
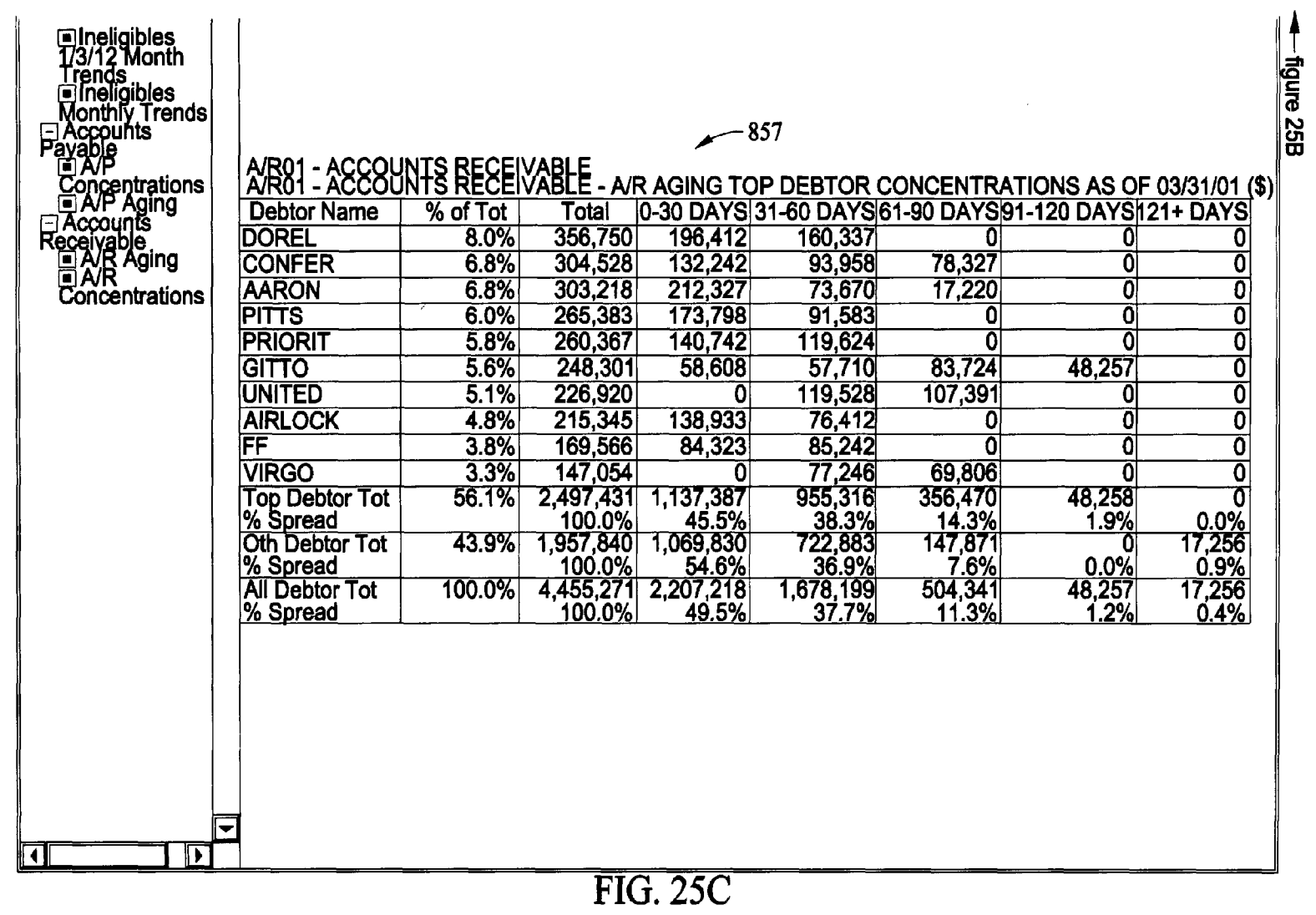

Ineligibles 1/3/12 Month Trends
Ineligibles Monthly Trends
Accounts Payable
A/P Concentrations
A/P Aging
Accounts Receivable
A/R Aging
A/R Concentrations

857

A/R01 - ACCOUNTS RECEIVABLE

A/R01 - ACCOUNTS RECEIVABLE - A/R AGING TOP DEBTOR CONCENTRATIONS AS OF 03/31/01 ($)

| Debtor Name | % of Tot | Total | 0-30 DAYS | 31-60 DAYS | 61-90 DAYS | 91-120 DAYS | 121+ DAYS |
|---|---|---|---|---|---|---|---|
| DOREL | 8.0% | 356,750 | 196,412 | 160,337 | 0 | 0 | 0 |
| CONFER | 6.8% | 304,528 | 132,242 | 93,958 | 78,327 | 0 | 0 |
| AARON | 6.8% | 303,218 | 212,327 | 73,670 | 17,220 | 0 | 0 |
| PITTS | 6.0% | 265,383 | 173,798 | 91,583 | 0 | 0 | 0 |
| PRIORIT | 5.8% | 260,367 | 140,742 | 119,624 | 0 | 0 | 0 |
| GITTO | 5.6% | 248,301 | 58,608 | 57,710 | 83,724 | 48,257 | 0 |
| UNITED | 5.1% | 226,920 | 0 | 119,528 | 107,391 | 0 | 0 |
| AIRLOCK | 4.8% | 215,345 | 138,933 | 76,412 | 0 | 0 | 0 |
| FF | 3.8% | 169,566 | 84,323 | 85,242 | 0 | 0 | 0 |
| VIRGO | 3.3% | 147,054 | 0 | 77,246 | 69,806 | 0 | 0 |
| Top Debtor Tot | 56.1% | 2,497,431 | 1,137,387 | 955,316 | 356,470 | 48,258 | 0 |
| % Spread | | 100.0% | 45.5% | 38.3% | 14.3% | 1.9% | 0.0% |
| Oth Debtor Tot | 43.9% | 1,957,840 | 1,069,830 | 722,883 | 147,871 | 0 | 17,256 |
| % Spread | | 100.0% | 54.6% | 36.9% | 7.6% | 0.0% | 0.9% |
| All Debtor Tot | 100.0% | 4,455,271 | 2,207,218 | 1,678,199 | 504,341 | 48,257 | 17,256 |
| % Spread | | 100.0% | 49.5% | 37.7% | 11.3% | 1.2% | 0.4% |

Figures 26A, 26B:
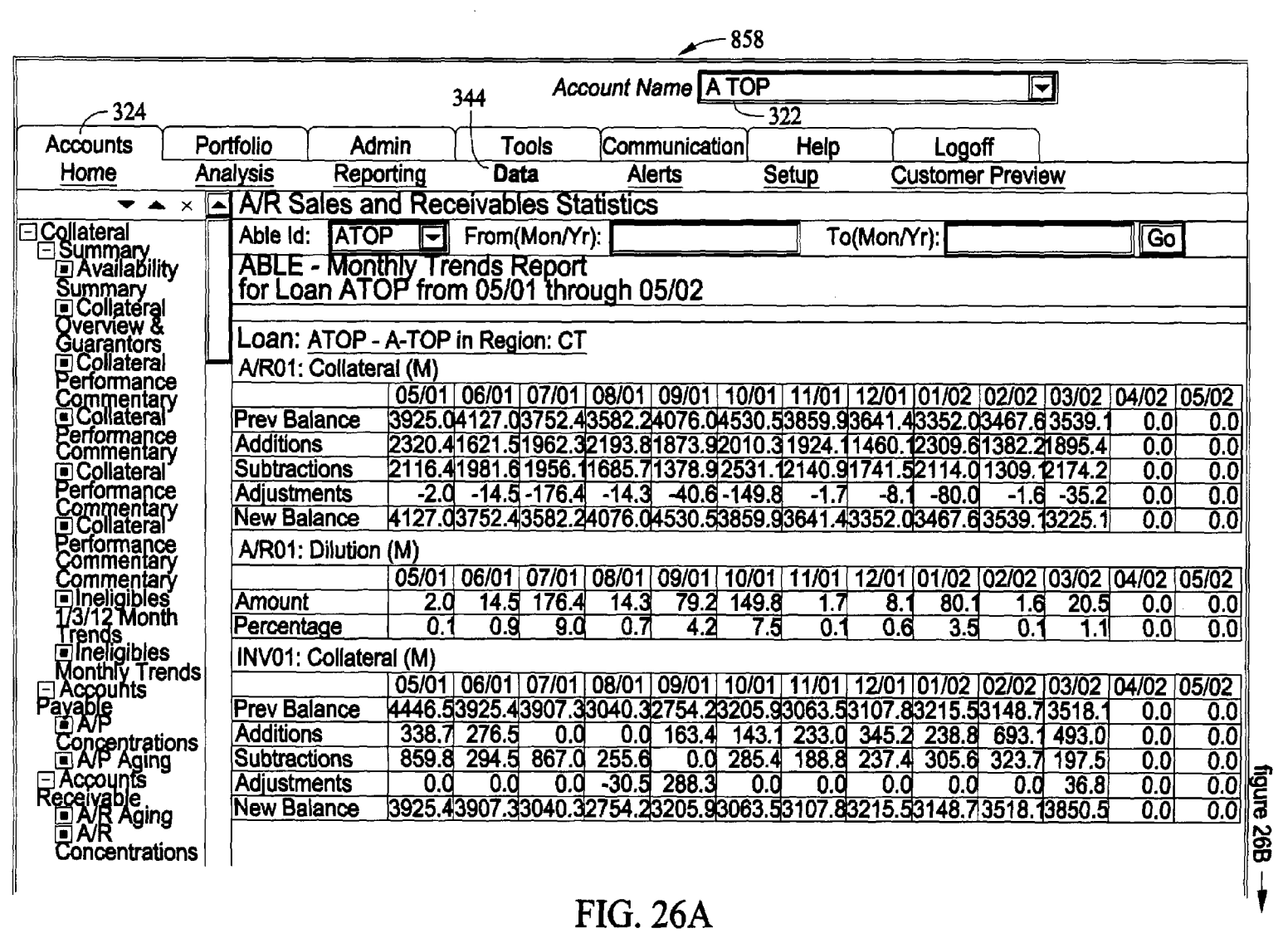

344 Account Name A TOP 322

324

Accounts | Portfolio | Admin | Tools | Communication | Help | Logoff

Home | Analysis | Reporting | Data | Alerts | Setup | Customer Preview

Collateral
- Summary
  - Availability Summary
  - Collateral Overview & Guarantors
  - Collateral Performance Commentary
  - Collateral Performance Commentary
  - Collateral Performance Commentary
  - Collateral Performance Commentary Commentary
  - Ineligibles 1/3/12 Month Trends
  - Ineligibles Monthly Trends
- Accounts Payable
  - A/P Concentrations
  - A/P Aging
- Accounts Receivable
  - A/R Aging
  - A/R Concentrations A/R Sales and Receivables Statistics Able Id: ATOP From(Mon/Yr): To(Mon/Yr): Go ABLE - Monthly Trends Report
for Loan ATOP from 05/01 through 05/02

Loan: ATOP - A-TOP in Region: CT

A/R01: Collateral (M)

| | 05/01 | 06/01 | 07/01 | 08/01 | 09/01 | 10/01 | 11/01 | 12/01 | 01/02 | 02/02 | 03/02 | 04/02 | 05/02 |
|---|---|---|---|---|---|---|---|---|---|---|---|---|---|
| Prev Balance | 3925.0 | 4127.0 | 3752.4 | 3582.2 | 4076.0 | 4530.5 | 3859.9 | 3641.4 | 3352.0 | 3467.6 | 3539.1 | 0.0 | 0.0 |
| Additions | 2320.4 | 1621.5 | 1962.3 | 2193.8 | 1873.9 | 2010.3 | 1924.1 | 1460.1 | 2309.6 | 1382.2 | 1895.4 | 0.0 | 0.0 |
| Subtractions | 2116.4 | 1981.6 | 1956.1 | 1685.7 | 1378.9 | 2531.1 | 2140.9 | 1741.5 | 2114.0 | 1309.1 | 2174.2 | 0.0 | 0.0 |
| Adjustments | -2.0 | -14.5 | -176.4 | -14.3 | -40.6 | -149.8 | -1.7 | -8.1 | -80.0 | -1.6 | -35.2 | 0.0 | 0.0 |
| New Balance | 4127.0 | 3752.4 | 3582.2 | 4076.0 | 4530.5 | 3859.9 | 3641.4 | 3352.0 | 3467.6 | 3539.1 | 3225.1 | 0.0 | 0.0 |

A/R01: Dilution (M)

| | 05/01 | 06/01 | 07/01 | 08/01 | 09/01 | 10/01 | 11/01 | 12/01 | 01/02 | 02/02 | 03/02 | 04/02 | 05/02 |
|---|---|---|---|---|---|---|---|---|---|---|---|---|---|
| Amount | 2.0 | 14.5 | 176.4 | 14.3 | 79.2 | 149.8 | 1.7 | 8.1 | 80.1 | 1.6 | 20.5 | 0.0 | 0.0 |
| Percentage | 0.1 | 0.9 | 9.0 | 0.7 | 4.2 | 7.5 | 0.1 | 0.6 | 3.5 | 0.1 | 1.1 | 0.0 | 0.0 |

INV01: Collateral (M)

| | 05/01 | 06/01 | 07/01 | 08/01 | 09/01 | 10/01 | 11/01 | 12/01 | 01/02 | 02/02 | 03/02 | 04/02 | 05/02 |
|---|---|---|---|---|---|---|---|---|---|---|---|---|---|
| Prev Balance | 4446.5 | 3925.4 | 3907.3 | 3040.3 | 2754.2 | 3205.9 | 3063.5 | 3107.8 | 3215.5 | 3148.7 | 3518.1 | 0.0 | 0.0 |
| Additions | 338.7 | 276.5 | 0.0 | 0.0 | 163.4 | 143.1 | 233.0 | 345.2 | 238.8 | 693.1 | 493.0 | 0.0 | 0.0 |
| Subtractions | 859.8 | 294.5 | 867.0 | 255.6 | 0.0 | 285.4 | 188.8 | 237.4 | 305.6 | 323.7 | 197.5 | 0.0 | 0.0 |
| Adjustments | 0.0 | 0.0 | 0.0 | -30.5 | 288.3 | 0.0 | 0.0 | 0.0 | 0.0 | 0.0 | 36.8 | 0.0 | 0.0 |
| New Balance | 3925.4 | 3907.3 | 3040.3 | 2754.2 | 3205.9 | 3063.5 | 3107.8 | 3215.5 | 3148.7 | 3518.1 | 3850.5 | 0.0 | 0.0 | figure 26B →

Figures 26A, 26B:
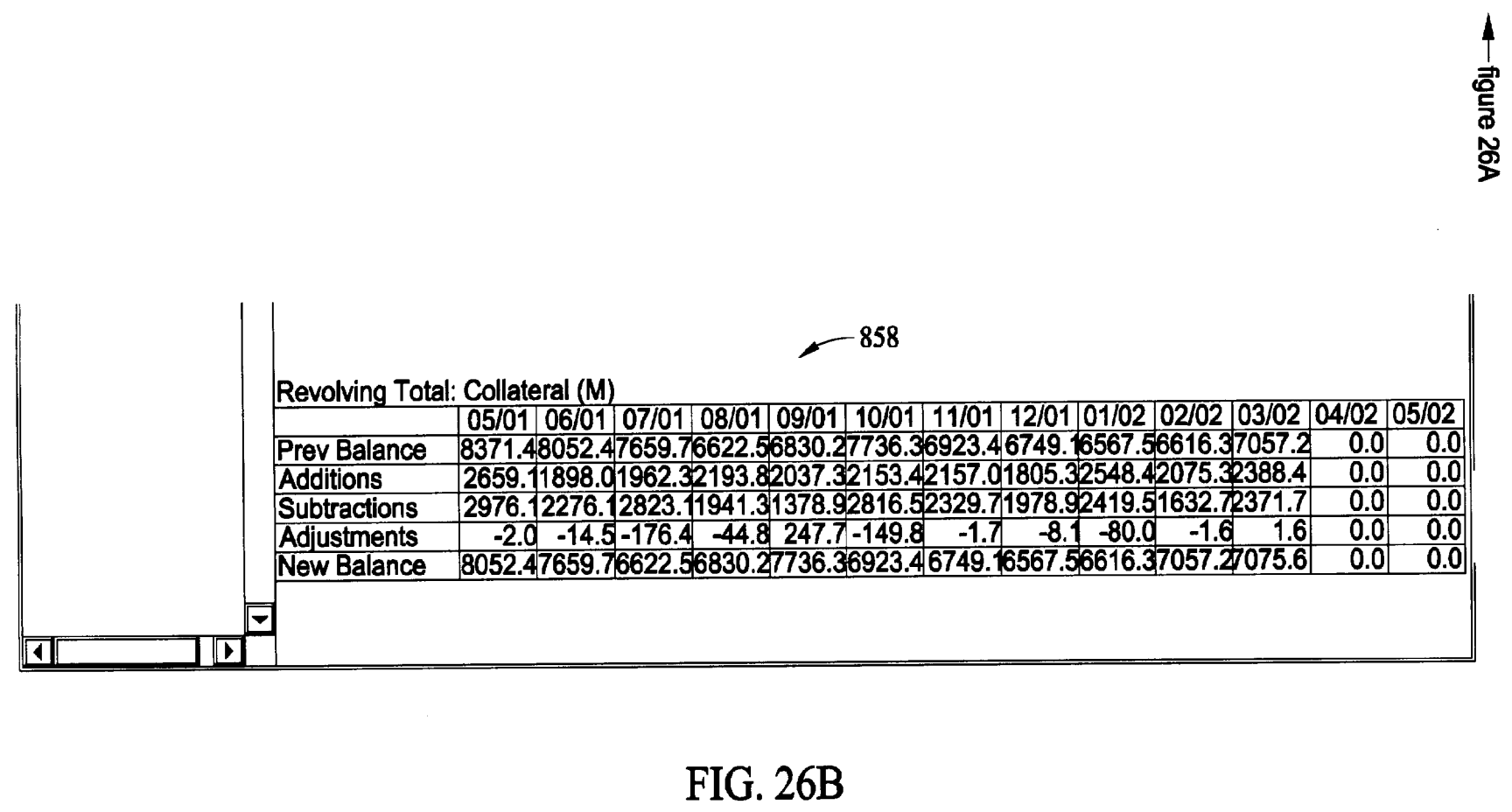

Revolving Total: Collateral (M)

| | 05/01 | 06/01 | 07/01 | 08/01 | 09/01 | 10/01 | 11/01 | 12/01 | 01/02 | 02/02 | 03/02 | 04/02 | 05/02 |
|---|---|---|---|---|---|---|---|---|---|---|---|---|---|
| Prev Balance | 8371.4 | 8052.4 | 7659.7 | 6622.5 | 6830.2 | 7736.3 | 6923.4 | 6749.1 | 6567.5 | 6616.3 | 7057.2 | 0.0 | 0.0 |
| Additions | 2659.1 | 1898.0 | 1962.3 | 2193.8 | 2037.3 | 2153.4 | 2157.0 | 1805.3 | 2548.4 | 2075.3 | 2388.4 | 0.0 | 0.0 |
| Subtractions | 2976.1 | 2276.1 | 2823.1 | 1941.3 | 1378.9 | 2816.5 | 2329.7 | 1978.9 | 2419.5 | 1632.7 | 2371.7 | 0.0 | 0.0 |
| Adjustments | -2.0 | -14.5 | -176.4 | -44.8 | 247.7 | -149.8 | -1.7 | -8.1 | -80.0 | -1.6 | 1.6 | 0.0 | 0.0 |
| New Balance | 8052.4 | 7659.7 | 6622.5 | 6830.2 | 7736.3 | 6923.4 | 6749.1 | 6567.5 | 6616.3 | 7057.2 | 7075.6 | 0.0 | 0.0 |

| | | | | |
|---|---|---|---|---|
| Off Balance Sheet (OBS) Current Assets | 0 | 0 | 0 | 0 |
| Total Current Assets including OBS items | 10,656,000 | 11,240,000 | 0 | 9,075,000 |
| Net PPE | 3,115,000 | 3,342,000 | 0 | 2,700,000 |
| Investments | 0 | 0 | 0 | 0 |
| Intangibles | 3,647,000 | 6,883,000 | 0 | 10,752,000 |
| Other Long Term Assets | 1,023,000 | 1,083,000 | 0 | 1,830,000 |
| Total Assets | 18,441,000 | 22,548,000 | 0 | 24,357,000 |
| Off Balance Sheet (OBS) Long Term Assets | 0 | 0 | 0 | 0 |
| Total Assets including OBS items | 18,441,000 | 22,548,000 | 0 | 24,357,000 |
| Liabilities And ShareHolder Equity ~984 | | | | |
| Accounts Payable | 3,854,000 | 5,128,000 | 0 | 5,269,000 |
| Accrued Liabilities | 0 | 0 | 0 | 0 |
| Other Current Liabilities | 709,000 | 2,713,000 | 0 | 0 |
| Current Portion of LT Debt | 0 | 0 | 0 | 0 |
| Total Current Liabilities | 4,563,000 | 7,841,000 | 0 | 5,269,000 |
| Off Balance Sheet (OBS) Current Liabilities | 0 | 0 | 0 | 0 |
| Total Current Liabilities including OBS items | 4,563,000 | 7,841,000 | 0 | 5,269,000 |
| Long Term Debt | 1,179,000 | 1,591,000 | 0 | 6,969,000 |
| Deferred Taxes | 0 | 0 | 0 | 0 |
| Other Long Term Liabilities | 81,000 | 188,000 | 0 | 0 |

Internet figure 39C →

Income Statement ~986

| Income as of: | 12/31/1998 | 12/31/1999 | 12/31/2000 | 12/31/2001 |
|---|---|---|---|---|
| Net Sales | 41,566,000 | 53,643,000 | 81,005,000 | 71,594,000 |
| Cost of Goods Sold (Inc. D & A) | 29,022,000 | 19,584,000 | 60,095,000 | 42,608,000 |
| Gross Profit | 12,544,000 | 34,059,000 | 20,910,000 | 28,986,000 |
| | | | | |
| S,G & A (Inc. D & A) | 9,094,000 | 31,598,000 | 17,300,000 | 31,949,000 |
| Operating Profit | 3,450,000 | 1,254,000 | 3,610,000 | (-2,963,000) |
| | | | | |
| Depreciation | 617,000 | 1,207,000 | 1,736,000 | 2,921,000 |
| Amortization | 0 | 0 | 0 | 0 |
| EBITDA | 4,067,000 | 2,461,000 | 5,346,000 | (-42,000) |
| | | | | |
| Sponsor Management Fees | 0 | 0 | 0 | 0 |
| Other Income (Expense) | 9,000 | 1,000 | (-27,000) | 3,000 |
| EBIT | 3,459,000 | 1,255,000 | 3,583,000 | (-2,960,000) |
| | | | | |
| Senior Cash Interest Expense | 11,000 | 0 | 601,000 | 1,101,000 |
| Subordinated Cash Interest Expense | 0 | 0 | 0 | 0 |
| Off Balance Sheet (OBS) Cash Interest Expense | 0 | 0 | 0 | 0 |
| Senior Non-Cash Interest Expense | 0 | 0 | 0 | 0 |
| Subordinated Non-Cash Interest Expense | 0 | 0 | 0 | 0 |
| Pre-tax Income | 3,448,000 | 1,170,000 | 2,982,000 | (-4,061,000) |

Internet figure 39E →

Figure 39F:
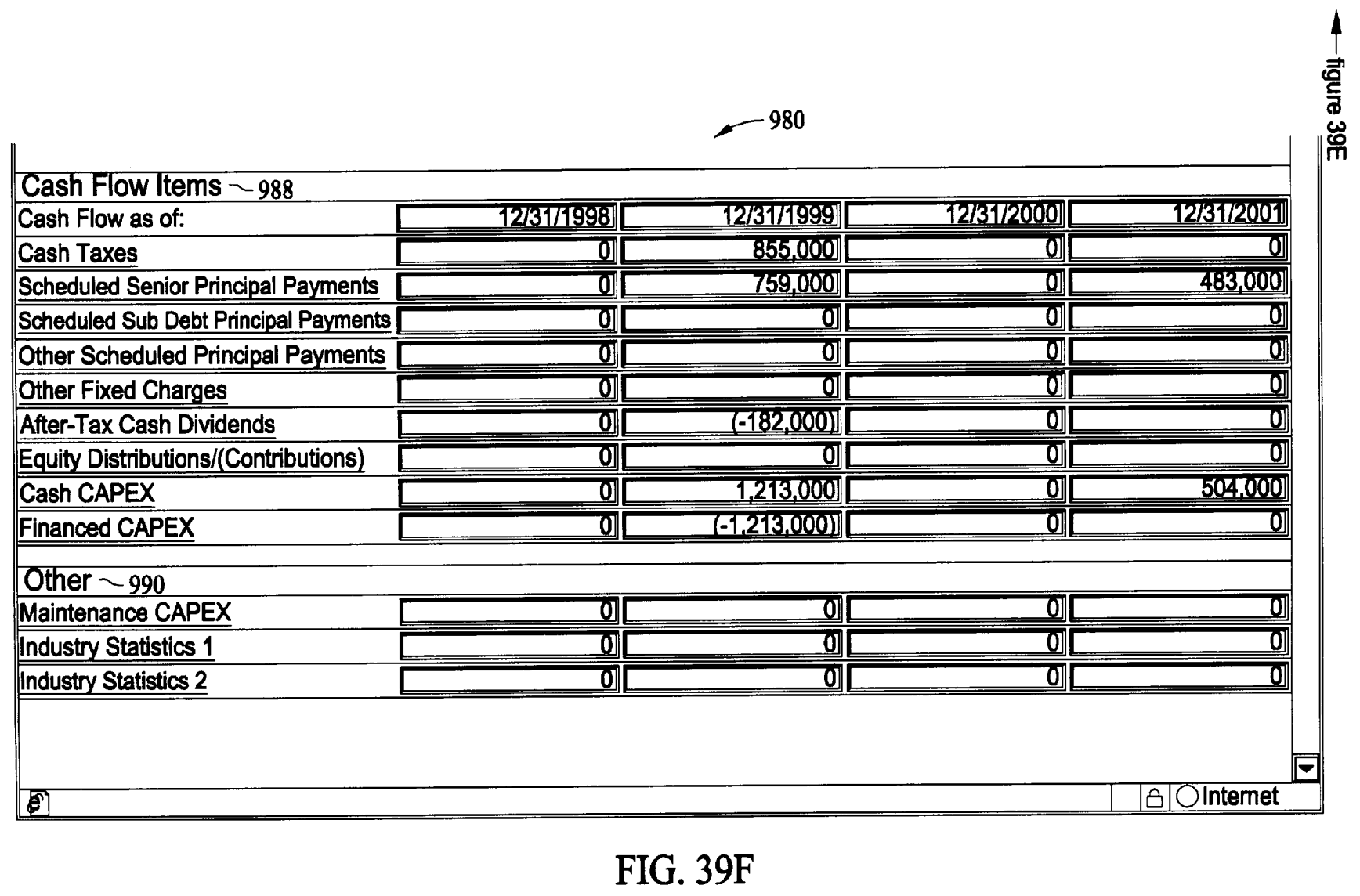

Cash Flow Items ~ 988

| Cash Flow as of: | 12/31/1998 | 12/31/1999 | 12/31/2000 | 12/31/2001 |
|---|---|---|---|---|
| Cash Taxes | 0 | 855,000 | 0 | 0 |
| Scheduled Senior Principal Payments | 0 | 759,000 | 0 | 483,000 |
| Scheduled Sub Debt Principal Payments | 0 | 0 | 0 | 0 |
| Other Scheduled Principal Payments | 0 | 0 | 0 | 0 |
| Other Fixed Charges | 0 | 0 | 0 | 0 |
| After-Tax Cash Dividends | 0 | (-182,000) | 0 | 0 |
| Equity Distributions/(Contributions) | 0 | 0 | 0 | 0 |
| Cash CAPEX | 0 | 1,213,000 | 0 | 504,000 |
| Financed CAPEX | 0 | (-1,213,000) | 0 | 0 |

Other ~ 990

| | | | | |
|---|---|---|---|---|
| Maintenance CAPEX | 0 | 0 | 0 | 0 |
| Industry Statistics 1 | 0 | 0 | 0 | 0 |
| Industry Statistics 2 | 0 | 0 | 0 | 0 |

Internet

| | | | | | | | | |
|---|---|---|---|---|---|---|---|---|
| OCF | 2,461,000.0 | 5,346,000.0 | (-546,000.0) | 202,000.0 | (-1,373,000.0) | 566,000.0 | (-261,000.0) | (-288,400.0) |
| Less: Cash Taxes | 855,000.0 | 0.0 | 0.0 | 0.0 | 0.0 | 0.0 | 0.0 | 0.0 |
| Less After-Tax Cash Dividends | (-182,000.0) | 0.0 | 0.0 | 0.0 | 0.0 | 0.0 | 0.0 | 0.0 |
| FCF (after Sponsor Mgmt Fees | 1,788,000.0 | 5,346,000.0 | (-546,000.0) | 202,000.0 | (-1,373,000.0) | 566,000.0 | (-261,000.0) | (-288,400.0) |
| Net Income | (-1,145,000.0) | 1,712,000.0 | (-3,911,000.0) | (-821,000.0) | (-4,102,000.0) | (-1,524,000.0) | (-1,715,000.0) | (-980,000.0) |
| Cash Interest Expense | 0.0 | 601,000.0 | 1,101,000.0 | 849,000.0 | 1,280,000.0 | 633,000.0 | 812,000.0 | 654,000.0 |
| Scheduled Principal Payments & Other Fixed Charges | 759,000.0 | 0.0 | 483,000.0 | 86,000.0 | 69,000.0 | 414,000.0 | 0.0 | 65,000.0 |
| Total Debt Service | 759,000.0 | 601,000.0 | 1,584,000.0 | 935,000.0 | 1,349,000.0 | 1,047,000.0 | 812,000.0 | 719,000.0 |
| OCF/Cash Interest | N/A | 8.9x | NEG | 0.2x | NEG | 0.9x | NEG | NEG |
| FCF/Total Debt Service | 2.4x | 8.9x | NEG | 0.2x | NEG | 0.5x | NEG | NEG |
| Adjusted EBITDA and Ratios Using Adjusted EDITDA | | | | | | | | |
| EBITDA Adjustments | 0.0 | 0.0 | 0.0 | 0.0 | 0.0 | 0.0 | 0.0 | 0.0 |
| ADJ. EBITDA | 2,461,000.0 | 5,346,000.0 | (-42,000.0) | 947,000.0 | (-1,247,000.0) | 944,000.0 | (-261,000.0) | 323,000.0 |
| OCF/Cash Interest | N/A | 8.9x | NEG | 0.2x | NEG | 0.9x | NEG | NEG |
| FCF/Total Debt Service | 2.4x | 8.9x | NEG | 0.2x | NEG | 0.5x | NEG | NEG |
| Cash Burn | | | | | | | | |
| Cash CAPEX | 1,213,000.0 | 0.0 | 504,000.0 | 345,000.0 | 126,000.0 | 378,000.0 | 0.0 | 211,400.0 |
| OCF(using Cash CAPEX) | 1,248,000.0 | 5,346,000.0 | (-546,000.0) | 602,000.0 | (-1,373,000.0) | 566,000.0 | (-261,000.0) | 111,600.0 |
| Less: Cash Interest Expense | 0.0 | 601,000.0 | 1,101,000.0 | 849,000.0 | 1,280,000.0 | 633,000.0 | 812,000.0 | 654,000.0 | figure 40C →

Figures 44B, 44C:
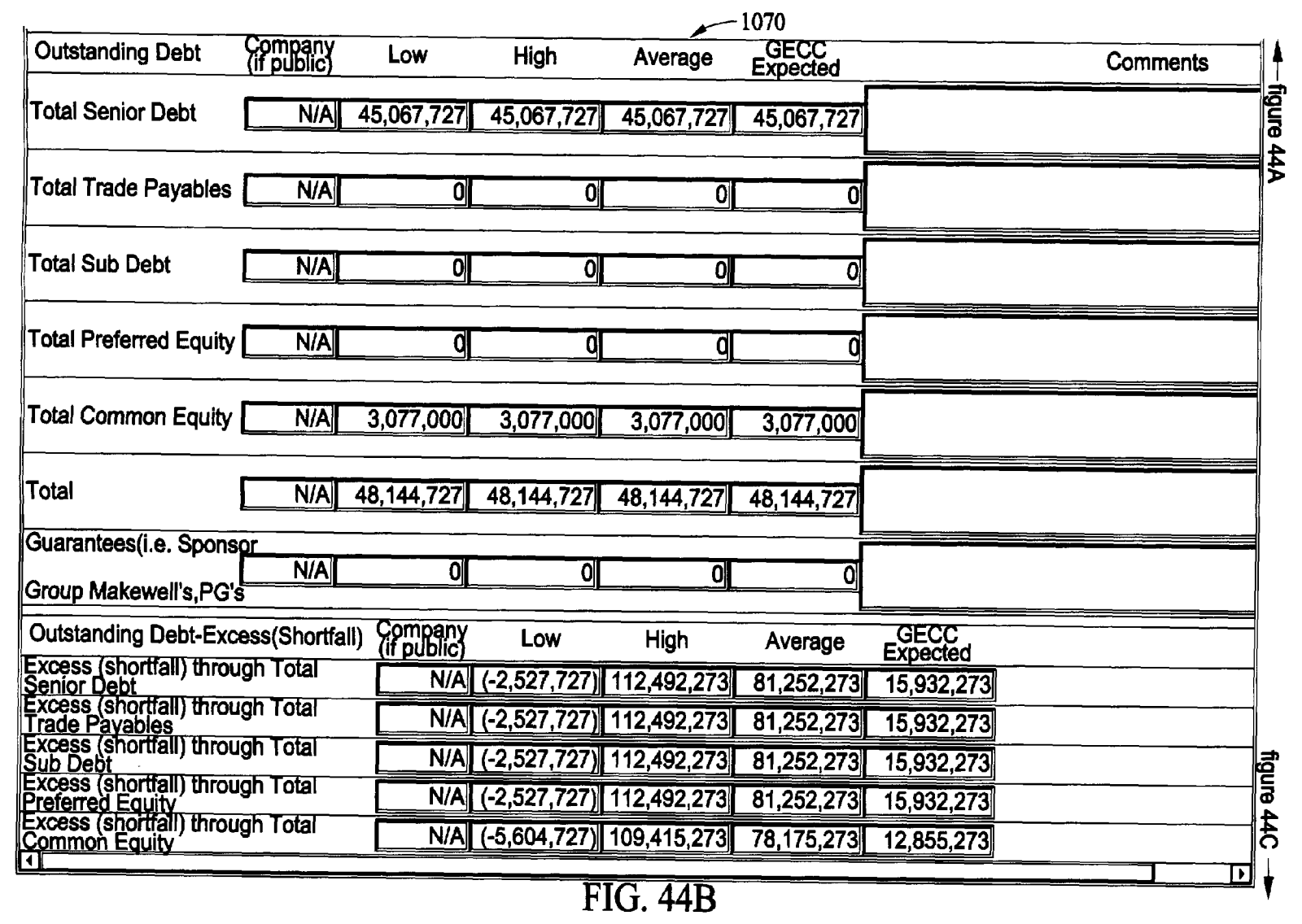

| Outstanding Debt | Company (if public) | Low | High | Average | GECC Expected | Comments |
|---|---|---|---|---|---|---|
| Total Senior Debt | N/A | 45,067,727 | 45,067,727 | 45,067,727 | 45,067,727 | |
| Total Trade Payables | N/A | 0 | 0 | 0 | 0 | |
| Total Sub Debt | N/A | 0 | 0 | 0 | 0 | |
| Total Preferred Equity | N/A | 0 | 0 | 0 | 0 | |
| Total Common Equity | N/A | 3,077,000 | 3,077,000 | 3,077,000 | 3,077,000 | |
| Total | N/A | 48,144,727 | 48,144,727 | 48,144,727 | 48,144,727 | |
| Guarantees(i.e. Sponsor Group Makewell's,PG's | N/A | 0 | 0 | 0 | 0 | |

| Outstanding Debt-Excess(Shortfall) | Company (if public) | Low | High | Average | GECC Expected |
|---|---|---|---|---|---|
| Excess (shortfall) through Total Senior Debt | N/A | (-2,527,727) | 112,492,273 | 81,252,273 | 15,932,273 |
| Excess (shortfall) through Total Trade Payables | N/A | (-2,527,727) | 112,492,273 | 81,252,273 | 15,932,273 |
| Excess (shortfall) through Total Sub Debt | N/A | (-2,527,727) | 112,492,273 | 81,252,273 | 15,932,273 |
| Excess (shortfall) through Total Preferred Equity | N/A | (-2,527,727) | 112,492,273 | 81,252,273 | 15,932,273 |
| Excess (shortfall) through Total Common Equity | N/A | (-5,604,727) | 109,415,273 | 78,175,273 | 12,855,273 | figure 44C →

| Outstanding Debt-Coverage Ratios | Company (if public) | Low | High | Average | GECC Expected |
|---|---|---|---|---|---|
| Coverage through Total Senior Debt | N/A | 0.94x | 3.5x | 2.8x | 1.35x |
| Coverage through Total Trade Payables | N/A | 0.94x | 3.5x | 2.8x | 1.35x |
| Coverage through Total Sub Debt | N/A | 0.94x | 3.5x | 2.8x | 1.35x |
| Coverage through Total Preferred Equity | N/A | 0.94x | 3.5x | 2.8x | 1.35x |
| Coverage through Total Common Equity | N/A | 0.88x | 3.27x | 2.62x | 1.27x |

| Fully Funded Debt | Company (if public) | Low | High | Average | GECC Expected | Comments |
|---|---|---|---|---|---|---|
| Total Senior Debt | N/A | 66,067,727 | 66,067,727 | 66,067,727 | 66,067,727 | |
| Total Trade Payables | N/A | 0 | 0 | 0 | 0 | |
| Total Sub Debt | N/A | 0 | 0 | 0 | 0 | |
| Total Preferred Equity | N/A | 0 | 0 | 0 | 0 | |
| Total Common Equity | N/A | 3,077,000 | 3,077,000 | 3,077,000 | 3,077,000 | |
| Total | N/A | 69,144,727 | 69,144,727 | 69,144,727 | 69,144,727 | |
| Guarantees(i.e. Sponsor Group Makewell's,PG's | N/A | 0 | 0 | 0 | 0 | | figure 44D →

Figures 44C, 44D:
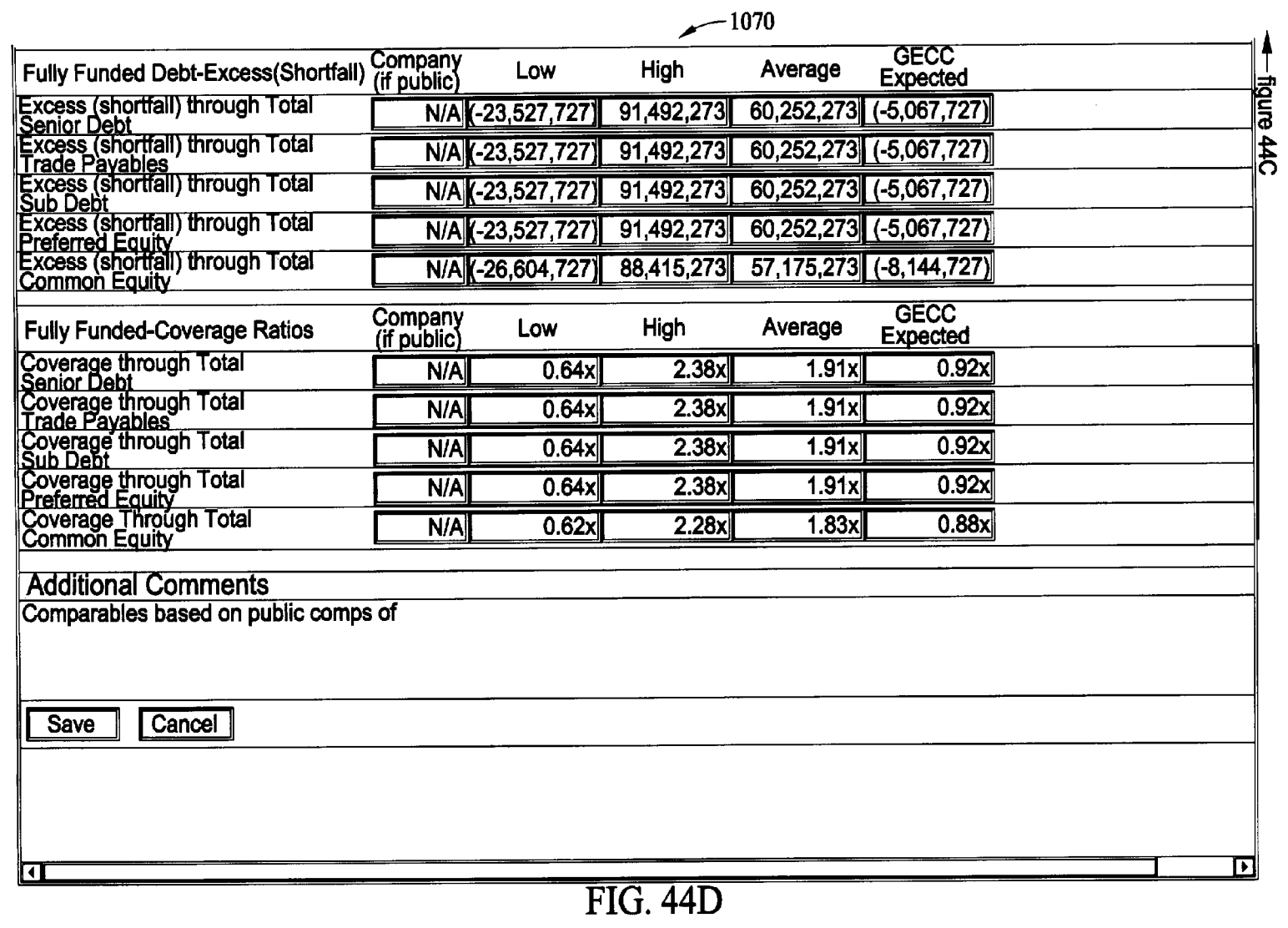

| Fully Funded Debt-Excess(Shortfall) | Company (if public) | Low | High | Average | GECC Expected |
|---|---|---|---|---|---|
| Excess (shortfall) through Total Senior Debt | N/A | (-23,527,727) | 91,492,273 | 60,252,273 | (-5,067,727) |
| Excess (shortfall) through Total Trade Payables | N/A | (-23,527,727) | 91,492,273 | 60,252,273 | (-5,067,727) |
| Excess (shortfall) through Total Sub Debt | N/A | (-23,527,727) | 91,492,273 | 60,252,273 | (-5,067,727) |
| Excess (shortfall) through Total Preferred Equity | N/A | (-23,527,727) | 91,492,273 | 60,252,273 | (-5,067,727) |
| Excess (shortfall) through Total Common Equity | N/A | (-26,604,727) | 88,415,273 | 57,175,273 | (-8,144,727) |

| Fully Funded-Coverage Ratios | Company (if public) | Low | High | Average | GECC Expected |
|---|---|---|---|---|---|
| Coverage through Total Senior Debt | N/A | 0.64x | 2.38x | 1.91x | 0.92x |
| Coverage through Total Trade Payables | N/A | 0.64x | 2.38x | 1.91x | 0.92x |
| Coverage through Total Sub Debt | N/A | 0.64x | 2.38x | 1.91x | 0.92x |
| Coverage through Total Preferred Equity | N/A | 0.64x | 2.38x | 1.91x | 0.92x |
| Coverage Through Total Common Equity | N/A | 0.62x | 2.28x | 1.83x | 0.88x |

Additional Comments

Comparables based on public comps of

Save Cancel

Graph Layer

Excess Availability for Monthly

| % Avail | JAN-2002 | FEB-2002 | MAR-2002 | APR-2002 | MAY-2002 | JUN-2002 | JUL-2002 | AUG-2002 | SEP-2002 | OCT-2002 | NOV-2002 | DEC-2002 |
|---|---|---|---|---|---|---|---|---|---|---|---|---|
| <=0% | $9,497.8 | $6,730.7 | $6,305.2 | $6,238.2 | $12,631.8 | $12,476.5 | $10,328.5 | $7,994.1 | $8,335.3 | $9,111.7 | $9,092.6 | $8,435.5 |
| >0%-<=5% | $3,599.1 | $2,176.2 | $2,564.6 | $2,331.8 | $2,999.9 | $2,299.9 | $2,546.4 | $2,947.1 | $2,475.7 | $2,565.6 | $3,220.0 | $2,561.0 |
| >5%-<=10% | $2,840.8 | $1,963.6 | $2,268.6 | $2,284.9 | $2,583.7 | $2,936.7 | $3,054.8 | $2,662.9 | $2,572.9 | $6,349.6 | $1,659.1 | $1,953.9 |
| >10%-<=15% | $1,483.7 | $1,706.1 | $1,830.1 | $2,022.0 | $1,623.3 | $1,317.4 | $1,631.7 | $1,238.0 | $1,500.0 | $1,328.7 | $1,658.5 | $1,218.3 |
| >15% | $35,511.0 | $21,777.2 | $25,673.0 | $26,177.7 | $25,122.8 | $23,726.5 | $24,341.9 | $29,648.7 | $26,855.2 | $26,826.0 | $26,546.2 | $27,524.7 |
| Total | $52,932.4 | $34,353.8 | $38,641.5 | $39,054.6 | $44,961.5 | $42,757.0 | $41,903.3 | $44,490.8 | $41,739.1 | $46,181.6 | $42,176.4 | $41,693.4 |

Internet

Data Chart

| Account Name ▲ | Tranche ▼ | Commitment ▼ | B/S/H ▼ | Amount ▼ | Price ▼ |
|---|---|---|---|---|---|
| 21ST | Term Loan B | $0.0 | H | $8.4 | 100.0 |
| 21ST | Term Loan B | $0.0 | H | $3.8 | 100.0 |
| 21ST | Revolving Credit Facility | $0.0 | H | $1.3 | 100.0 |
| 21ST | Acquisition Line | $0.0 | H | $0.3 | 100.0 |
| ACTE | Term Loan B | $8.0 | B | $9.6 | 65.0 |
| Adelphia | Revolver Reducing | $16.4 | B | $50.0 | 0.8 |
| Adelphia | Revolver/Reducing Revolver | $20.0 | B | $50.0 | 0.8 |
| Adelphia | Revolving Credit Facility | $19.4 | B | $50.0 | 0.8 |
| Adelphia | Revolver-Reducing Revolver | $18.4 | B | $50.0 | 85.0 |
| Adelphia | Revolver-Reducing Revolver | $18.4 | B | $5.0 | 82.0 |
| ADVANCE | Term Loan B | $12.2 | H | $7.4 | 0.0 |
| ADVANCE | Revolving Credit Facility | $4.8 | H | $4.8 | 0.0 |

Internet

Data Layer

| Outstanding As Of 12/01/2002 | | | | |
|---|---|---|---|---|
| SIC | INDUSTRY | # | $ | % |
| 48 | Communications | 117 | $1,740.5 | 8.5% |
| 51 | Wholesale Trade - Nondurable Goods | 93 | $1,459.1 | 7.1% |
| 50 | Wholesale Trade - Durable Goods | 121 | $1,351.9 | 6.6% |
| 73 | Business Services | 115 | $1,321.4 | 6.5% |
| 33 | Primary Metal Industries | 62 | $1,091.9 | 5.3% |
| 80 | Health Services | 57 | $998.1 | 4.9% |
| 67 | Holding and Other Investment Offices | 29 | $839.3 | 4.1% |
| 0 | Non Classified Establishments | 170 | $691.5 | 3.4% |
| 37 | Transportation Equipment | 66 | $690.9 | 3.4% |
| 36 | Electronic, Elctrcl Eqpmnt & Cmpnts | 75 | $649.6 | 3.2% |
| ⊞ Others | | 1008 | $9,621.2 | 47.0% |
| Total | | 1913 | $20,455.4 | 100.0% |

| Outstanding As Of 12/11/2002 | | | | |
|---|---|---|---|---|
| SIC | INDUSTRY | # | $ | % |
| 48 | Communications | 111 | $1,751.1 | 8.6% |
| 51 | Wholesale Trade - Nondurable Goods | 86 | $1,445.6 | 7.1% |
| 50 | Wholesale Trade - Durable Goods | 114 | $1,342.4 | 6.6% |
| 73 | Business Services | 111 | $1,334.3 | 6.5% |
| 33 | Primary Metal Industries | 59 | $1,096.6 | 5.4% |
| 80 | Health Services | 56 | $980.8 | 4.8% |
| 67 | Holding and Other Investment Offices | 31 | $849.4 | 4.2% |
| 0 | Non Classified Establishments | 165 | $697.8 | 3.4% |
| 37 | Transportation Equipment | 62 | $684.8 | 3.4% |
| 28 | Chemicals and Allied Products | 61 | $658.0 | 3.2% |
| ⊞ Others | | 964 | $9,545.0 | 46.8% |
| Total | | 1820 | $20,385.8 | 100.0% |

Internet

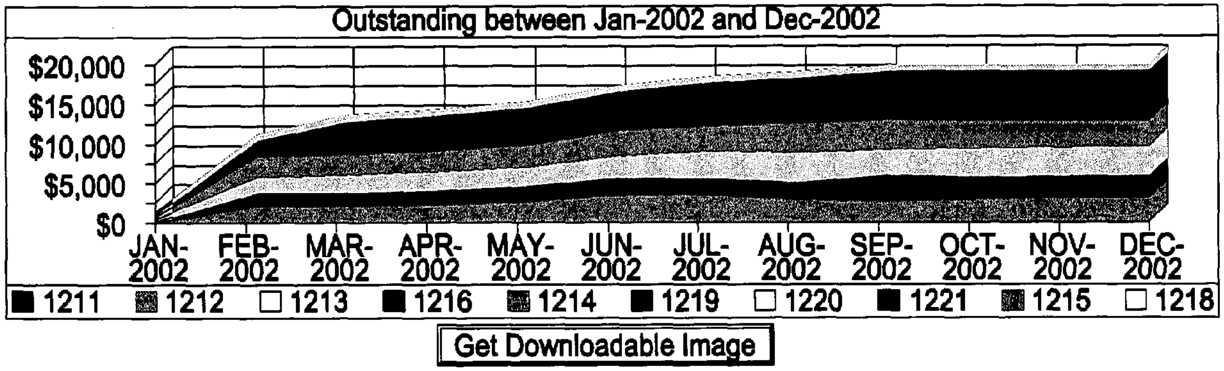

Get Downloadable Image

⊟ Data Layer

Outstanding between Jan-2002 and Dec-2002

| Risk Rating | Risk Class | JAN-2002 | FEB-2002 | MAR-2002 | APR-2002 | MAY-2002 | JUN-2002 | JUL-2002 | AUG-2002 | SEP-2002 | OCT-2002 | NOV-2002 | DEC-2002 |
|---|---|---|---|---|---|---|---|---|---|---|---|---|---|
| 1211 | Performing | $63.9 | $2,602.3 | $4,288.8 | $4,696.6 | $4,806.7 | $5,279.0 | $5,947.0 | $6,643.1 | $6,759.4 | $7,037.4 | $6,936.9 | $7,172.1 |
| 1212 | Moderate | $419.5 | $2,162.6 | $2,108.0 | $2,179.7 | $2,080.3 | $2,201.5 | $2,505.5 | $2,831.5 | $2,768.1 | $2,672.3 | $2,468.5 | $2,604.7 |
| 1213 | Moderate, High Maintenance | $8.0 | $724.2 | $1,003.7 | $938.3 | $1,158.3 | $1,864.7 | $2,079.5 | $2,451.5 | $2,239.8 | $2,336.3 | $2,539.6 | $2,597.1 |
| 1216 | Watchlist, High Maintenance | $168.7 | $1,764.9 | $1,706.4 | $2,060.3 | $2,425.9 | $2,266.3 | $1,797.4 | $1,755.5 | $2,312.2 | $2,115.1 | $2,179.1 | $1,941.7 |
| 1214 | Watchlist, Increased Monitoring | $363.6 | $1,840.1 | $1,462.4 | $1,534.0 | $1,879.0 | $2,375.0 | $2,157.2 | $1,608.5 | $1,524.9 | $1,487.8 | $1,533.6 | $1,434.5 |
| 1219 | DD Green | $0.0 | $25.4 | $93.8 | $94.0 | $171.0 | $478.0 | $426.1 | $450.8 | $444.8 | $503.7 | $479.3 | $507.3 |
| 1220 | DD Yellow | $0.0 | $0.0 | $0.0 | $0.0 | $0.0 | $147.1 | $238.6 | $276.5 | $352.0 | $347.4 | $340.0 | $427.2 |
| 1221 | DD Red | $0.0 | $0.0 | $0.0 | $0.0 | $0.0 | $65.7 | $66.0 | $87.1 | $209.4 | $184.2 | $172.2 | $110.1 |
| 1215 | Non-earning | $0.0 | $35.6 | $175.0 | $427.5 | $443.3 | $726.5 | $781.4 | $665.1 | $805.4 | $806.3 | $804.6 | $880.5 |
| 1218 | Non-earning Liquidation | $0.0 | $0.0 | $0.0 | $0.0 | $125.4 | $85.4 | $171.9 | $196.8 | $139.4 | $141.2 | $139.0 | $149.3 |
| | Total | $1,023.7 | $9,155.1 | $10,838.1 | $11,930.4 | $13,089.9 | $15,489.2 | $16,170.6 | $16,966.4 | $17,555.4 | $17,631.7 | $17,592.8 | $17,824.5 |

Internet

FIG. 75B

| Alert Type | Escalated | New | Open | Total |
|---|---|---|---|---|
| ARAgeOvrdue | 75 | 0 | 125 | 125 |
| ARInelgChg | 85 | 13 | 156 | 169 |
| ARTurnChg | 3 | 29 | 138 | 167 |
| AuditOvrdue | 116 | 2 | 159 | 161 |
| AuditSched | 0 | 9 | 0 | 9 |
| Availability | 99 | 15 | 127 | 142 |
| Cashrcpts | 59 | 25 | 68 | 93 |
| CollatPost | 192 | 26 | 232 | 258 |
| FinStmntFYE | 184 | 0 | 187 | 187 |
| FinStmntInt | 202 | 0 | 241 | 241 |
| InvRptOvrdue | 154 | 1 | 236 | 237 |
| OverAdvance | 42 | 1 | 42 | 43 |
| SalesChg | 65 | 27 | 126 | 153 |
| Total | 1276 | 148 | 1837 | 1985 |

1640

METHODS AND SYSTEMS FOR MANAGING RISK MANAGEMENT INFORMATION

BACKGROUND OF THE INVENTION

This invention relates generally to managing risk management information and, more particularly, to network-based methods and systems for managing risk management information.

Businesses engaging in complex deals, such as commercial financing, mergers, acquisitions and real estate transactions, generally conduct a due diligence analysis to access the financial strength, operational characteristics of a business, collateral and/or business value, management strength, industry dynamics, and the proposed structure of the transaction and the party or parties involved in the deal. The due diligence analysis facilitates the financing business to better evaluate and manage the risk associated with the deal after the transaction closes.

During a due diligence analysis, information, known as risk management (RM) information, is gathered from many sources. RM information is often complex and relates to various relevant areas of the overall transaction. Therefore, a number of different members of a due diligence team may need to know the same RM information in evaluating the deal. Internal deal teams typically manually and individually collect data as part of the due diligence analysis. The efforts are often duplicated, and as such, the data may be entered multiple times on multiple different systems throughout the financing business. For example, in a transaction involving the lending on accounts receivable and inventory to secure a formula based loan to a business, both an underwriting team and a legal team may be involved. The underwriting team may be focused on (i) what the collateral is, the value of the collateral, and how the collateral is valued, (ii) the financial strength and operation of the business, (iii) the management strength, (iv) the overall structure of the transaction, and (v) other factors relating to the business, industry, and collateral involved in the deal. The legal team may be focused on (i) the location of the collateral, (ii) the structure of the transaction, (iii) an understanding of the legal entities involved, and (iv) other legal factors surrounding the business, industry and collateral involved in the deal. During the due diligence analysis, both the underwriting and the legal teams will collect certain RM information to be evaluated. Although the underwriting team and the legal team may have different concerns when evaluating the RM information, much of the RM information being evaluated is the same.

Individual collection of RM information by various internal deal teams increases the risk of overlapping data collection and decreases time efficiency. Further, individual reporting by internal teams to other internal teams or external teams increases the risk of providing inconsistent or incomplete data during the documentation process, which may result in increased cycle time and costs. For example, in the collateral transaction described above, external legal counsel may request information relating to the location of the collateral from the borrower. The underwriting team may also request information from the borrower regarding the location of the collateral. Because the information is collected both manually and individually, the underwriting team may have no knowledge that the data had been previously collected by the legal team. Consequently, documentation cycle time and costs are increased. Additionally, because various deal teams may collect the RM information, the RM information may not be centralized for future monitoring and management.

BRIEF DESCRIPTION OF THE INVENTION

In one aspect, a method for managing business information by a first business entity using a server system is provided. The server system is coupled to a centralized database and at least one client system. The method includes receiving at the server system business information relating to at least one second business entity from the client system, storing the business information received at the server system in the centralized database, tracking the business information stored in the centralized database, updating the centralized database periodically with newly received business information to maintain the business information, and providing the business information in response to an inquiry.

In another aspect, a method for managing risk management (RM) information for a first business entity using a web-based system is provided. The system employs a server system coupled to a centralized database and at least one client system. The RM information includes at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition of at least one second business entity. The method includes receiving at the server system RM information relating to at least one second business entity from a user through the client system, storing RM information received at the server system in the centralized database, and tracking RM information including compiling data reports, exporting RM information, and linking documents to at least one of the second business entities. The method also includes updating the centralized database with RM information including adding and deleting information to revise existing RM information, and providing RM information in response to an inquiry, including downloading requested information from the server system and displaying requested information on the client system, the inquiry including utilizing at least one pull-down lists, check boxes, radio buttons, and hypertext links. The method also includes notifying a user through an electronic message of the results of a review of RM information, including findings and recommendations relating to the RM information, and providing a report of the review results by transmitting an electronic report to the managerial user system, which includes a summary of the review of RM information, and an internal deal team's findings and recommendations such that managerial oversight of the RM information and electronic data interchange between a user, the first business entity, and the second business entity are facilitated.

In another aspect, a network based system for managing business information by a first business entity is provided. The system includes a client system comprising a browser, a centralized database for storing information, and a server system configured to be coupled to the client system and the database. The server system is further configured to receive business information relating to at least one second business entity from the client system, store the business information in the centralized database, track the business information, update the centralized database periodically with newly received business information to maintain the business information, provide said business information in response to an inquiry by a user, and notify users electronically of a review of the business information by a deal team, including said deal team's findings and recommendations relating to the review of said business information.

In another aspect, a computer program embodied on a computer readable medium for managing risk management (RM) information by a first business entity analyzing at least one second business entity is provided. The program includes a code segment that receives RM information and then maintains a database by adding, deleting and updating RM information, provides users with access to RM information, generates data reports based on RM information for at least one of each second business entity and a selected group of second business entities, and compiles a plurality of data reports that includes at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition of each second business entity. The code segment also compiles a plurality of data reports that includes a selected subset of at least one of business information, accounts payable, accounts receivable, the availability analysis, the covenant compliance, coverage ratios, financial statements, financial statement and availability projections, the capital structure, income statements, the inventory, the leverage analysis, the loan profile, collateral, guarantors, machinery and equipment, real estate, the liquidation value, amortization information, the capital raising history, the equity valuation, and other documents and information relating to the financial condition of each second business entity, and compiles a plurality of data reports that includes at least one of business information, accounts payable, accounts receivable, the availability analysis, the covenant compliance, coverage ratios, financial statements, financial statement and availability projections, the capital structure, income statements, the inventory, the leverage analysis, the loan profile, collateral, guarantors, machinery and equipment, real estate, the liquidation value, amortization information, the capital raising history, the equity valuation, and other documents and information relating to the financial condition of the selected group of second business entities. The code segment also compiles a plurality of data reports that includes a selected subset of at least one of business information, accounts payable, accounts receivable, the availability analysis, the covenant compliance, coverage ratios, financial statements, financial statement and availability projections, the capital structure, income statements, the inventory, the leverage analysis, the loan profile, collateral, guarantors, machinery and equipment, real estate, the liquidation value, amortization information, the capital raising history, the equity valuation, and other documents and information relating to the financial condition of the selected group of second business entities. The code segment also exports RM information relating to at least one second business entity by a user from the database to at least one other computer program for review, exports RM information relating to the selected group of second business entities selected by a user from the database to at least one other computer program for review, links documents to at least one second business entity such that a user can access said documents during a review of the second business entity, links documents to the selected group of second business entities such that a user can access the documents during a review of the second business entities, notifies a user of a review of RM information by a deal team member, and provides a report comprising a summary of the review of RM information, including the deal team's findings and recommendations.

BRIEF DESCRIPTION OF THE DRAWINGS

FIGS. 6A and 6B show an example embodiment of a user interface displaying a home page of an account section in a RMCS.

FIGS. 16A through 16F display an example embodiment of a user interface displaying asset based portfolio management reports for an account in a RMCS.

FIGS. 17A and 17B show an example embodiment of a user interface displaying a collateral availability summary for an account in a RMCS.

FIGS. 22A and 22B show an example embodiment of a user interface displaying account payable concentration information for an account in a RMCS.

FIGS. 24A and 24B show an example embodiment of a user interface displaying account receivable aging information for an account in a RMCS.

FIGS. 25A, 25B and 25C show an example embodiment of a user interface displaying account receivable concentration information for an account in a RMCS.

FIGS. 26A and 26B show an example embodiment of a user interface displaying account receivable sales and receivables statistics information for an account in a RMCS.

FIGS. 39A through 39F display an example embodiment of a user interface displaying financial statements information for an account in a RMCS.

FIGS. 40A, 40B and 40C show an example embodiment of a user interface displaying a financial performance summary for an account in a RMCS.

FIGS. 44A through 44D display an example embodiment of a user interface displaying a cash flow loan analysis for an account in a RMCS.

FIGS. 65A and 65B show an example embodiment of a user interface displaying availability trends for a portfolio in a RMCS.

FIGS. 66A and 66B show an example embodiment of a user interface displaying buy, sell, hold reporting for a portfolio in a RMCS.

FIGS. 70A and 70B show an example embodiment of a user interface displaying a comparison of industry concentration trends at different times for a portfolio in a RMCS.

FIGS. 75A and 75B show an example embodiment of a user interface displaying risk classification for a portfolio in a RMCS.

DETAILED DESCRIPTION OF THE INVENTION

Figure 1:
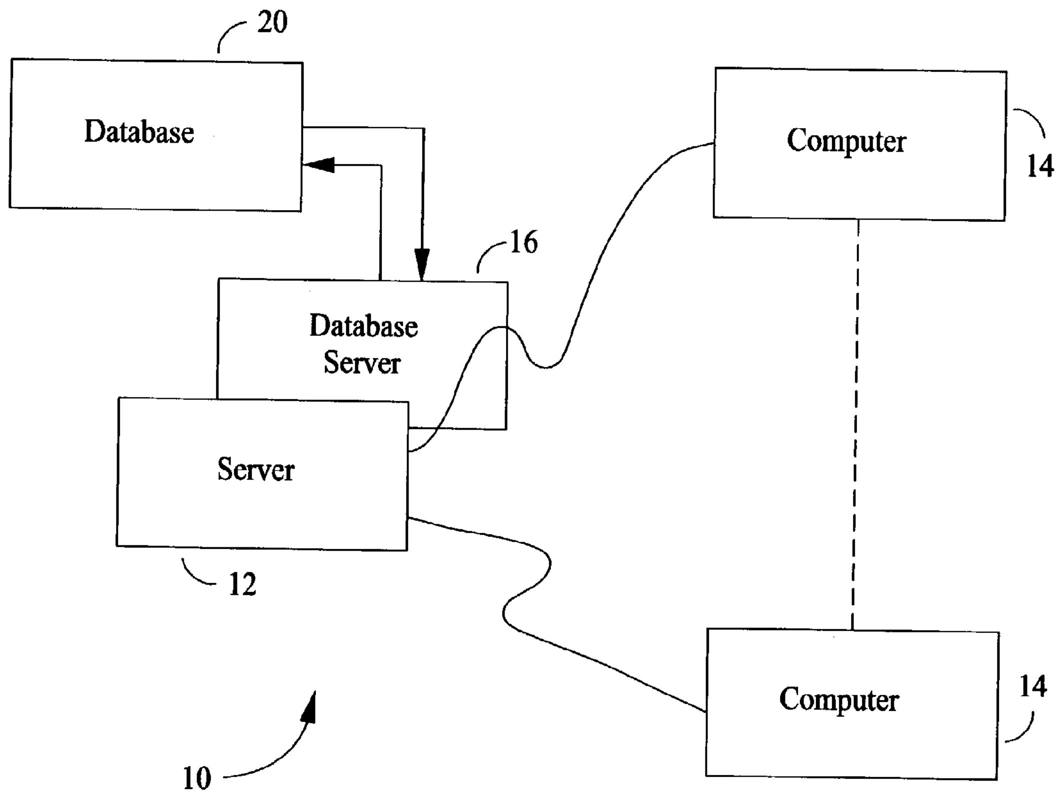
FIG. 1 is a simplified block diagram of a Risk Management Coordination System (RMCS) in accordance with one embodiment of the present invention.

Example embodiments of systems and processes that facilitate integrated network-based electronic reporting and workflow process management related to a Risk Management Coordination System (RMCS) are described below in detail. A technical effect of the systems and processes described herein include at least one of facilitating an electronic submission of information using a client system, automating extraction of information, and web-based reporting for internal and external system users. The RMCS allows a business engaging in complex deals, such as commercial financing, mergers, acquisitions and real estate transactions, to collect, manage, store and disseminate risk management (RM) information among internal deal teams and selected outside deal teams to facilitate a more accurate and efficient analysis of the risks associated with a deal and to facilitate management of workload and personnel. The RMCS also allows a business engaging in complex deals to manage customer relationships, manage specific legal information, manage and create an electronic deal file, manage and create an electronic account manager journal, train personnel, and provide predictive measures based on history, industry trends and economic data.

In the example embodiment, the RMCS collects, tracks, displays, and disseminates real time Risk Management (RM) information, which is information relating to a business entity being analyzed ("Analyzed Business") by another business engaging in complex deals, such as commercial financing, mergers, acquisitions and real estate transactions ("Commercial Finance Business" or "CF Business"). RM information includes at least one of business information, accounts payable, accounts receivable, covenant compliance, financial statements, capital structure, income statements, inventory, leverage, loan profile, collateral, guarantors, machinery and equipment, real estate, liquidation value, and other documents and information relating to the financial condition of the Analyzed Business.

The RMCS enables the CF Business to input RM information on a single occasion and into a single computer workstation that may be located at various locations. In addition, the RMCS permits the various internal deal teams within the CF Business to share RM information when conducting a due diligence analysis and to continue account management on the Analyzed Business. The RMCS also enables the CF Business to provide RM information to outside deal teams, like outside legal counsel, during the due diligence analysis. The RMCS also enables a user to monitor a plurality of accounts included in a portfolio, and monitor a plurality of portfolios. Additionally, the RMCS enables a deal team leader to manage a workload of an account manager as well as enabling a senior risk officer to manage a workload of team leaders. The RMCS further permits the CF Business to devote more time to analyzing RM information and conducting a due diligence analysis, and less time entering, checking and reporting data.

RM information relating to the Analyzed Business is received by the RMCS which stores the RM information in a database, updates the database with RM information received, tracks, the RM information received, provides RM information in response to an inquiry, allows selected outside deal teams to review and comment on RM information, and provides a report to at least one managerial user within the CF Business summarizing the review of RM information for an Analyzed Business.

In the RMCS, RM information is stored in the database. The network based RMCS provides convenient access to RM information, including at least one of business information, accounts payable, accounts receivable, availability analysis, covenant compliance, coverage ratios, financial statements, financial statement and availability projections, capital structure, income statements, inventory, leverage, loan profile, collateral, guarantors, machinery and equipment, real estate, liquidation value, amortization, capital raising history, equity valuation, and other documents and information relating to the financial condition of the Analyzed Business. A user must be authorized to gain access into the RMCS. In the example embodiment, once the RMCS home page is accessed, the user will be able to choose from a list of Analyzed Businesses, also known as accounts, for which the user is responsible, is listed on the deal team, or has been granted access by other users. Once the user selects the account to be reviewed, the user can review RM information relating to the Analyzed Business associated with that account. In an example embodiment, only an authorized user can access the RM information. In addition, the example embodiment enables a user to monitor and view RM information for a plurality of accounts which comprise a portfolio.

In one embodiment, the system is a computer program embodied on a computer readable medium implemented utilizing Java® and Structured Query Language (SQL) with a client user interface front-end for administration and a web interface for standard user input and reports. (Java is a registered trademark of Sun Microsystems, Inc., Palo Alto, Calif.). In an example embodiment, the system is web enabled and is run on a business-entity's intranet. In yet another embodiment, the system is fully accessed by individuals having an authorized access outside the firewall of the business-entity through the Internet. In a further example embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of a Risk Management Coordination System (RMCS) 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
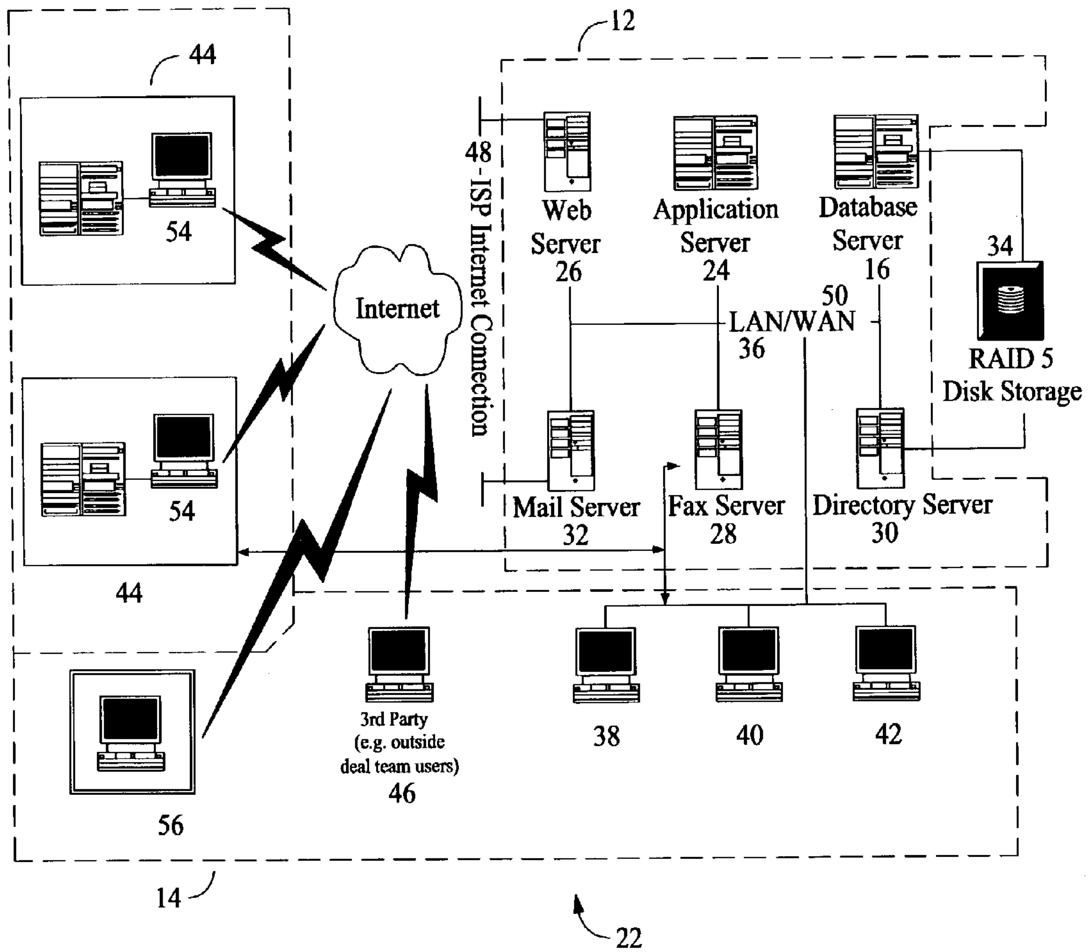
FIG. 2 is an expanded version block diagram of an example embodiment of a server architecture of the RMCS.

FIG. 2 is an expanded version block diagram of an example embodiment of a server architecture of a RMCS 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36. In an example embodiment, client system 14 includes workstation 40 which can be used by an internal deal team user or a designated outside deal team user to review RM information relating to an Analyzed Business.

Server system 12 is configured to be communicatively coupled to various individuals, including employees 44 and to third parties, e.g., designated outside deal team users, 46 via an ISP Internet connection 48. The communication in the example embodiment is illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50.

In the example embodiment, any authorized individual having a workstation 54 can access RMCS 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 via a telephone link. Fax server 28 is configured to communicate with other client systems 38, 40, and 42 as well.

Figure 3:
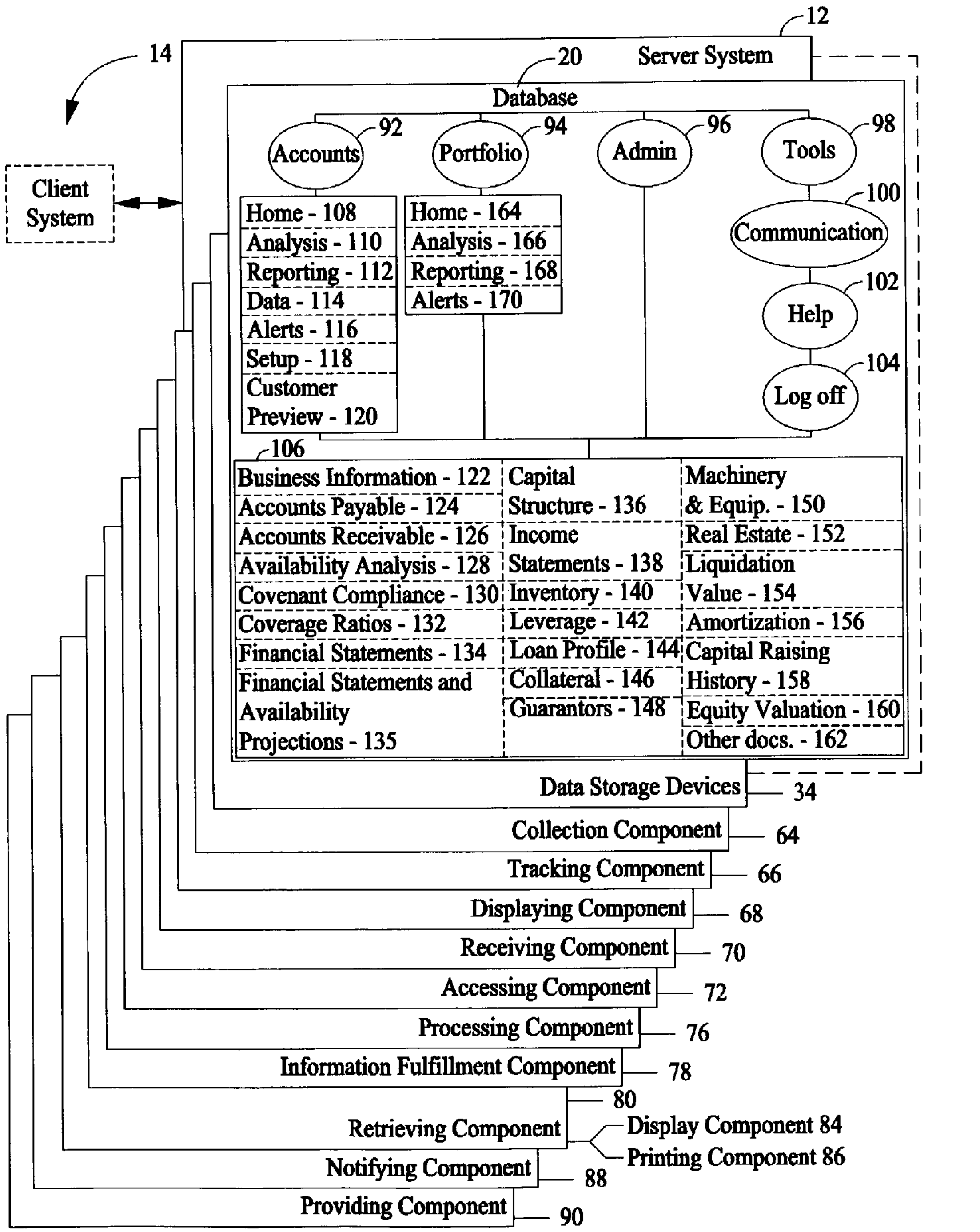
FIG. 3 shows a configuration of a database within the database server of the server system including other related server components.

FIG. 3 shows a configuration of database 20 within database server 16 of server system 12 shown in FIG. 1. Database 20 is coupled to several separate computer software components within server system 12, which perform specific tasks. In the example embodiment, server system 12 includes a collection component 64 for collecting data from users in database 20, a tracking component 66 for tracking data, and a displaying component 68 to display information. Tracking component 66 tracks and cross-references data, including modifying existing data.

Server system 12 also includes a receiving component 70 to receive a specific query from client system 14, and an accessing component 72 to access database 20 within data storage device 34. Receiving component 70 is programmed to receive a query from one of a plurality of users. Server system 12 further includes a processing component 76 for searching and processing received queries against database 20 containing a variety of information collected by collection component 64. An information fulfillment component 78 located in server system 12 enables the requested information to be downloaded to the plurality of users in response to the requests received by receiving component 70. Information fulfillment component 78 downloads the information after the information is retrieved from database 20 by a retrieving component 80. Retrieving component 80 retrieves, downloads and sends information to client system 14 based on a query received from client system 14.

Retrieving component 80 also includes a display component 84 that is configured to download information to be displayed on a client system's graphical user interface, and a printing component 86 that is configured to print information. Retrieving component 80 generates reports requested by the user through client system 14 in a pre-determined format. System 10 is flexible to provide other alternative types of reports and is not constrained to the options set forth above.

Server system 12 also includes a notifying component 88 and a providing component 90. Notifying component 88 electronically transmits a message to client system 14 based on information inputted into server system 12, notifying a user of the status of the review of RM information by the deal team. Providing component 90 electronically provides a report to manager workstation 56 (shown in FIG. 2) summarizing the review of the RM information by the deal team, including the deal team's findings and recommendations relating to whether the CF Business should take risk mitigation action with respect to the deal, and, if so, what type of action is recommended.

In one embodiment, collection component 64, tracking component 66, displaying component 68, receiving component 70, processing component 76, information fulfillment component 78, retrieving component 80, display component 84, printing component 86, notifying component 88, and providing component 90 are computer programs embodied on computer readable medium.

Database 20 is divided into an Accounts Section 92, a Portfolio Section 94, an Admin Section 96, a Tools Section 98, a Communication Section 100, a Help Section 102, and a Logoff Section 104. Accounts Section 92 illustrates RM information 106 for each individual account, which are also known as the Analyzed Businesses, within RMCS 10 (shown in FIG. 1). To facilitate searching, Accounts Section 92 is sub-divided into a Home Section 108, an Analysis Section 110, a Reporting Section 112, a Data Section 114, an Alerts Section 116, a Setup Section 118, and a Customer Preview Section 120.

RM information 106 includes at least one of the following for each Analyzed Business: business information 122, accounts payable 124, accounts receivable 126, availability analysis 128, covenant compliance 130, coverage ratios 132, financial statements 134, financial statement and availability projections 135, a capital structure 136, income statements 138, an inventory 140, leverage 142, a loan profile 144, collateral 146, guarantors 148, machinery and equipment 150, real estate 152, a liquidation value 154, amortization 156, a capital raising history 158, an equity valuation 160, and other documents and information 162 relating to the financial condition of the Analyzed Business'.

Portfolio Section 94 illustrates RM information 106 on an aggregate basis for a plurality of accounts (or Analyzed Businesses) within a portfolio and inputted in RMCS 10. To facilitate searching, Portfolio Section 94 is sub-divided into a Home Section 164, an Analysis Section 166, a Reporting Section 168, and an Alerts Section 170.

Admin Section 96 enables the user to access RM information 106, and delegate accounts to various other users, including internal deal team users and outside deal team users.

Tools Section 98 enables the user to access RM information 106 and provides a user with links to other commercial finance resources.

Communication Section 100 enables the user to access RM information 106 and provides useful links to historical and current communications (e.g., e-mails, correspondence, memos, etc.) from users within the CF Business.

Help Section 102 displays additional information links relating to RMCS 10 (shown in FIG. 1). In the example embodiment, Help Section 102 includes a user guide link, a glossary of defined terms link, a frequently asked questions link, a quick reference card link, and a feedback link.

Logoff Section 104 permits a user to logoff of RMCS 10 (shown in FIG. 1).

System 10 accumulates a variety of confidential data and has different access levels to control and monitor the security of and access to system 10. Authorization for access is assigned by system administrators on a need to know basis. In one embodiment, access is provided based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architectures of system 10 as well as various components of system 10 are exemplary only. Other architectures are possible and can be utilized in connection with practicing the processes described below.

Figure 4A:
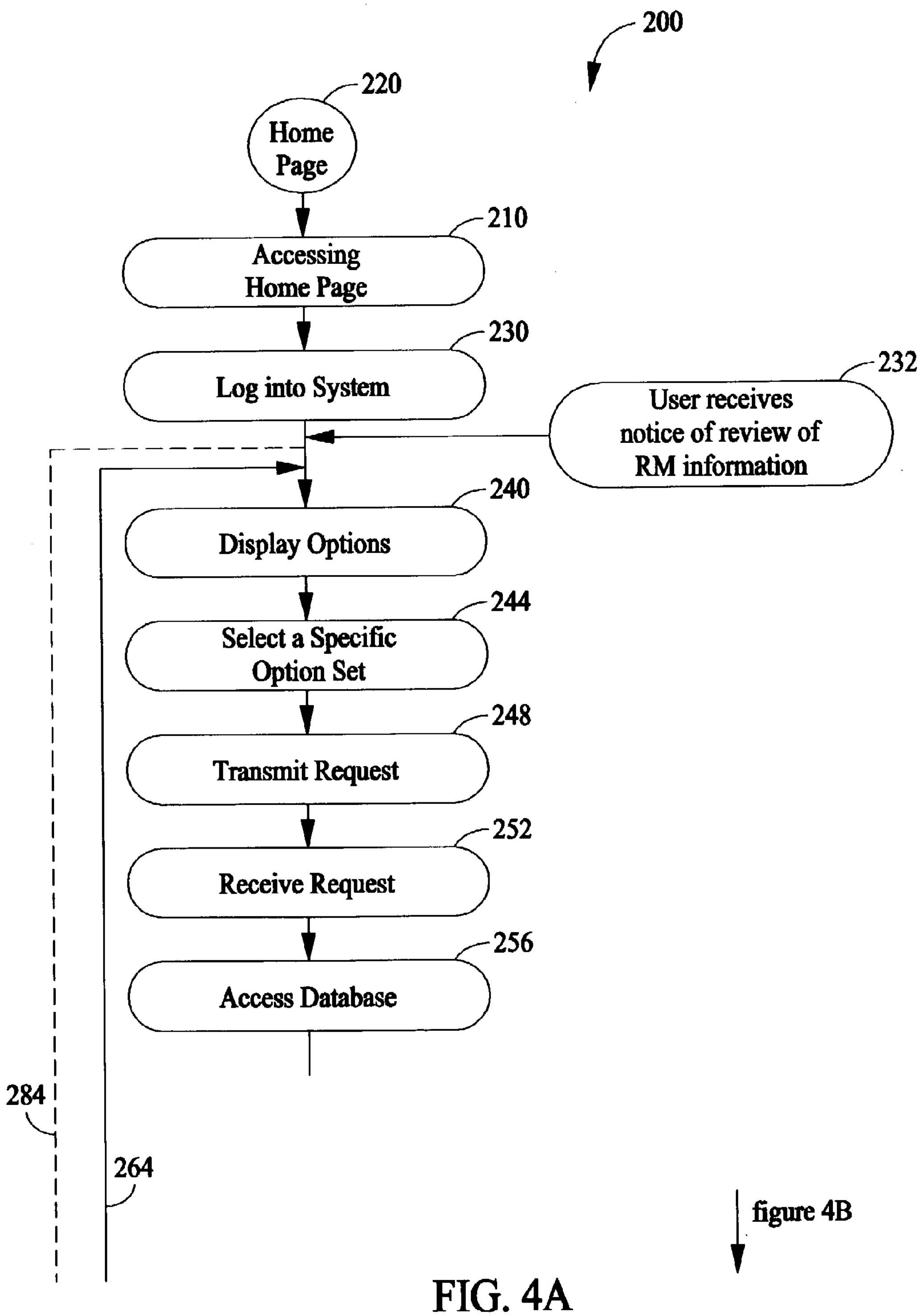
FIGS. 4A and 4B show a flowchart of the processes employed by RMCS to facilitate use.
Figure 4B:
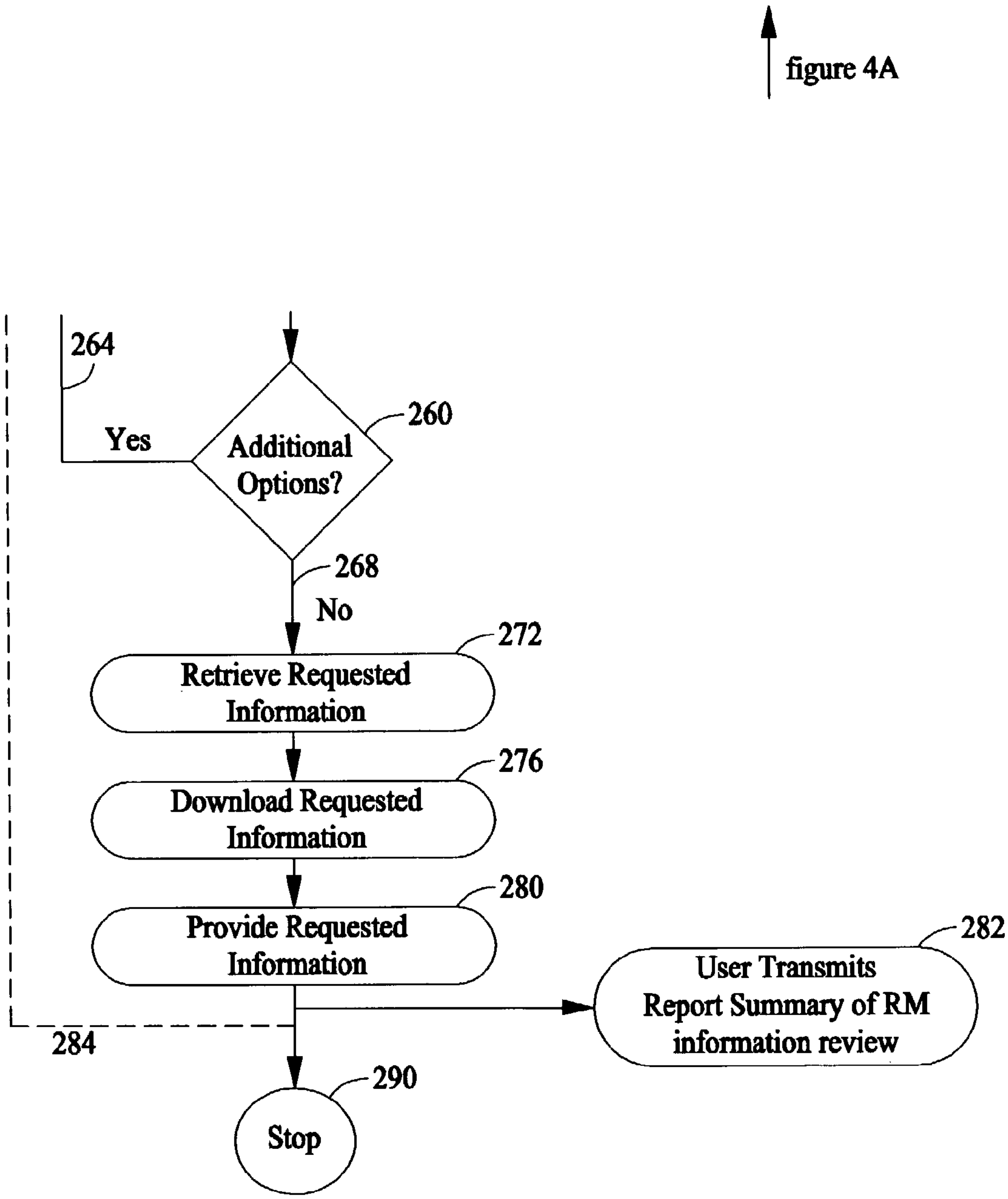

FIGS. 4A and 4B show a flowchart 200 illustrating example processes utilized by system 10. The technical effect of RMCS 10 is achieved by a user first accessing 210 a user interface, such as a home page 220, of the web site through client system 14 (shown in FIG. 1). In one embodiment, client system 14, as well as server system 12, are protected from access by unauthorized individuals. The user logs-in 230 to system 10 using a password (not shown) and an employee user login for security. The technical effect is further achieved through client system 14, which is configured to receive 232 an electronic notice indicating that a review of RM information 106 (shown in FIG. 3) has occurred, and whether any comments or findings were made relating to the review.

Client system 14 also displays 240 options available to the user through links, check boxes, or pull-down lists. Once the user selects 244 an option (in one embodiment, relating to a facility within the business entity) from the available links, the request is transmitted 248 to server system 12. Transmitting 248 the request is accomplished, in one embodiment, either by click of a mouse or by a voice command. Once server system 12 (shown in FIG. 1) receives 252 the request, server system 12 accesses 256 database 20 (shown in FIG. 1). System 10 determines 260 if additional narrowing options are available. In one embodiment, additional narrowing options relate to at least one of the Analyzed Business and RM information 106, and include check boxes, hyperlinks, buttons, and pull-down lists. If additional narrowing options are available 264, system 10 displays 240 the options relating to the prior option selected by the user on client system 14. The user selects 244 the desired option and transmits the request 248. Server system 12 receives the request 252 and accesses 256 database 20. When system 10 determines that additional options 260 are not available 268, system 10 retrieves 272 requested information from database 20. The requested information is downloaded 276 and provided 280 to client system 14 from server 12. Client system 14 transmits a report 282 from a user to manager workstation 56 (shown in FIG. 2) summarizing the review of RM information 106 by a deal team, including the deal team's comments and findings. The user can continue to search 284 database 20 for other information or exit 290 from system 10.

Figure 5:
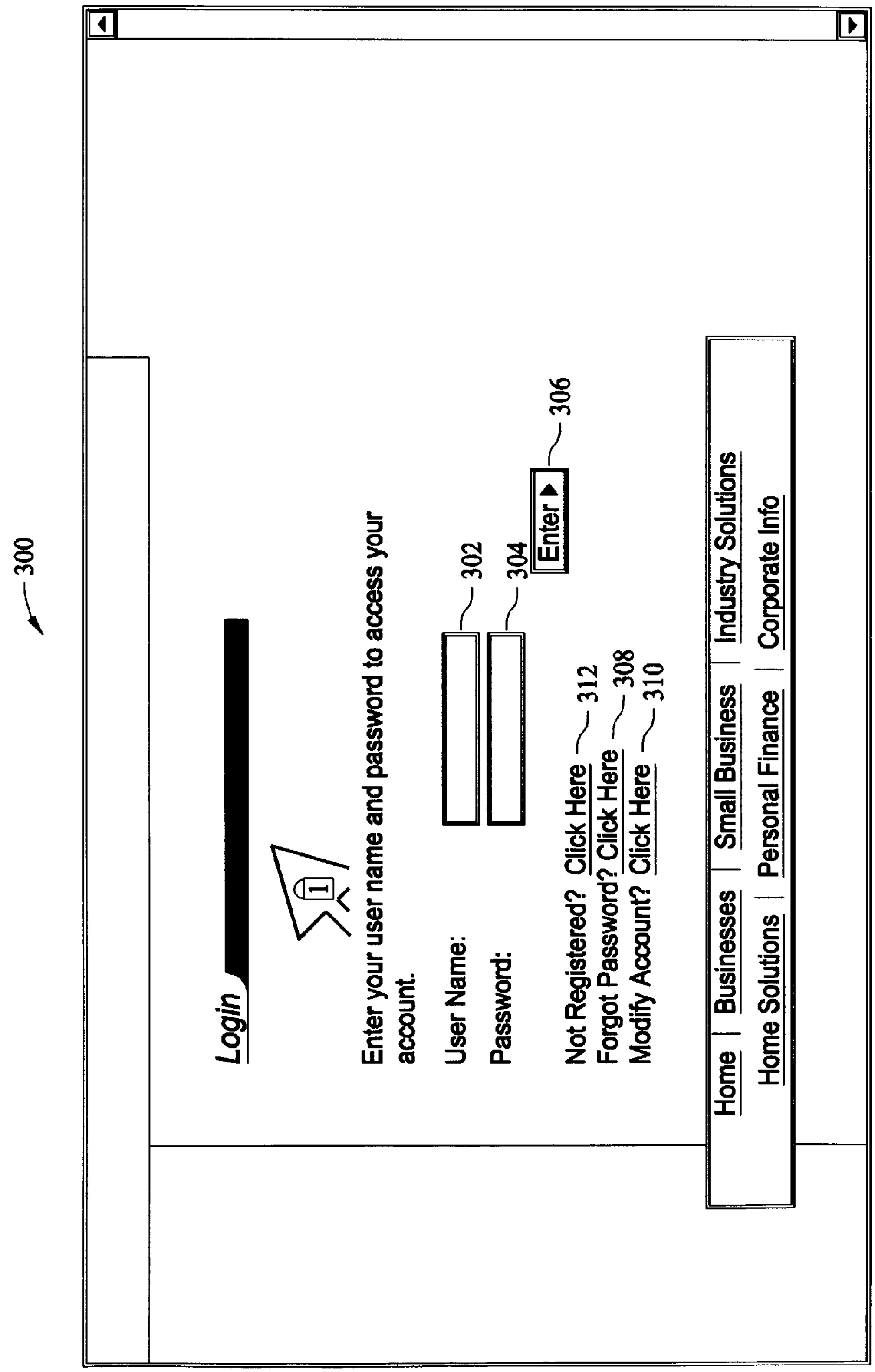
FIG. 5 is an example embodiment of a user interface displaying a login page of a RMCS.

FIG. 5 is an example embodiment of a user interface 300 displaying a login page of RMCS 10 (shown in FIG. 1). User interface 300 illustrates a User Name field 302 and a Password field 304. All users must have a user name and password to log-on to RMCS 10. In an example embodiment, user interface 300 also shows an "Enter" button 306, which the user must select after entering an appropriate user name in User Name field 302 and password in Password field 304. Although buttons are shown in the example embodiment, pull-down lists, check boxes, and other means for inputting this information could also be used. User interface 300 is the entry point for anyone trying to access RMCS 10 and database 20 (shown in FIG. 1) via the web. After entering the requested information and selecting Submit button 306, the user enters RMCS 10.

User interface 300 also displays hyperlinks Forgot Password 308, Modify Account 310, and Not Registered 312. By selecting Forgot Password 308 hyperlink, a screen is displayed prompting the user to input information. By inputting the requested information, RMCS 10 provides the user with their assigned password. Similarly, by selecting Modify Account 310 hyperlink, a user is prompted by a screen to input information that will change the user's current password.

Figure 6A:
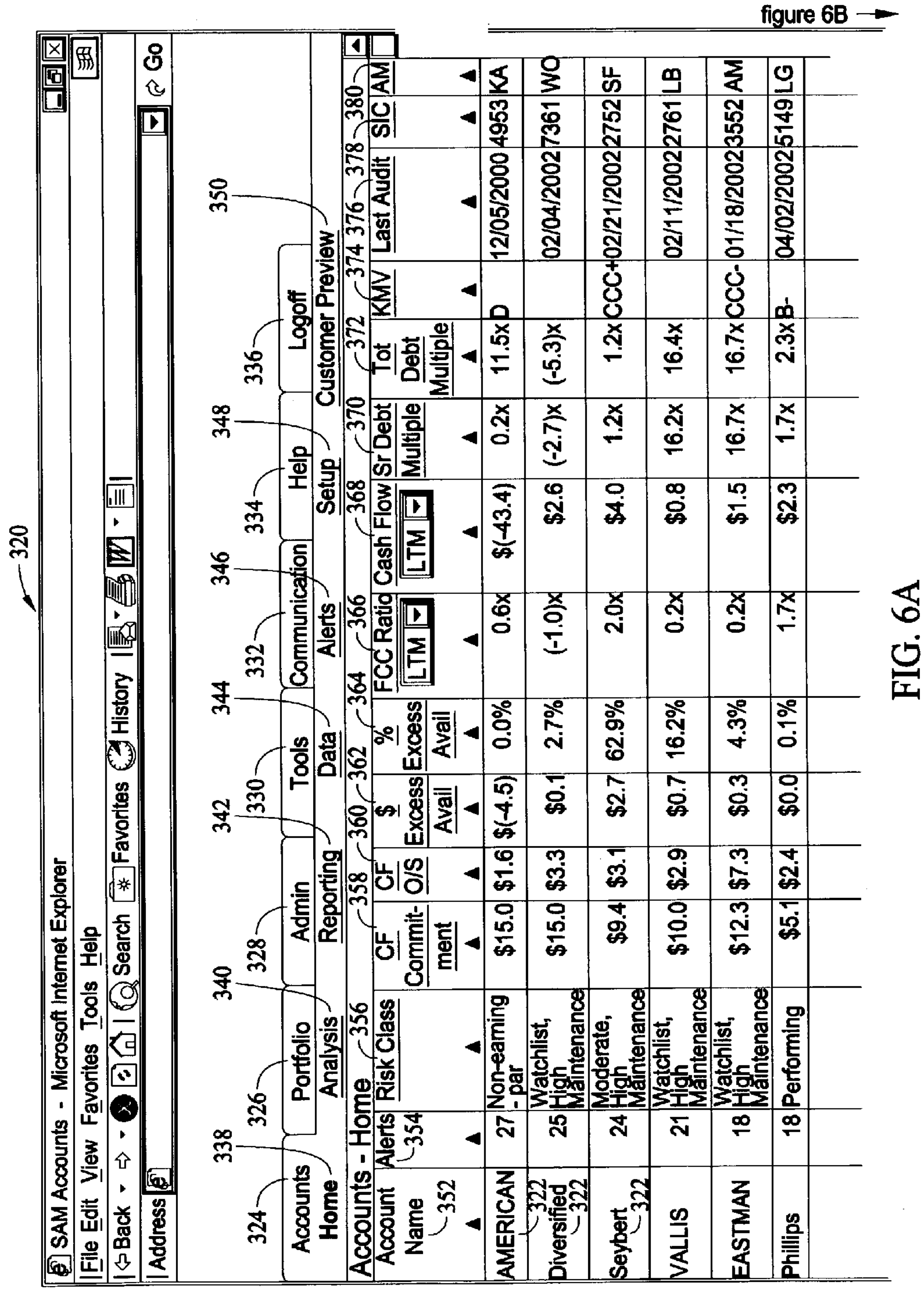

FIGS. 6A and 6B show an example embodiment of a user interface 320 displaying a home page of RMCS 10 (shown in FIG. 1), which is displayed after a user has logged onto RMCS 10. User interface 320 displays a summary of RM information 106 (shown in FIG. 3) for all accounts 322, or Analyzed Businesses, for which the user is responsible, is listed on a deal team, or has been assigned to by other users. In an example embodiment, user interface 320 illustrates a plurality of menu tabs including at least one of Accounts 324, Portfolio 326, Admin 328, Tools 330, Communication 332, Help 334, and Logoff 336. Although tabs are shown in the example embodiment, pull-down lists, check boxes, and other means for inputting this information could also be used. These menu tabs enable the user to navigate RMCS 10.

In the example embodiment, user interface 320 also displays sub-menu tabs located below the menu tabs. The sub-menu tabs include at least one of Home 338, Analysis 340, Reporting 342, Data 344, Alerts 346, Setup 348, and Customer Preview 350. The sub-menu tabs further enable the user to navigate RMCS 10. In the example embodiment, user interface 320 is displayed when Accounts 324 and Home 338 are selected or upon logging into the system.

When menu tab Accounts 324 and sub-menu tab Home 338 are selected, user interface 320 displays a summary of RM information 106 in tabular form for each accounts 322 for which the user is responsible, is listed on a deal team, or has been assigned to by other users. In the example embodiment, the table includes at least the following column headers: Account Name 352, Alerts 354, Risk Class 356, Commercial Finance (CF)-Commitment 358, CF Outstandings (CF O/S) 360, $ Excess Avail 362, % Excess Avail 364, Fixed Charge Coverage Over The Last Twelve Months (FCC LTM) 366, Cash Burn LTM 368, Sr. Debt 370, Tot. Debt 372, KMV 374, Last Audit 376, SIC 378, and Account Manager (AM) 380. KMV is a third party credit valuation tool. SIC is a code that identifies an industry that the business operates within. An Account Manager is a person within the CF Business that manages the account and underwrites the original transaction. In the example embodiment, each column is sortable by ascending or descending order. Additionally, each column header is a link, when selected, displays another screen that provides additional information relating to the selected column header.

FCC LTM 366 and Cash Burn LTM 368 also include pull-down boxes that may be selected by the user. In the example embodiment, the options included in these pull-down boxes are LTM (shown in FIGS. 6A and 6B), L9M (Last Nine Months), L6M (Last Six Months), L3M (Last Three Months), and L1M (Last One Month).

Figure 7:
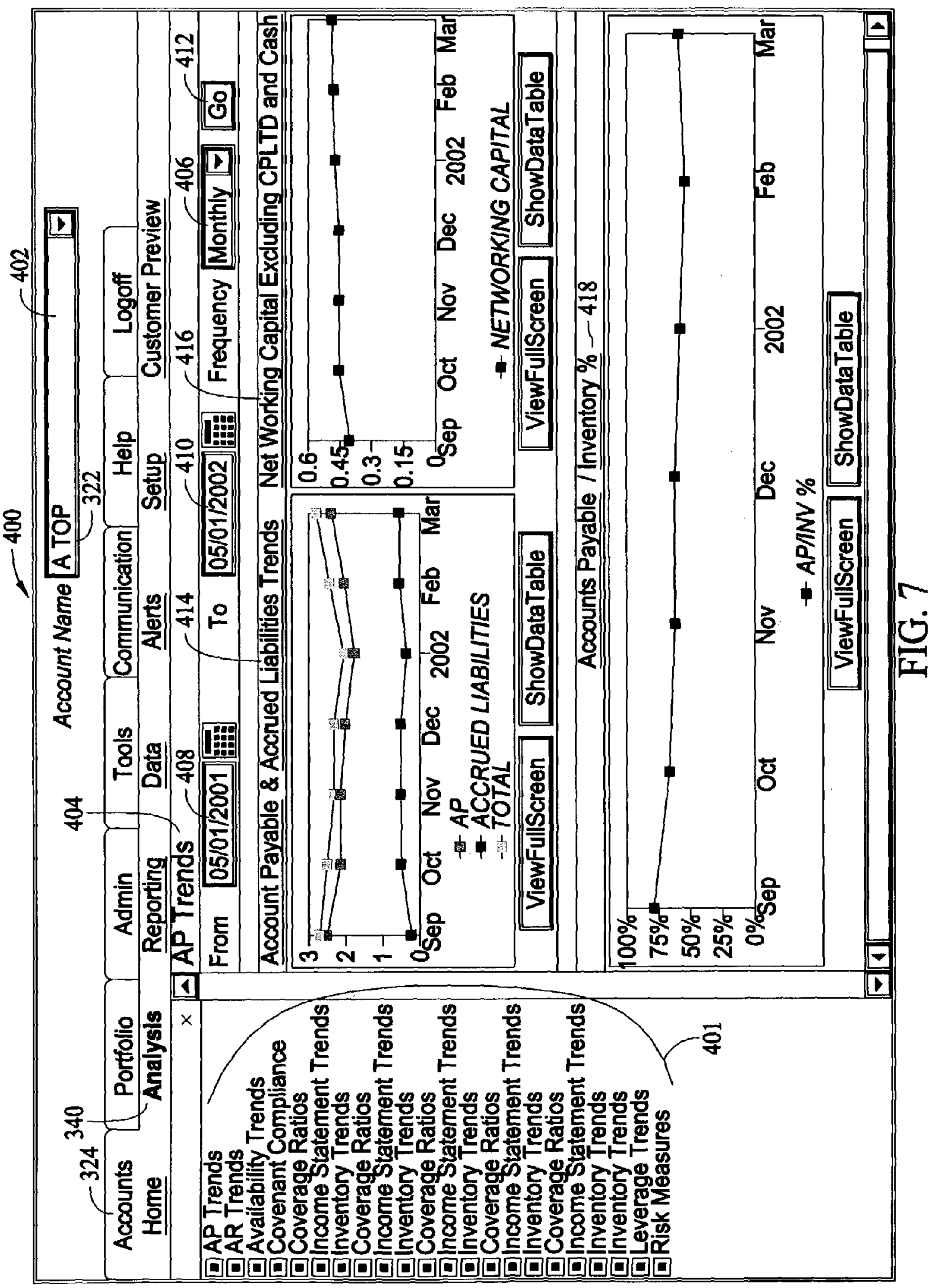
FIG. 7 is an example embodiment of a user interface displaying account payable trends for an account in a RMCS.

FIG. 7 is an example embodiment of a user interface 400 displaying account payable trends for selected account 322 (shown in FIGS. 6A and 6B), which is displayed after menu tab Accounts 324 and sub-menu tab Analysis 340 are selected by a user or after the user selects AP Trends within a navigation bar 401 located along the left side of user interface 400.

In the example embodiment, navigation bar 401 can be hidden to provide a larger screen view by clicking an "X" in the upper right hand corner of navigation bar 401. Once navigation bar 401 is hidden, a user can unhide navigation bar 401 by clicking on a Show Menu icon located below and to the left of Account tab 324. Navigation bar 401 may be displayed or hidden on most user interfaces included within RMCS 10 (shown in FIG. 1). For exemplary purposes, navigation bar 401 is shown both displayed and hidden in the user interfaces included within the present patent application.

User interface 400 displays at least one of graphical and tabular analyses of selected account 322. In the example embodiment, user interface 400 illustrates an account field 402 showing selected account 322 or the Analyzed Business. User interface 400 also illustrates Accounts Payable (AP) Trends field 404, a Frequency field 406, e.g., monthly, quarterly, and annual, a From date field 408, a To date field 410, and a Go button 412.

In the example embodiment, the graphs displayed on user interface 400 are displayed automatically using RM information 106 which is stored in RMCS 10 (shown in FIG. 1). The graphs are generated by the user when dates are inputted into From date field 408 and To date field 410, a Frequency 406 is selected, and Go button 412 is selected. Additionally, once the graphs are generated, a user can (i) click on a View Full Screen button to enlarge the corresponding graph to occupy the full screen, or (ii) click on a Show Data Table button to view the actual tabular data that is used to generate the specific graph. To change the display, the user selects different time intervals and/or dates. The graphs may include at least one of Accounts Payable and Accrued Liabilities 414, Net Working Capital 416, and Accounts Payable to Inventory 418.

Figure 8:
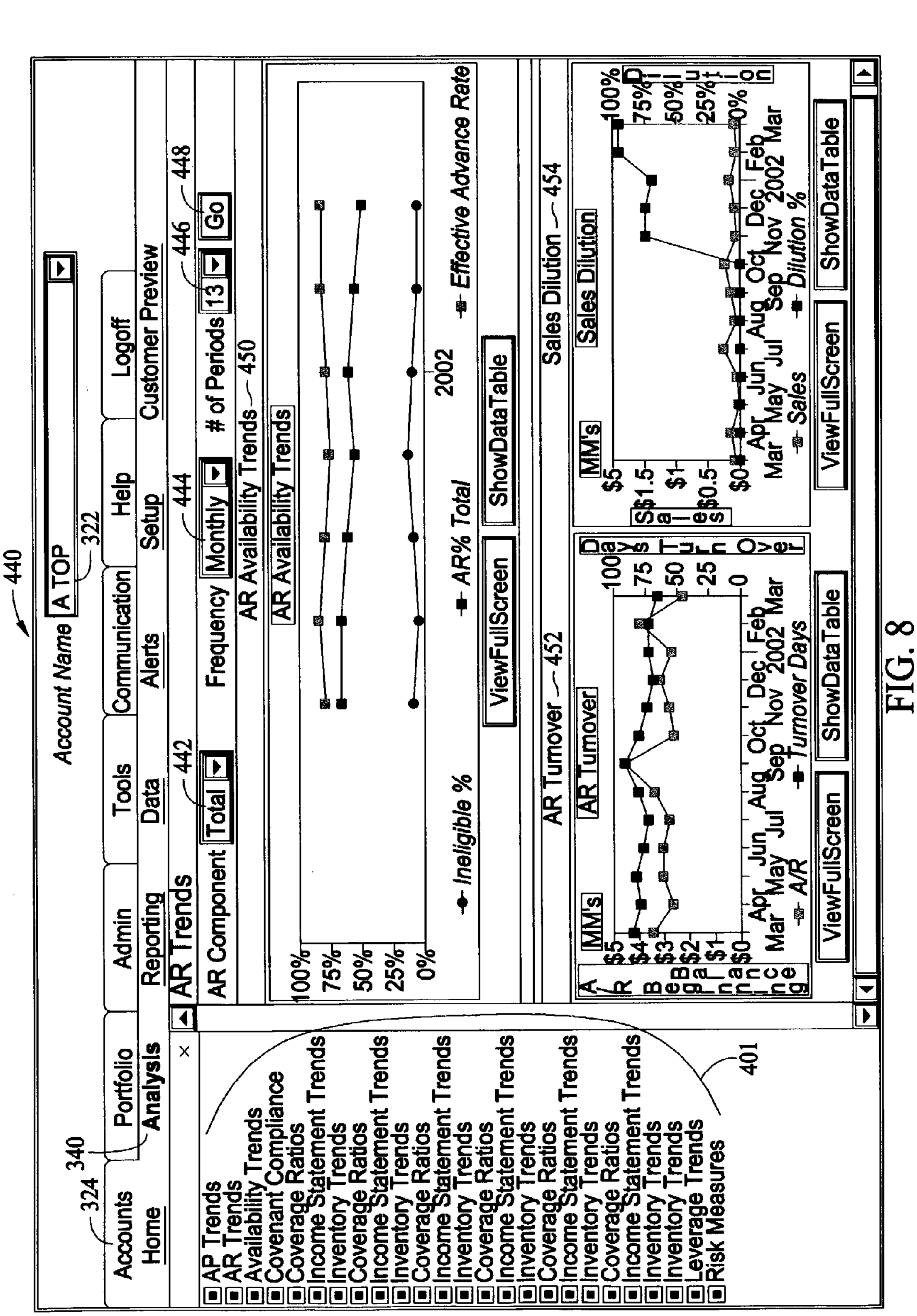
FIG. 8 is an example embodiment of a user interface displaying account receivable trends for an account in a RMCS.

FIG. 8 is an example embodiment of a user interface 440 displaying account receivable trends for selected account 322 (shown in FIGS. 6A and 6B), which is displayed after menu tab Accounts 324 and sub-menu tab Analysis 340 are selected by a user or after the user selects AR Trends within navigation bar 401. User interface 440 displays at least one of graphical and tabular analyses of selected account 322 for a selected period of time. In the example embodiment, user interface 440 displays an Accounts Receivable (AR) Components pull-down list 442, a Frequency pull-down list 444, a Number of Periods pull-down list 446, and a Go button 448.

In the example embodiment, the graphs displayed on user interface 440 are displayed automatically using RM information 106 (shown in FIG. 3) which is stored in RMCS 10 (shown in FIG. 1). The graphs are generated by the user after the time period is inputted by the user. Additionally, once the graphs are generated, a user can (i) click on a View Full Screen button to enlarge the corresponding graph to occupy the full screen, or (ii) click on a Show Data Table button to view the actual tabular data that is used to generate the specific graph. The graphs are then shown over a monthly, quarterly, annually frequency based on what is inputted into Frequency field 444. The graphs are generated after Go button 448 is selected. To change the display, the user selects different time intervals and/or dates. The graphs may include at least one of A/R Availability Trends 450, A/R Turnover 452, and Sales Dilution 454.

Figure 9A:
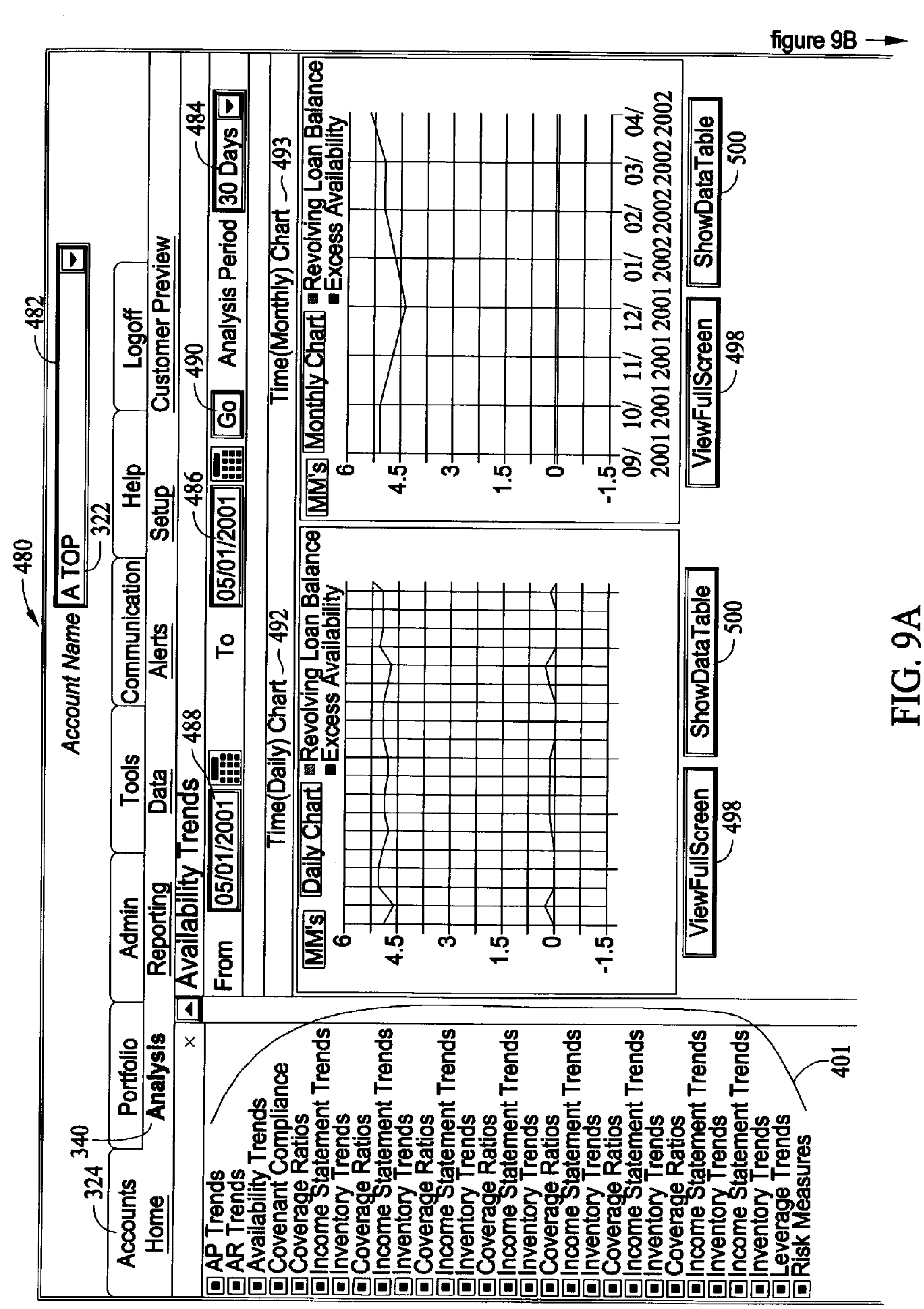
FIGS. 9A and 9B show an example embodiment of a user interface displaying availability trends for an account in a RMCS.
Figure 9B:
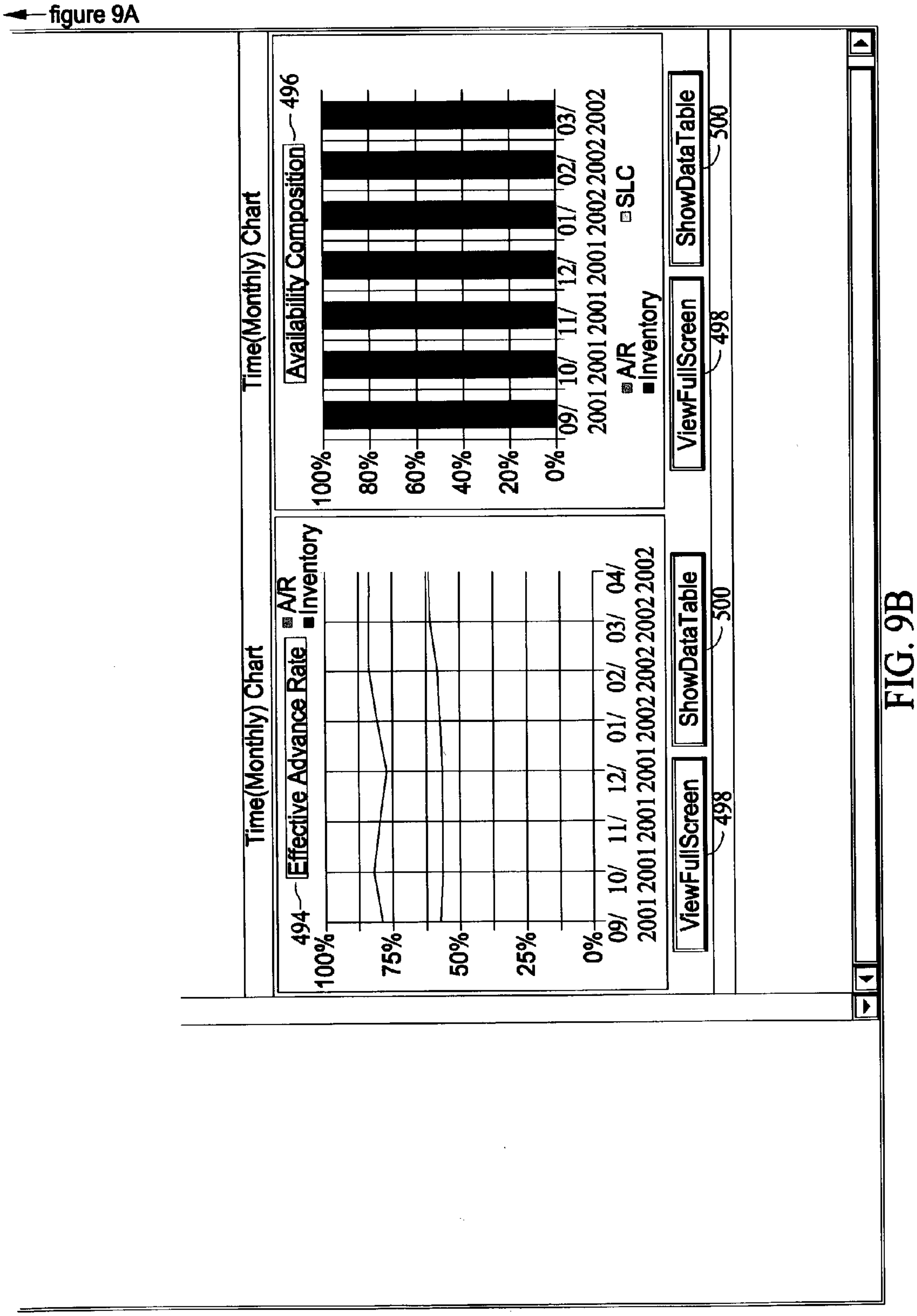

FIGS. 9A and 9B show an example embodiment of a user interface 480 displaying an availability analysis for selected account 322, which is displayed after menu tab Accounts 324 and sub-menu tab Analysis 340 are selected by a user or after the user selects Availability Trends within navigation bar 401. User interface 480 displays at least one of graphical and tabular analyses of selected account 322. In the example embodiment, user interface 480 illustrates an account field 482 showing selected account 322 or the Analyzed Business. User interface 480 also displays an Analysis Period field 484, a To date field 486, a From date field 488, and a Go button 490. In the example embodiment, Analysis Period field 484 includes 15 days, 30 days, 45 days, 60 days, and 90 days.

In the example embodiment, the graphs illustrated on user interface 480 are displayed automatically using RM information 106 (shown in FIG. 3) stored in RMCS 10 (shown in FIG. 1). The graphs are generated by the user when dates are inputted into To date field 486 and From date field 488, an Analysis Period 484 is selected, and Go button 490 is selected. To change the display, the user selects different time intervals and/or dates, and selects Go button 490. The graphs may include at least one of a Daily Excess Availability Chart 492, a Monthly Excess Availability Chart 493, an Effective Advance Rate Chart 494, and an Availability Composition Chart 496. Each graph also provides a View Full Screen button 498 which enables the user to enlarge the corresponding graph, and a Show Data Table button 500 which enables the user to display the data table that corresponds to that particular graph.

Figure 10:
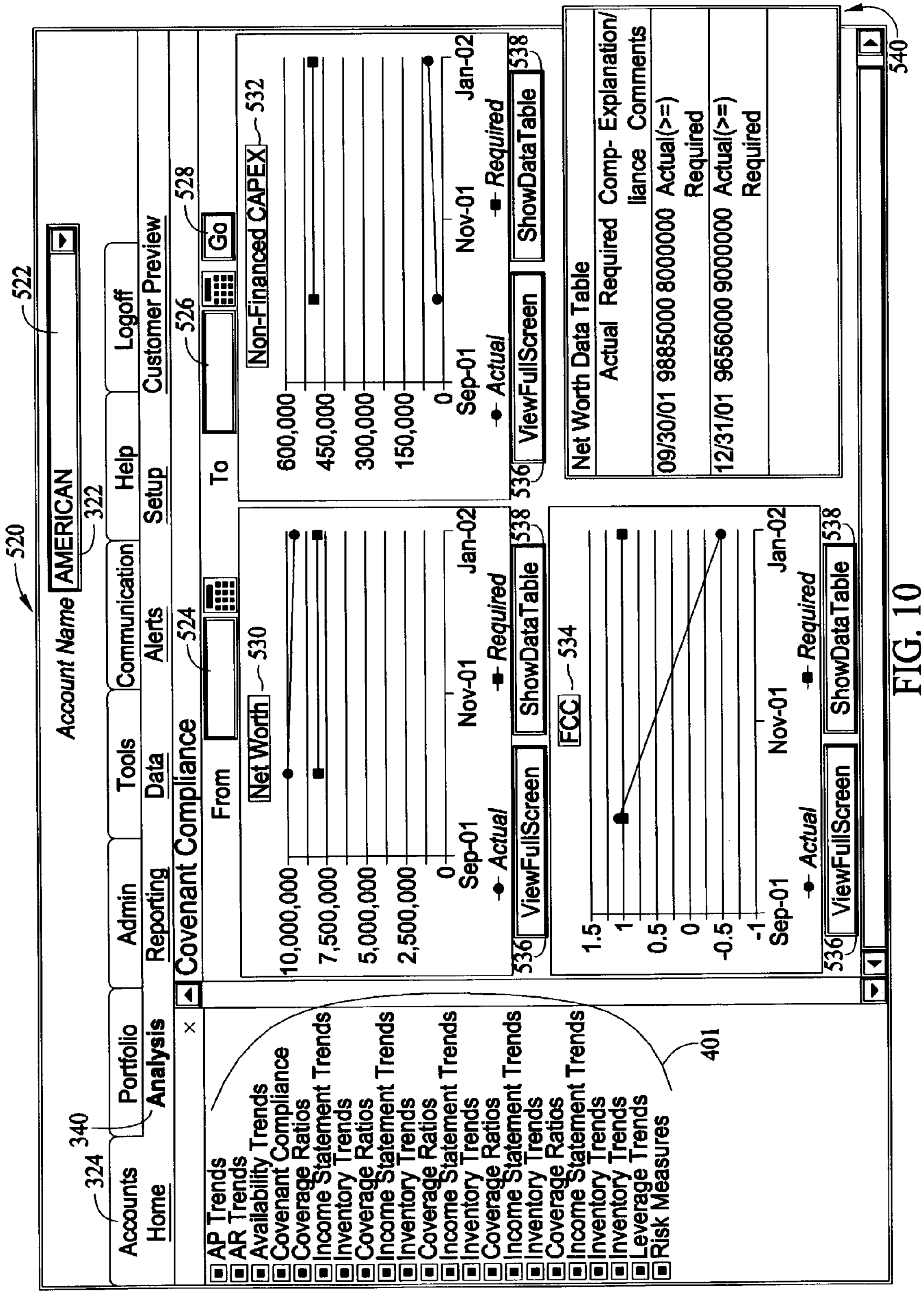
FIG. 10 is an example embodiment of a user interface displaying covenant compliance for an account in a RMCS.

FIG. 10 is an example embodiment of a user interface 520 displaying covenant compliance for selected account 322, which is displayed after menu tab Accounts 324 and sub-menu tab Analysis 340 are selected by a user or after the user selects Covenant Compliance within navigation bar 401. User interface 520 displays at least one of graphical and tabular analyses of selected account 322. In the example embodiment, user interface 520 displays an Account field 522 showing selected account 322, which is also known as the Analyzed Business. User interface 520 also includes a From date field 524, a To date field 526, and a Go button 528.

In the example embodiment, the graphs displayed on user interface 520 display financial covenant compliance for account 322 or the Analyzed Business. The graphs are automatically displayed using RM information 106 (shown in FIG. 3) which is stored in RMCS 10 (shown in FIG. 1). The graphs are generated by the user when dates are inputted into From date field 524 and To date field 526, and Go button 528 is selected. To change the display, the user selects different dates, and selects Go button 528. In the example embodiment, the graphs displayed on user interface 520 may include at least one of Net Worth 530, Non-Financed Capex 532, and FCC 534. Each graph displayed on user interface 520 also includes a View Full Screen button 536, and a Show Data Table button 538. Additionally, user interface 520 displays a reduced Data Table 540 that corresponds with at least one of the displayed graphs. When a user selects reduced Data Table 540, a full screen data table is displayed.

Figure 11:
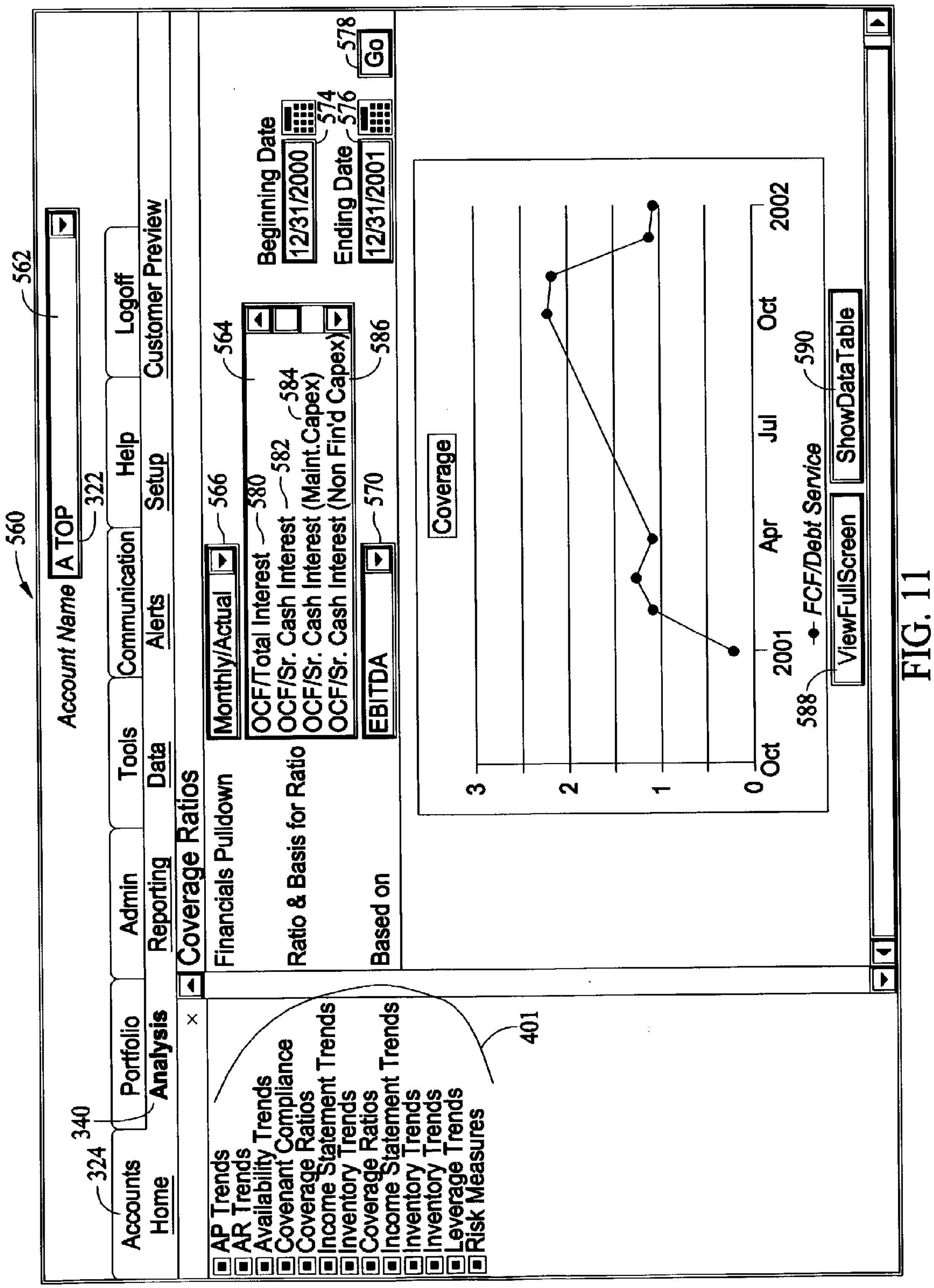
FIG. 11 is an example embodiment of a user interface displaying coverage ratios for an account in a RMCS.

FIG. 11 is an example embodiment of a user interface 560 displaying coverage ratios for selected account 322, which is displayed after menu tab Accounts 324 and sub-menu tab Analysis 340 are selected by a user or after the user selects Coverage Ratios within navigation bar 401. User interface 560 displays at least one of graphical and tabular analyses of selected account 322. In the example embodiment, user interface 560 includes an Account Name field 562 showing selected account 322, which is also known as the Analyzed Business. User interface 560 also illustrates a Ratio & Basis for Ratio data scroll field 564, a Financials pull-down field 566, a Based on pull-down field 570, a Beginning Date field 574, an Ending Date field 576, and a Go button 578.

In the example embodiment, the graphs illustrated on user interface 560 are displayed automatically using RM information 106 (shown in FIG. 3) which is stored in RMCS 10 (shown in FIG. 1). The graphs are generated by the user when data is inputted into Ratio & Basis for Ratio data scroll field 564, Financials pull-down field 566, Based on pull-down field 570, Beginning Date field 574, Ending Date field 576, and Go button 578 is selected. To change the display, the user inputs different data into the various fields and selects Go button 578. In the example embodiment, the user can select from at least one of the following ratios: Operating Cash Flow (OCF)/Total Interest 580, OCF/Senior Cash Interest 582, OCF/Senior Cash Interest (Maintenance Capex) 584, and OCF/Senior Cash Interest (Non-Financed Capex) 586. Capex is defined as Capital Expenditures. EBITDA, which is shown in Based on pull-down field 570, is defined as Earnings Before Interest, Taxes, Depreciation, and Amortization. Each graph displayed on user interface 560 also includes a View Full Screen button 588, and a Show Data Table button 590.

Figure 12:
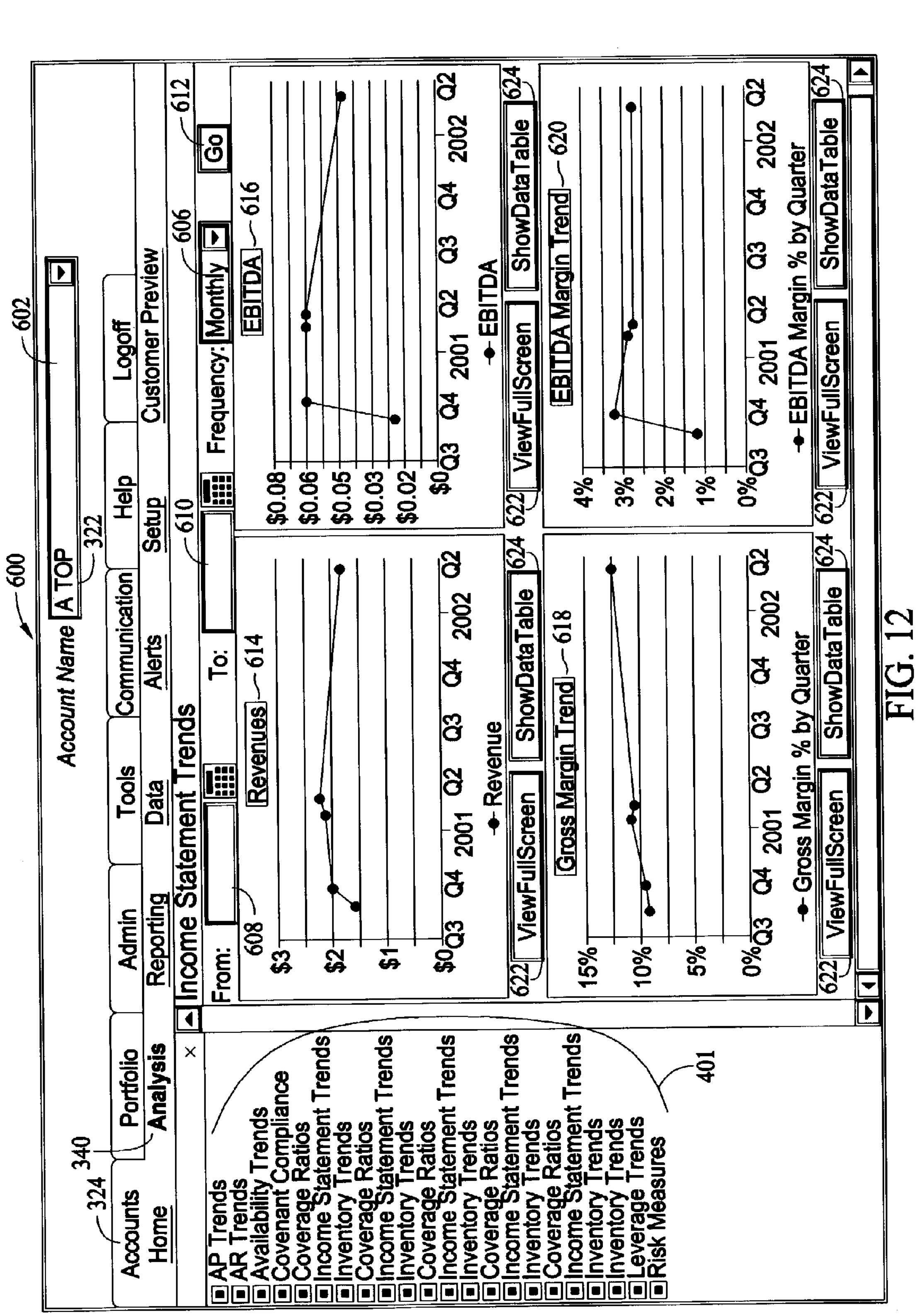
FIG. 12 is an example embodiment of a user interface displaying income statement trends for an account in a RMCS.

FIG. 12 is an example embodiment of a user interface 600 displaying financial statement trends for selected account 322, which is displayed after menu tab Accounts 324 and sub-menu tab Analysis 340 are selected by a user or after the user selects Income Statement Trends within navigation bar 401. User interface 600 displays at least one of graphical and tabular analyses of selected account 322. In the example embodiment, user interface 600 displays an Account Name field 602 showing selected account 322, also known as the Analyzed Business. User interface 600 also illustrates a Frequency field 606, e.g., monthly, quarterly, and annual, a From date field 608, a To date field 610, and a Go button 612.

In the example embodiment, the graphs illustrated on user interface 600 display an income statement performance for account 322. The graphs are automatically displayed on user interface 600 using RM information 106 (shown in FIG. 3) which is stored in RMCS 10 (shown in FIG. 1). The graphs are generated by the user when data is inputted into Frequency field 606, From date field 608, To date field 610, and Go button 612 is selected. To change the display, the user inputs different data into the various fields and selects Go button 612. In the example embodiment, the graphs that may be generated by the user and displayed on user interface 600 include at least one of Revenues 614, Earnings Before Interest, Taxes, Depreciation and Amortization (EBITDA) 616, Gross Margin Trend 618, and EBITDA Margin Trend 620. Each graph displayed on user interface 600 also includes a View Full Screen button 622, and a Show Data Table button 624.

Figure 13:
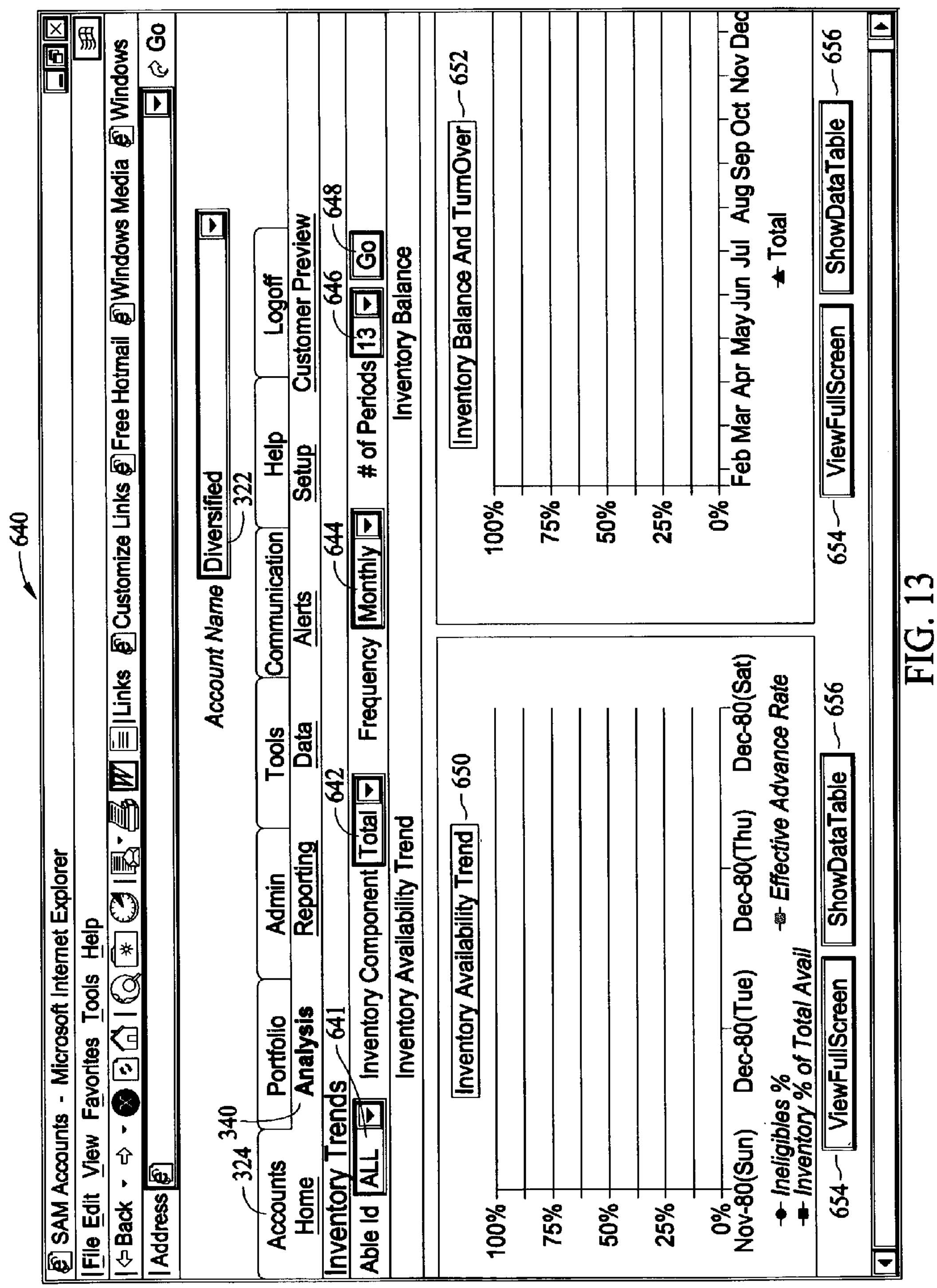
FIG. 13 is an example embodiment of a user interface displaying inventory trends for an account in a RMCS.

FIG. 13 is an example embodiment of a user interface 640 displaying inventory trends for selected account 322 (shown in FIGS. 6A and 6B), which is displayed after menu tab Accounts 324 and sub-menu tab Analysis 340 are selected by a user or after the user selects Inventory Trends within navigation bar 401 (not shown in FIG. 13). User interface 640 displays at least one of graphical and tabular analyses of selected account 322. In the example embodiment, user interface 640 displays an ABLE ID pull-down field 641, an Inventory Component pull-down field 642, a Frequency pull-down field 644, e.g., monthly, quarterly, and annual, a # of Periods pull-down field 646, and a Go button 648.

ABLE is a known and commercially available software program manufactured by Computer and Software Enterprises, Inc., San Luis Obispo, Calif. ABLE stands for Asset Based Lending Environment ("ABLE") and is a collateral and accounting subledger system. Although ABLE is shown in the example embodiment, RMCS 10 does not require ABLE as it sub-ledger system. Rather, RMCS 10 can utilize and interface with a plurality of known and commercially available sub-ledger systems. Another example of a known and commercially available sub-ledger system that can interface with RMCS 10 includes AE Business Solutions, Madison, Wis. For convenience purposes, the example embodiment discussed herein will include the ABLE sub-ledger system.

In the example embodiment, the graphs illustrated on user interface 640 display inventory trends for account 322, also known as the Analyzed Business. The graphs are automatically displayed on user interface 640 using RM information 106 (shown in FIG. 3) which is stored in RMCS 10 (shown in FIG. 1). The graphs are generated by the user when data is inputted into ABLE ID pull-down field 641, Inventory Component pull-down field 642, Frequency pull-down field 644, # of periods pull-down field 646, and Go button 648 is selected. To change the display, the user inputs different data into the various fields and selects Go button 648. In the example embodiment, the graphs that may be generated by the user and displayed on user interface 640 include at least one of Inventory Availability Trend 650, and Inventory Balance and Turnover 652. Each graph displayed on user interface 640 also includes a View Full Screen button 654, and a Show Data Table button 656.

Figure 14:
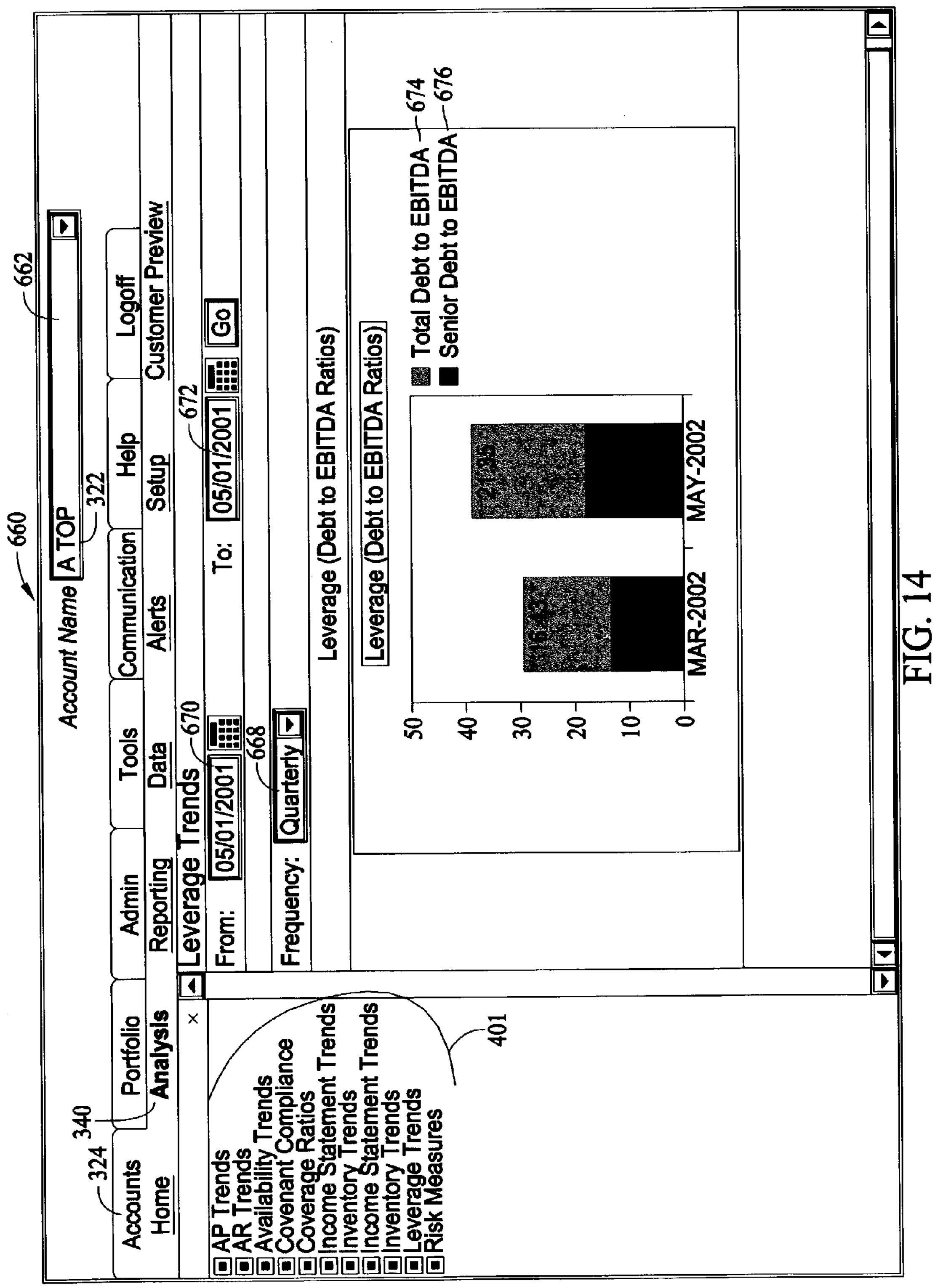
FIG. 14 is an example embodiment of a user interface displaying total leverage and senior leverage over time for an account in a RMCS.

FIG. 14 is an example embodiment of a user interface 660 displaying total leverage and senior leverage over time for selected account 322, which is displayed after menu tab Accounts 324 and sub-menu tab Analysis 340 are selected by a user or after the user selects Leverage Trends within navigation bar 401. User interface 660 displays at least one of graphical and tabular analyses of selected account 322. In the example embodiment, user interface 660 displays an Account Name field 662 showing selected account 322, also known as the Analyzed Business. User interface 660 also displays a Frequency pull-down field 668, e.g., monthly, quarterly, and annual, a From date field 670, and a To date field 672.

In the example embodiment, the graphs illustrated on user interface 660 display total leverage and senior leverage over time for account 322. The graphs are automatically displayed on user interface 660 using RM information 106 (shown in FIG. 3) which is stored in RMCS 10 (shown in FIG. 1). The graphs are generated by the user when data is inputted into Frequency pull-down field 668, From date field 670, and To date field 672. To change the display, the user inputs different data into the various fields. In the example embodiment, the graphs that may be generated by the user and displayed on user interface 660 include at least one of Total Debt to EBITDA 674, and Senior Debt to EBITDA 676.

Figure 15A:
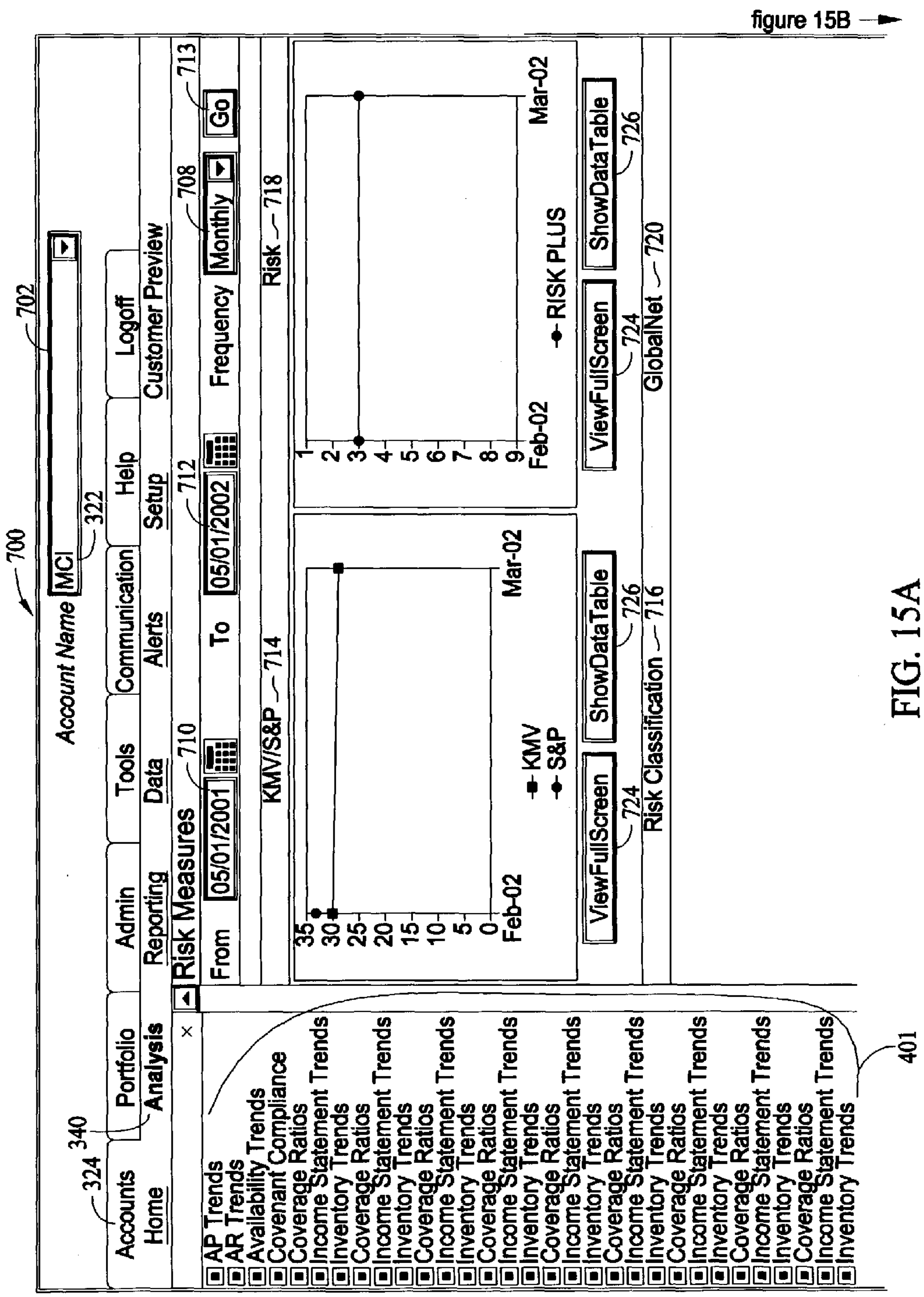
FIGS. 15A and 15B show an example embodiment of a user interface displaying risk measures for an account in a RMCS.
Figure 15B:
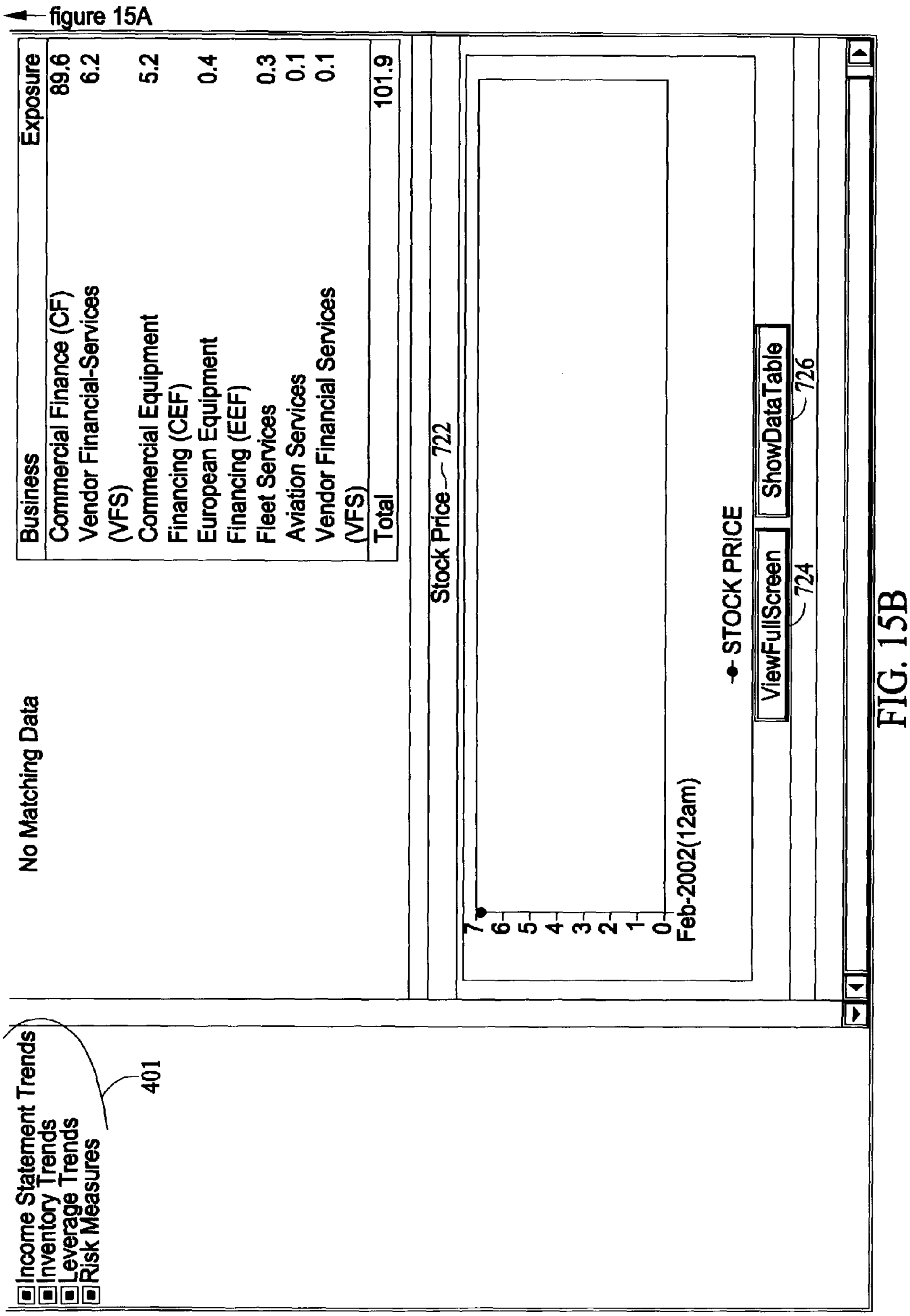

FIGS. 15A and 15*b* show an example embodiment of a user interface 700 displaying risk measures such as KMV, S&P, Moody's, and other measures utilized by the business entity to classify risk including at least one of Risk Classification, Risk+, and GlobalNet, over time for selected account 322, which is displayed after menu tab Accounts 324 and sub-menu tab Analysis 340 are selected by a user or after the user selects Risk Measures within navigation bar 401. KMV is a risk rating system that provides a default rate indicator on a business entity. S&P is a Standard & Poors risk rating system. Moody's and Risk+ are also risk rating systems. GlobalNet is a tool used to track and aggregate the CF Business' entire exposure by both business and product as they relate to the specific deal. User interface 700 displays at least one of graphical and tabular analyses of selected account 322. In the example embodiment, user interface 700 displays an Account Name field 702 showing selected account 322, also known as the Analyzed Business. User interface 700 also displays a Frequency pull-down field 708, e.g., monthly, quarterly, and annual, a From date field 710, a To date field 712, and a Go button 713.

FIGS. 16A through 16F display an example embodiment of a user interface 740 displaying account specific reports referred to as Portfolio Management Reports (PMR) for selected account 322, which is displayed after menu tab Accounts 324 and sub-menu tab Reporting 342 are selected by a user. User interface 740 displays at least one of graphical and tabular analyses of selected account 322. In the example embodiment, user interface 740 may display for selected account 322 a summary of current loan balances, an amount of collateral, a resulting availability of credit, an effective advance rate, letters of credit, and other information relating to credit. User interface 740 may also display for selected account 322 a summary of loan balances, a monthly trend of changes in collateral balances, and an amount of collateral availability.

FIGS. 17A and 17B show an example embodiment of a user interface 780 displaying collateral availability for selected account 322, which is displayed after menu tab Accounts 324 and sub-menu tab Data 344 are selected by a user. The data may be viewed by the user through Data Section 344 and the Setup Section 348 of RMCS 10 (shown in FIG. 1). The navigation bar located along the left side of user interface 780 is shown hidden in FIGS. 17A and 17B. In the example embodiment, Data Section 344 is divided into a plurality of categories including at least one of Collateral, Financial Statements and Capital Structure, Strategy, Deal Structure, Equity, Company, and Contacts, which are displayed within the navigation bar. User interface 780 displays at least one of graphical and tabular analyses of selected account 322. In the example embodiment, user interface 780 displays for selected account 322 a summary of collateral data such as availability, appraisals, agings, and concentrations. User interface 780 may also illustrate for selected account 322 a summary of collateral data broken down into categories including Secured 782, Unsecured 784, and Combined 786.

Figure 18A:
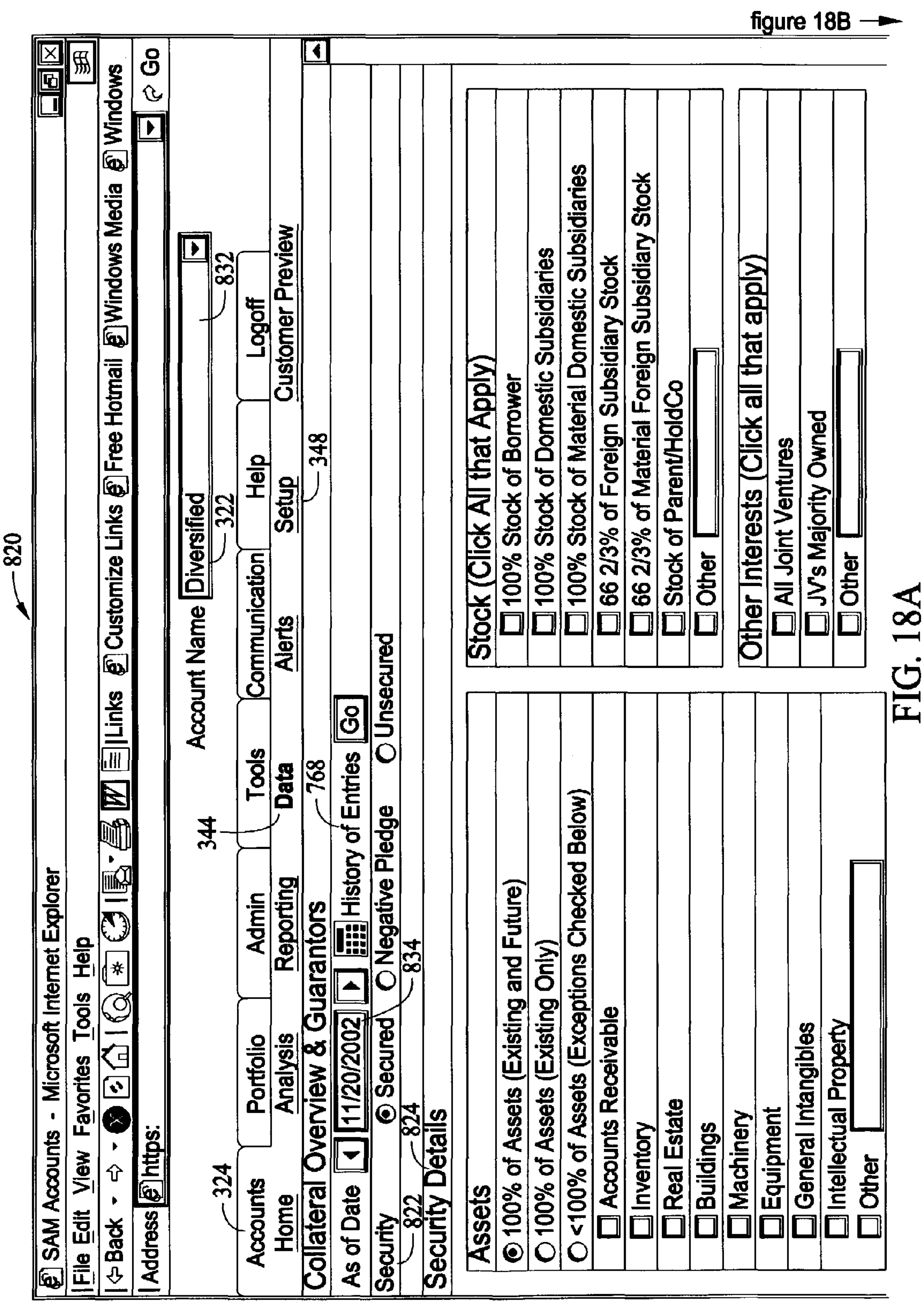
FIGS. 18A and 18B show an example embodiment of a user interface displaying collateral security and guarantors information for an account in a RMCS.
Figure 18B:
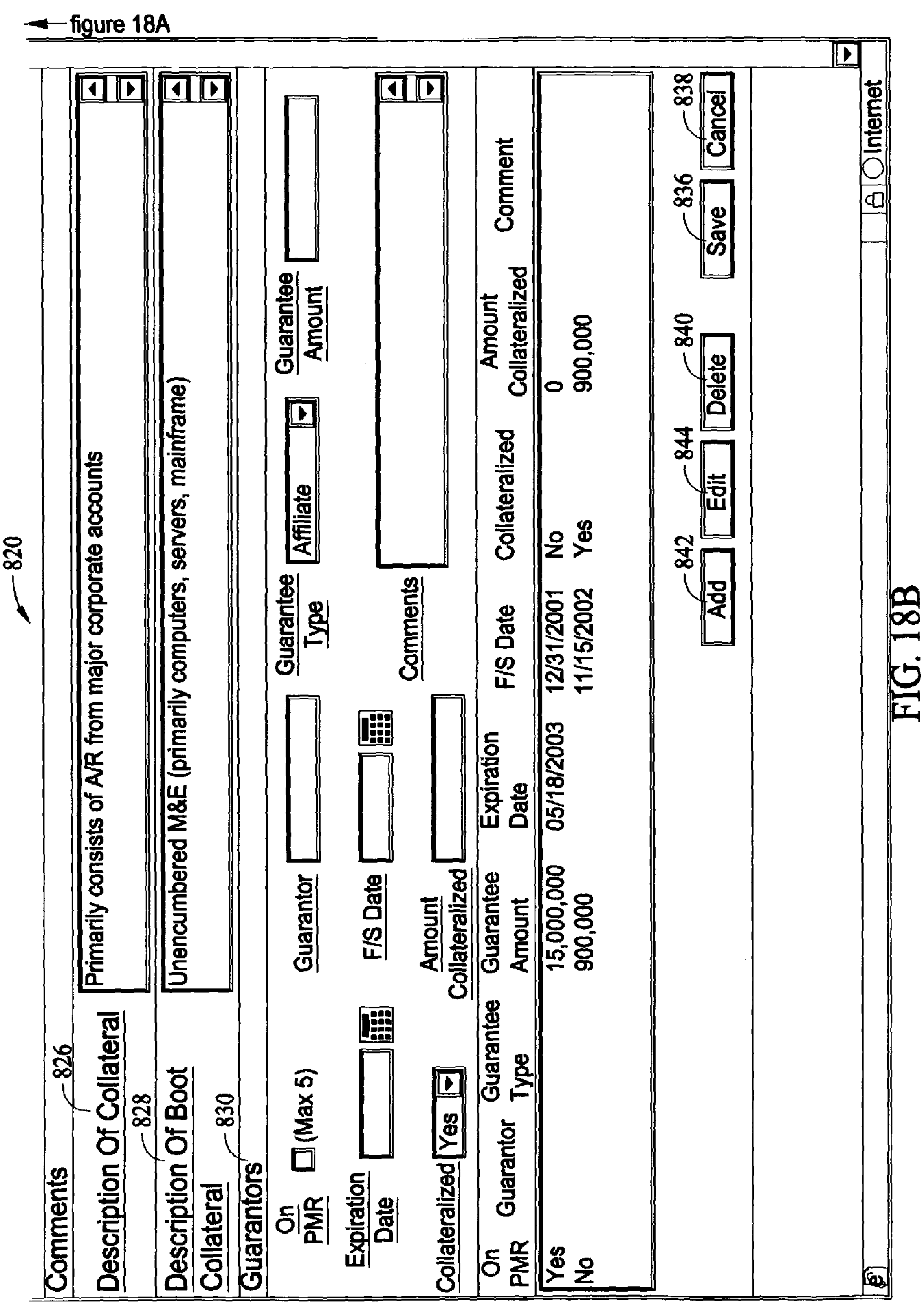

FIGS. 18A and 18B show an example embodiment of a user interface 820 displaying collateral security and guarantors information for selected account 322, which is displayed after menu tab Accounts 324 and sub-menu tab Data 344 are selected by a user or after a user selects Collateral Overview & Guarantors from a navigation bar (not shown) located on the left side of user interface 820. The data may be viewed by a user through Data Section 344 and Setup Section 348 of RMCS 10 (shown in FIG. 1). User interface 820 displays at least one of graphical and tabular analyses of selected account 322. In the example embodiment, user interface 820 displays for selected account 322 a summary of collateral security and guarantors. User interface 820 may also display for selected account 322 a summary of security 822, security details, 824, description of collateral 826, description of boot collateral 828, and guarantors 830. In the example embodiment, user interface 820 displays an Account Name field 832 showing selected account 322, which is also known as the Analyzed Business. User interface 820 also displays a Date field 834, a Save button 836, a Cancel button 838, a Delete button 840, an Add button 842, and an Edit button 844. User interface 820 also displays a History of Entries link 846, which enables a user to identify when a financial record was last saved within RMCS 10.

Figure 19A:
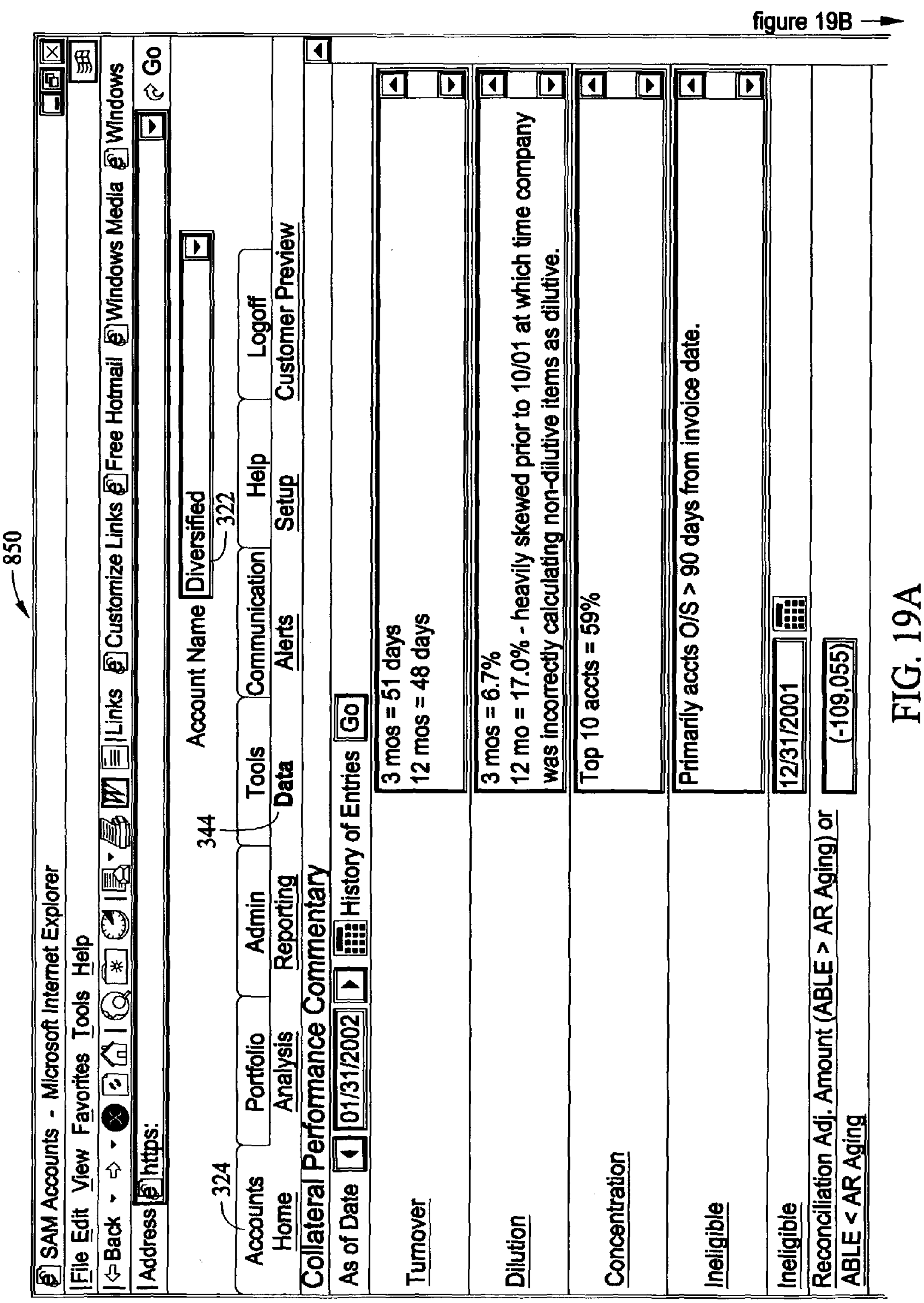
FIGS. 19A and 19B show an example embodiment of a user interface displaying collateral performance commentary information for an account in a RMCS.
Figure 19B:
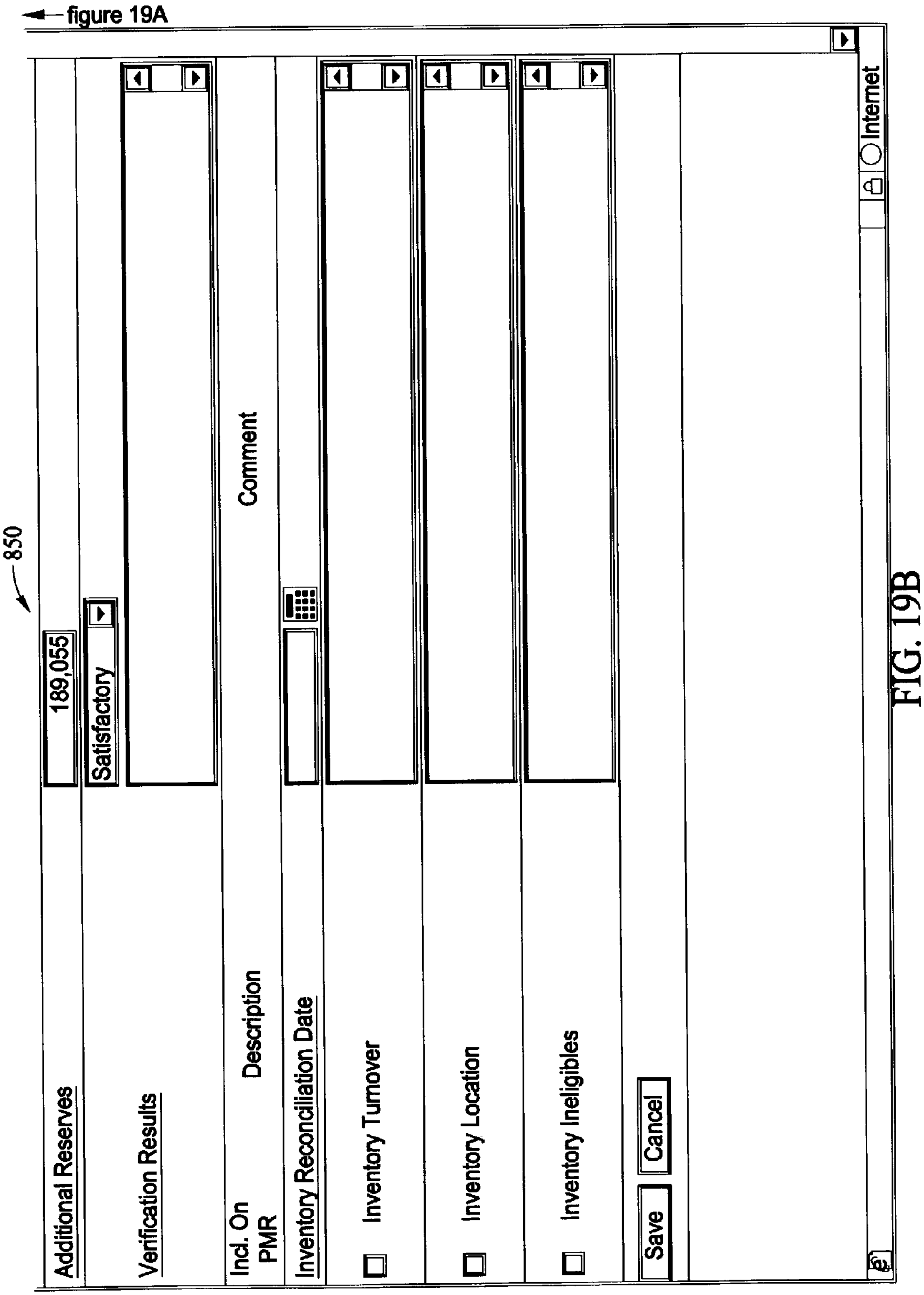

FIGS. 19A and 19B show an example embodiment of a user interface 850 displaying collateral performance commentary information for selected account 322, which is displayed after menu tab Accounts 324 and sub-menu tab Data 344 are selected by a user or after a user selects Collateral Performance Commentary from a navigation bar (not shown) located on the left side of user interface 850. User interface 850 displays at least one of graphical and tabular analyses of selected account 322. In the example embodiment, user interface 850 displays for selected account 322 a summary of collateral performance commentary.

In the example embodiment, the graphs illustrated on user interface 700 display risk measures over time for account 322. The graphs are automatically displayed on user interface 700 using RM information 106 (shown in FIG. 3) which is stored in RMCS 10 (shown in FIG. 1). The graphs are generated by the user when data is inputted into Frequency field 708, From date field 710, To date field 712, and Go button 713 is selected. To change the display, the user inputs different data into the various fields. In the example embodiment, the graphs that may be generated by the user and displayed on user interface 700 include at least one of KMV/S&P 714, Risk Classification 716, Risk+ 718, GlobalNet 720, and Stock Price 722. Each graph displayed on user interface 700 also includes a View Full Screen button 724, and a Show Data Table button 726.

Figure 16A:
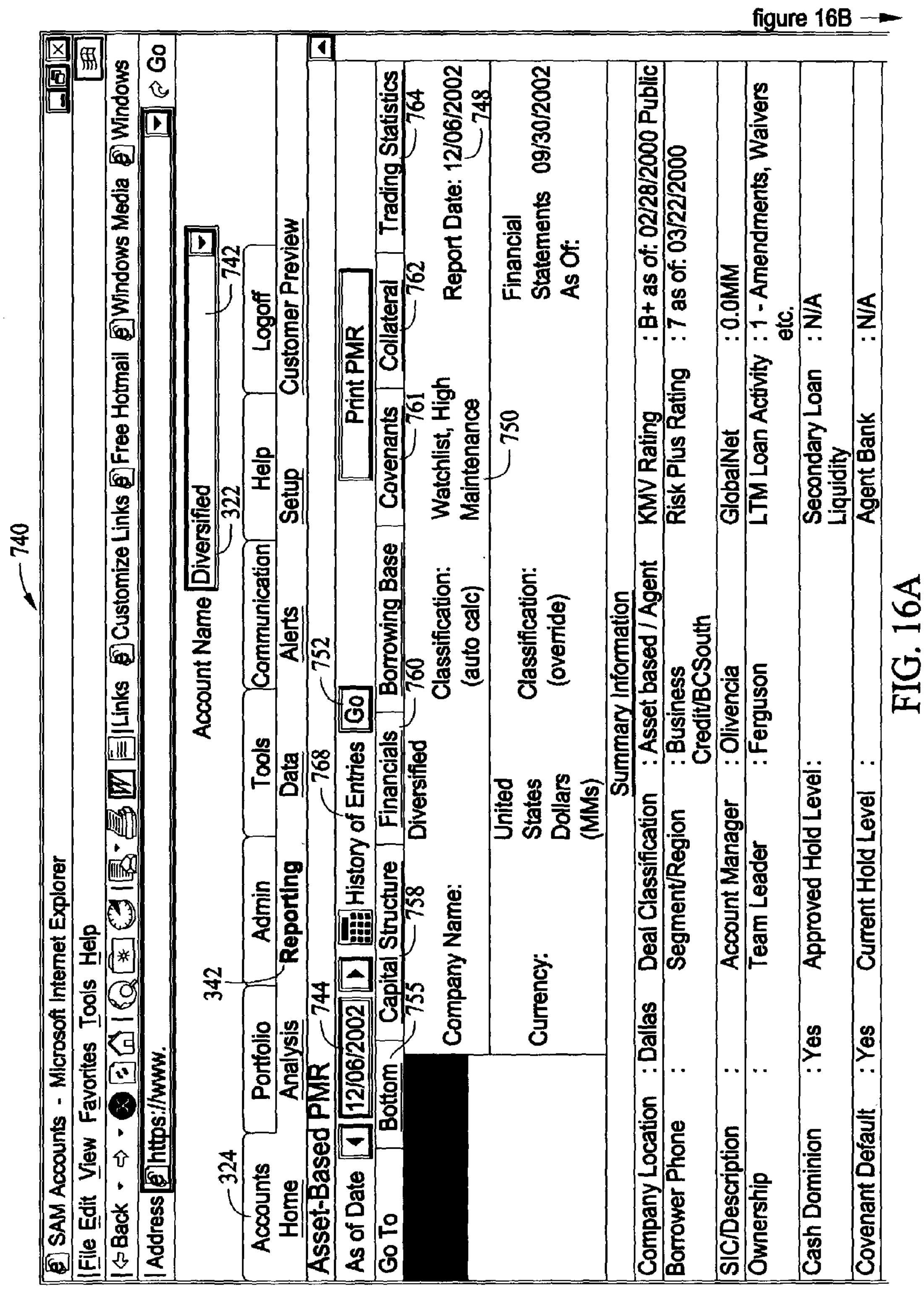
Figure 16C:
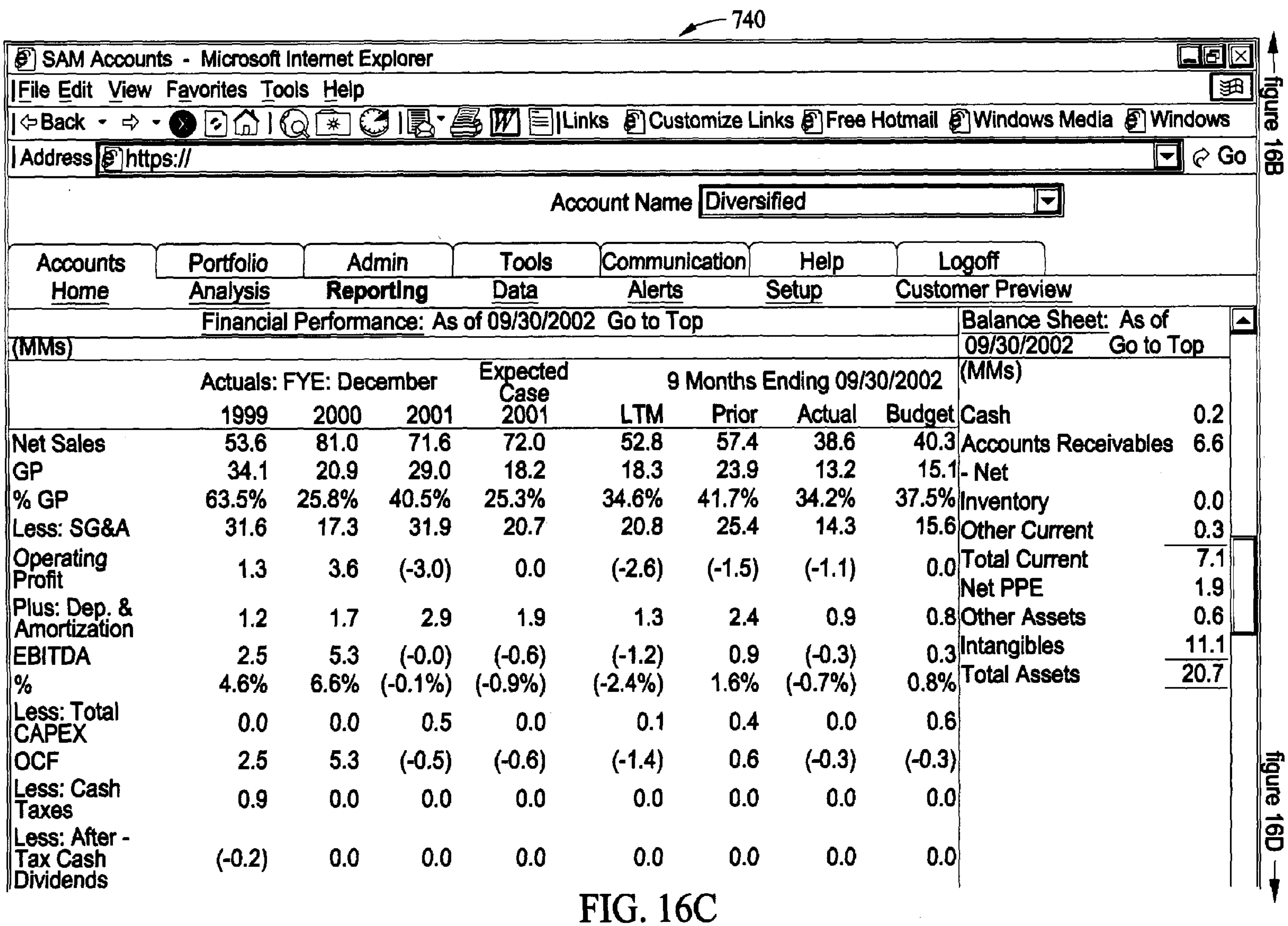
Figure 16E:
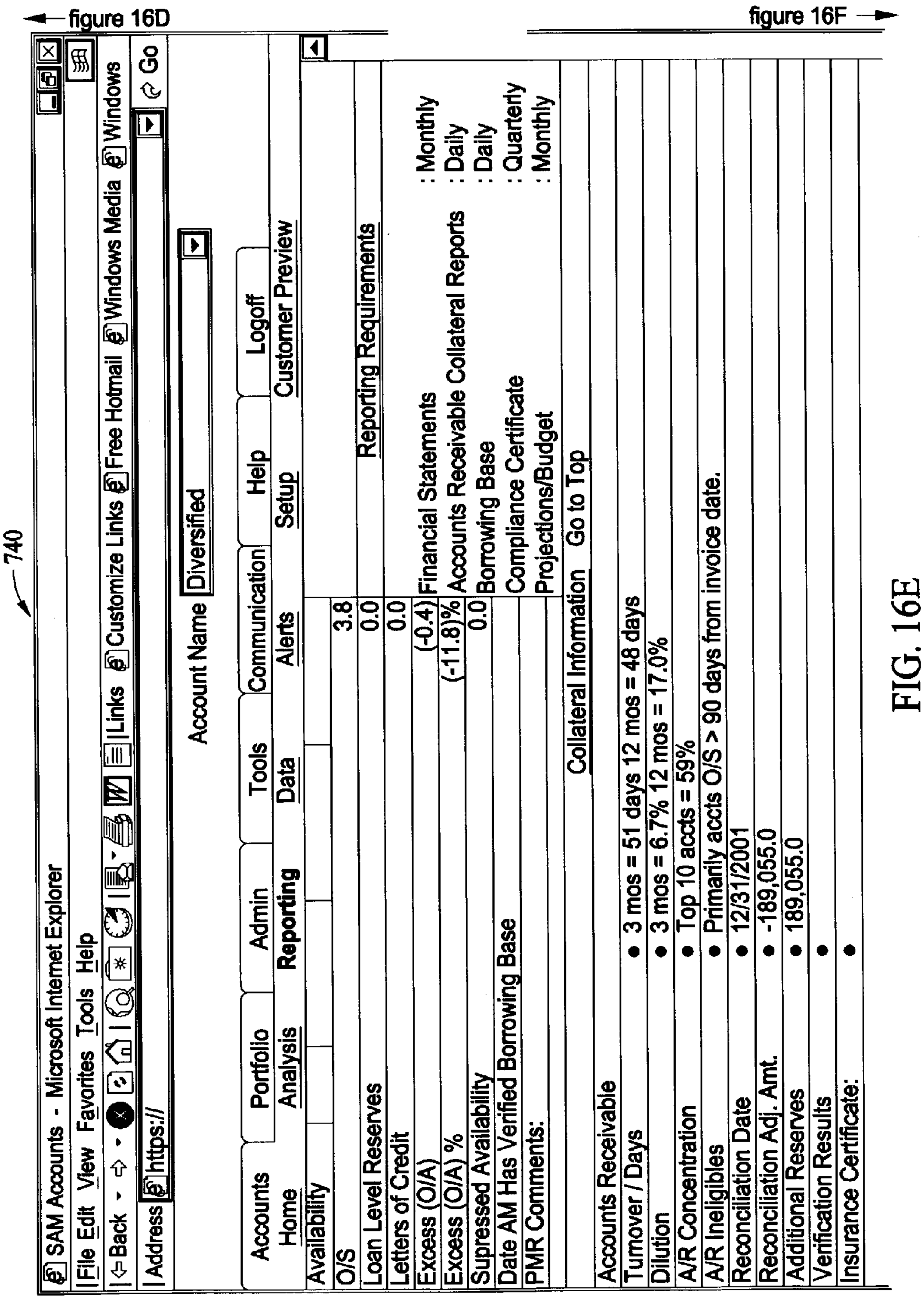
Figure 16F:
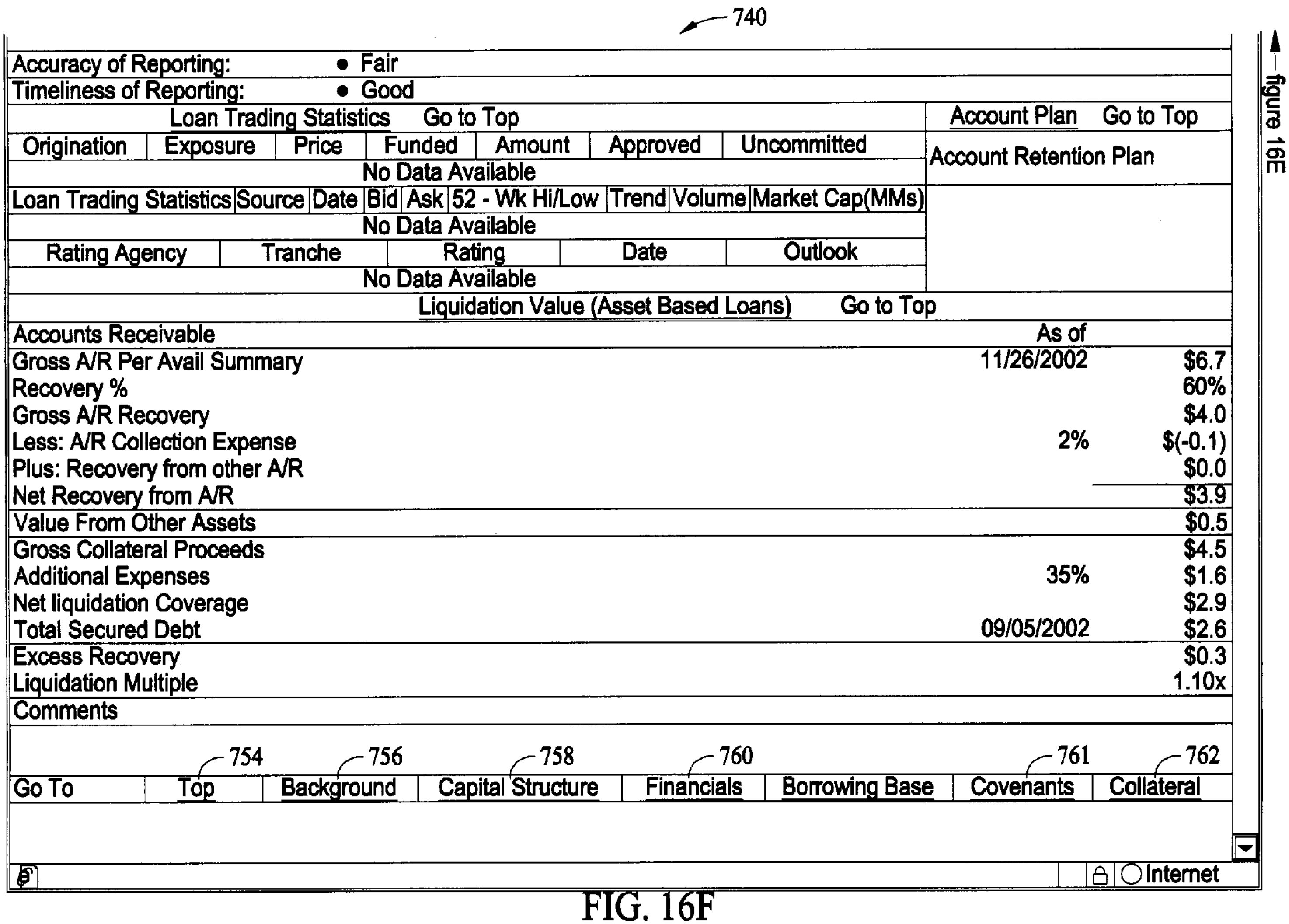

FIGS. 16A through 16C display an example embodiment of a user interface 740 displaying account specific reports referred to as Portfolio Management Reports (PMR) for selected account 322, which is displayed after menu tab Accounts 324 and sub-menu tab Reporting 342 are selected by a user. User interface 740 displays at least one of graphical and tabular analyses of selected account 322. In the example embodiment, user interface 740 may display for selected account 322 a summary of current loan balances, an amount of collateral, a resulting availability of credit, an effective advance rate, letters of credit, and other information relating to credit. User interface 740 may also display for selected account 322 a summary of loan balances, a monthly trend of changes in collateral balances, and an amount of collateral availability.

User interface 740 displays an account specific report used by management within the CF Business to monitor each account 322, also known as the Analyzed Business. User interface 740 displays a report based on RM information 106 (shown in FIG. 3) which is stored in RMCS 10 (shown in FIG. 1). The standard report includes at least one of asset-based accounts, cash-flow accounts, equity accounts, Bank Loan Group (BLG) accounts, and WatchList account.

In the example embodiment, user interface 740 displays an Account Name pull-down field 742 showing selected account 322. User interface 740 also displays a Summary Information Section, a Background Section, a Recent Events and Loan Activities Section, a Guarantors/Security Section, a Capital Structure Section, a Fee Structure Section, a Financial Performance Section, a Balance Sheet Section, a Financial Commentary Section, a Borrowing Base Section, a Covenants Section, a Collateral Information Section, a Trading Statistics Section, and a Liquidation Value Section. User interface 740 also displays an As of Date data field 744, a Report Date label 748, a Risk Classification field 750, a Go button 752, a Top button 754, a Bottom button 755, a Background button 756, a Capital Structure button 758, a Financials button 760, a Covenants button 761, a Collateral button 762, and a Trading Statistics button 764.

User interface 740 also displays a History of Entries link 768, which enables a user to identify when a financial record was last saved within RMCS 10. After a user selects History of Entries link 768, a calendar is displayed (not shown in FIG. 16) that highlights the last time a specific financial record was saved within RMCS 10.

FIG. 17 is an example embodiment of a user interface 780 displaying collateral availability for selected account 322, which is displayed after menu tab Accounts 324 and sub-menu tab Data 344 are selected by a user. The data may be viewed by the user through Data Section 344 and the Setup Section 348 of RMCS 10 (shown in FIG. 1). The navigation bar located along the left side of user interface 780 is shown hidden in FIG. 17. In the example embodiment, Data Section 344 is divided into a plurality of categories including at least one of Collateral, Financial Statements and Capital Structure, Strategy, Deal Structure, Equity, Company, and Contacts, which are displayed within the navigation bar. User interface 780 displays at least one of graphical and tabular analyses of selected account 322. In the example embodiment, user interface 780 displays for selected account 322 a summary of collateral data such as availability, appraisals, agings, and concentrations. User interface 780 may also illustrate for selected account 322 a summary of collateral data broken down into categories including Secured 782, Unsecured 784, and Combined 786.

In the example embodiment, user interface 780 displays an Account Name field 788 showing selected account 322, also known as the Analyzed Business. User interface 780 also displays an ABLE ID pull-down field 790, a currency pull-down field 792, a Date field 794, a Go button 796, and a Save button 798. In the example embodiment, ABLE ID pull-down field 790 displays those subaccounts that are linked to the selected account 322. User interface 780 also displays a History of Entries link 799, which enables a user to identify when a financial record was last saved within RMCS 10.

FIG. 18 is an example embodiment of a user interface 820 displaying collateral security and guarantors information for selected account 322, which is displayed after menu tab Accounts 324 and sub-menu tab Data 344 are selected by a user or after a user selects Collateral Overview & Guarantors from a navigation bar (not shown) located on the left side of user interface 820. The data may be viewed by a user through Data Section 344 and Setup Section 348 of RMCS 10 (shown in FIG. 1). User interface 820 displays at least one of graphical and tabular analyses of selected account 322. In the example embodiment, user interface 820 displays for selected account 322 a summary of collateral security and guarantors. User interface 820 may also display for selected account 322 a summary of security 822, security details, 824, description of collateral 826, description of boot collateral 828, and guarantors 830. In the example embodiment, user interface 820 displays an Account Name field 832 showing selected account 322, which is also known as the Analyzed Business. User interface 820 also displays a Date field 834, a Save button 836, a Cancel button 838, a Delete button 840, an Add button 842, and an Edit button 844. User interface 820 also displays a History of Entries link 846, which enables a user to identify when a financial record was last saved within RMCS 10.

FIG. 19 is an example embodiment of a user interface 850 displaying collateral performance commentary information for selected account 322, which is displayed after menu tab Accounts 324 and sub-menu tab Data 344 are selected by a user or after a user selects Collateral Performance Commentary from a navigation bar (not shown) located on the left side of user interface 850. User interface 850 displays at least one of graphical and tabular analyses of selected account 322. In the example embodiment, user interface 850 displays for selected account 322 a summary of collateral performance commentary.

Figure 20:
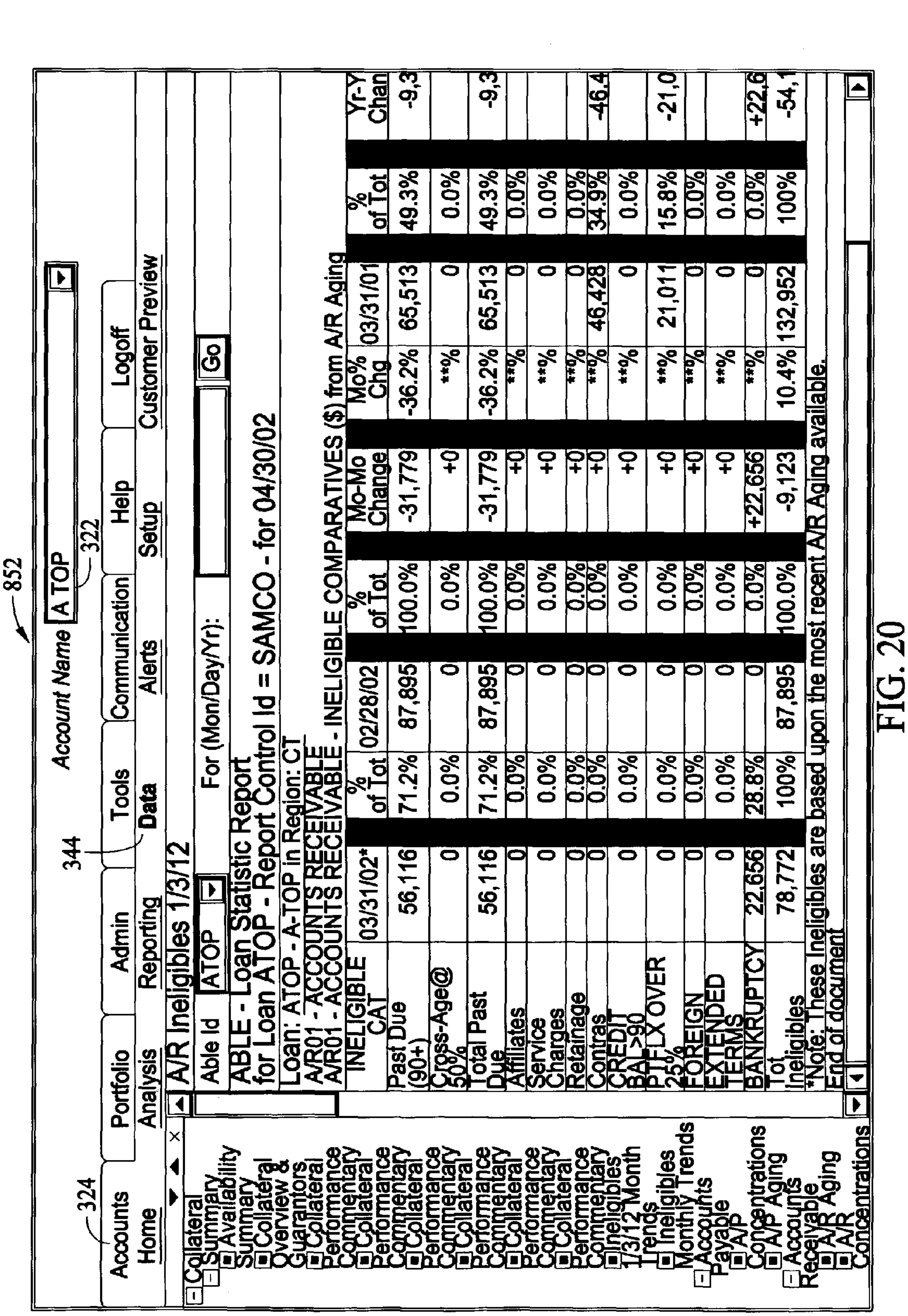
FIG. 20 is an example embodiment of a user interface displaying account receivable ineligibles information for an account in a RMCS.

FIG. 20 is an example embodiment of a user interface 852 displaying accounts receivable (A/R) ineligibles information for selected account 322, which is displayed after menu tab Accounts 324 and sub-menu tab Data 344 are selected by a user or after a user selects A/R Ineligibles from a navigation bar located on the left side of user interface 852. User interface 852 displays at least one of graphical and tabular analyses of selected account 322. In the example embodiment, user interface 852 displays for selected account 322 a summary of A/R ineligibles.

Figure 21:
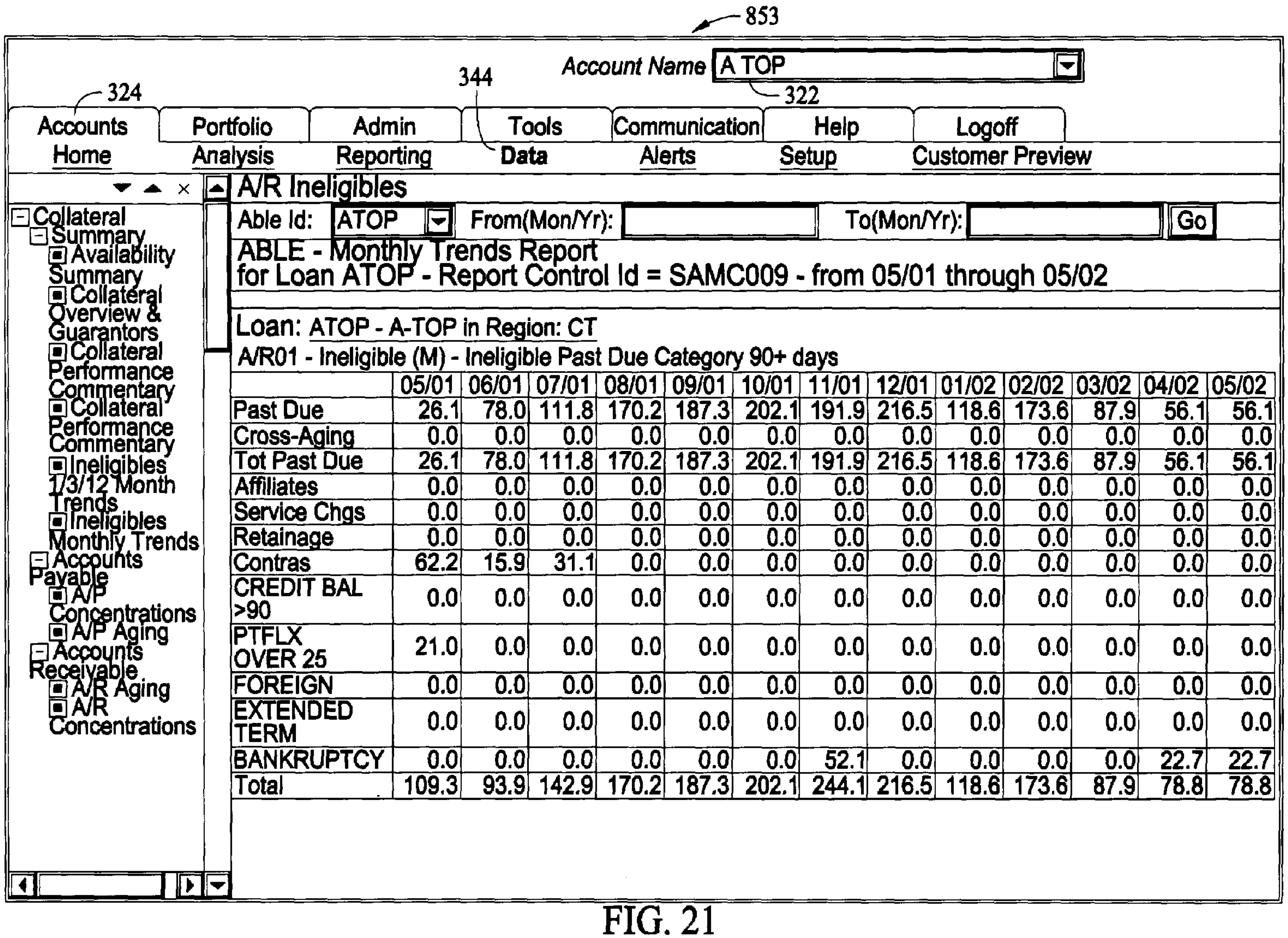
FIG. 21 is an example embodiment of a user interface displaying account receivable ineligibles information for an account in a RMCS.

FIG. 21 is an example embodiment of a user interface 853 displaying A/R ineligibles information for selected account 322, which is displayed after menu tab Accounts 324 and sub-menu tab Data 344 are selected by a user or after a user selects A/R Ineligibles Monthly Trends from a navigation bar located on the left side of user interface 853. User interface 853 displays at least one of graphical and tabular analyses of selected account 322. In the example embodiment, user interface 853 displays for selected account 322 a summary of A/R ineligibles with a monthly trend report.

Figure 22A:
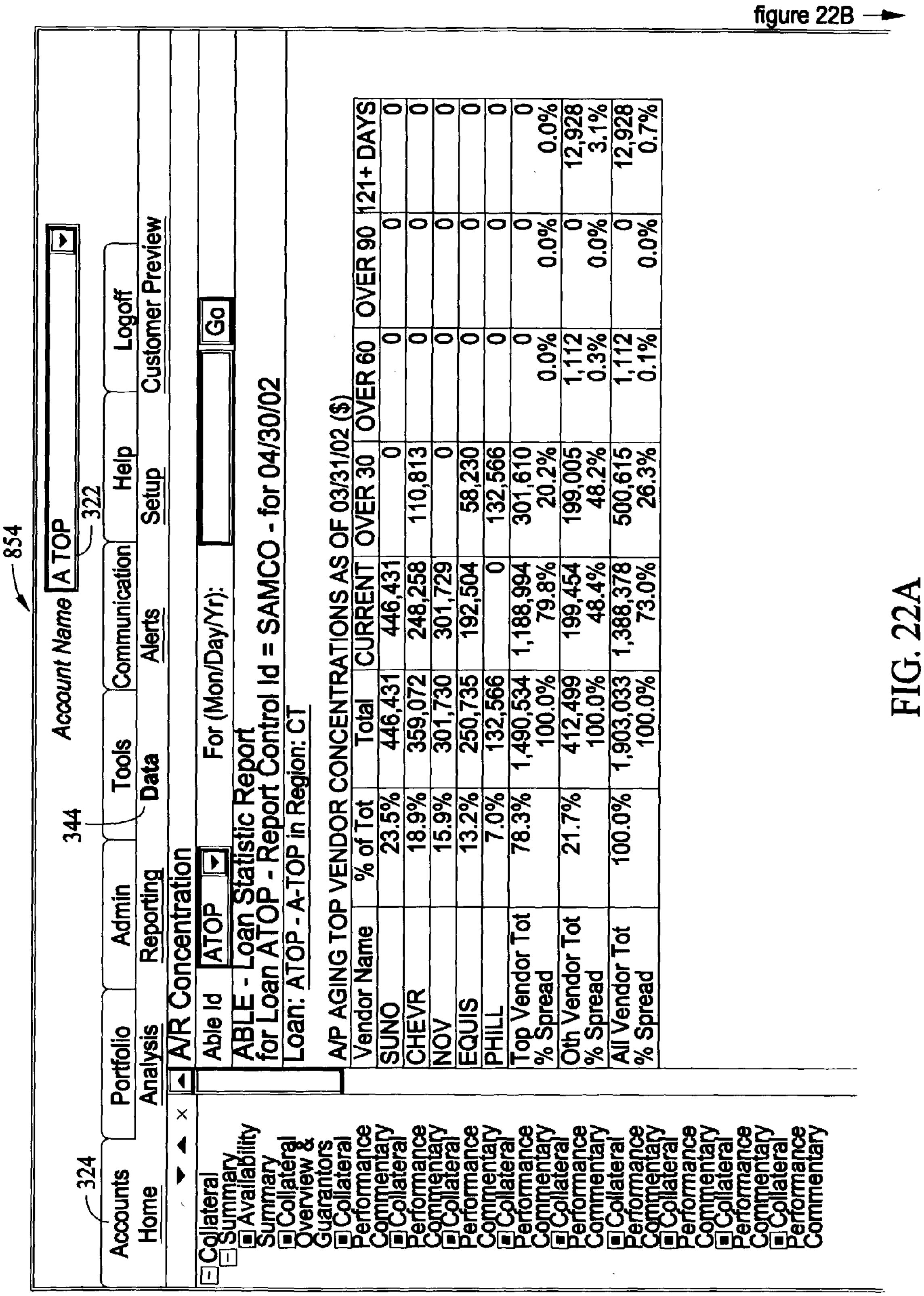

FIGS. 22A and 22B show an example embodiment of a user interface 854 displaying accounts payable (A/P) concentration information for selected account 322, which is displayed after menu tab Accounts 324 and sub-menu tab Data 344 are selected by a user or after a user selects A/P Concentration from a navigation bar located on the left side of user interface 854. User interface 854 displays at least one of graphical and tabular analyses of selected account 322. In the example embodiment, user interface 854 displays for selected account 322 a summary of A/P concentration.

Figure 23:
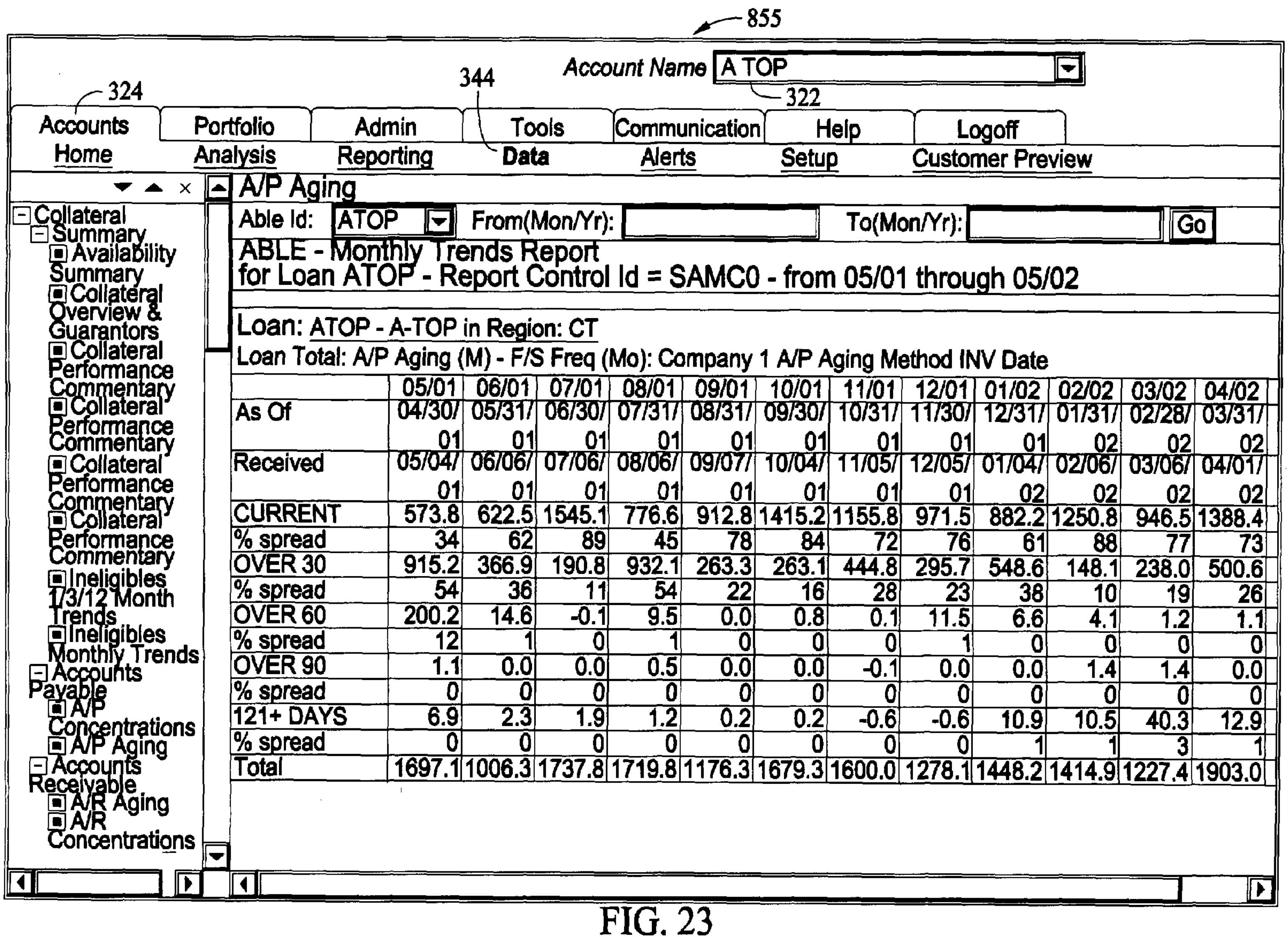
FIG. 23 is an example embodiment of a user interface displaying account payable aging information for an account in a RMCS.

FIG. 23 is an example embodiment of a user interface 855 displaying A/P aging information for selected account 322, which is displayed after menu tab Accounts 324 and sub-menu tab Data 344 are selected by a user or after a user selects A/P Aging from a navigation bar located on the left side of user interface 855. User interface 855 displays at least one of graphical and tabular analyses of selected account 322. In the example embodiment, user interface 855 displays for selected account 322 a summary of A/P aging.

Figure 24A:
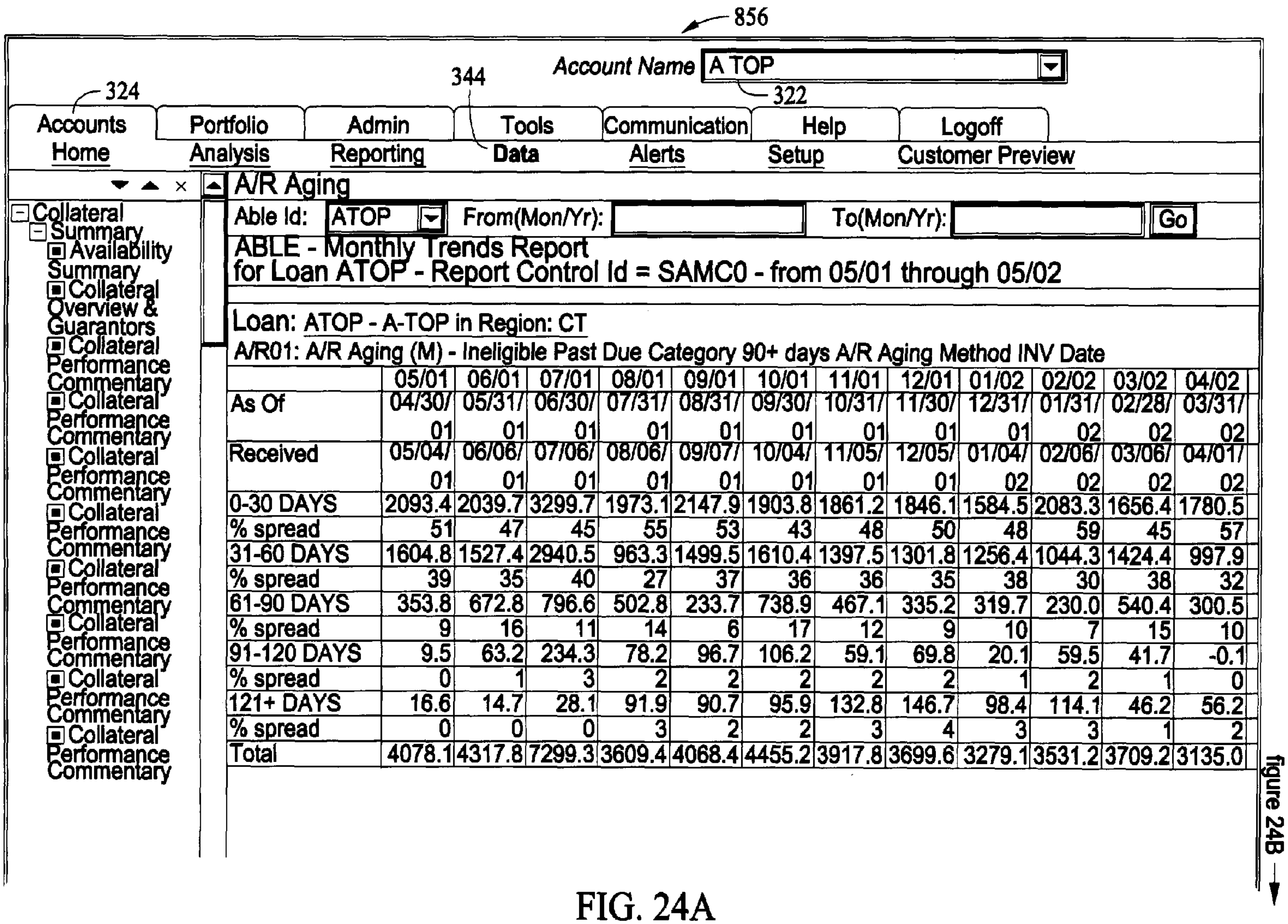

FIGS. 24A and 24B show an example embodiment of a user interface 856 displaying A/R aging information for selected account 322, which is displayed after menu tab Accounts 324 and sub-menu tab Data 344 are selected by a user or after a user selects A/R Aging from a navigation bar located on the left side of user interface 856. User interface 856 displays at least one of graphical and tabular analyses of selected account 322. In the example embodiment, user interface 856 displays for selected account 322 a summary of A/R aging.

FIGS. 25A, 25B and 25C show an example embodiment of a user interface 857 displaying A/R concentration information for selected account 322, which is displayed after menu tab Accounts 324 and sub-menu tab Data 344 are selected by a user or after a user selects A/R Concentration from a navigation bar located on the left side of user interface 857. User interface 857 displays at least one of graphical and tabular analyses of selected account 322. In the example embodiment, user interface 857 displays for selected account 322 a summary of A/R concentration.

FIGS. 26A and 26B show an example embodiment of a user interface 858 displaying A/R sales and receivables statistics for selected account 322, which is displayed after menu tab Accounts 324 and sub-menu tab Data 344 are selected by a user or after a user selects A/R Sales & Receivables Statistics from a navigation bar located on the left side of user interface 858. User interface 858 displays at least one of graphical and tabular analyses of selected account 322. In the example embodiment, user interface 858 displays for selected account 322 a summary of A/R sales and receivable statistics.

Figure 27:
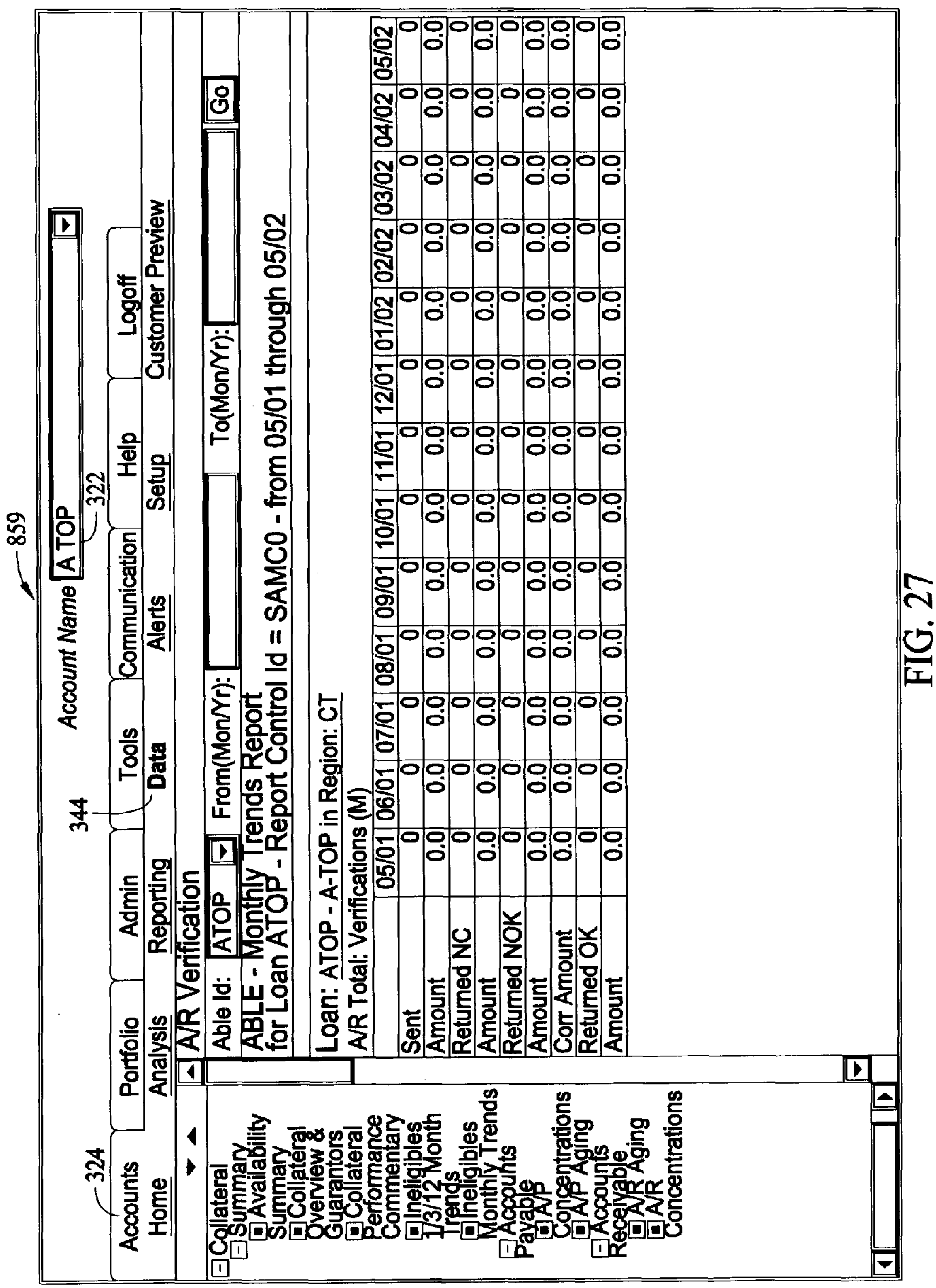
FIG. 27 is an example embodiment of a user interface displaying account receivable verification information for an account in a RMCS.

FIG. 27 is an example embodiment of a user interface 859 displaying A/R verification information for selected account 322, which is displayed after menu tab Accounts 324 and sub-menu tab Data 344 are selected by a user or after a user selects A/R Verification from a navigation bar located on the left side of user interface 859. User interface 859 displays at least one of graphical and tabular analyses of selected account 322. In the example embodiment, user interface 859 displays for selected account 322 a summary of A/R verifications.

Figure 28A:
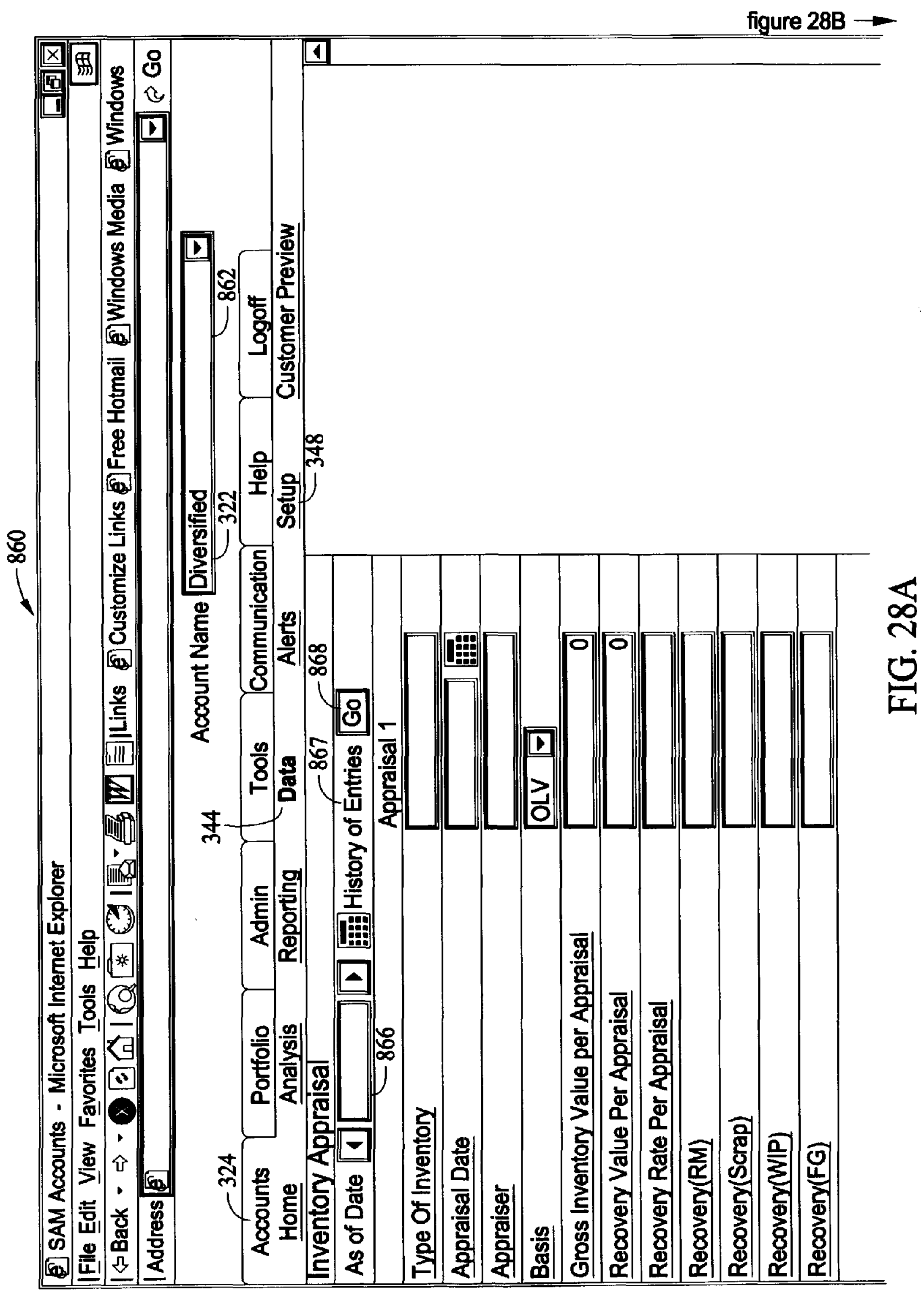
FIGS. 28A and 28B show an example embodiment of a user interface displaying inventory appraisal information for an account in a RMCS.
Figure 28B:
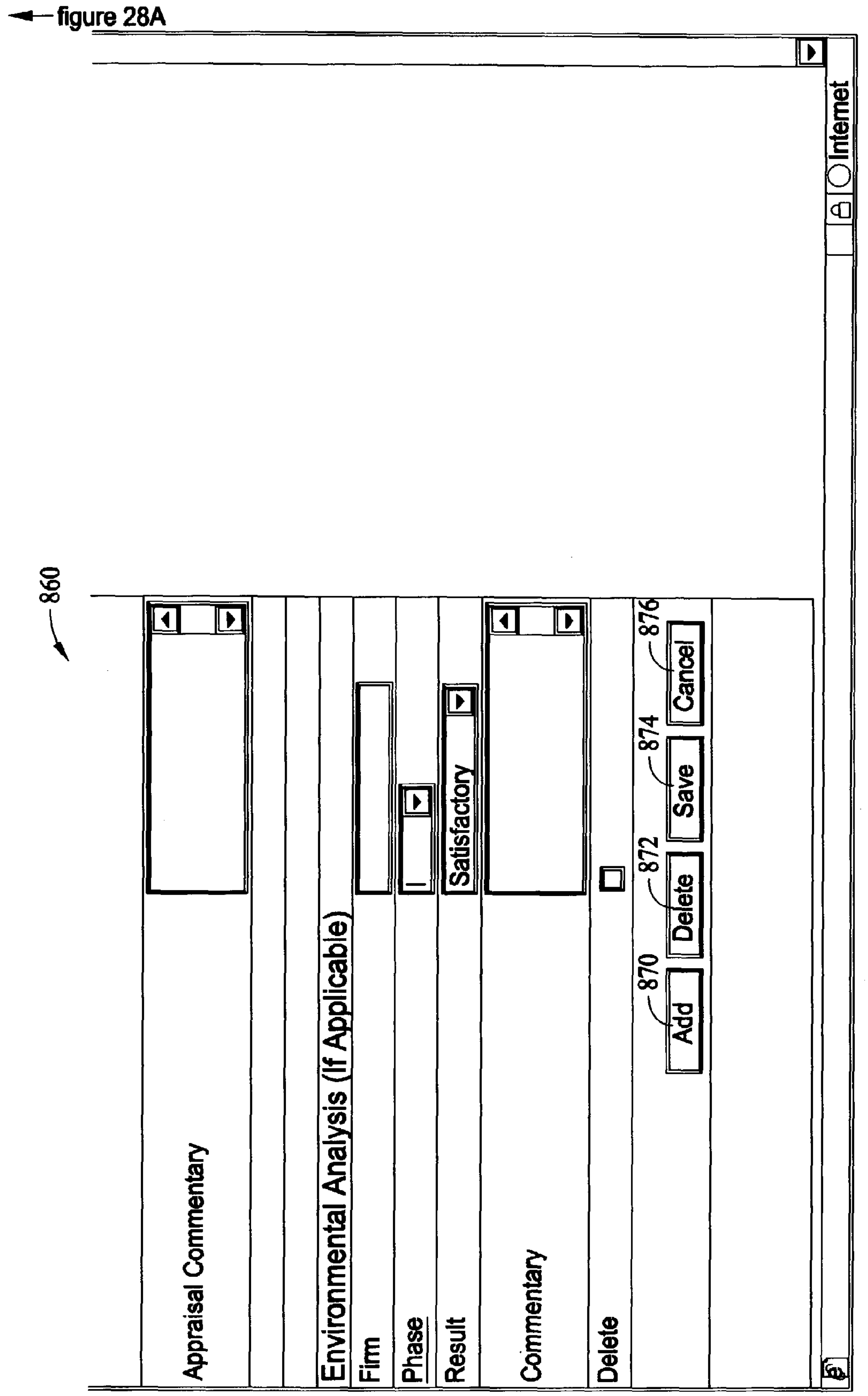

FIGS. 28A and 28B show an example embodiment of a user interface 860 displaying detailed information relating to inventory appraisals for selected account 322, which is displayed after menu tab Accounts 324 and sub-menu tab Data 344 are selected by a user or after a user selects Inventory Appraisal from a navigation bar (not shown) located on the left side of user interface 860. User interface 860 is included in the Collateral category of Data Section 344. Data may be viewed by a user through Data Section 344 and Setup Section 348 of RMCS 10 (shown in FIG. 1). User interface 860 displays at least one of graphical and tabular analyses of selected account 322. In the example embodiment, user interface 860 displays for selected account 322 a summary of inventory appraisals for account 322. In the example embodiment, user interface 860 displays an Account Name field 862 showing selected account 322, which is also known as the Analyzed Business. User interface 860 also includes a Date field 866, a History of Entries link 867, a Go button 868, an Add Item button 870, a Delete button 872, a Save button 874, and a Cancel button 876.

Figure 29:
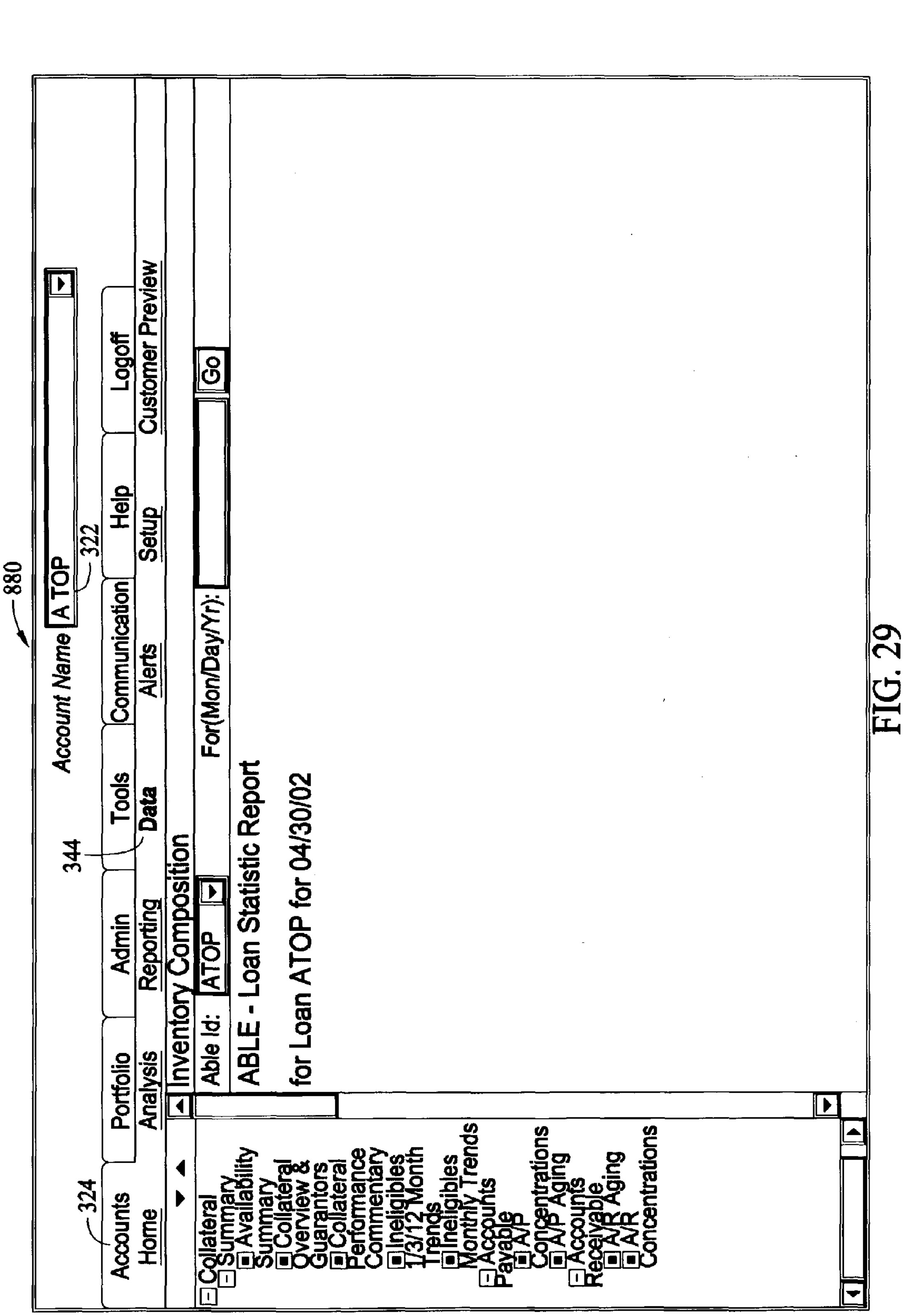
FIG. 29 is an example embodiment of a user interface displaying inventory composition information for an account in a RMCS.

FIG. 29 is an example embodiment of a user interface 880 displaying detailed information relating to inventory composition for selected account 322, which is displayed after menu tab Accounts 324 and sub-menu tab Data 344 are selected by a user or after a user selects Inventory Composition from a navigation bar located on the left side of user interface 880. User interface 880 displays at least one of graphical and tabular analyses of selected account 322. In the example embodiment, user interface 880 displays a summary of inventory composition for account 322.

Figure 30:
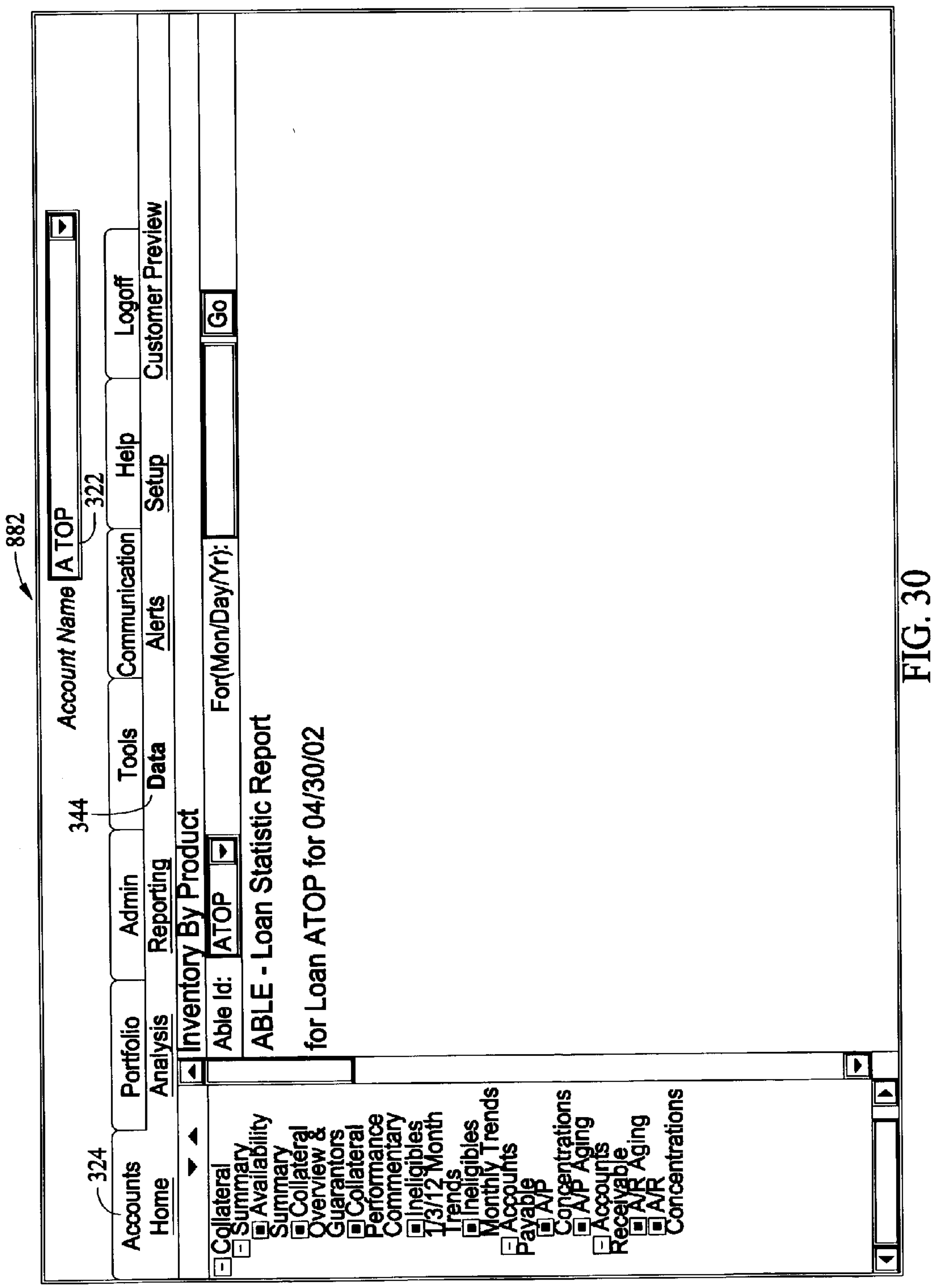
FIG. 30 is an example embodiment of a user interface displaying inventory by product information for an account in a RMCS.

FIG. 30 is an example embodiment of a user interface 882 displaying detailed information relating to inventory by product for selected account 322, which is displayed after menu tab Accounts 324 and sub-menu tab Data 344 are selected by a user or after a user selects Inventory By Product from a navigation bar located on the left side of user interface 882. User interface 882 displays at least one of graphical and tabular analyses of selected account 322. In the example embodiment, user interface 882 displays a summary of inventory by product for account 322.

Figure 31:
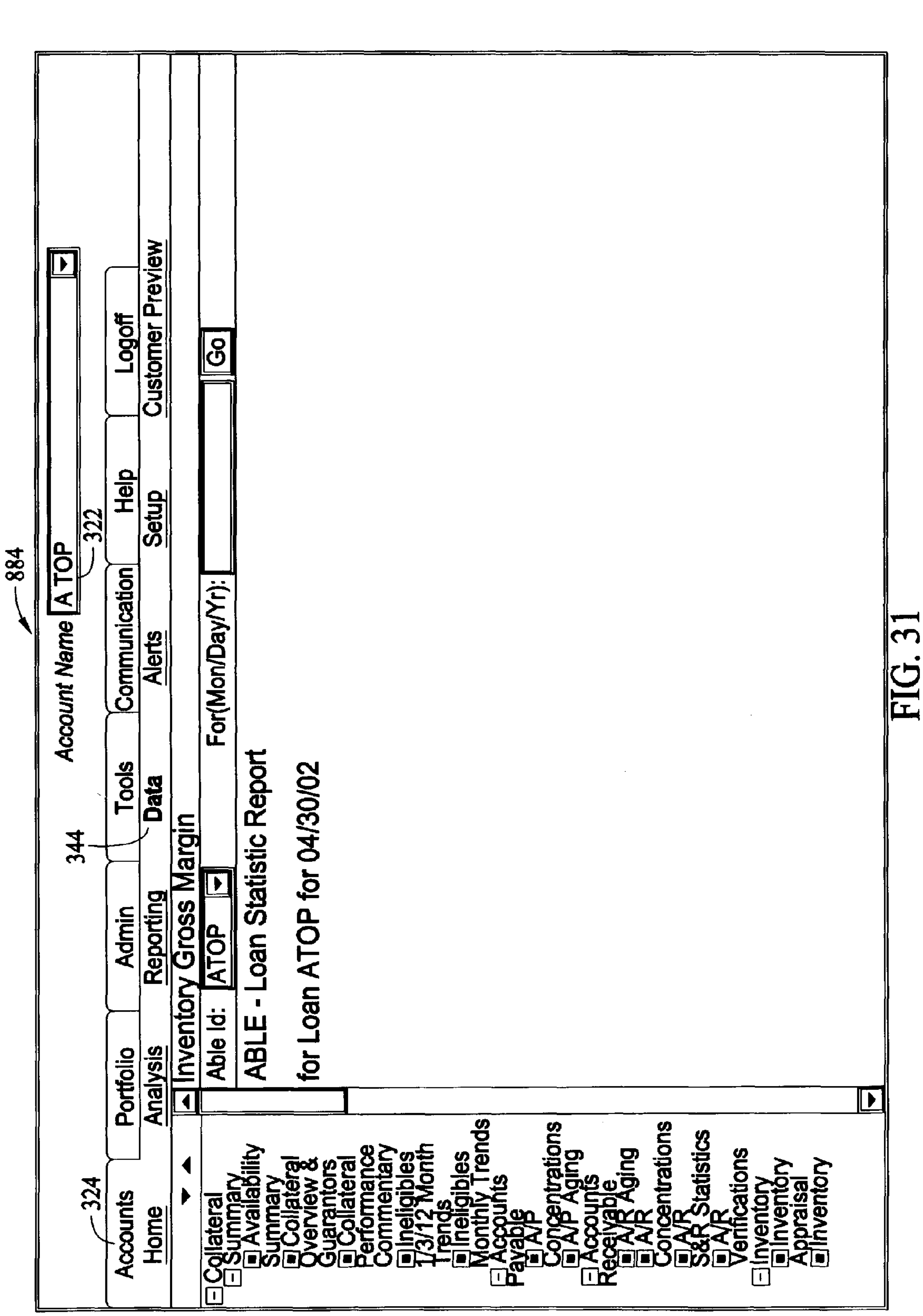
FIG. 31 is an example embodiment of a user interface displaying inventory gross margin information for an account in a RMCS.

FIG. 31 is an example embodiment of a user interface 884 displaying detailed information relating to inventory gross margin for selected account 322, which is displayed after menu tab Accounts 324 and sub-menu tab Data 344 are selected by a user or after a user selects Inventory Gross Margin from a navigation bar located on the left side of user interface 884. User interface 884 displays at least one of graphical and tabular analyses of selected account 322. In the example embodiment, user interface 884 displays a summary of inventory gross margin for account 322.

Figure 32A:
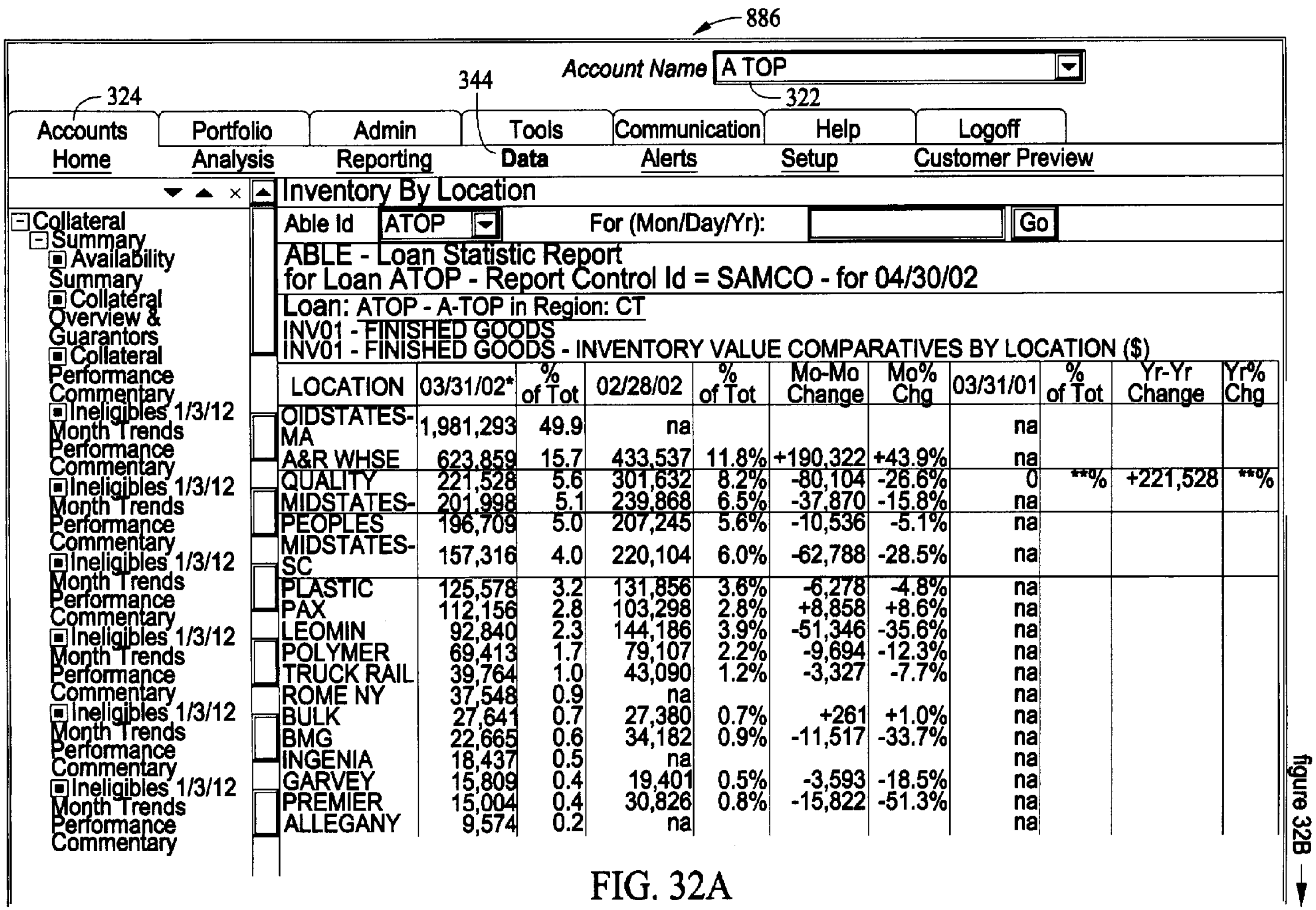
FIGS. 32A and 32B show an example embodiment of a user interface displaying inventory by location information for an account in a RMCS.
Figure 32B:
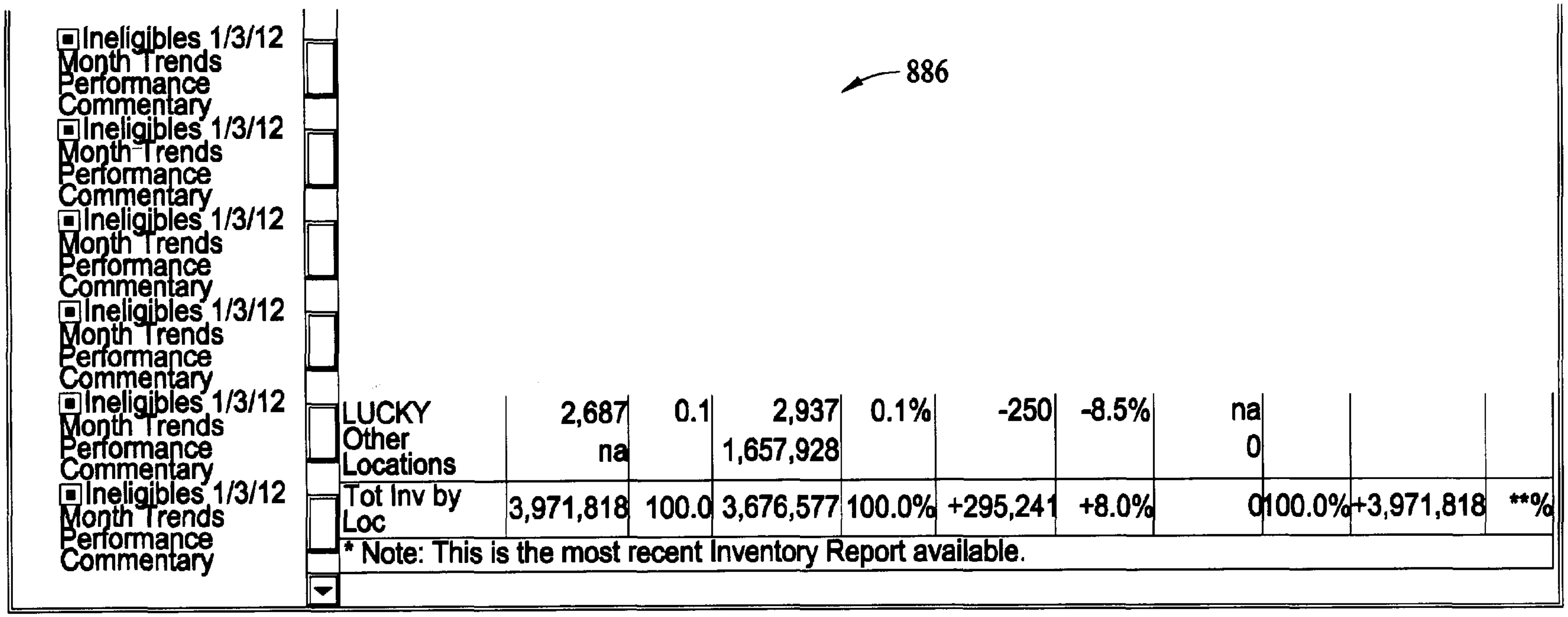

FIGS. 32A and 32B show an example embodiment of a user interface 886 displaying detailed information relating to inventory by location for selected account 322, which is displayed after menu tab Accounts 324 and sub-menu tab Data 344 are selected by a user or after a user selects Inventory By Location from a navigation bar located on the left side of user interface 886. User interface 886 displays at least one of graphical and tabular analyses of selected account 322. In the example embodiment, user interface 886 displays a summary of inventory by location for account 322.

Figure 33A:
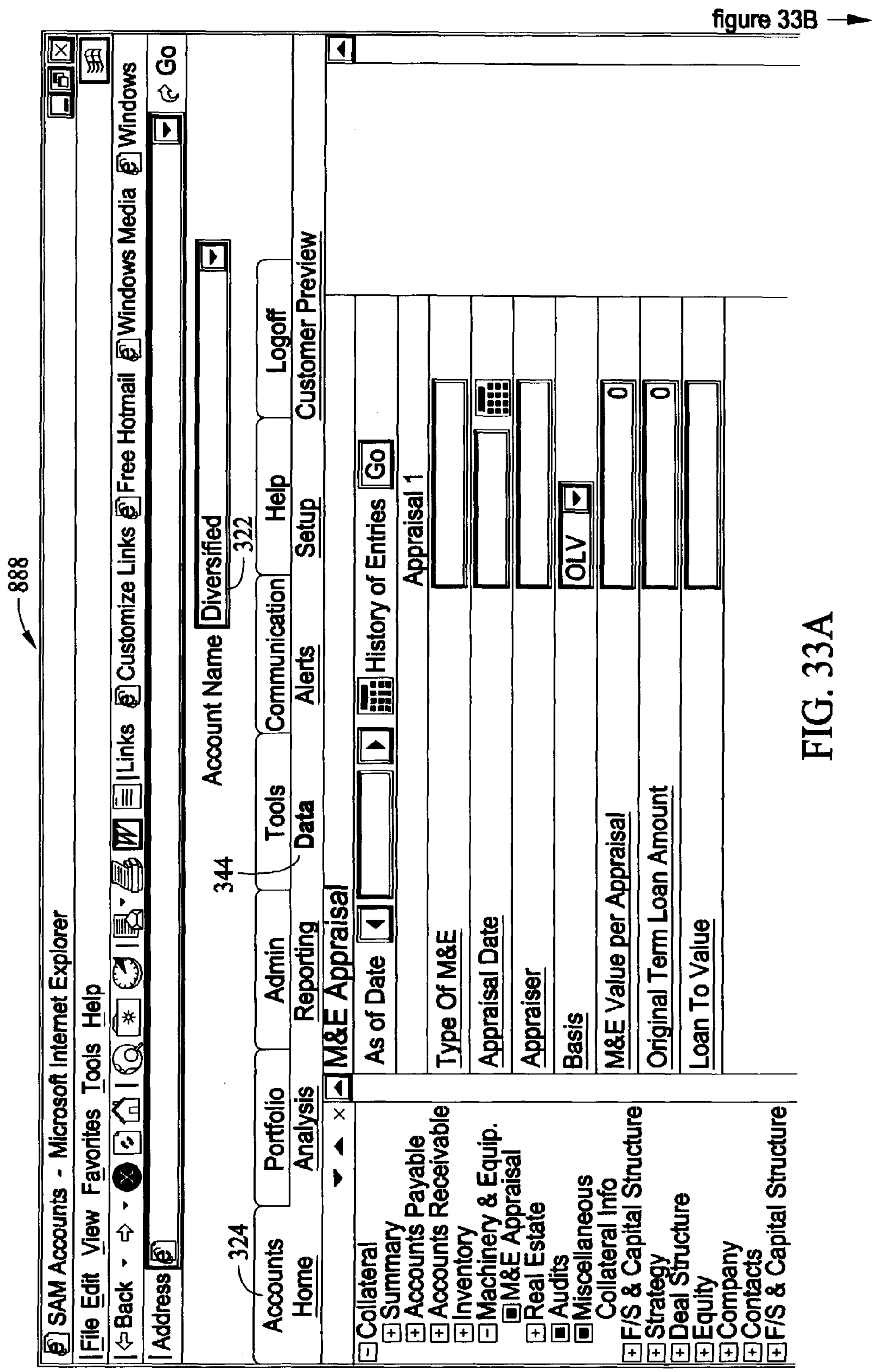
FIGS. 33A and 33B show an example embodiment of a user interface displaying machinery and equipment appraisal information for an account in a RMCS.
Figure 33B:
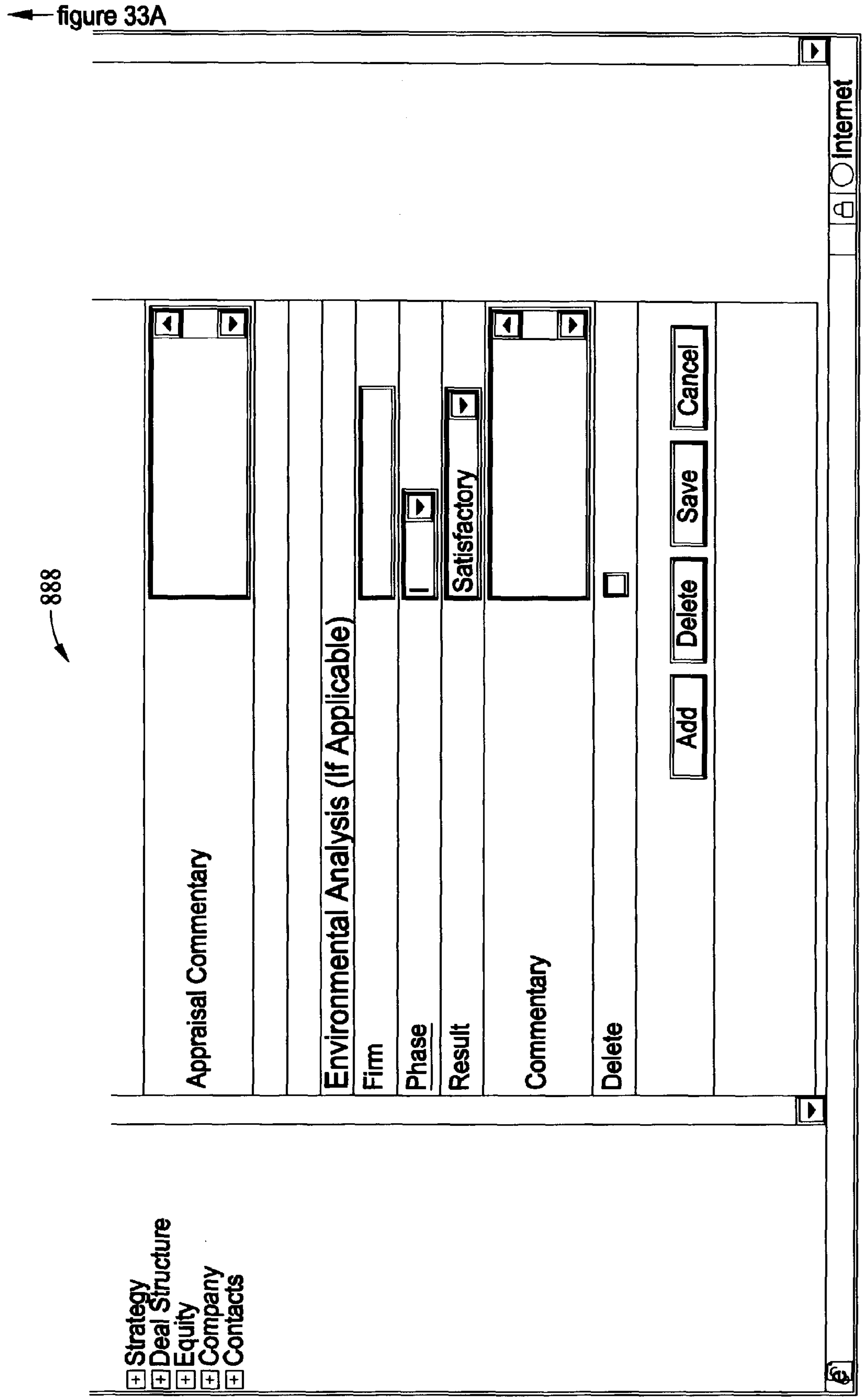

FIGS. 33A and 33B show an example embodiment of a user interface 888 displaying detailed information relating to machinery and equipment (M&E) appraisals for selected account 322, which is displayed after menu tab Accounts 324 and sub-menu tab Data 344 are selected by a user or after a user selects M&E Appraisal from a navigation bar located on the left side of user interface 888. User interface 888 displays at least one of graphical and tabular analyses of selected account 322. In the example embodiment, user interface 888 displays a summary of inventory by location for account 322.

Figure 34A:
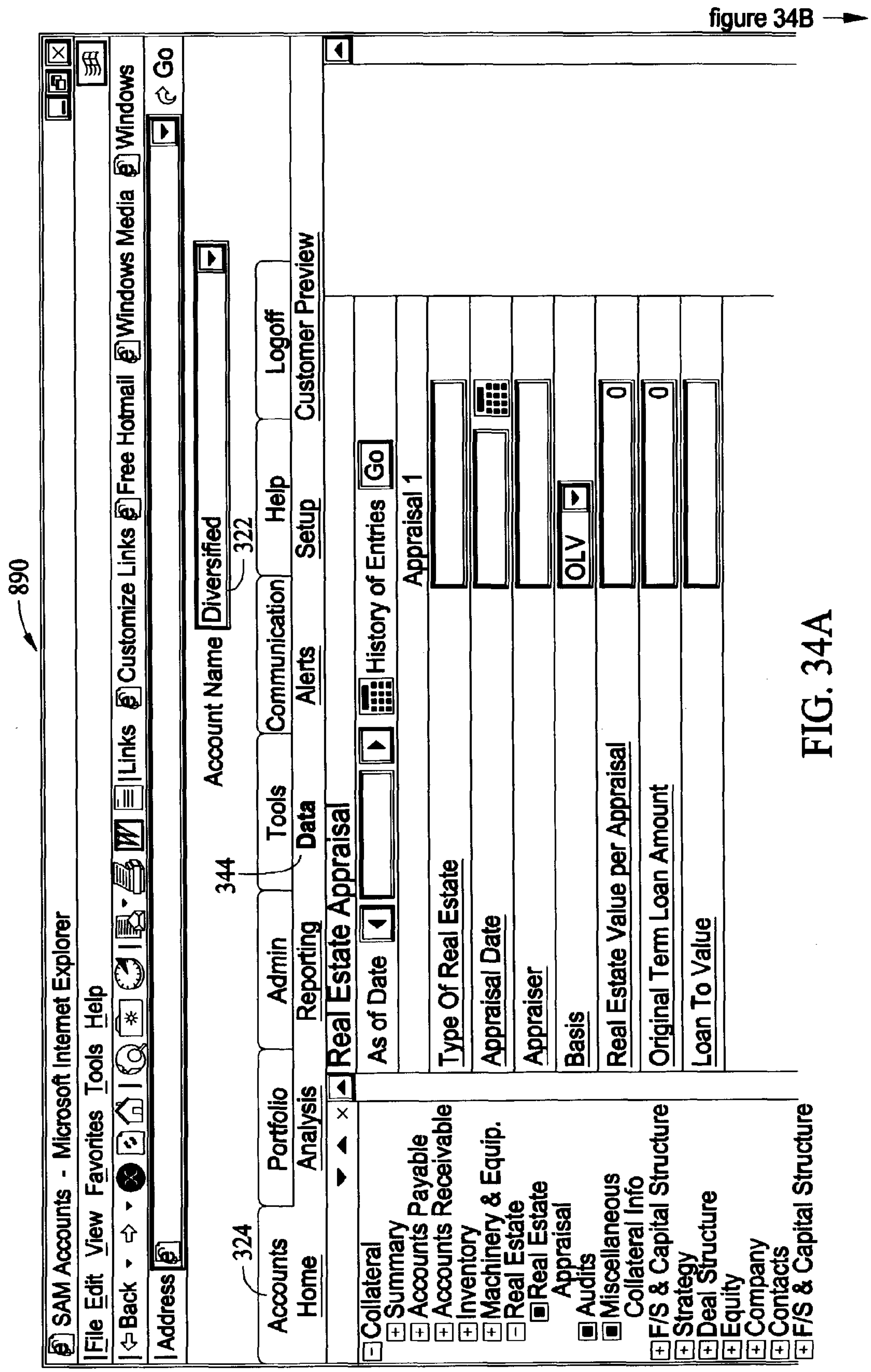
FIGS. 34A and 34B show an example embodiment of a user interface displaying real estate appraisal information for an account in a RMCS.
Figure 34B:
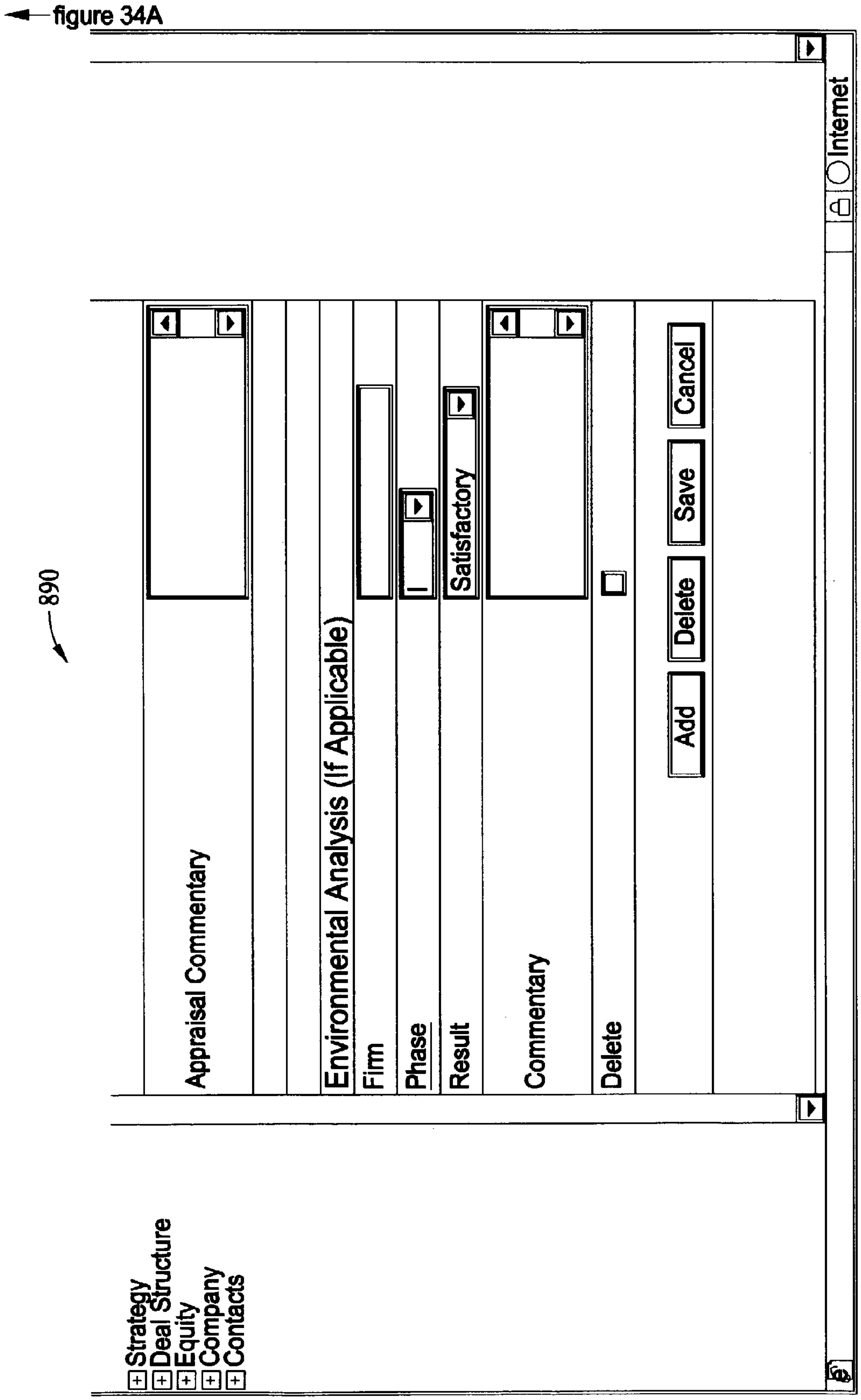

FIGS. 34A and 34B show an example embodiment of a user interface 890 displaying detailed information relating to real estate appraisals for selected account 322, which is displayed after menu tab Accounts 324 and sub-menu tab Data 344 are selected by a user or after a user selects Real Estate Appraisal from a navigation bar located on the left side of user interface 890. User interface 890 displays at least one of graphical and tabular analyses of selected account 322. In the example embodiment, user interface 890 displays a summary of inventory by location for account 322.

Figure 35:
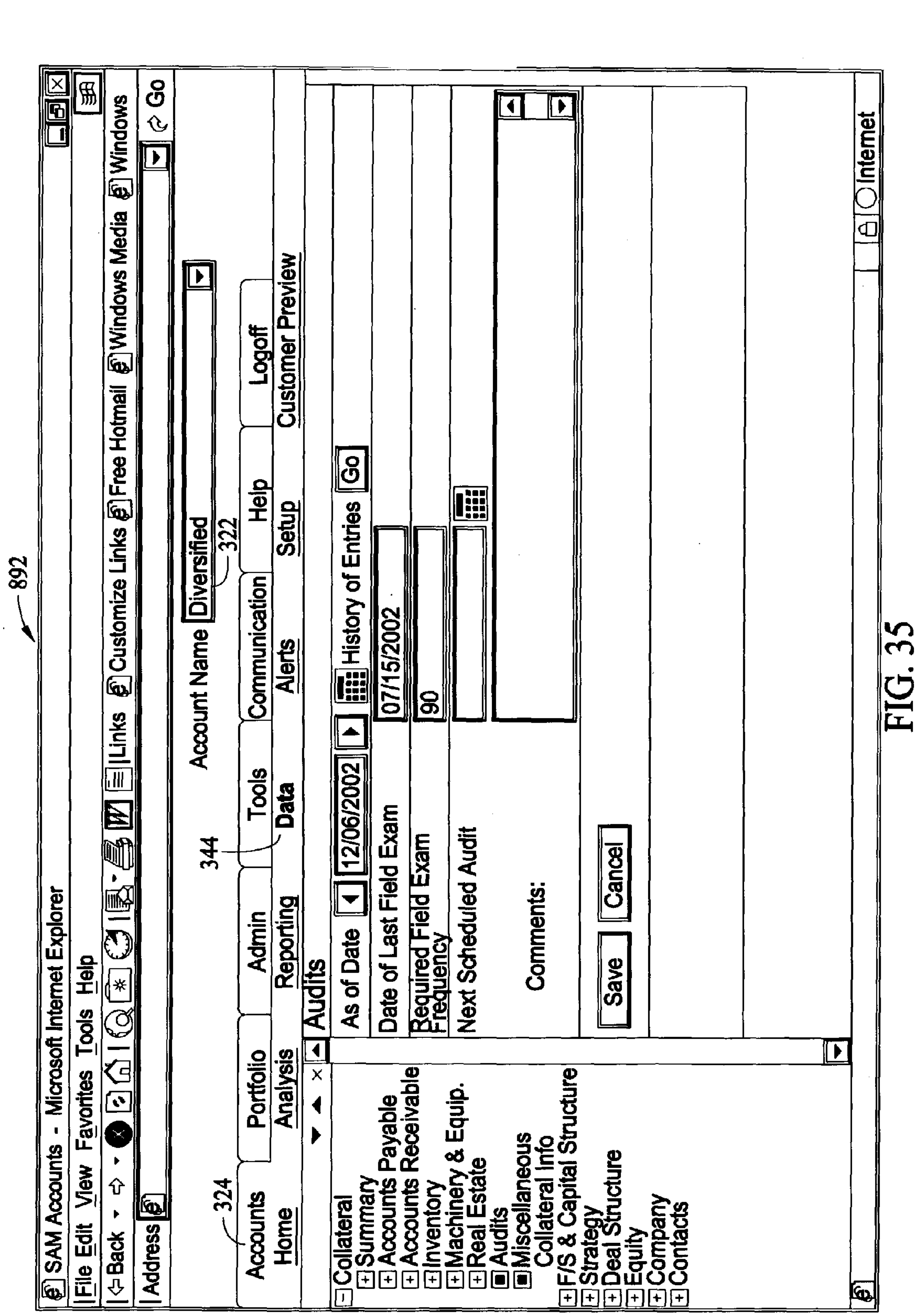
FIG. 35 is an example embodiment of a user interface displaying audits information for an account in a RMCS.

FIG. 35 is an example embodiment of a user interface 892 displaying detailed information relating to audits for selected account 322, which is displayed after menu tab Accounts 324 and sub-menu tab Data 344 are selected by a user or after a user selects Audits from a navigation bar located on the left side of user interface 892. User interface 892 displays at least one of graphical and tabular analyses of selected account 322. In the example embodiment, user interface 892 displays a summary of audits for account 322.

Figure 36:
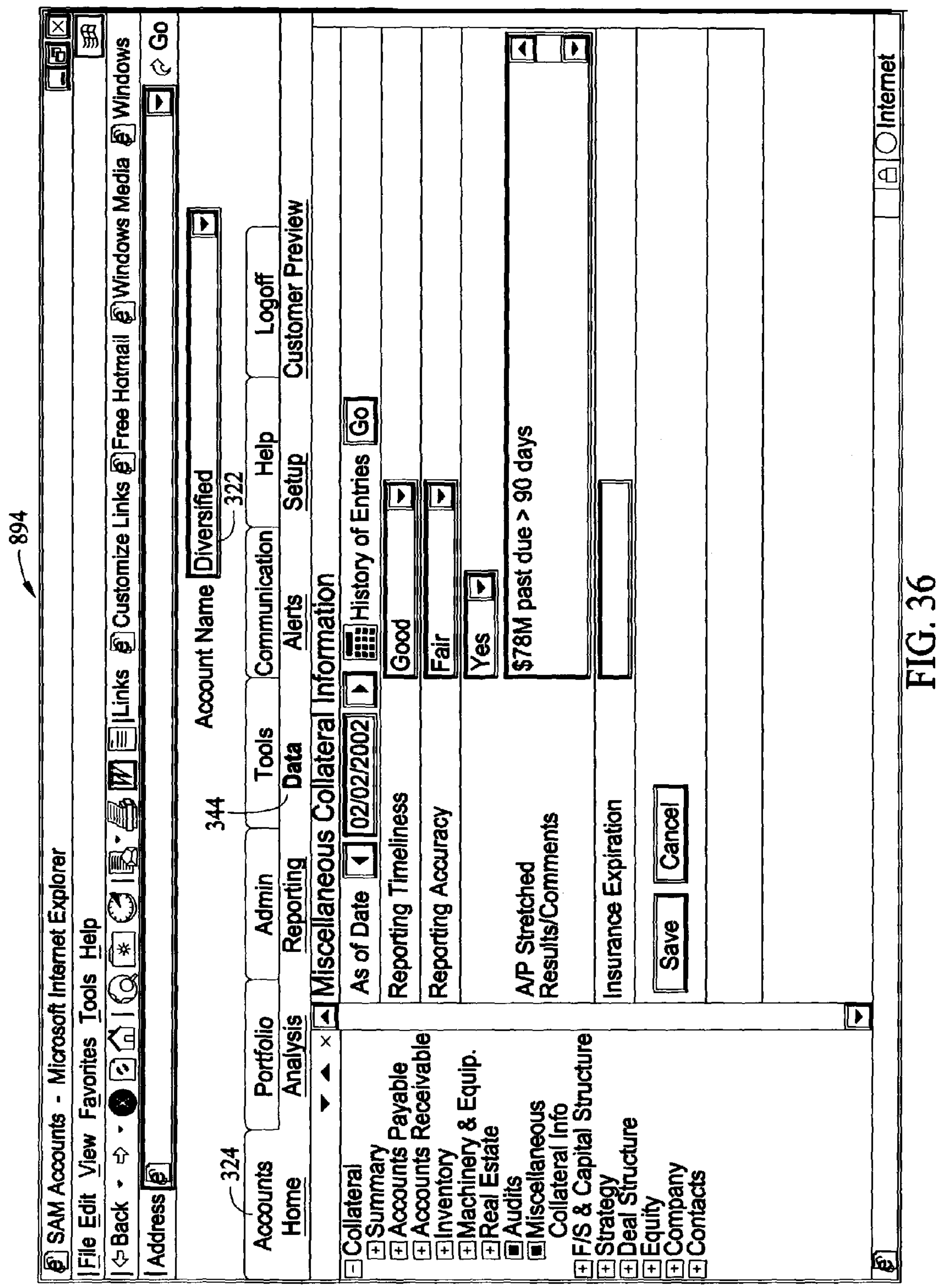
FIG. 36 is an example embodiment of a user interface displaying miscellaneous collateral information for an account in a RMCS.

FIG. 36 is an example embodiment of a user interface 894 displaying detailed information relating to miscellaneous collateral matters for selected account 322, which is displayed after menu tab Accounts 324 and sub-menu tab Data 344 are selected by a user or after a user selects Miscellaneous Collateral Matters from a navigation bar located on the left side of user interface 894. User interface 894 displays at least one of graphical and tabular analyses of selected account 322. In the example embodiment, user interface 894 displays a summary of miscellaneous collateral matters for account 322.

Figure 37A:
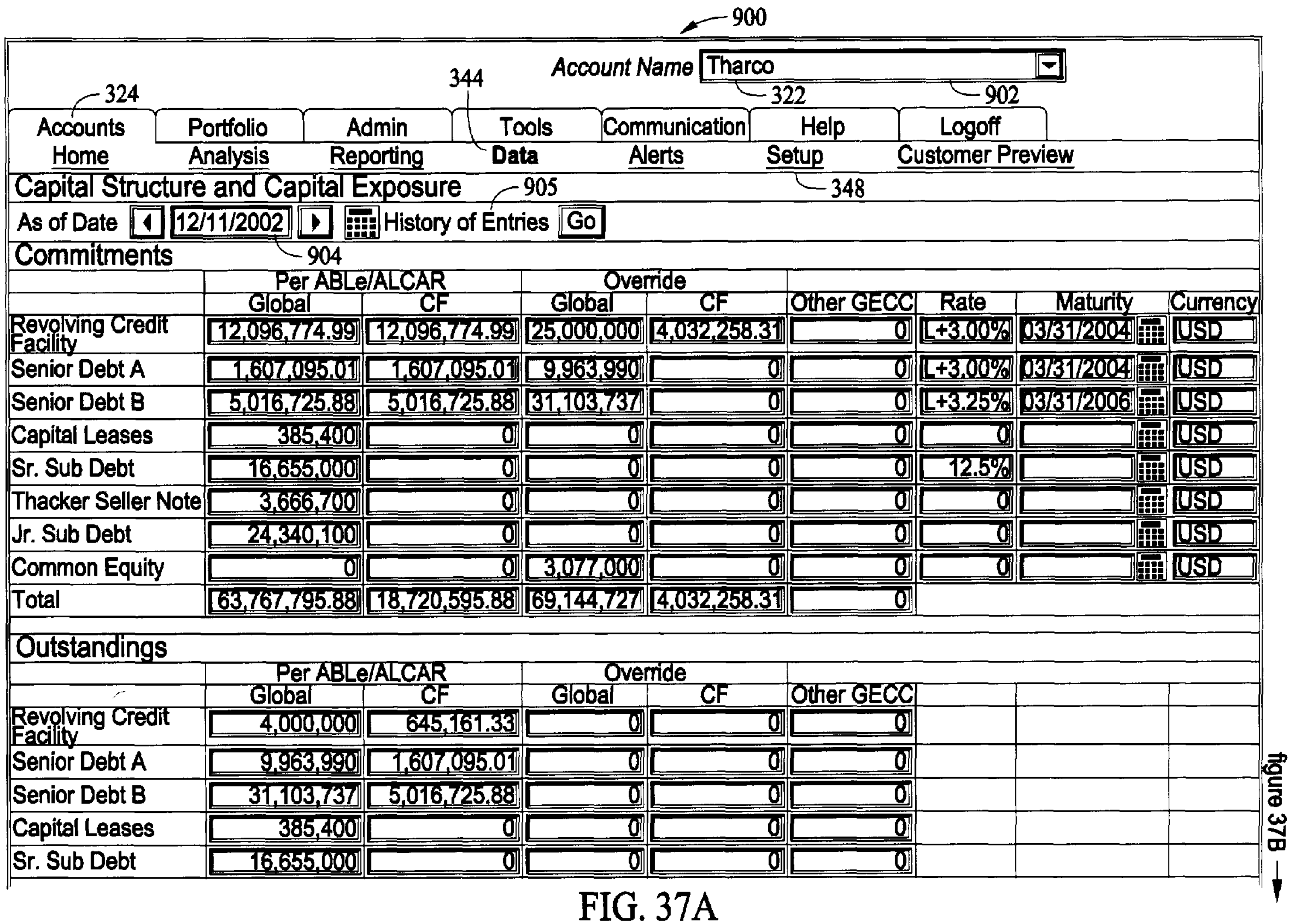
FIGS. 37A and 37B show an example embodiment of a user interface displaying capital structure and CF Business Exposure for an account in a RMCS.
Figure 37B:
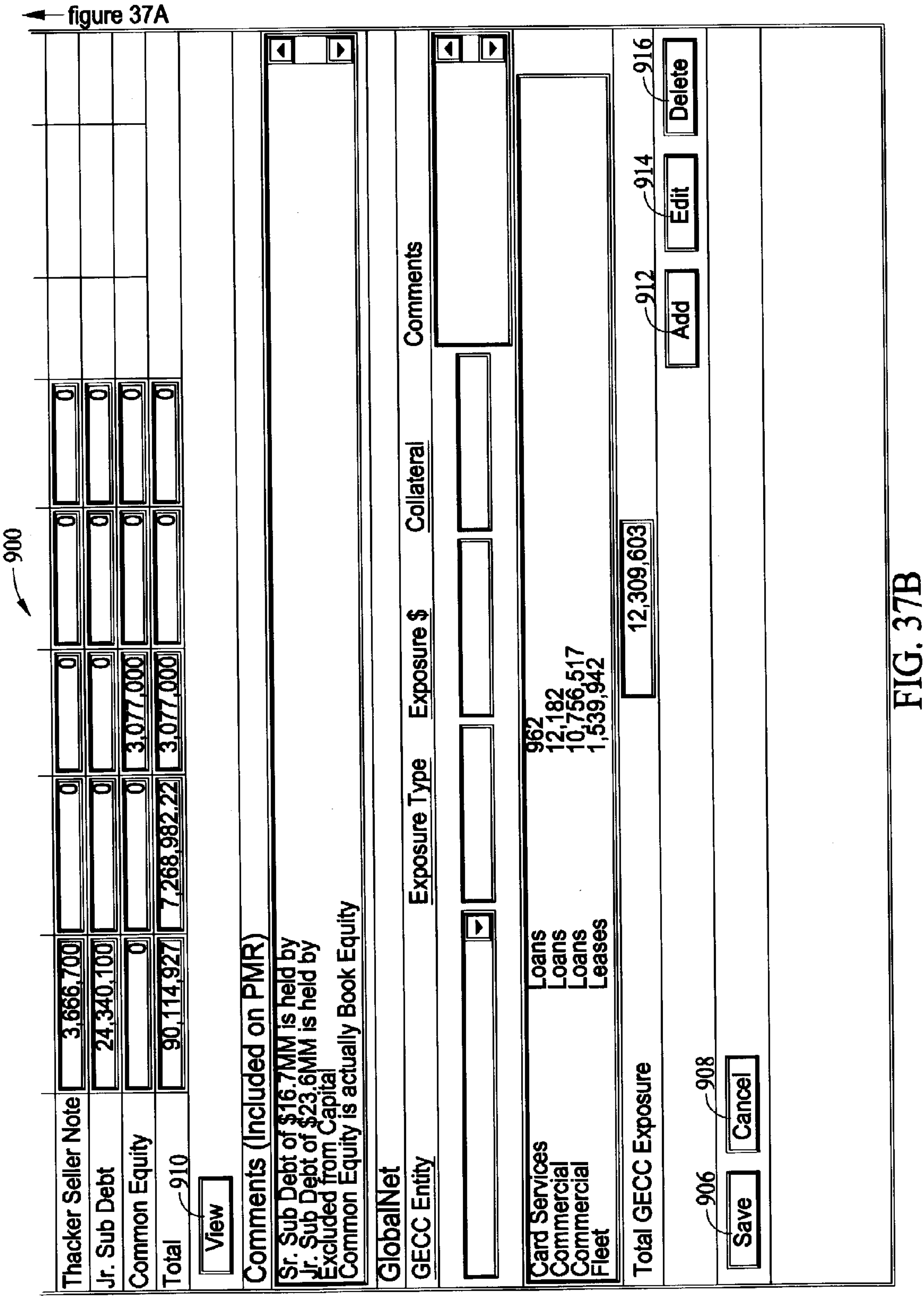

FIGS. 37A and 37B show an example embodiment of a user interface 900 displaying capital structure and CF Business exposure by business and product information for selected account 322, which is displayed after menu tab Accounts 324 and sub-menu tab Data 344 are selected by a user or after a user selects Capital Structure and GECC Exposure from a navigation bar located on the left side of user interface 900 (navigation bar shown in FIG. 36). User interface 900 is included in the Financial Statements and Capital Structure category of Data Section 344. Data may be viewed by a user through Data Section 344 and Setup Section 348 of RMCS 10 (shown in FIG. 1). User interface 900 displays at least one of graphical and tabular analyses of selected account 322. In the example embodiment, user interface 900 illustrates for selected account 322 capital structure, the CF Business capital exposure, and the GlobalNet exposure within the CF Business. In the example embodiment, user interface 900 illustrates an Account Name field 902 showing selected account 322, which is also known as the Analyzed Business. User interface 900 also displays a Date field 904, a History of Entries link 905, a Save button 906, a Cancel button 908, a View button 910, an Add button 912, an Edit button 914, and a Delete button 916.

In the example embodiment, user interface 900 also includes a column having a reference "Per ABLE/ALCAR". As stated above, ABLE is a known and commercially available software program manufactured by Computer and Software Enterprises, Inc., San Luis Obispo, Calif. ABLE stands for Asset Based Lending Environment ("ABLE") and is a collateral and accounting subledger system. Alcar® is a computer software application that enables a user to project or model a financial situation of a business entity based on actual, historical financial information for the business entity. Alcar® also enables a user to compare the "actual" financial information for a company to "expected" financial information and/or "historical" financial information. (Alcar is a registered trademark of The Alcar Group Inc., Skokie, Ill. 60077.)

Figure 38A:
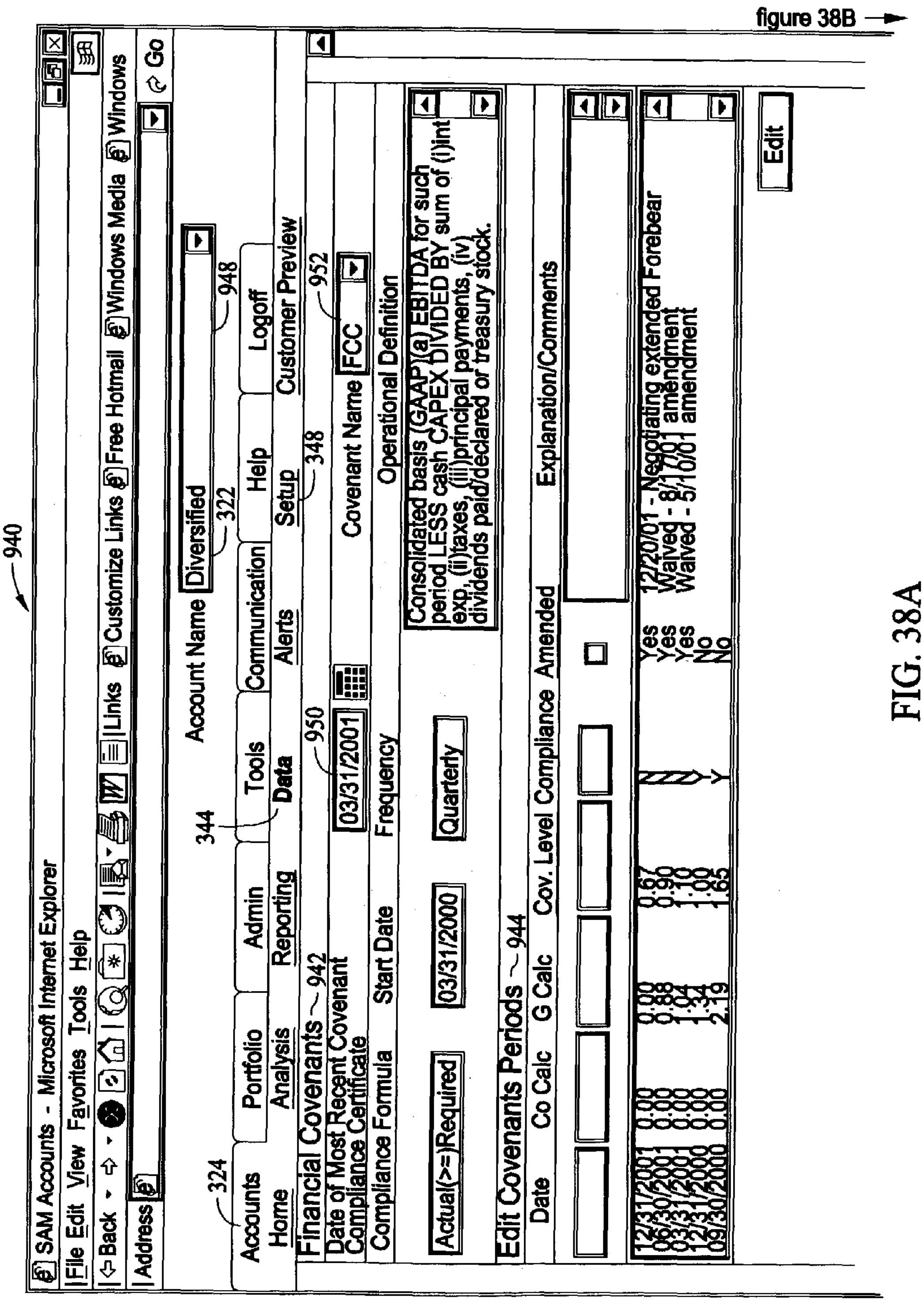
FIGS. 38A and 38B show an example embodiment of a user interface displaying financial covenants information for an account in a RMCS.
Figures 38A, 38B:
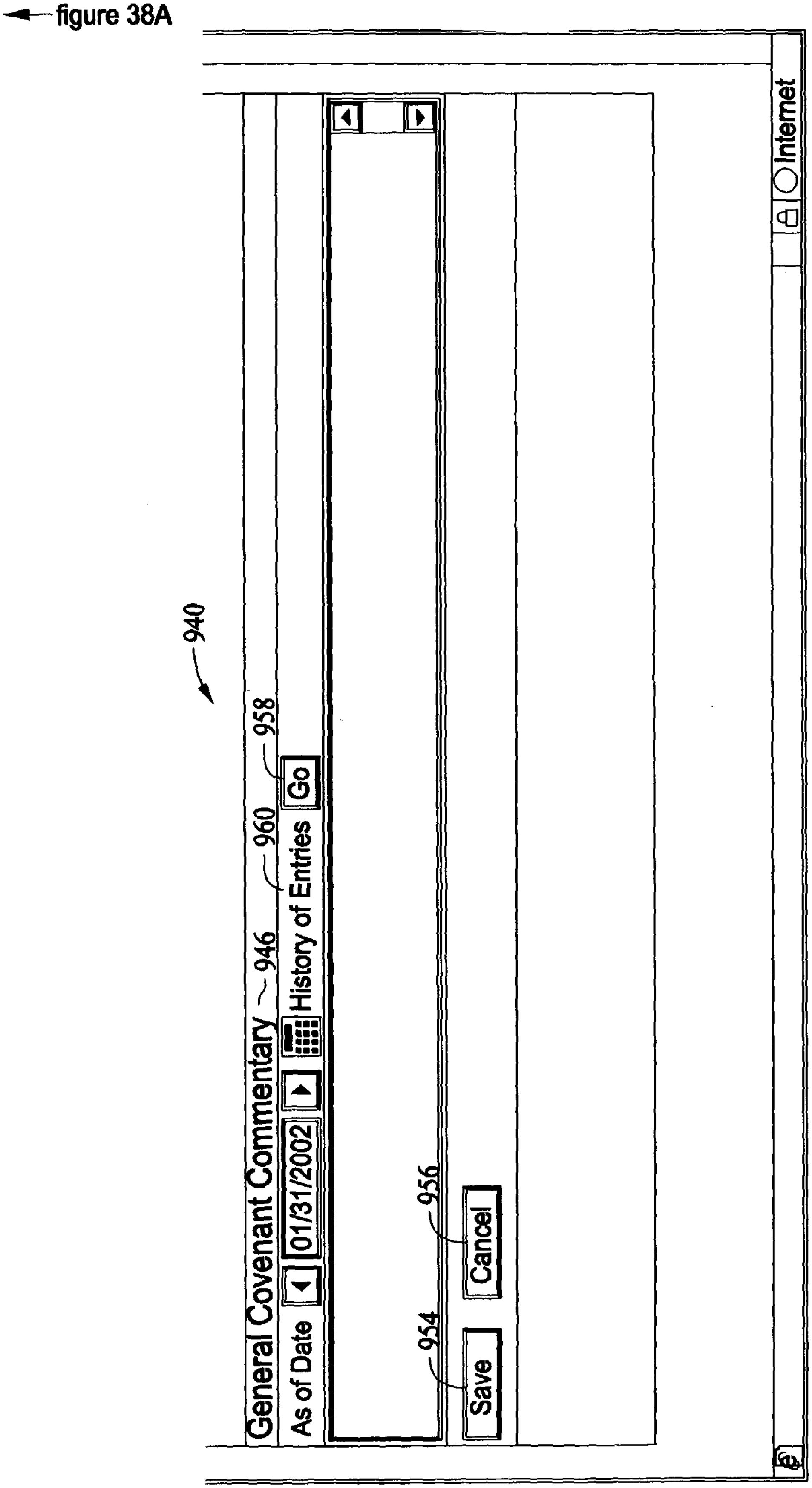
Figure 39A:
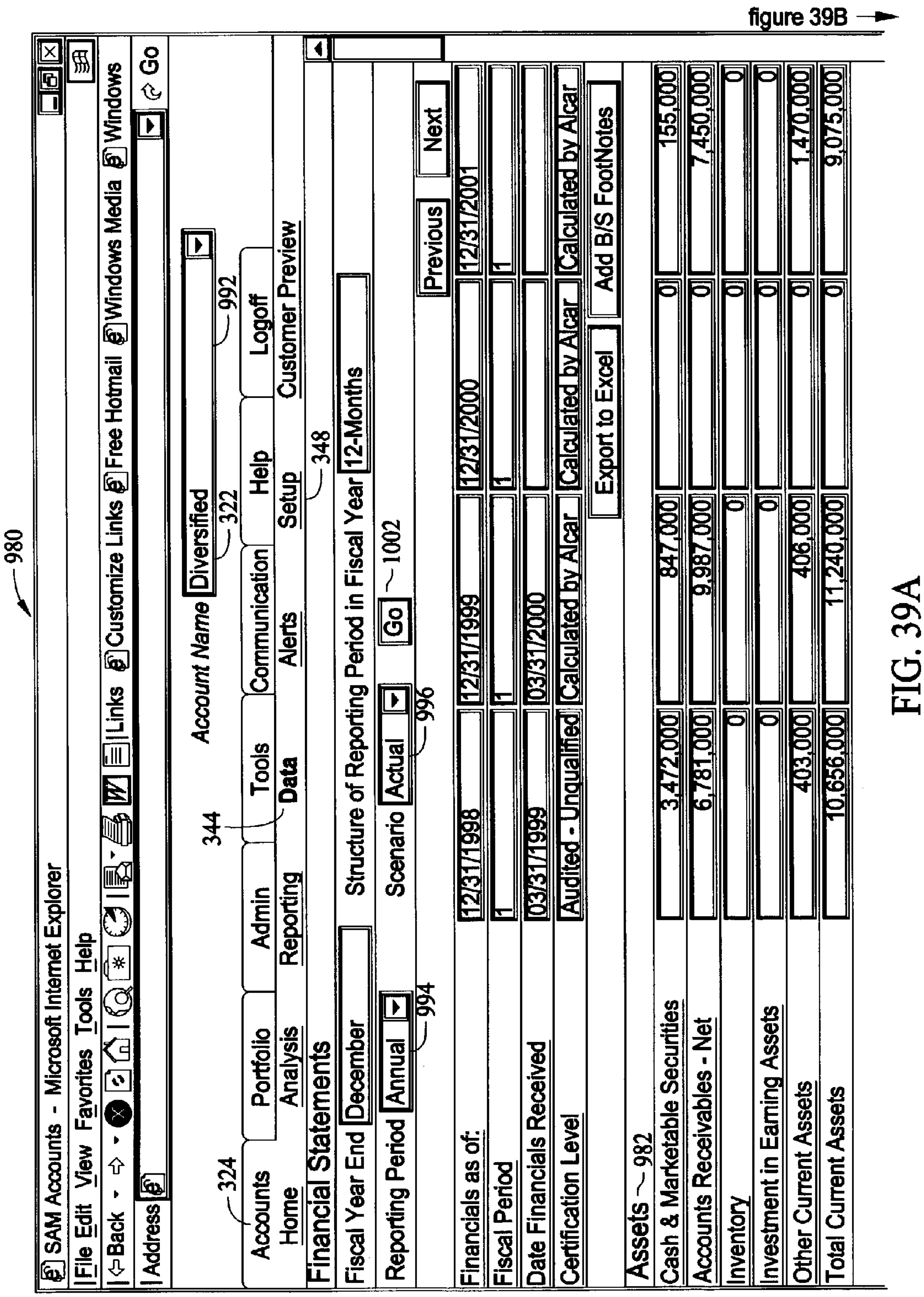
Figure 39C:
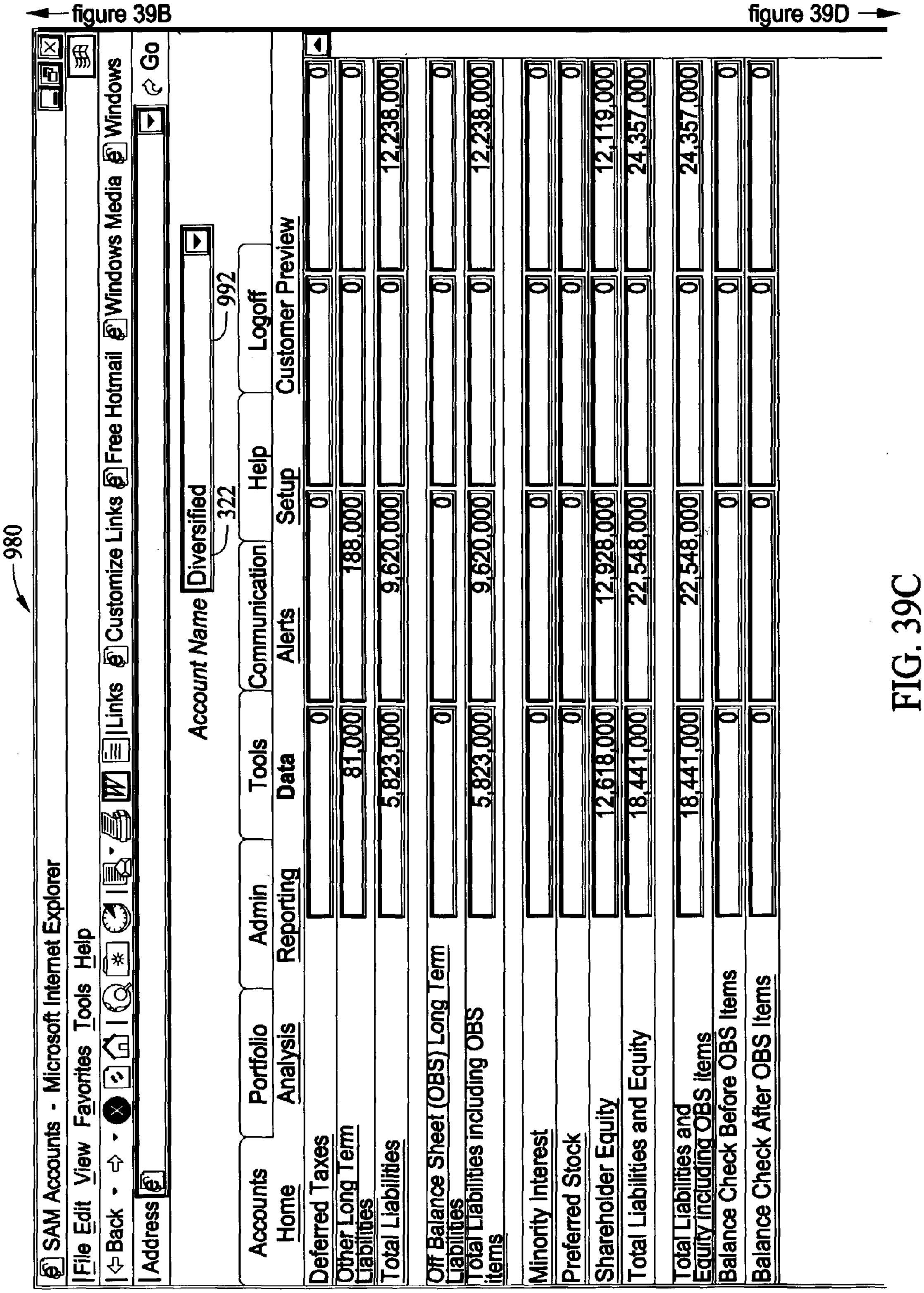
Figure 39E:
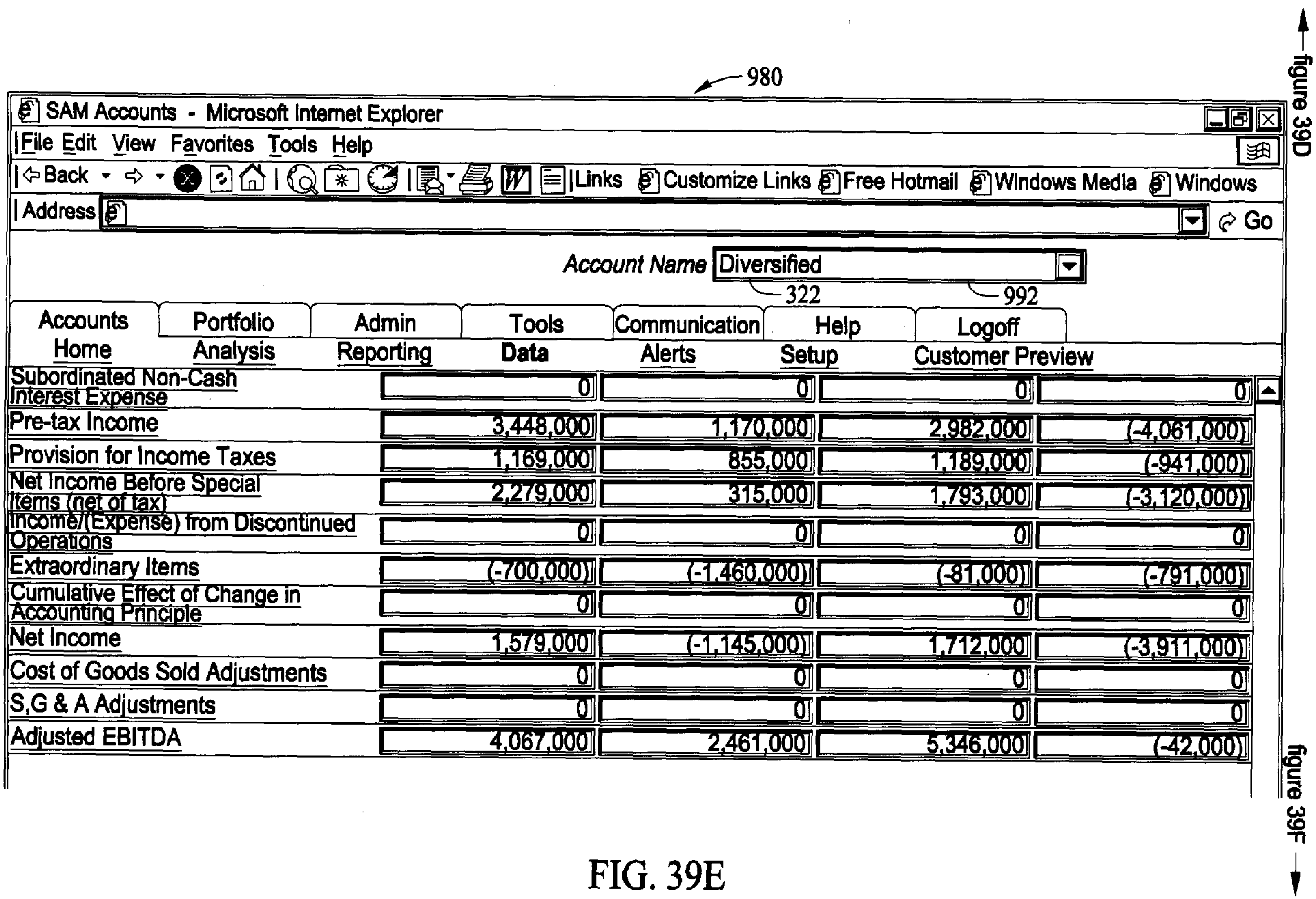

FIGS. 38A and 38B show an example embodiment of a user interface 940 displaying a financial covenant compliance history for selected account 322, which is displayed after menu tab Accounts 324 and sub-menu tab Data 344 are selected by a user. User interface 940 is included in the Financial Statements and Capital Structure category of Data Section 344. Data may be viewed by a user through Data Section 344 and Setup Section 348 of RMCS 10 (shown in FIG. 1). User interface 940 displays at least one of graphical and tabular analyses of selected account 322. In the example embodiment, user interface 940 displays for selected account 322 a Financial Covenants section 942, an Edit Covenant Periods section 944, and a General Covenant Commentary section 946. In the example embodiment, user interface 940 displays an Account Name field 948 showing selected account 322, which is also known as the Analyzed Business. User interface 940 also displays a Date of Most Recent Covenant Compliance Certificate field 950, a Covenant Name pull-down field 952, a Save button 954, a Cancel button 956, a Go button 958, and a History of Entries link 960.

FIGS. 39A through 39F display an example embodiment of a user interface 980 displaying a balance sheet, income statement and cash flow information for selected account 322, which is displayed after menu tab Accounts 324 and sub-menu tab Data 344 are selected by a user or after a user selects Financial Statements from a navigation bar (not shown) located on the left side of user interface 980. User interface 980 is included in the Financial Statements and Capital Structure category of Data Section 344. Data may be viewed by a user through Data Section 344 and Setup Section 348 of RMCS 10 (shown in FIG. 1). User interface 980 displays at least one of graphical and tabular analyses of selected account 322, and provides data fields for financial information for account 322 to be inputted into RMCS 10. In the example embodiment, user interface 980 displays for selected account 322 an Assets section 982, a Liabilities and Shareholder Equity section 984, an Income Statement section 986, a Cash Flow section 988, and an Other section 990. In the example embodiment, user interface 980 displays an Account Name pull-down field 992 showing selected account 322, which is also known as the Analyzed Business. User interface 980 also displays a Reporting Period pull-down field 994, a Scenario pull-down field 996, a Save button 998, a Cancel button 1000, a Go button 1002, and an Add button 1004.

In the example embodiment, the financial information, including balance sheet, income statement and cash flow information, displayed on user interface 980 is enter into RMCS 10 through Alcar®. More specifically, financial information is entered into Alcar®, and is then download from Alcar® to RMCS 10. As stated above, Alcar® is a computer software application that enables a user to project or model a financial situation of a business entity based on actual, historical financial information for the business entity. Alcar® also enables a user to compare the "actual" financial information for a company to "expected" financial information and/or "historical" financial information.

Figure 40A:
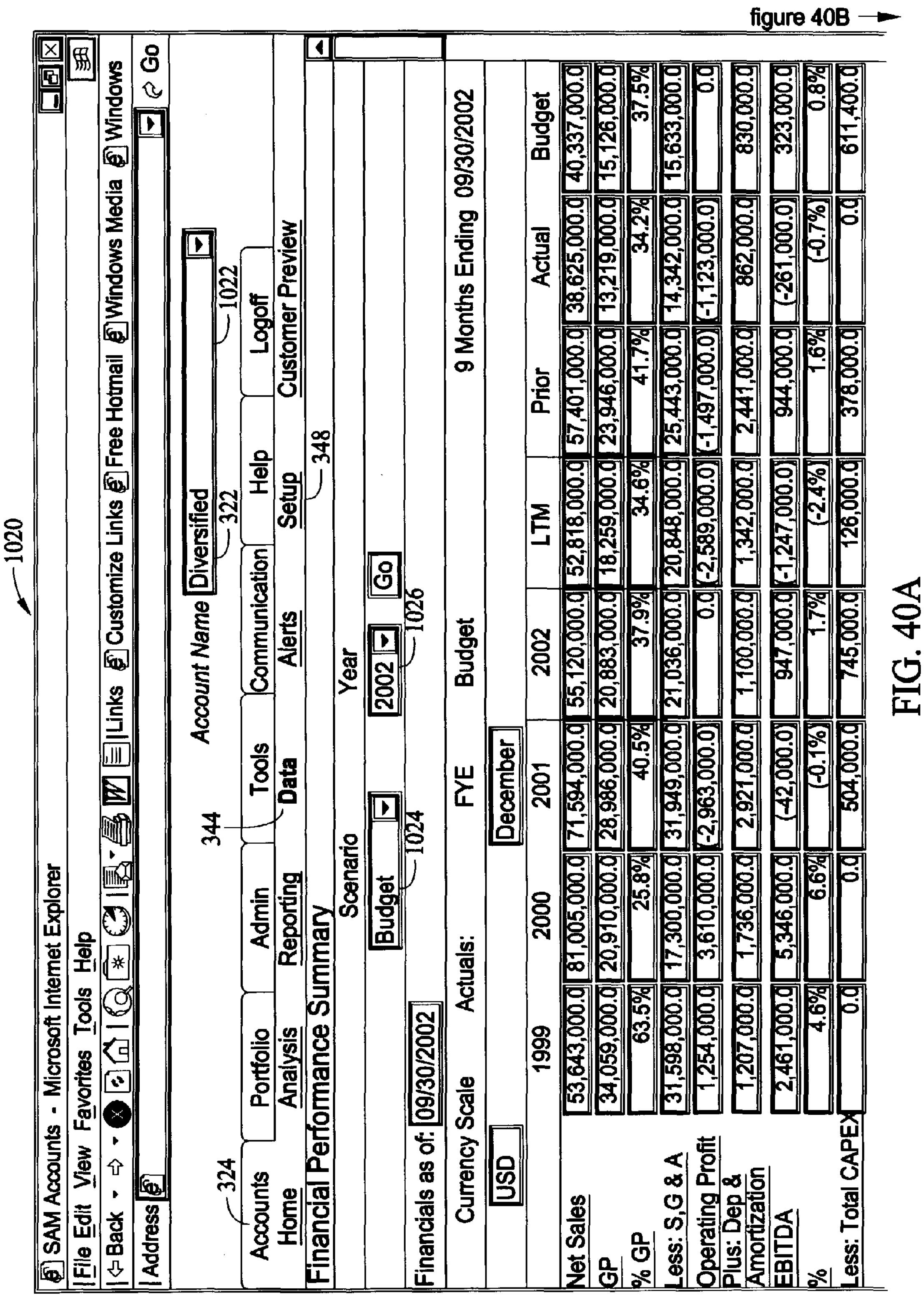
Figure 40C:
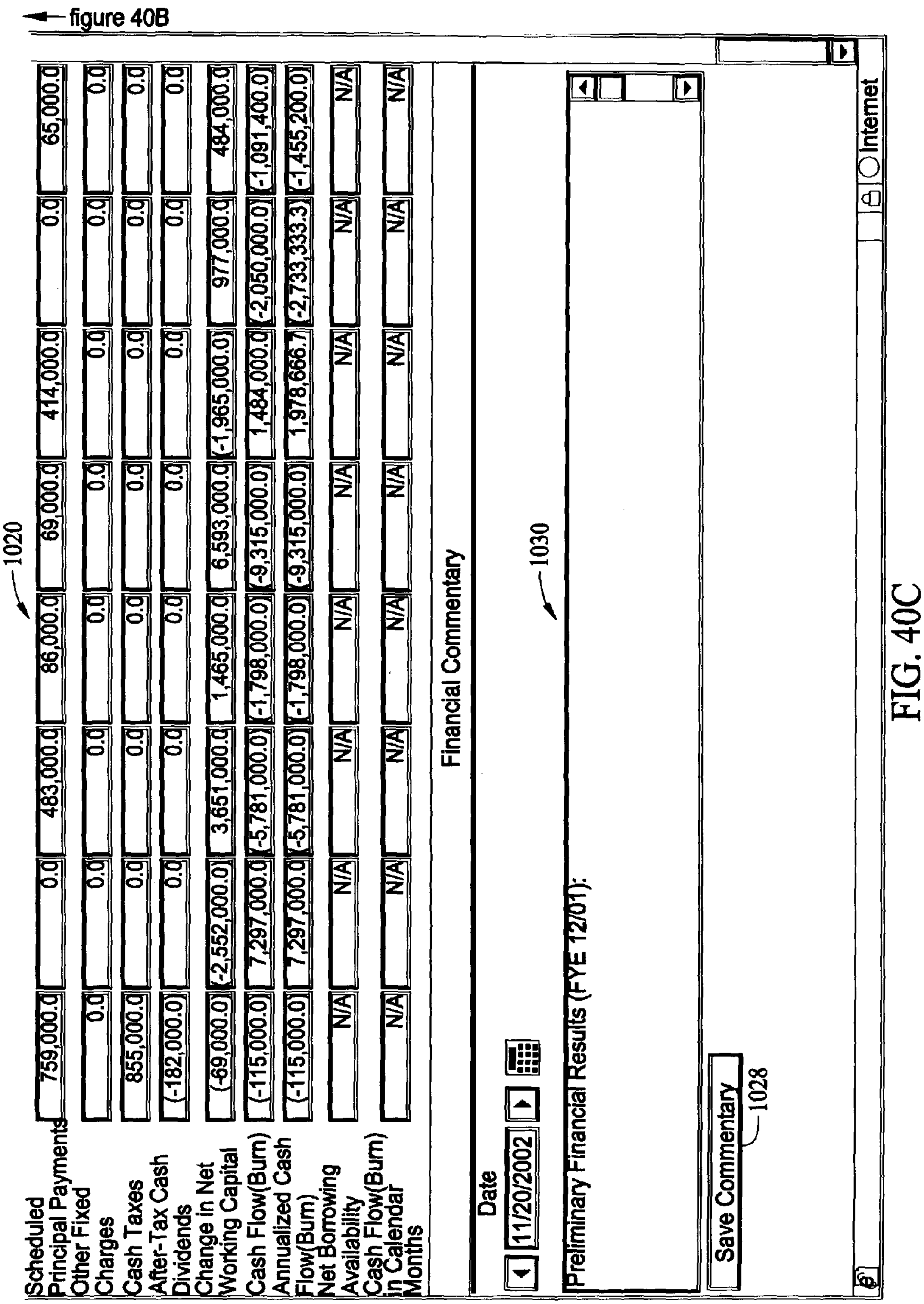
Figure 41A:
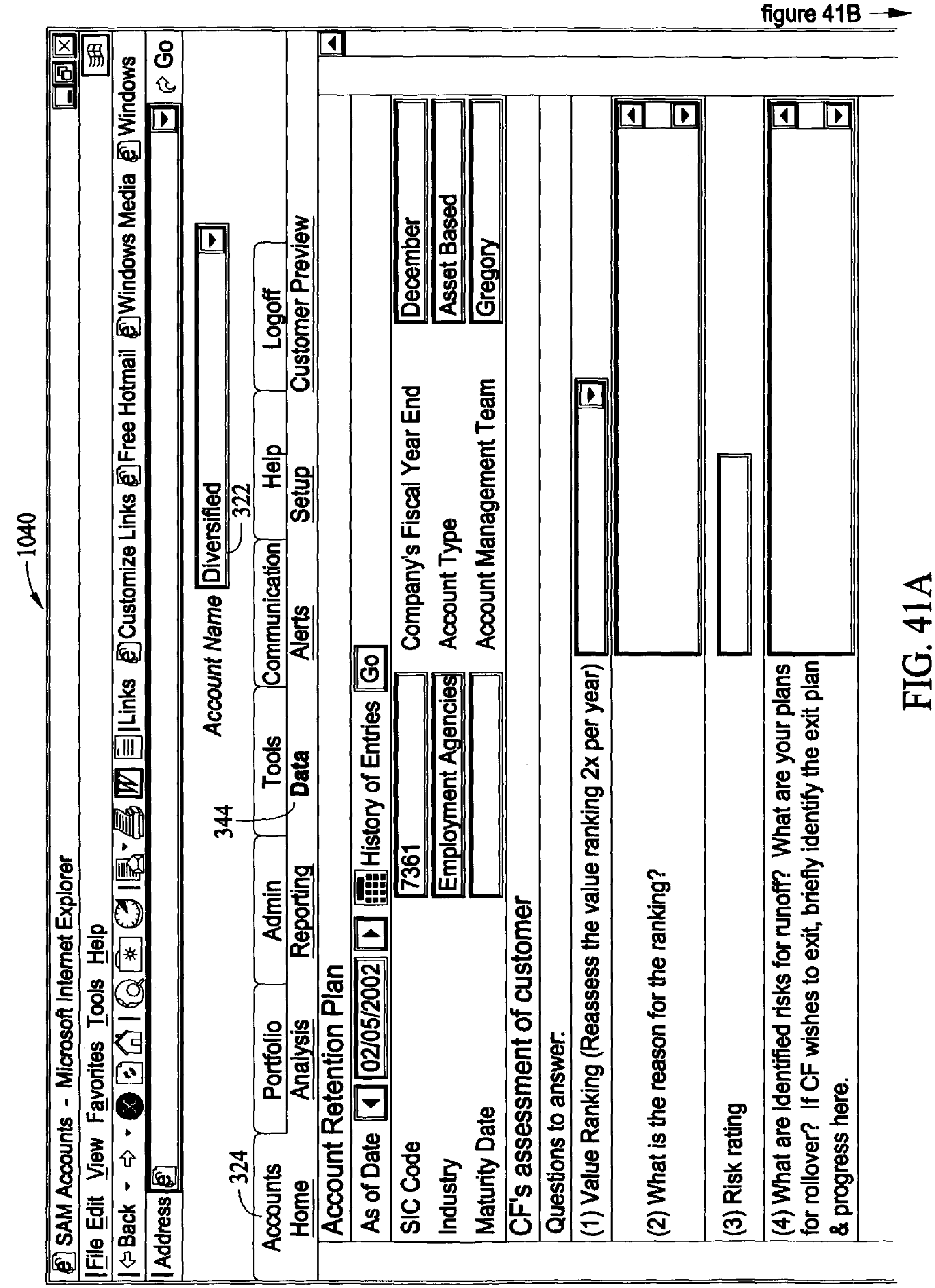
FIGS. 41A through 41D show an example embodiment of a user interface displaying an account retention plan for an account in a RMCS.
Figure 41B:
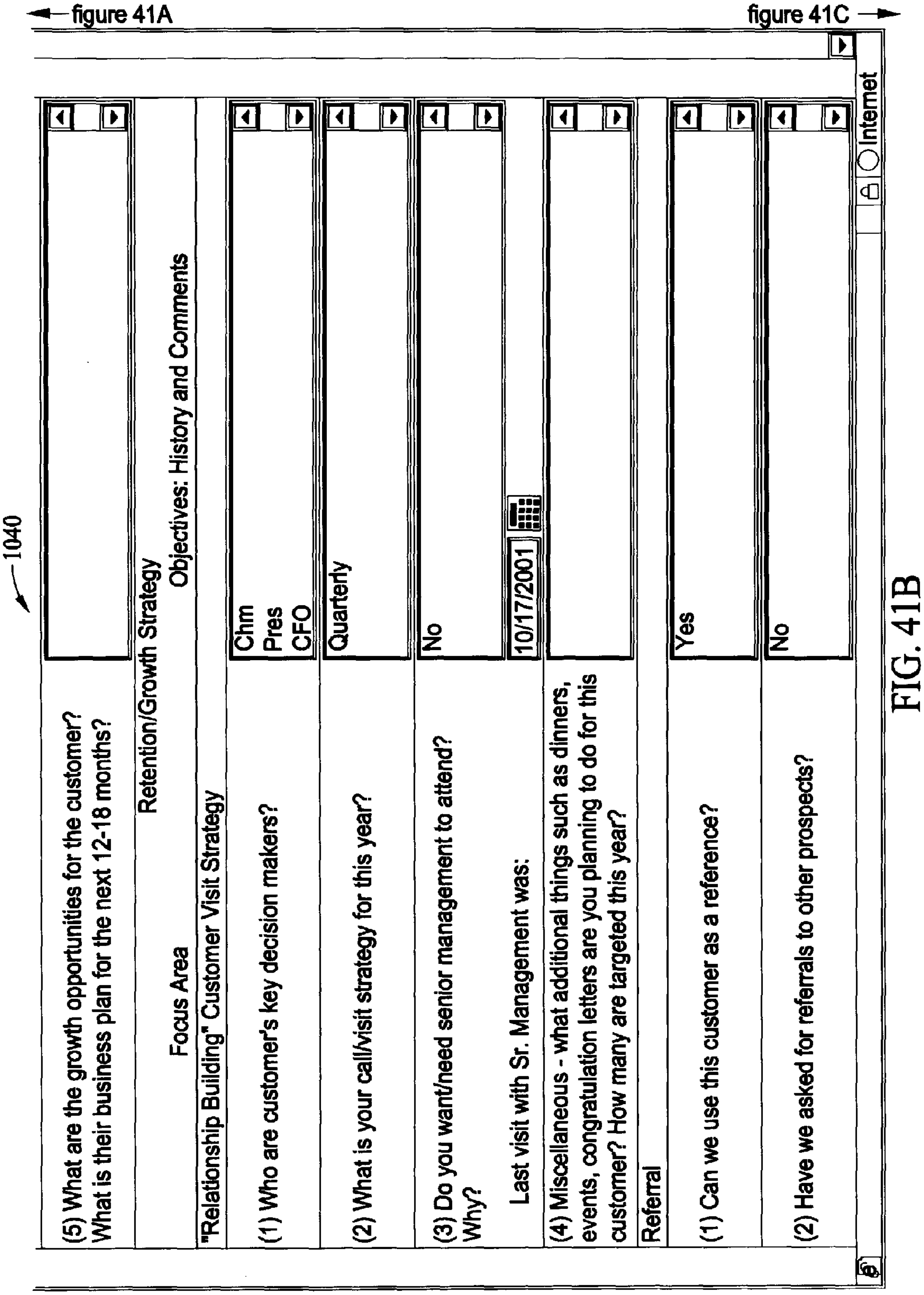
Figure 41C:
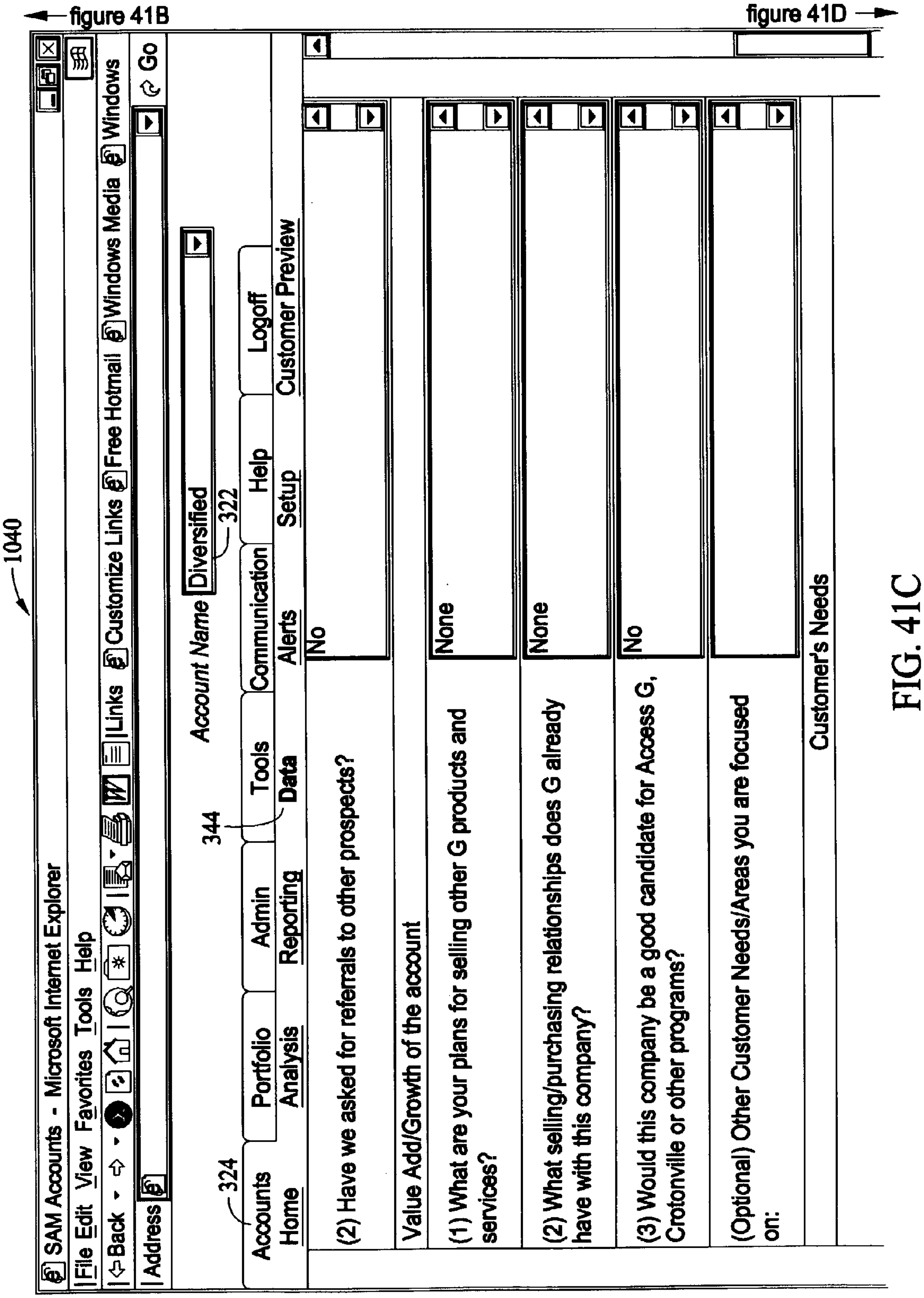
Figure 41D:
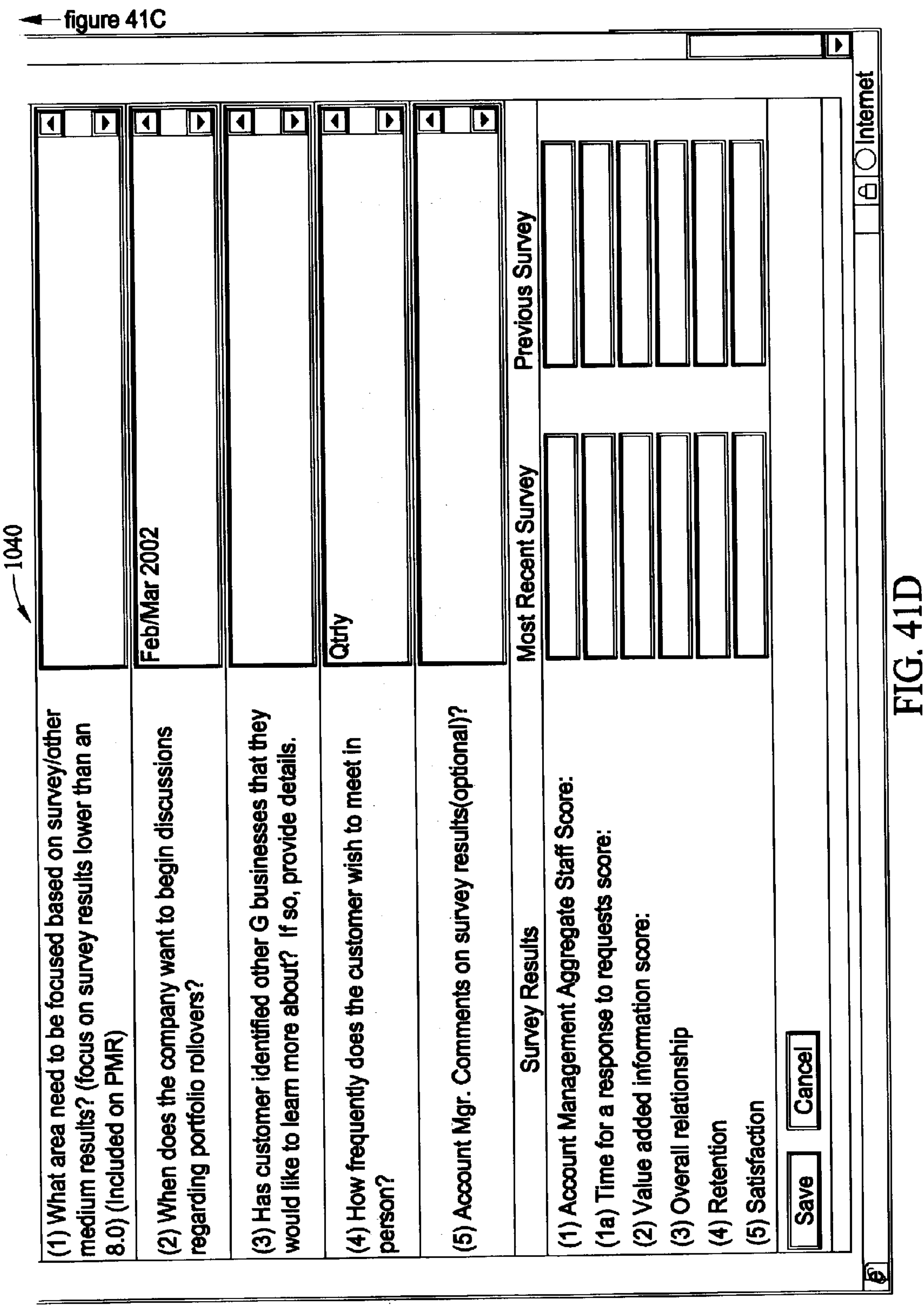

FIGS. 40A, 40B and 40C show an example embodiment of a user interface 1020 displaying a summary of an income statement, debt service ratios, and a cash position for selected account 322, which is displayed after menu tab Accounts 324 and sub-menu tab Data 344 are selected by a user. User interface 1020 is included in the Financial Statements and Capital Structure category of Data Section 344. Data may be viewed by a user through Data Section 344 and Setup Section 348 of RMCS 10 (shown in FIG. 1). User interface 1020 displays at least one of graphical and tabular analyses of selected account 322. In the example embodiment, user interface 1020 displays an Account Name pull-down field 1022 showing selected account 322, which is also known as the Analyzed Business. User interface 1020 also displays a Scenario pull-down field 1024, a Year pull-down field 1026, a Save Commentary button 1028, and a Financial Commentary section 1030 where financial commentary is inputted for selected account 322.

FIGS. 41A-46C are example embodiments of user interfaces illustrating the Strategy category of Data Section 344. The Strategy category of Data Section 344 displays actions taken by an account manager for the CF Business to either retain or exit selected account 322 as well as a tool to assess and/or evaluate an economic viability of different business options.

FIGS. 41A, 41B, 41C and 41D show an example embodiment of user interface 1040 displaying an account retention plan for selected account 322, which is displayed after menu tab Accounts 324 and sub-menu tab Data 344 are selected by a user. The account retention plan is a tool used by management of CF Business to improve the retention of valued accounts and expand CF Business product offerings as well as tap into the valued account vendors, customers and peers to source new business for the CF Business. In the example embodiment, user interface 1040 has a section illustrating whether the CF Business is attempting to retain the account or exit the credit. In addition, user interface 1040 illustrates a strategy of the CF Business for retaining the account.

Figure 42:
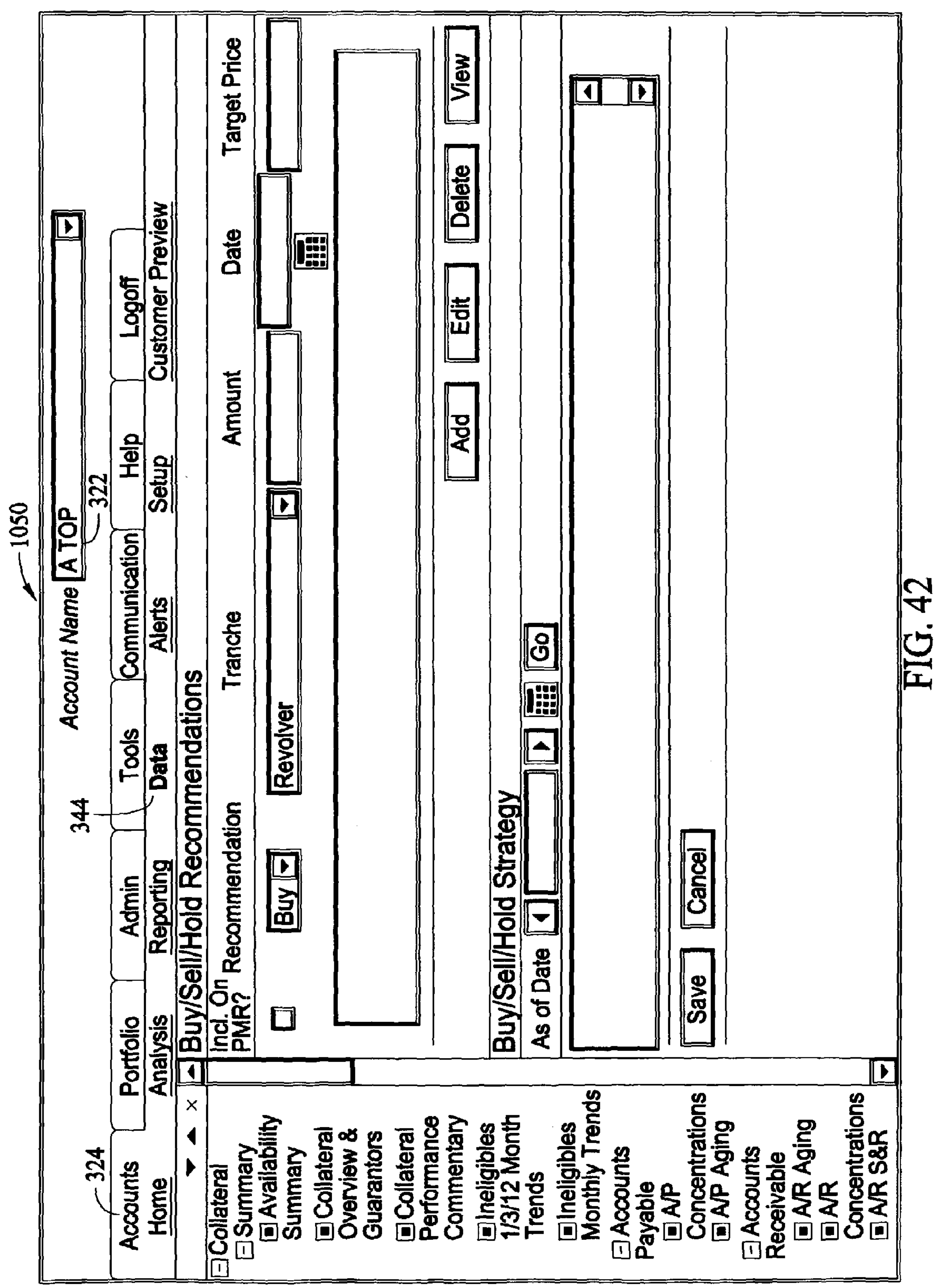
FIG. 42 is an example embodiment of a user interface displaying buy, sell, hold recommendations for an account in a RMCS.

FIG. 42 is an example embodiment of user interface 1050 illustrating recommendations on buying, selling, or holding specific capital structure tranches for selected account 322, which is displayed after menu tab Accounts 324 and sub-menu tab Data 344 are selected by a user. The term "tranche" as used herein is not limited to foreign notes but also includes assets and financial instrument groupings regardless of country or jurisdiction. User interface 1050 enables a user to add comments supporting various recommendations and strategy. In the example embodiment, data will only be inputted into user interface 1050 for debt deals that have a secondary market for the paper.

Figure 43:
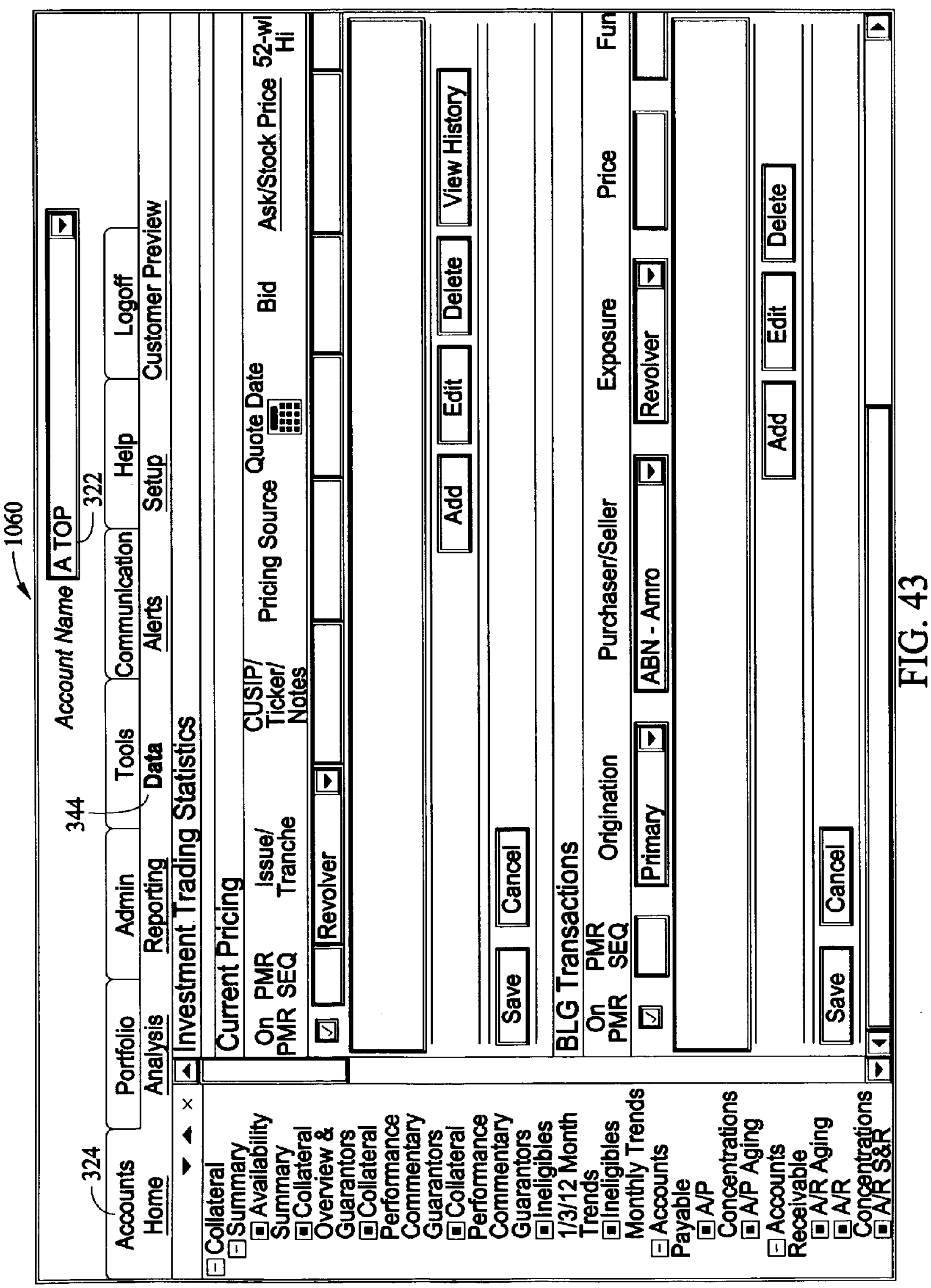
FIG. 43 is an example embodiment of a user interface displaying investment trading statistics information for an account in a RMCS.
Figure 44A:
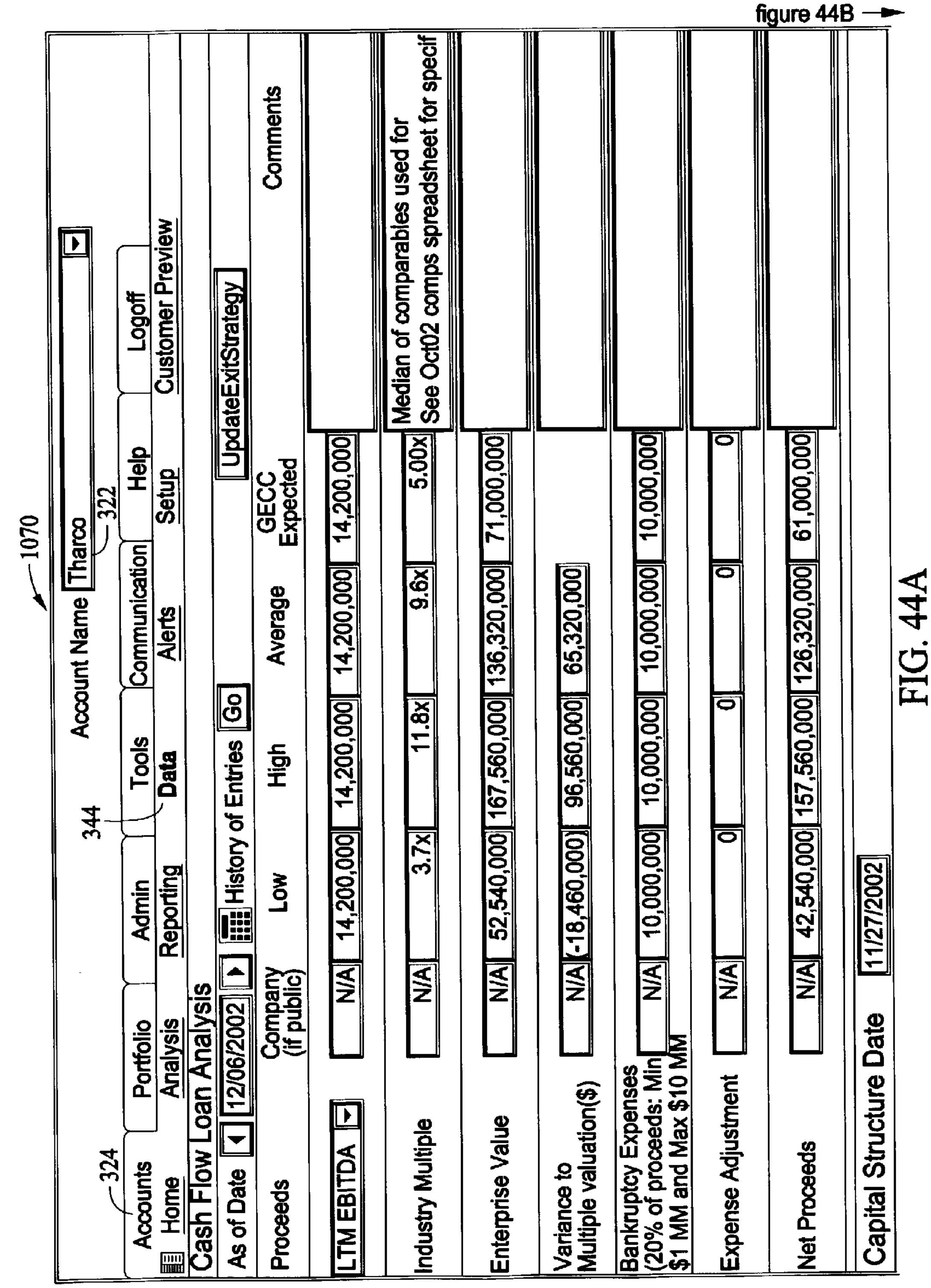
Figure 45A:
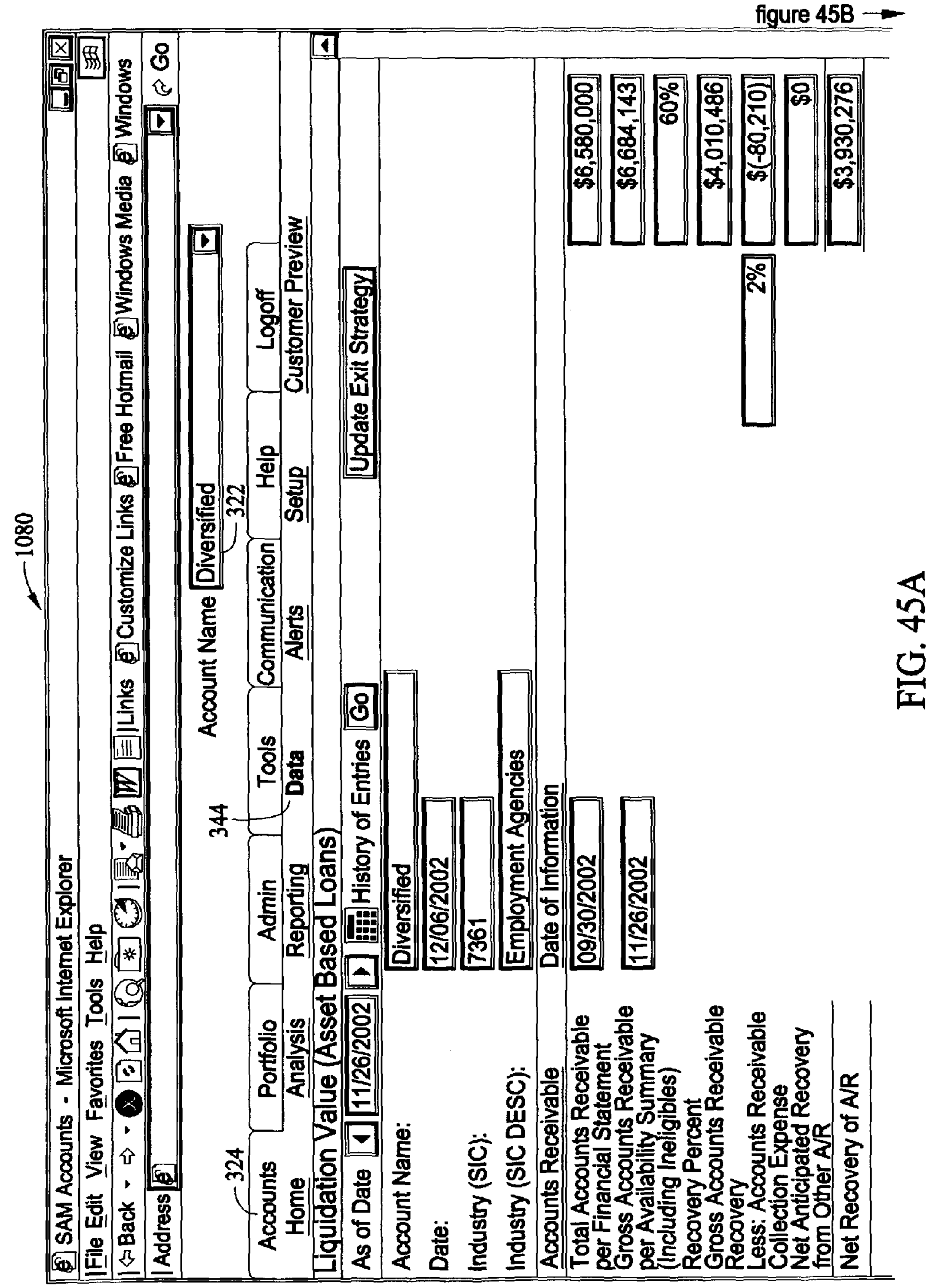
FIGS. 45A through 45D show an example embodiment of a user interface displaying liquidation value information for an account in a RMCS.
Figure 45B:
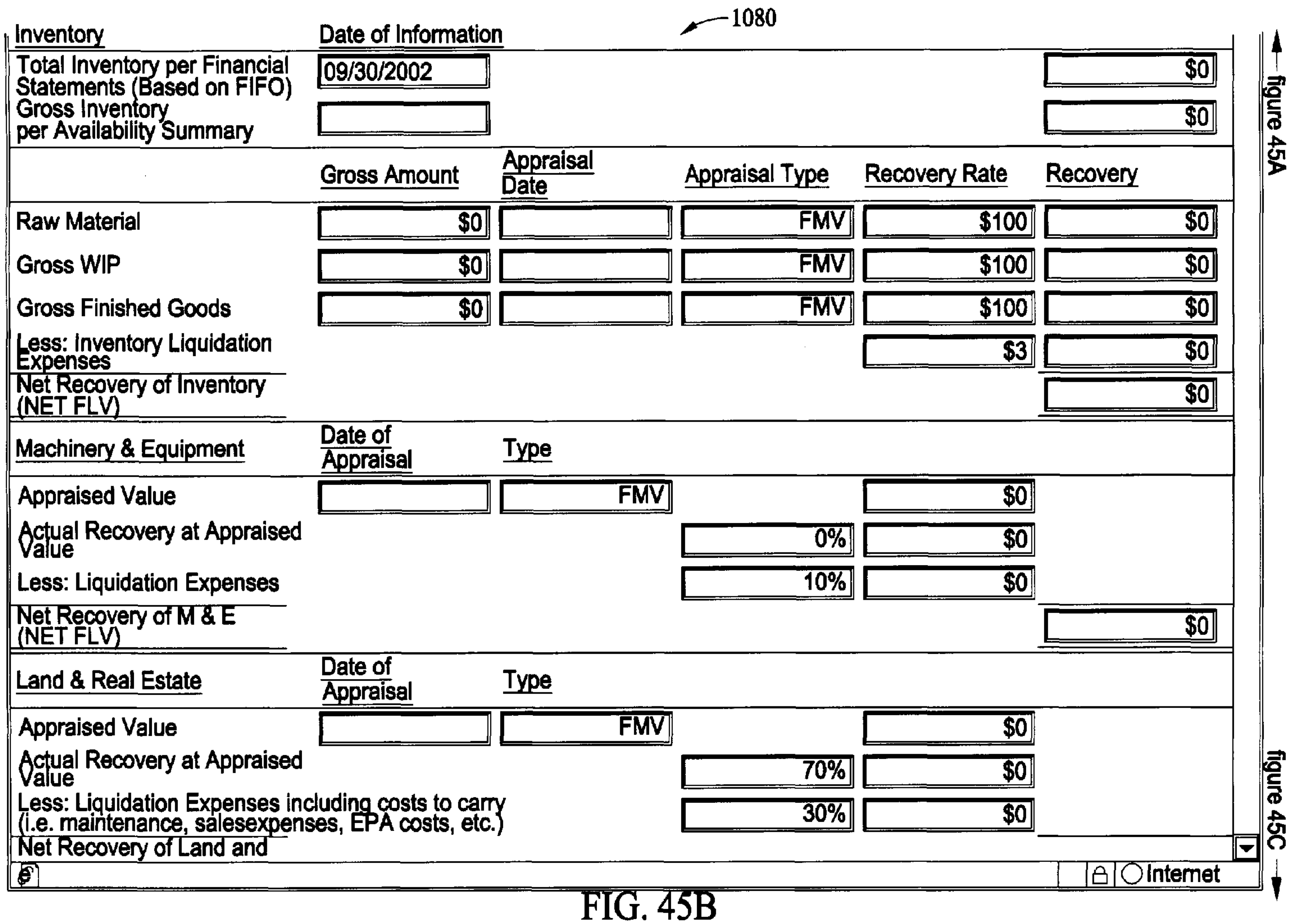
Figure 45C:
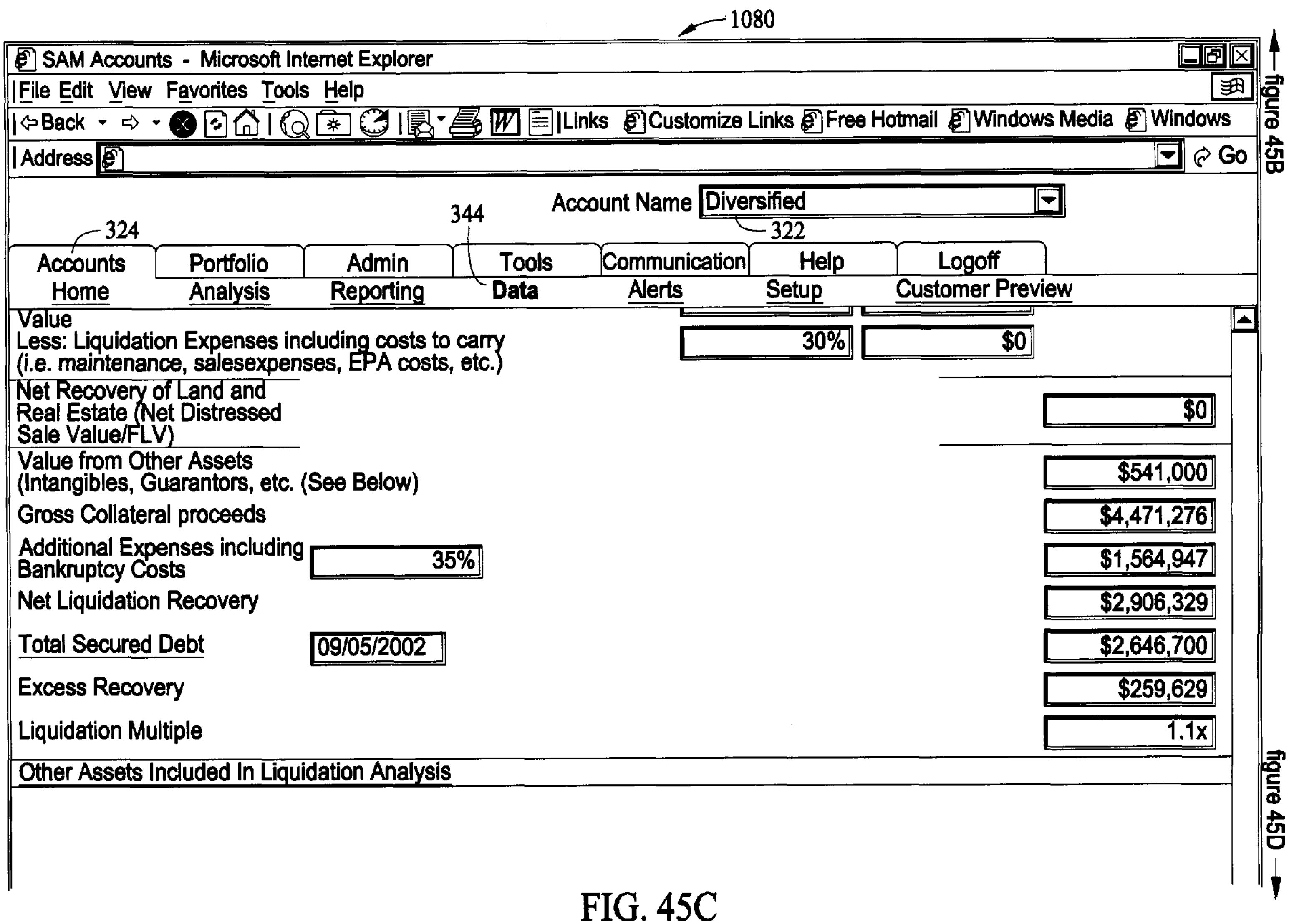
Figure 45D:
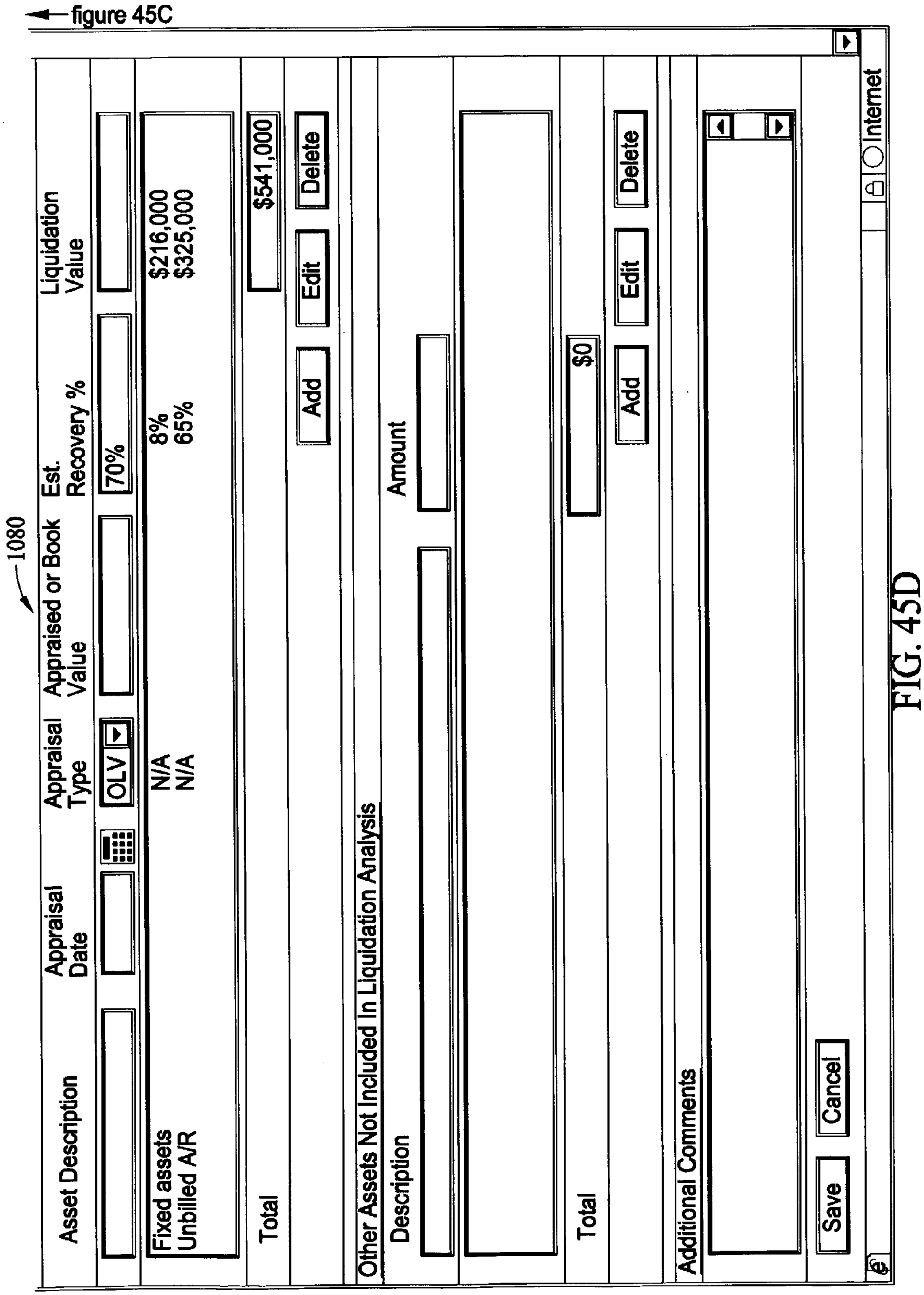

FIG. 43 is an example embodiment of user interface 1060 displaying trading prices for debt and equity tranches, details the prior market transactions, for example Bank Loan Group (BLG) Transactions, for selected account 322. User interface 1060 is displayed after menu tab Accounts 324 and sub-menu tab Data 344 are selected by a user. In the example embodiment, BLG Transactions section should be completed for all BLG accounts. Additionally, any accounts that have had secondary market transactions should complete the BLG Transactions section on user interface 1060. RMCS 10 (shown in FIG. 1) also tracks prior market transactions for other groups other than BLG.

FIGS. 44A, 44B, 44C and 44D display an example embodiment of user interface 1070 displaying company valuations based on a sale of the company as a going concern for selected account 322, which is displayed after menu tab Accounts 324 and sub-menu tab Data 344 are selected by a user. In the example embodiment, data relating to asset-based deals is entered through user interface 1070.

FIGS. 45A, 45B, 45C and 45D show an example embodiment of user interface 1080 displaying company valuation based on a liquidation of the company's assets for selected account 322, which is displayed after menu tab Accounts 324 and sub-menu tab Data 344 are selected by a user. In the example embodiment, for each asset, net recovery is calculated by multiplying an appropriate value by the recovery percent. Liquidation and collection expenses are then deducted. All of the net recovery items are added to calculate the gross collateral proceeds. Additionally, expenses are captured in the liquidation analysis and are broken down as follows: A/R Collection Expenses, Liquidation Expenses, and Additional Expenses.

Figure 46A:
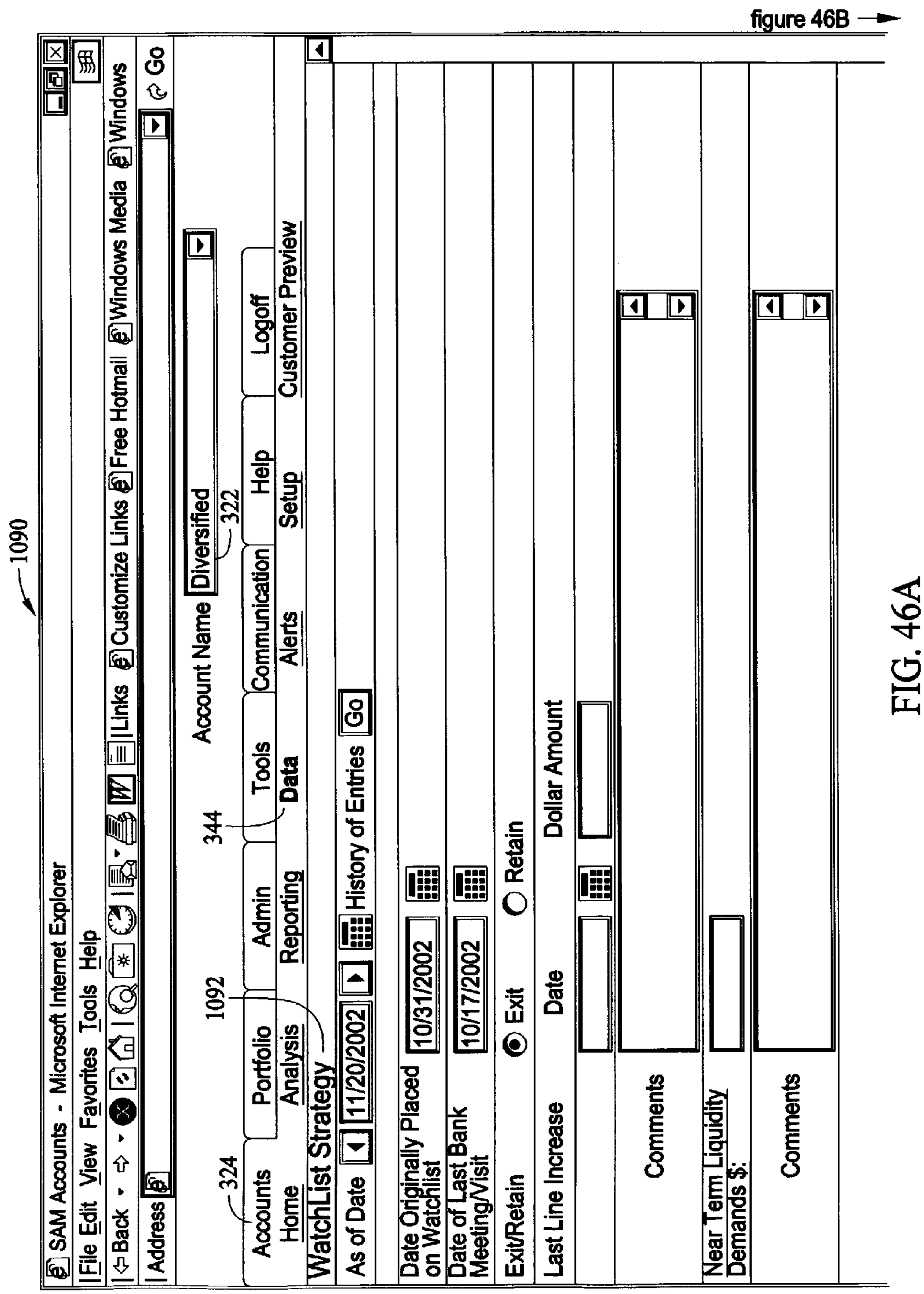
FIGS. 46A, 46B and 46C show an example embodiment of a user interface displaying a watchlist strategy for an account in a RMCS.
Figure 46B:
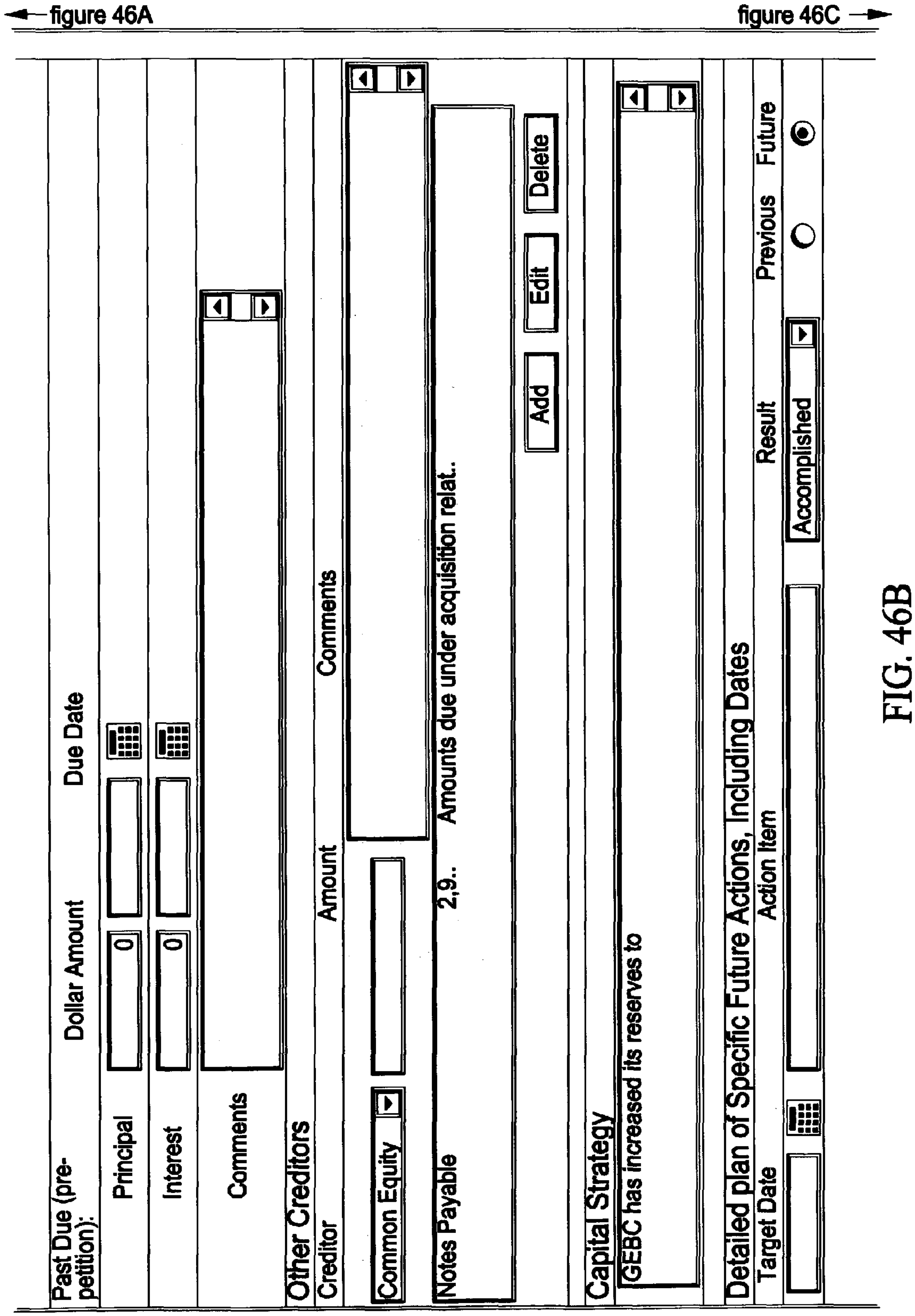
Figure 46C:
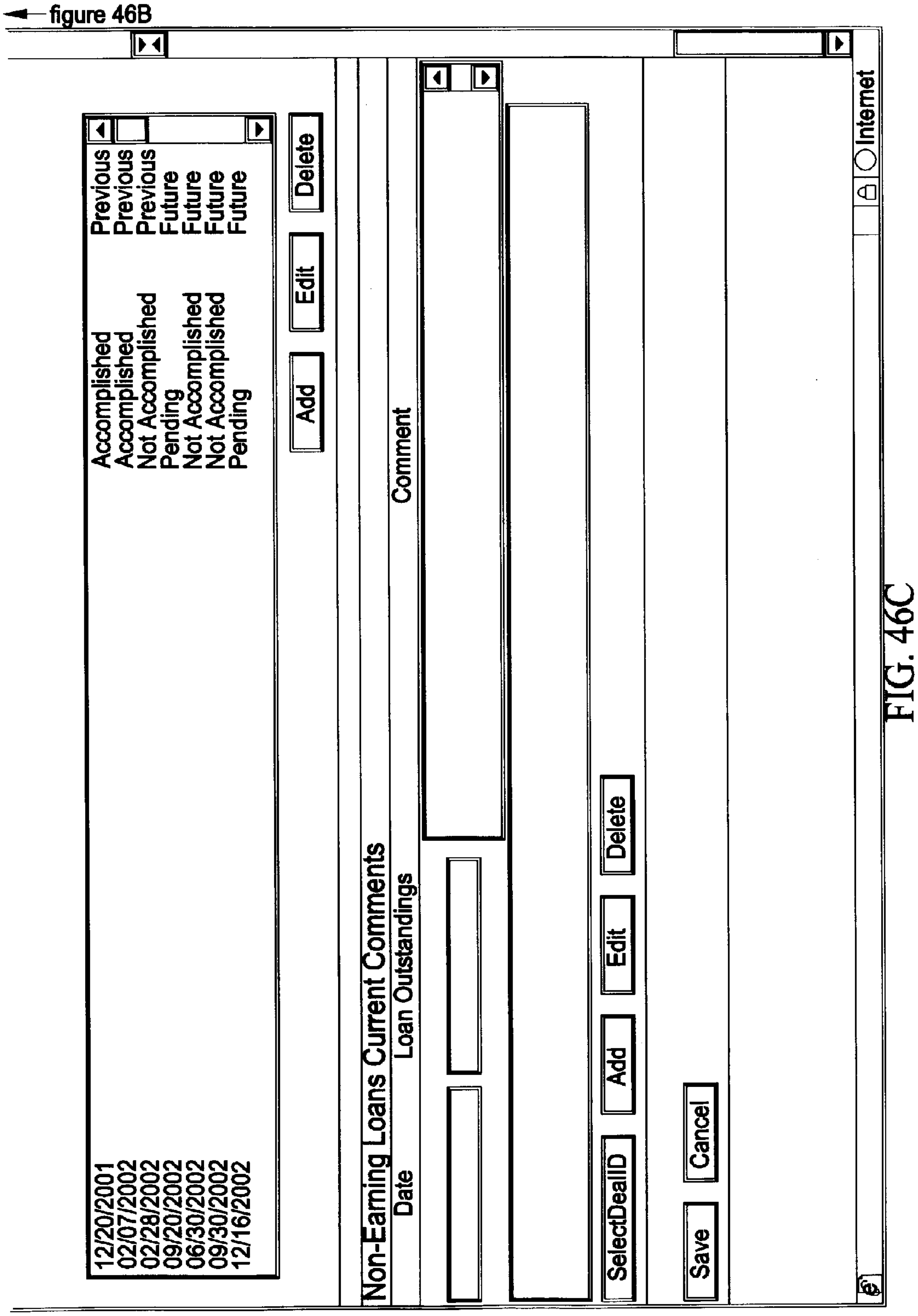

FIGS. 46A, 46B and 46C show an example embodiment of user interface 1090 displaying a strategy being used by an account manager for selected account 322 on a Watchlist Strategy 1092. User interface 1090 is accessed after menu tab Accounts 324 and sub-menu tab Data 344 are selected by a user.

Figure 47:
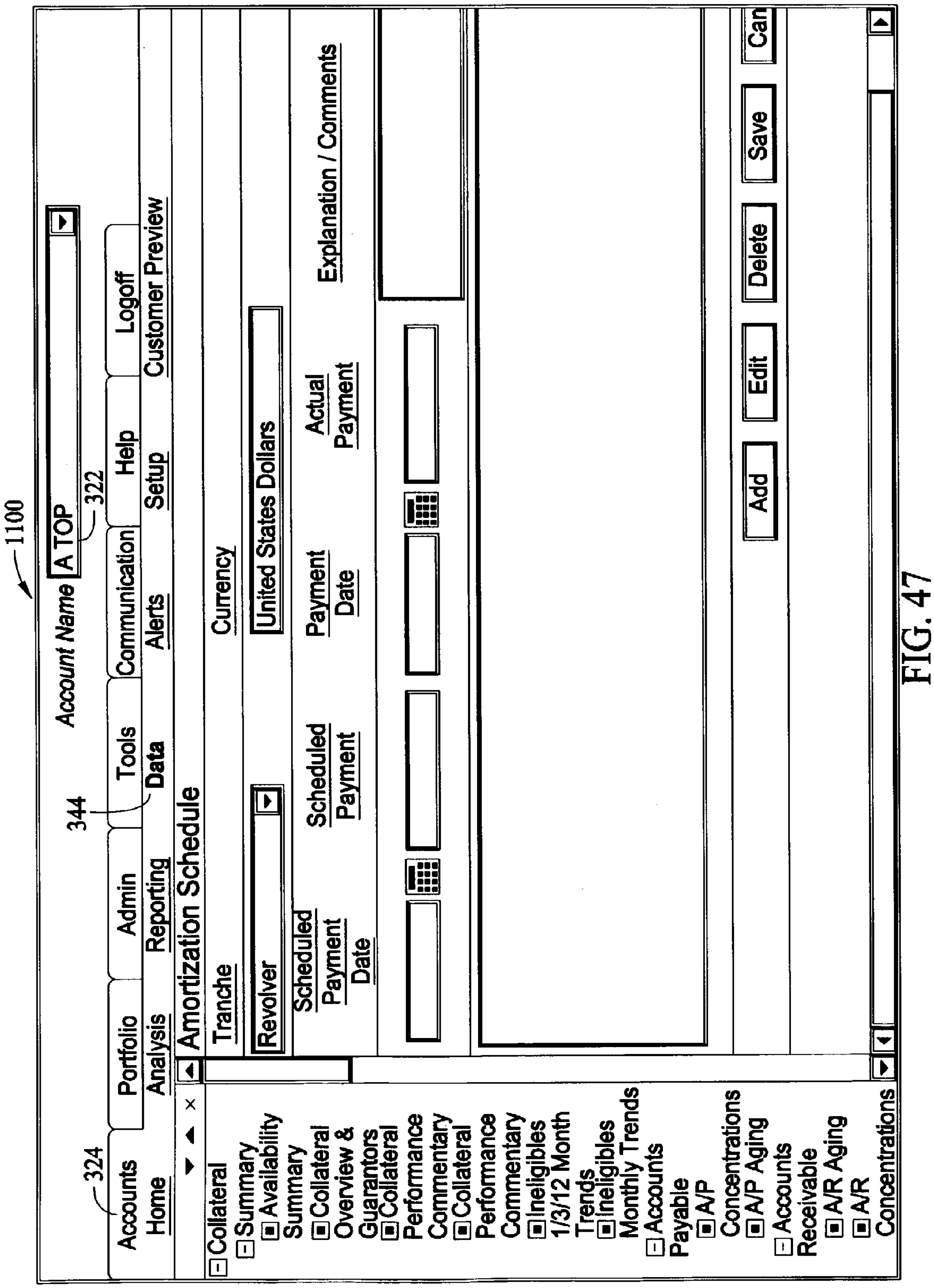
FIG. 47 is an example embodiment of a user interface displaying an amortization schedule for an account in a RMCS.
Figure 48:
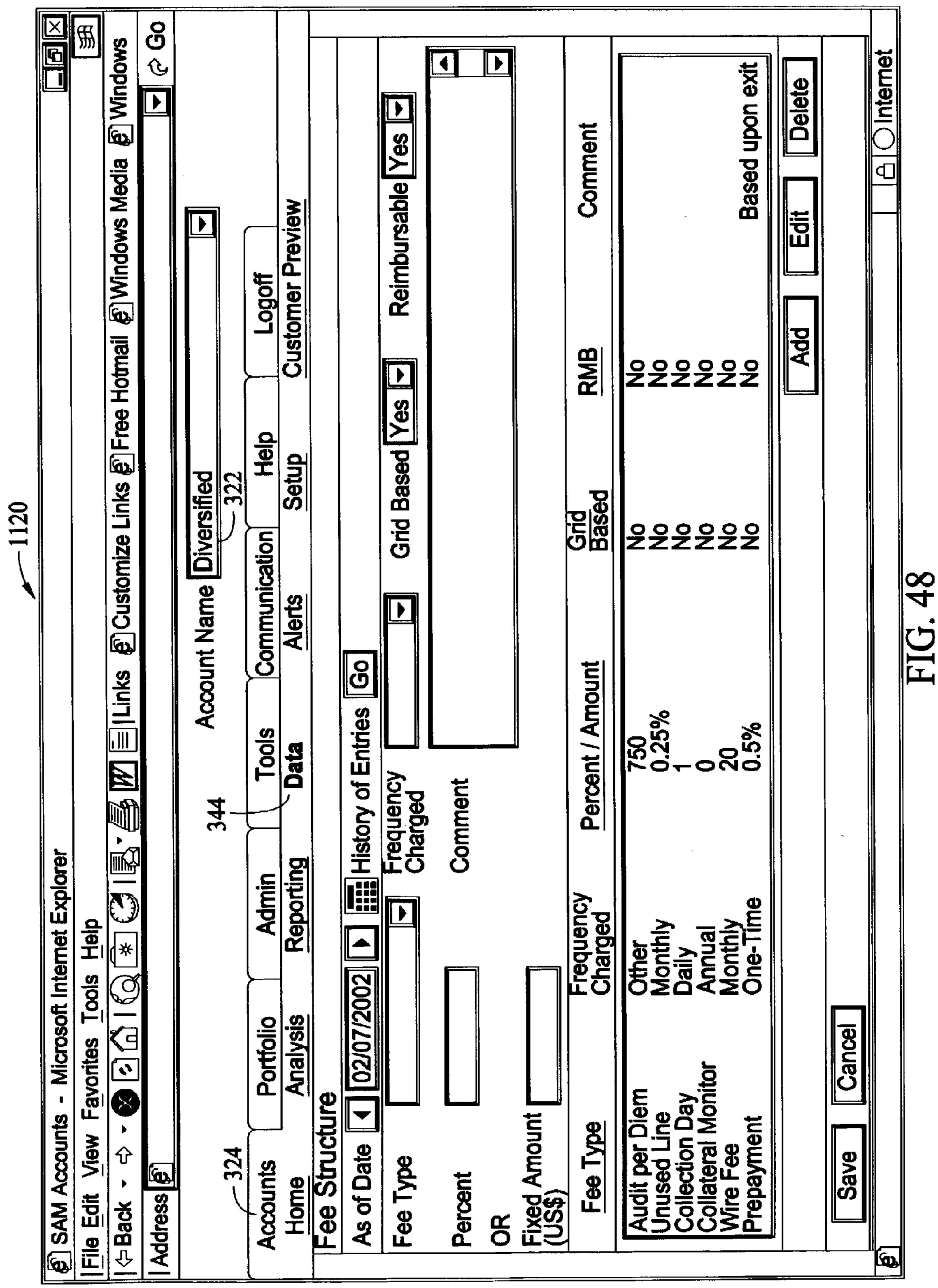
FIG. 48 is another example embodiment of a user interface displaying fee structure information for an account in a RMCS.

FIGS. 47-48 are example embodiments of user interfaces illustrating the Deal Structure category of Data Section 344. The Deal Structure category of Data Section 344 illustrates scheduled debt payments and actual payments received for all tranches of debt for selected account 322, and illustrates a negotiated fee structure for each borrower.

FIG. 47 is an example embodiment of user interface 1100 that displays an amortization schedule for all tranches of company debt for selected account 322, which is displayed after menu tab Accounts 324 and sub-menu tab Data 344 are selected by a user. In the example embodiment, if a company has debt with regularly scheduled amortization payments or a one-time bullet payment, such payments may be entered in RMCS 10 (shown in FIG. 1) through user interface 1100.

FIG. 48 is an example embodiment of user interface 1120 displaying a negotiated fee structure for each transaction for selected account 322. User interface 1120 is displayed after menu tab Accounts 324 and sub-menu tab Data 344 are selected by a user. In the example embodiment, fees that may be displayed on user interface 1120 include at least one of agency fees, audit fees, success fees, and legal fees.

FIGS. 49-52 are example embodiments of user interfaces illustrating the Equity category of Data Section 344. The Equity category of Data Section 344 illustrates whether the CF Business has an equity interest in selected account 322.

Figure 49:
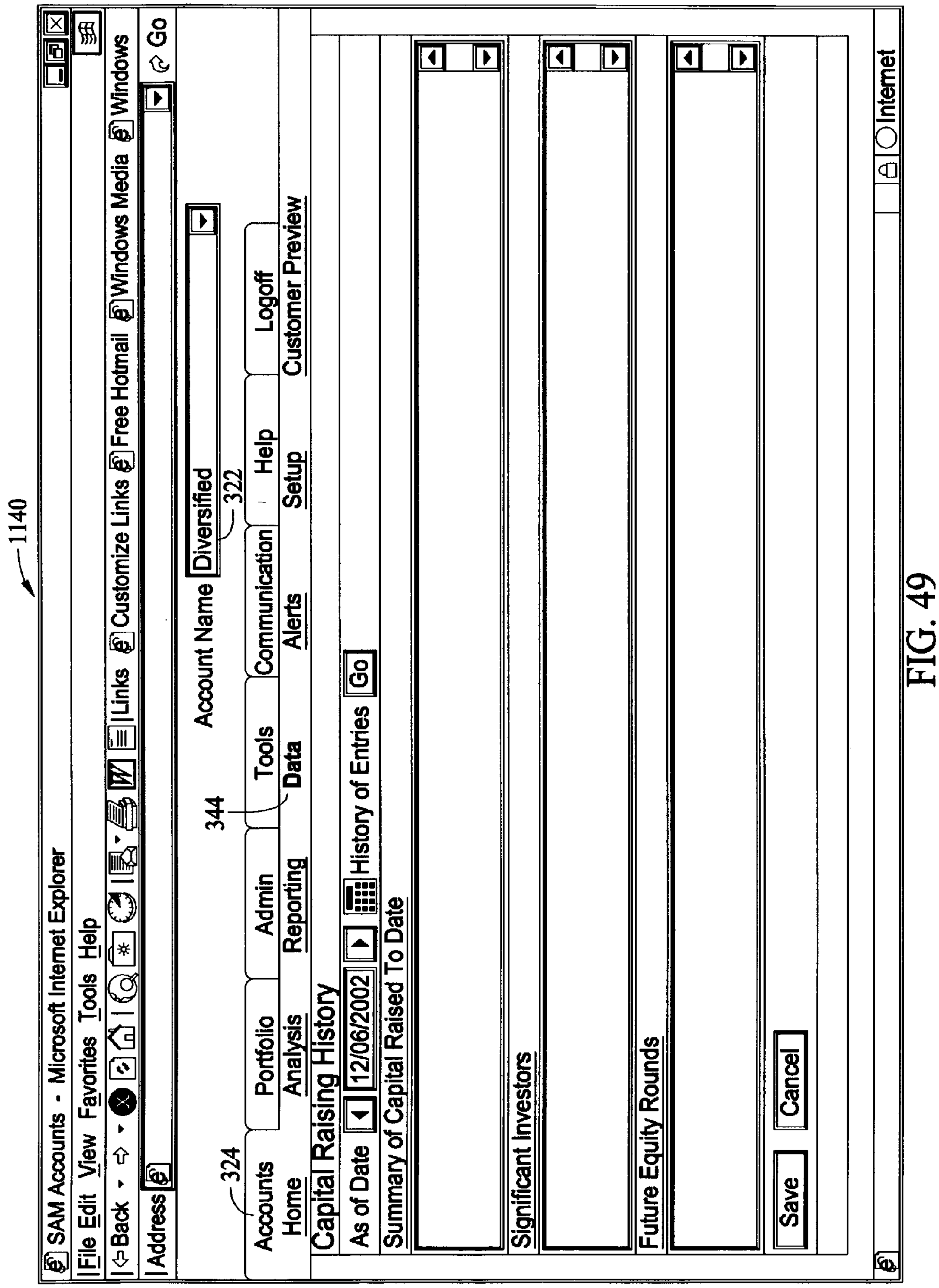
FIG. 49 is an example embodiment of a user interface displaying capital raising history information for an account in a RMCS.

FIG. 49 is an example embodiment of user interface 1140 displaying a summary of information relating to a company's investors and capital raising history for equity deals for selected account 322. User interface 1140 is displayed after menu tab Accounts 324 and sub-menu tab Data 344 are selected by a user. In the example embodiment, data will only be inputted into user interface 1140 for deals in which the CF Business has an equity interest.

Figure 50:
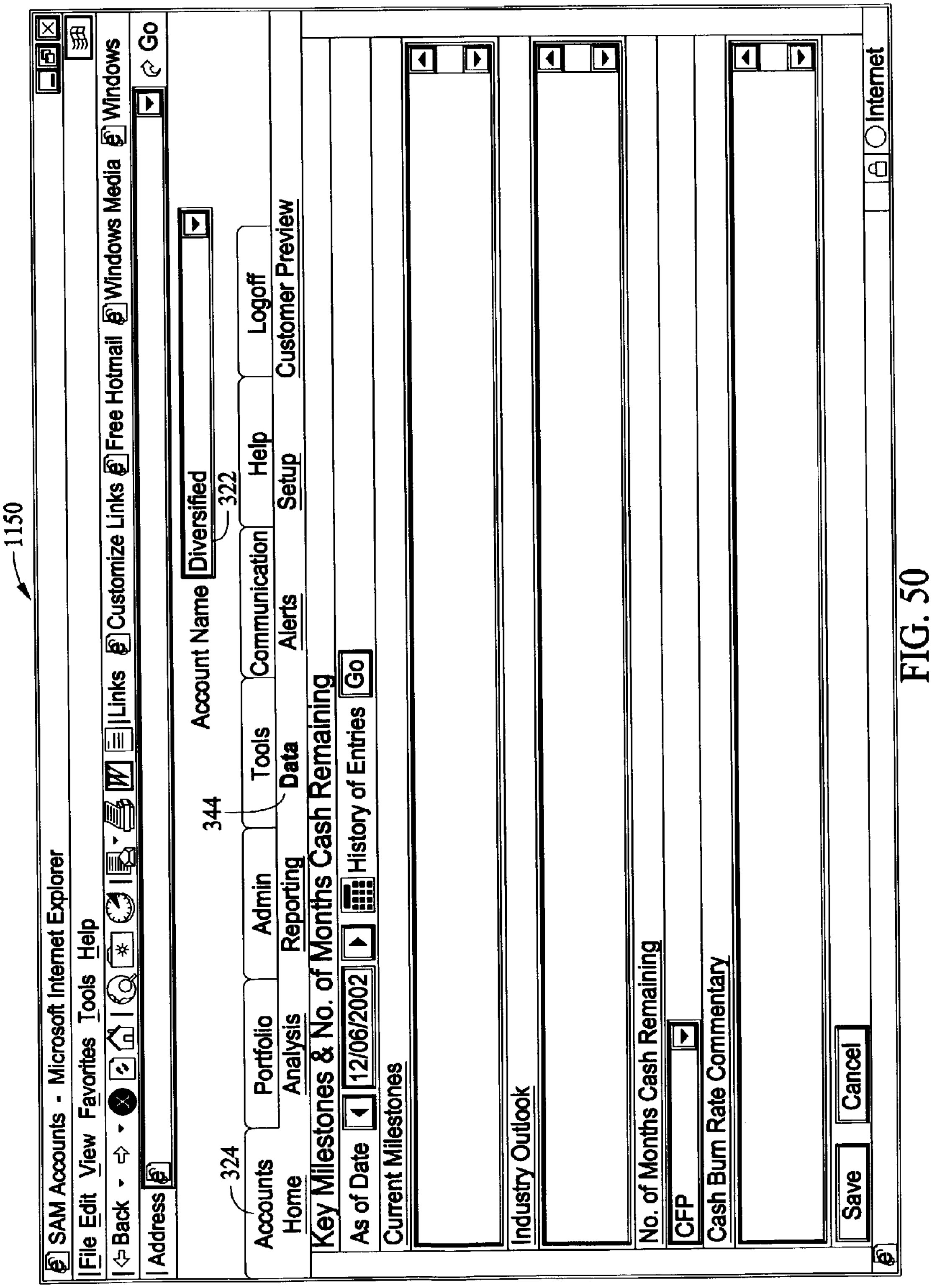
FIG. 50 is an example embodiment of a user interface displaying key milestones and number of months of cash remaining for an account in a RMCS.

FIG. 50 is an example embodiment of user interface 1150 that displays a company's progress on meeting milestones and illustrates how much cash the company has to meet future obligations for selected account 322. User interface 1150 is displayed after menu tab Accounts 324 and sub-menu tab Data 344 are selected by the user. In the example embodiment, data will only be inputted into user interface 1150 for deals in which the CF Business has an equity interest.

Figure 51A:
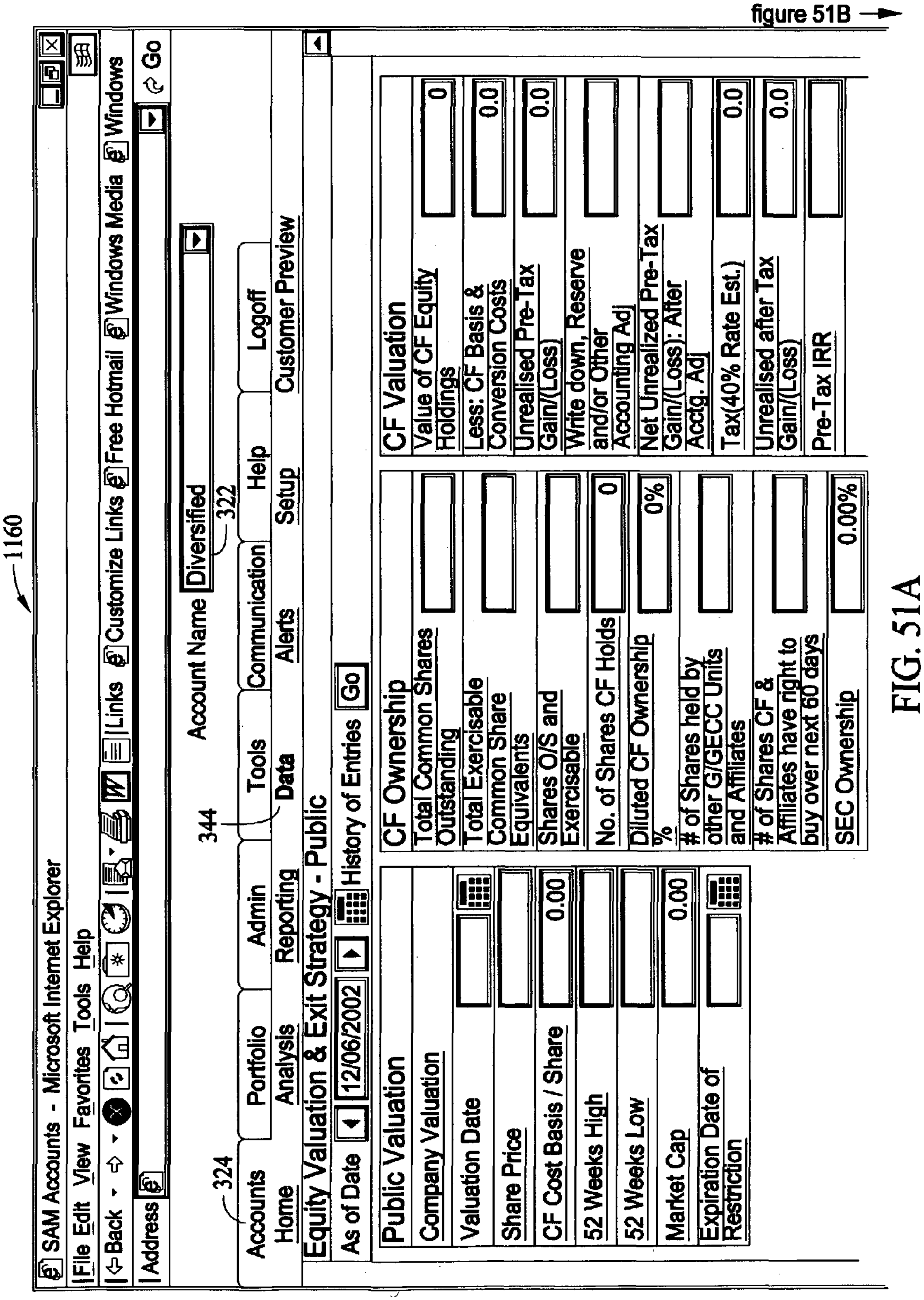
FIGS. 51A and 51B show an example embodiment of a user interface displaying equity valuation and exit strategy for an account in a RMCS.
Figure 51B:
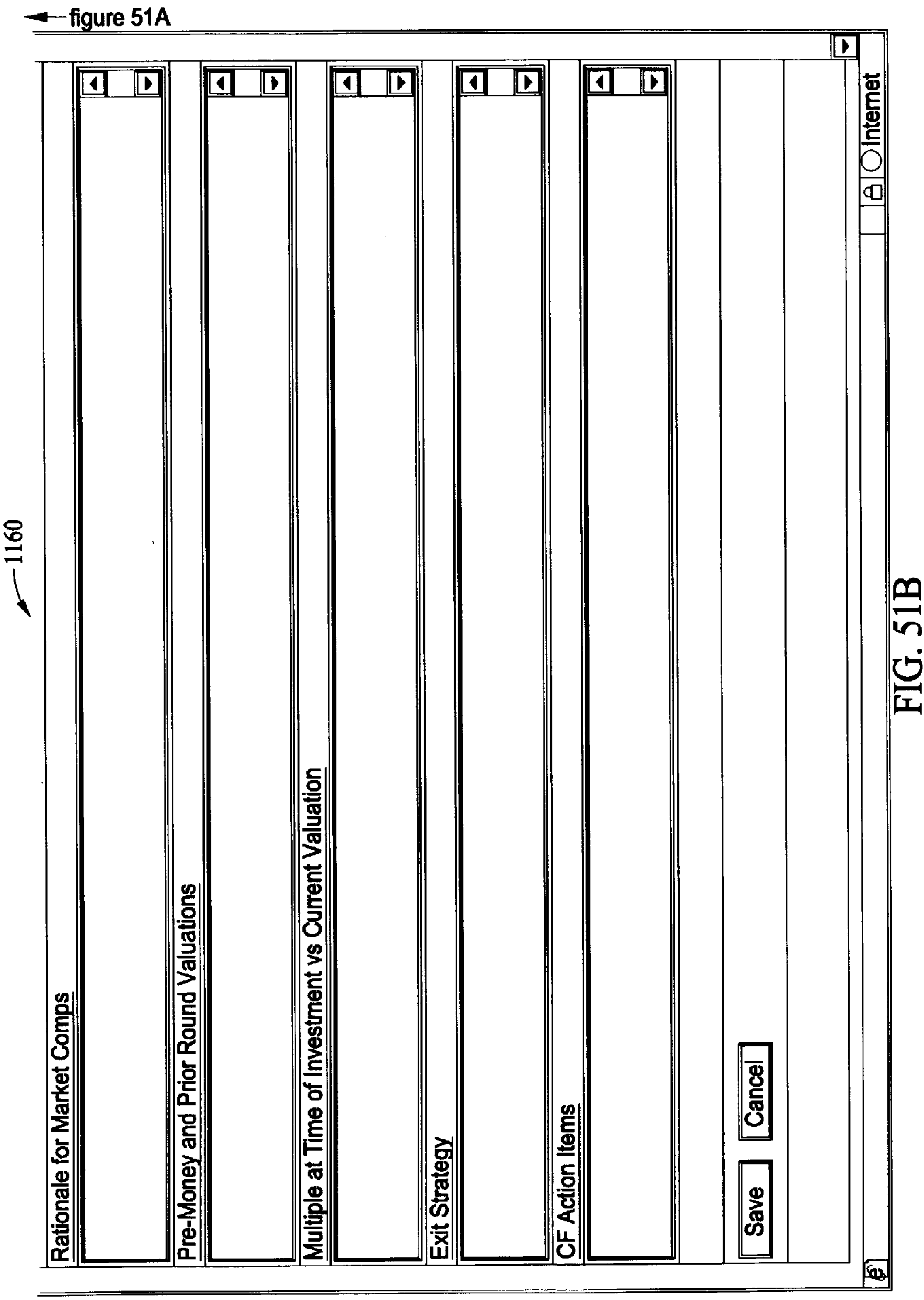

FIGS. 51A and 51B show an example embodiment of user interface 1160 that displays estimated valuation of common equity, the CF Business's ownership percentage, and strategy to maximize value and exit investment for selected account 322. User interface 1160 is displayed after menu tab Accounts 324 and sub-menu tab Data 344 are selected by a user.

Figure 52:
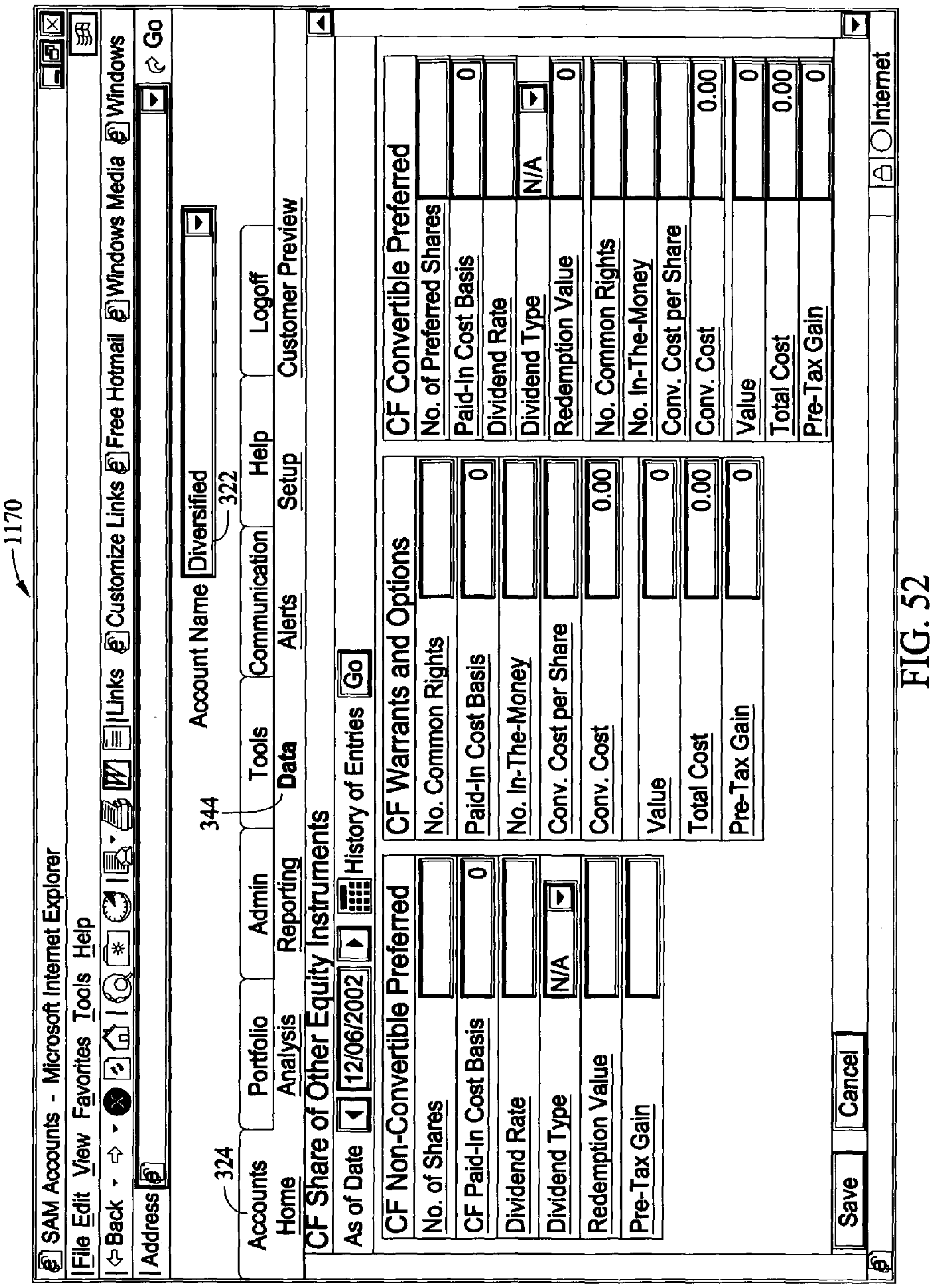
FIG. 52 is an example embodiment of a user interface displaying CF Business share of other equity instruments information for an account in a RMCS.

FIG. 52 is an example embodiment of user interface 1170 that calculates valuation and pre-tax gain for equity instruments other than common stock and maintains characteristics for each equity instrument for selected account 322. User interface is displayed after menu tab Accounts 324 and sub-menu tab Data 344 are selected by a user. In the example embodiment, user interface 1170 is utilized if an equity investment other than common stock is held. On an equity setup page, the user will note the types of equity investments that the CF Business has made in the Analyzed Business, the cost basis, and the share or rights held. If the equity instrument is something other than common stock, the information is than further used in user interface 1170. In the example embodiment, data must be inputted into at least one of Dividend Rate field, Dividend Type field, Redemption Value field, Number of Warrants in the Money field, and Conversion Cost of Warrants field on user interface 1170.

FIGS. 53-55B are example embodiments of user interfaces displaying the Company category of Data Section 344. The Company category of Data Section 344 illustrates general information regarding the CF Business' relationship with the Analyzed Business, current events impacting the Analyzed Business, and how the Analyzed Business is rated by external agencies and by internal resources.

Figure 53:
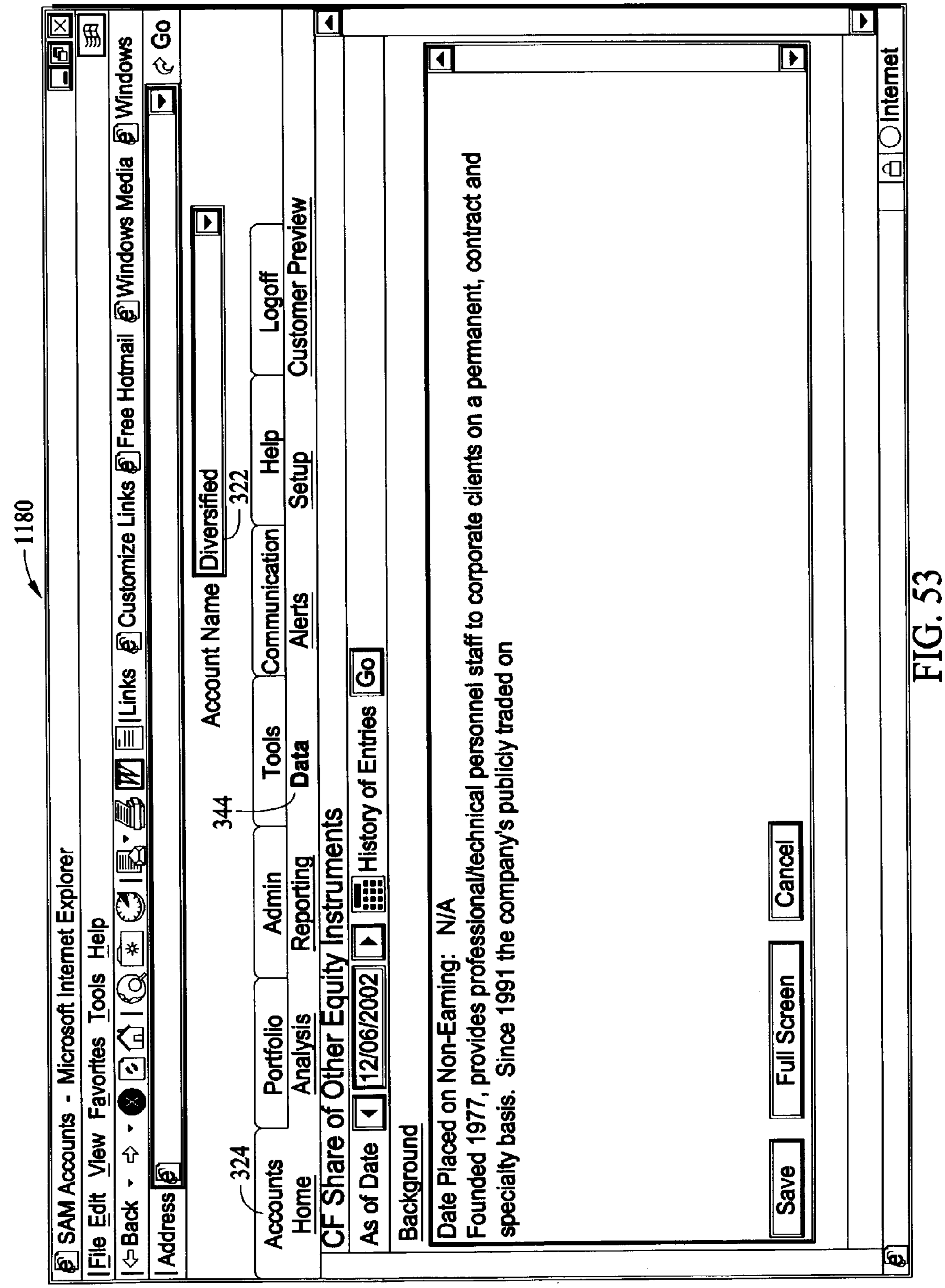
FIG. 53 is an example embodiment of a user interface displaying background commentary information for an account in a RMCS.

FIG. 53 is an example embodiment of user interface 1180 that displays general background information about the Analyzed Business, also referred to as selected account 322, and its relationship with the CF Business. User interface 1180 is displayed after menu tab Accounts 324 and sub-menu tab Data 344 are selected by a user. In the example embodiment, information displayed on user interface 1180 provides a general overview of the Analyzed Business and describes the nature of the relationship with the borrower.

Figure 54:
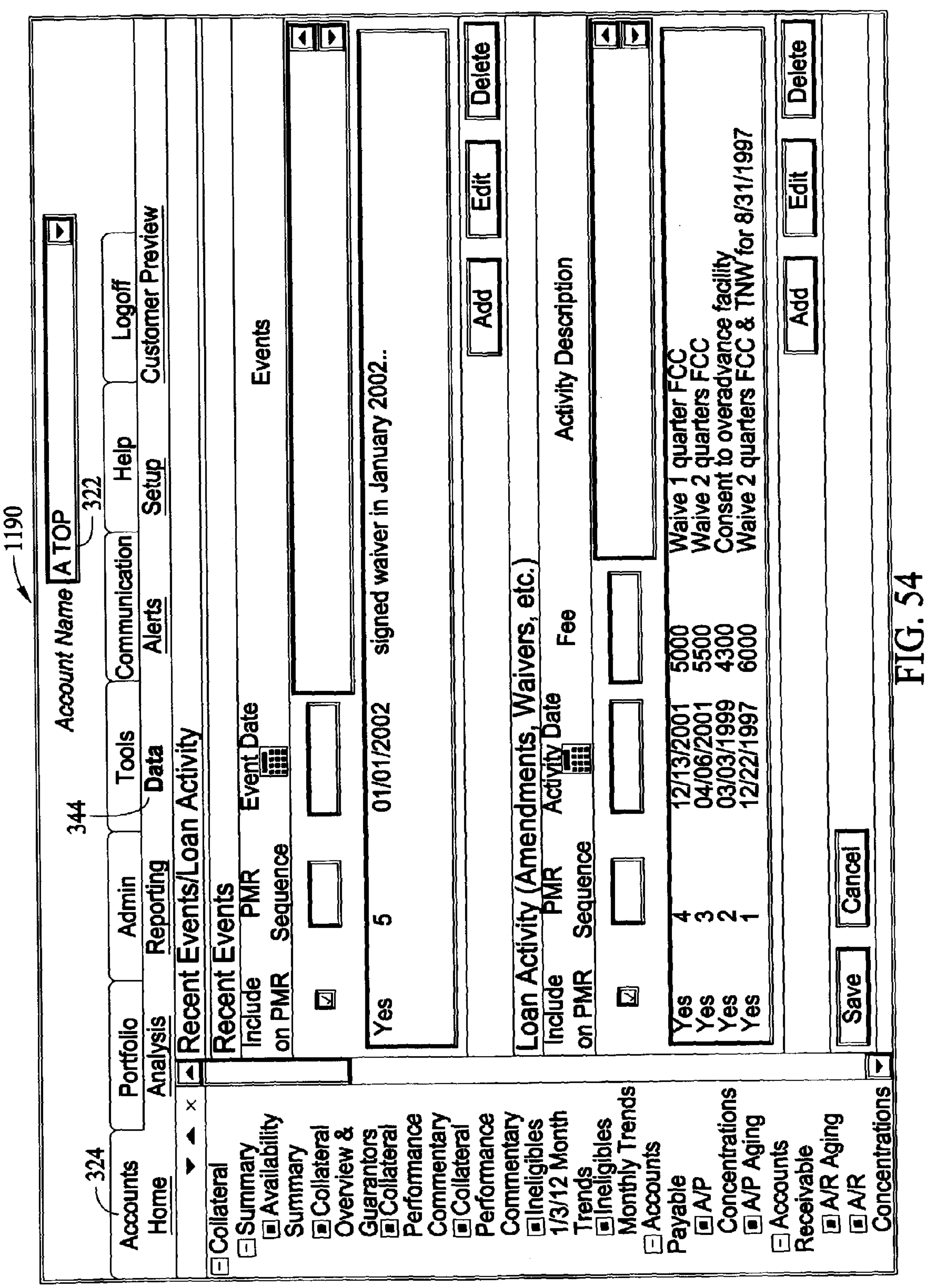
FIG. 54 is an example embodiment of a user interface displaying recent events and loan activity for an account in a RMCS.

FIG. 54 is an example embodiment of user interface 1190 that tracks recent events affecting the selected account 322, which is also known as the Analyzed Business, and records loan activity. User interface 1190 is displayed after menu tab Accounts 324 and sub-menu tab Data 344 are selected by a user.

Figure 55A:
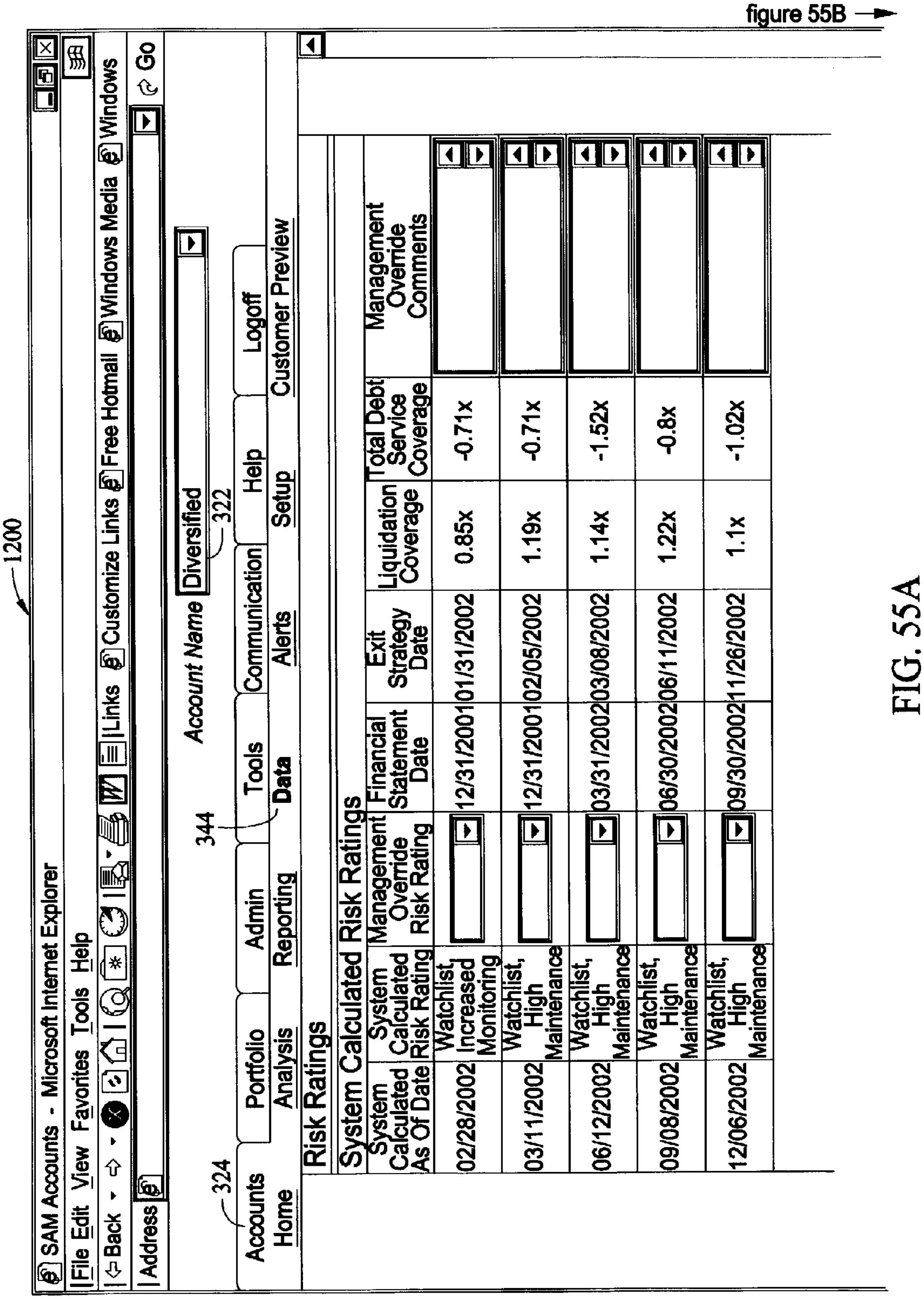
FIGS. 55A and 55B show an example embodiment of a user interface displaying risk ratings for an account in a RMCS.
Figure 55B:
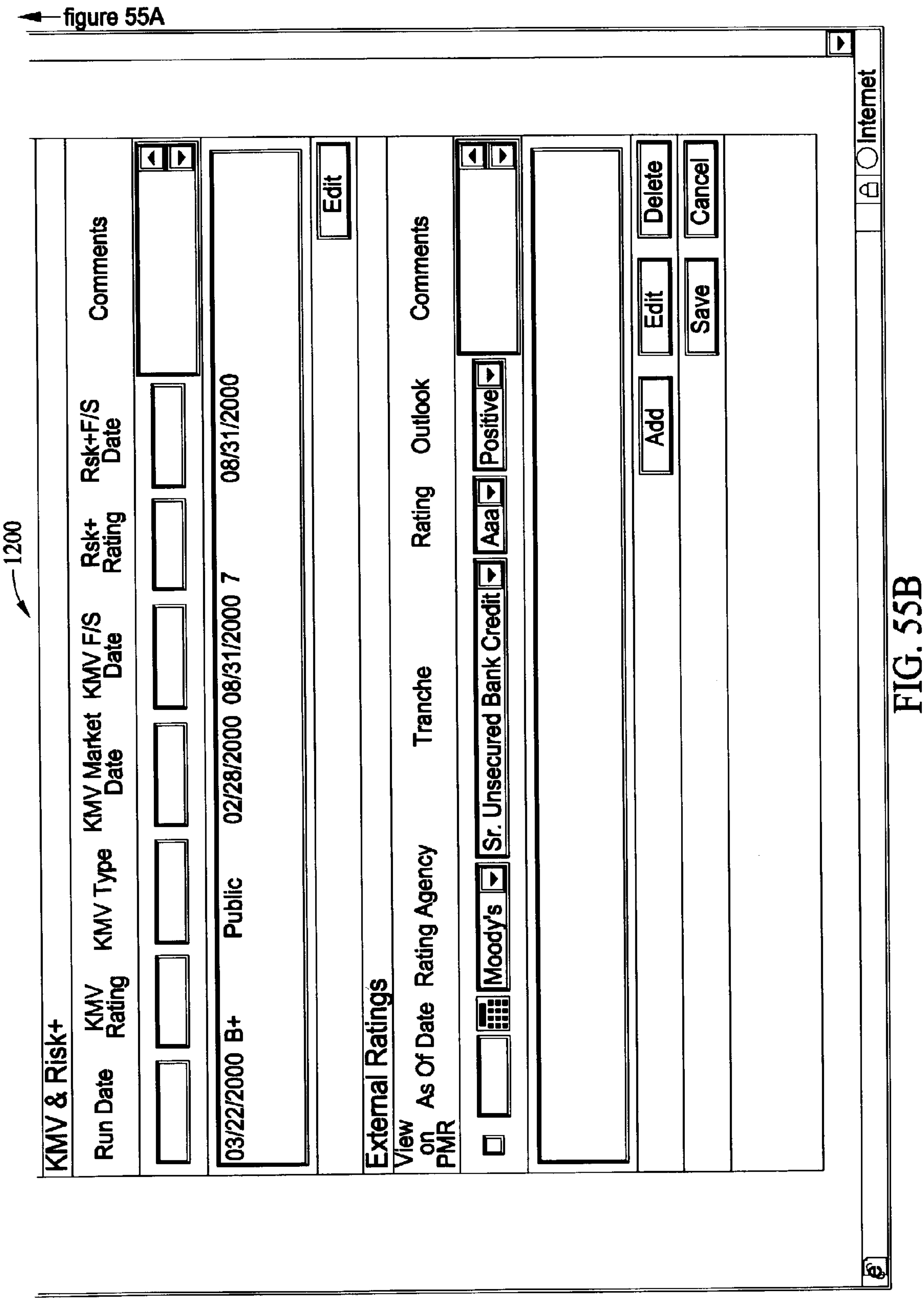

FIGS. 55A and 55B show an example embodiment of user interface 1200 that displays internal and external risk ratings of the Analyzed Business, also referred to as selected account 322. User interface 1200 is displayed after menu tab Accounts 324 and sub-menu tab Data 344 are selected by a user. In the example embodiment, all deals will have an internal auto calculation of credit risk rating as well as facility risk rating, which are each based upon a predetermined criteria. These risk ratings are displayed on user interface 1200.

Figure 56:
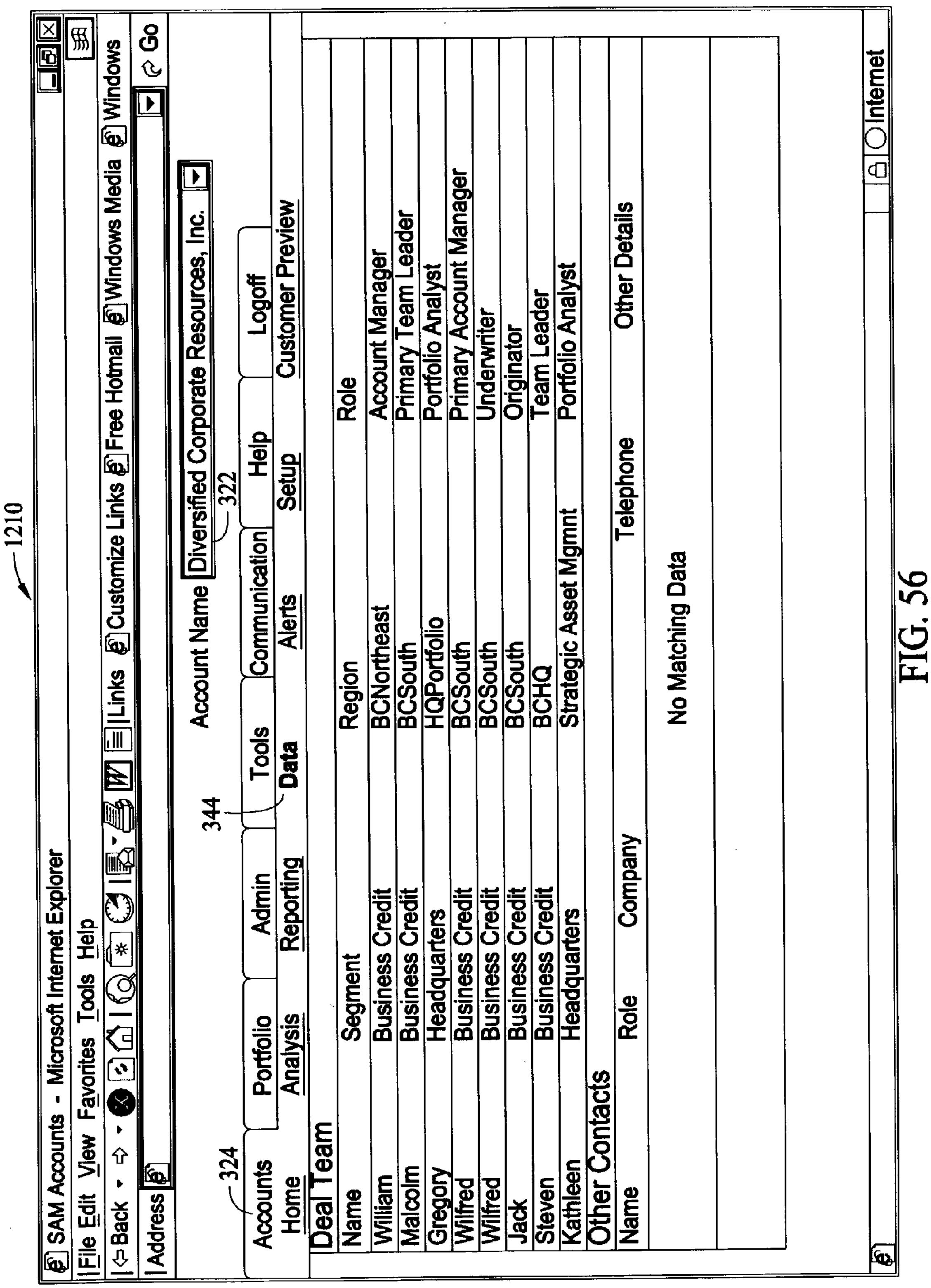
FIG. 56 is an example embodiment of a user interface displaying deal team information for an account in a RMCS.

FIG. 56 is an example embodiment of user interface 1210 that displays the Contacts category of Data Section 344. The Contacts category of Data Section 344 displays the names of those persons involved with selected account 322, also known as the Deal Team. User interface 1210 is displayed after menu tab Accounts 324 and sub-menu tab Data 344 are selected by a user. In the example embodiment, user interface 1210 includes those persons on the deal team for the CF Business that are involved in selected account 322, and each persons role on the deal team. In alternative embodiments, user interface 1210 will also include persons outside of the CF Business that are also involved in selected account 322.

Figure 57:
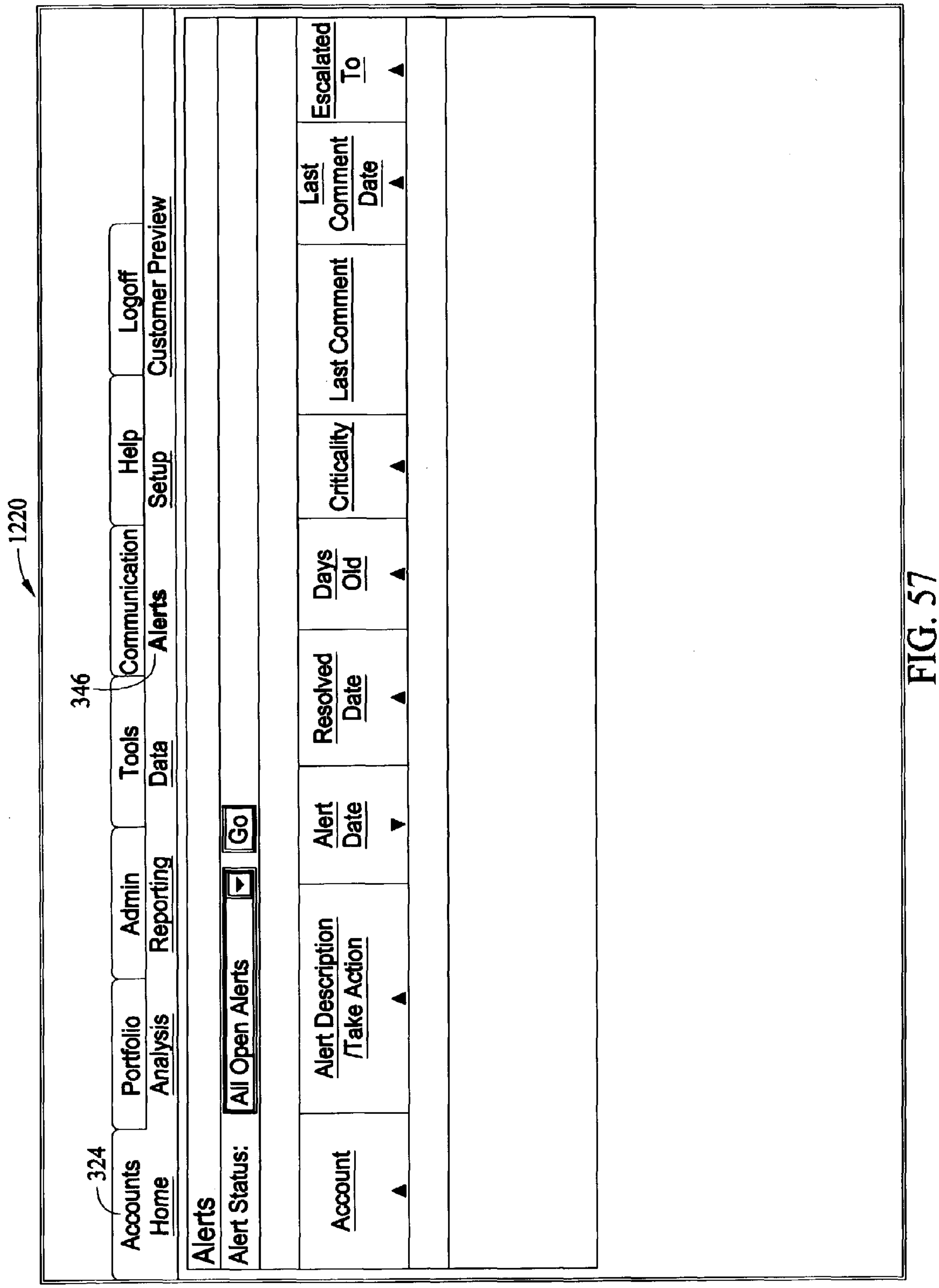
FIG. 57 is an example embodiment of a user interface displaying alerts for accounts in a RMCS.

FIG. 57 is an example embodiment of a user interface 1220 displaying a summary of outstanding alerts for all accounts illustrated on user interface 320 (shown on FIGS. 6A and 6B). User interface 1220 is displayed after menu tab Accounts 324 and sub-menu tab Alerts 346 are selected by a user. In the example embodiment, user interface 1220 displays at least two alerts including: Informative Alerts and Action Alerts. An Informative Alert is an alert sent to an account manager within the CF Business to notify the account manager of possible changes in the overall deal that include, but are not limited to, the credit structure, collateral performance, risk ratings, and financial performance of the Analyzed Business. An Action Alert is an alert that requires action. An Action Alert is sent to the account manager to notify the account manager that the user has been instructed to take some action. Additionally, in the example embodiment, user interface 1220 permits the alerts to be escalated to a series of upper management layers within the CF Business such that, after a specified period of time or when an informative alert has exceeded a certain threshold, an alert will automatically be sent to the various layers of upper management based on the severity of the alert. Also, in the example embodiment, user interface 1220 displays whether an action alert has been resolved or when an informative alert has been acknowledged by an account manager. An action alert may be resolved when the necessary information is received by the CF Business and RMCS 10 (shown in FIG. 1) is updated with respect to the information received. An informative alert may be resolved when the account manager acknowledges the alert. Additionally, with respect to either type of alert, the account manager can record comments that can be tracked over time and senior management can review, add, delete, and evaluate such comments to more senior management or refer them back to the account manger for further follow up.

FIGS. 58A-62B are example embodiments of user interfaces that prompt the user to input information to setup an account, also known as the Analyzed Business, in RMCS 10 (shown in FIG. 1). In the example embodiment and as explained below, these user interfaces drive numerous calculations and decisions made by RMCS 10.

Figure 58A:
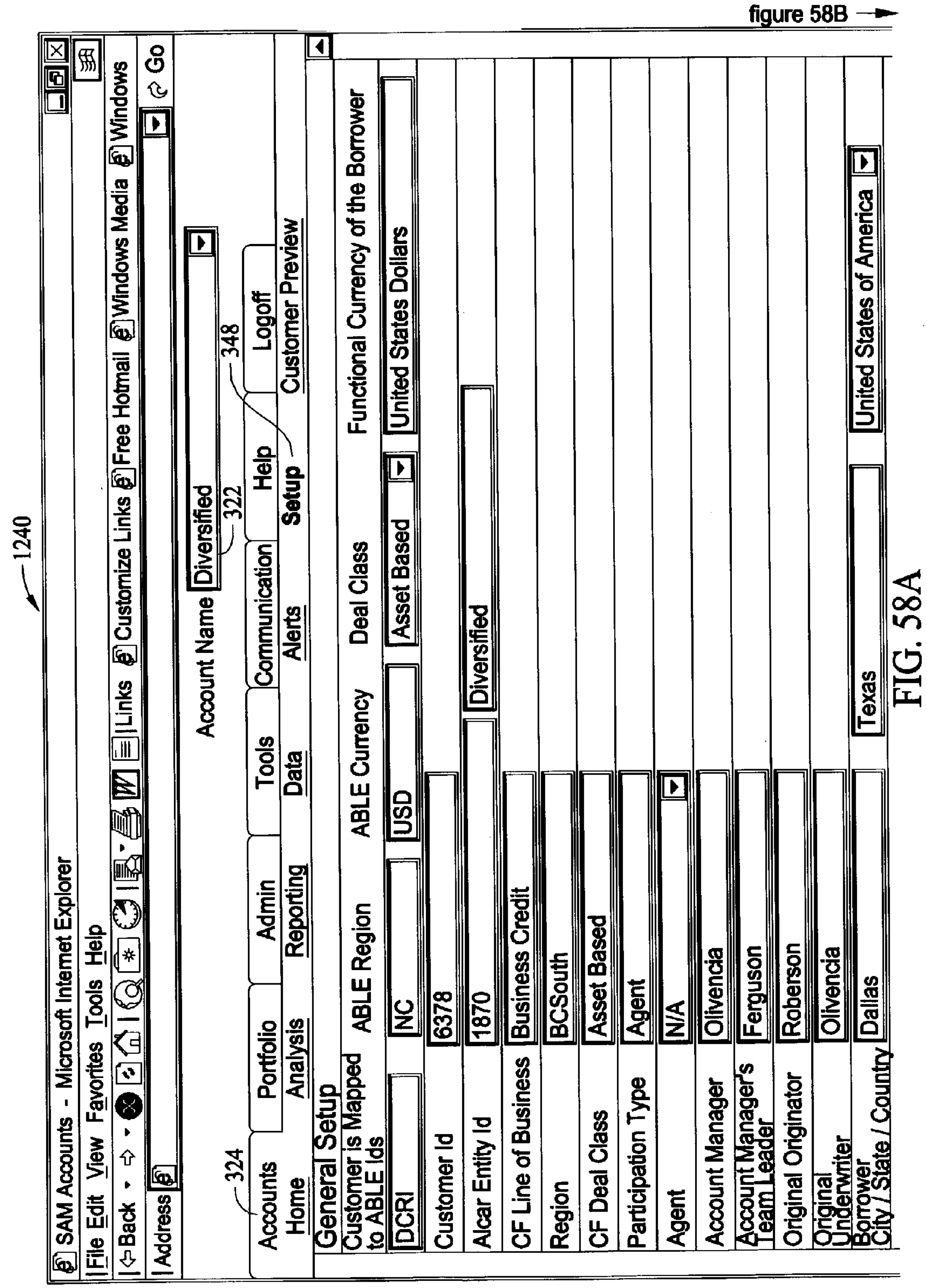
FIGS. 58A, 58B and 58C show an example embodiment of a user interface displaying general setup information for an account in a RMCS.
Figure 58B:
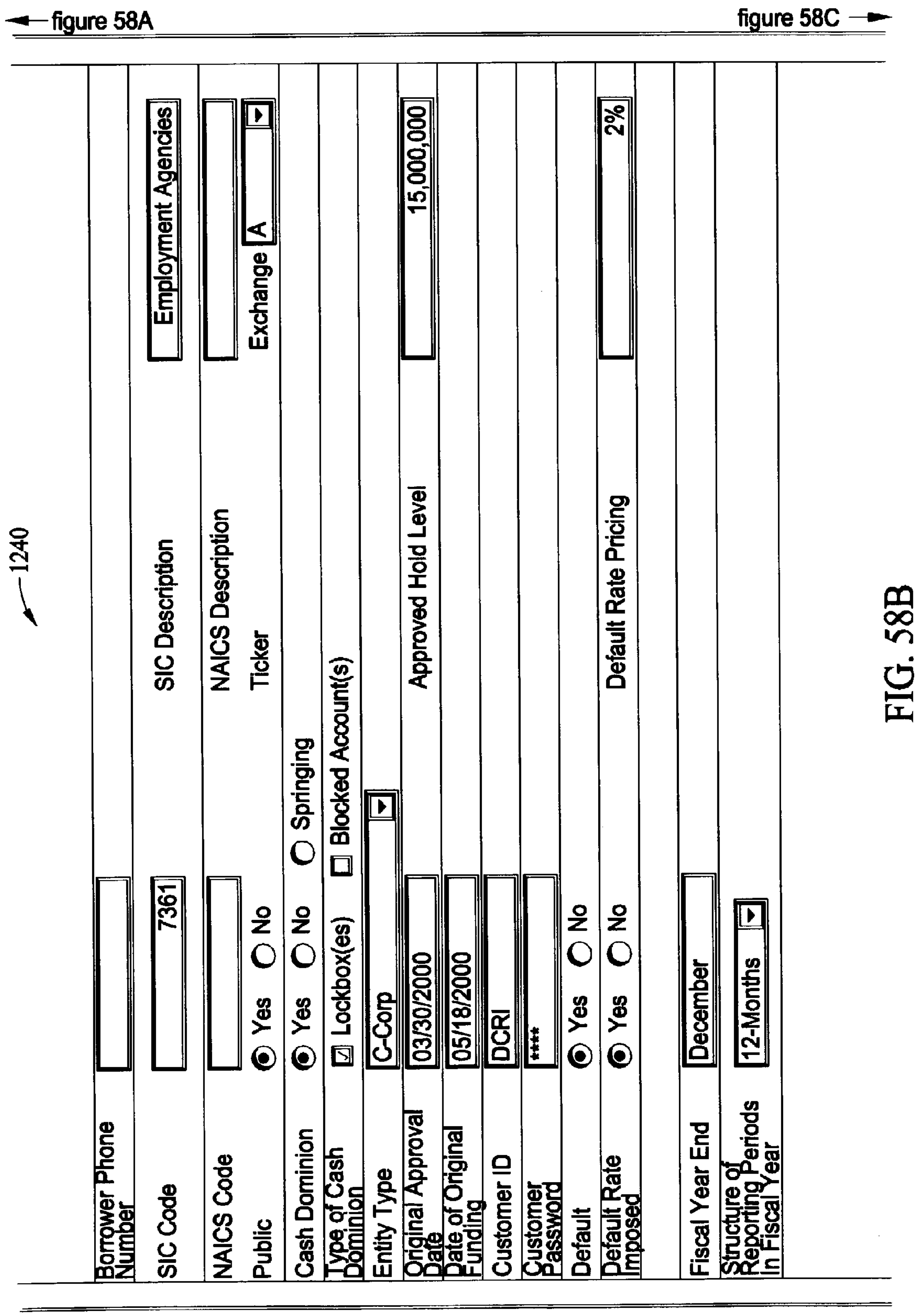
Figure 58C:
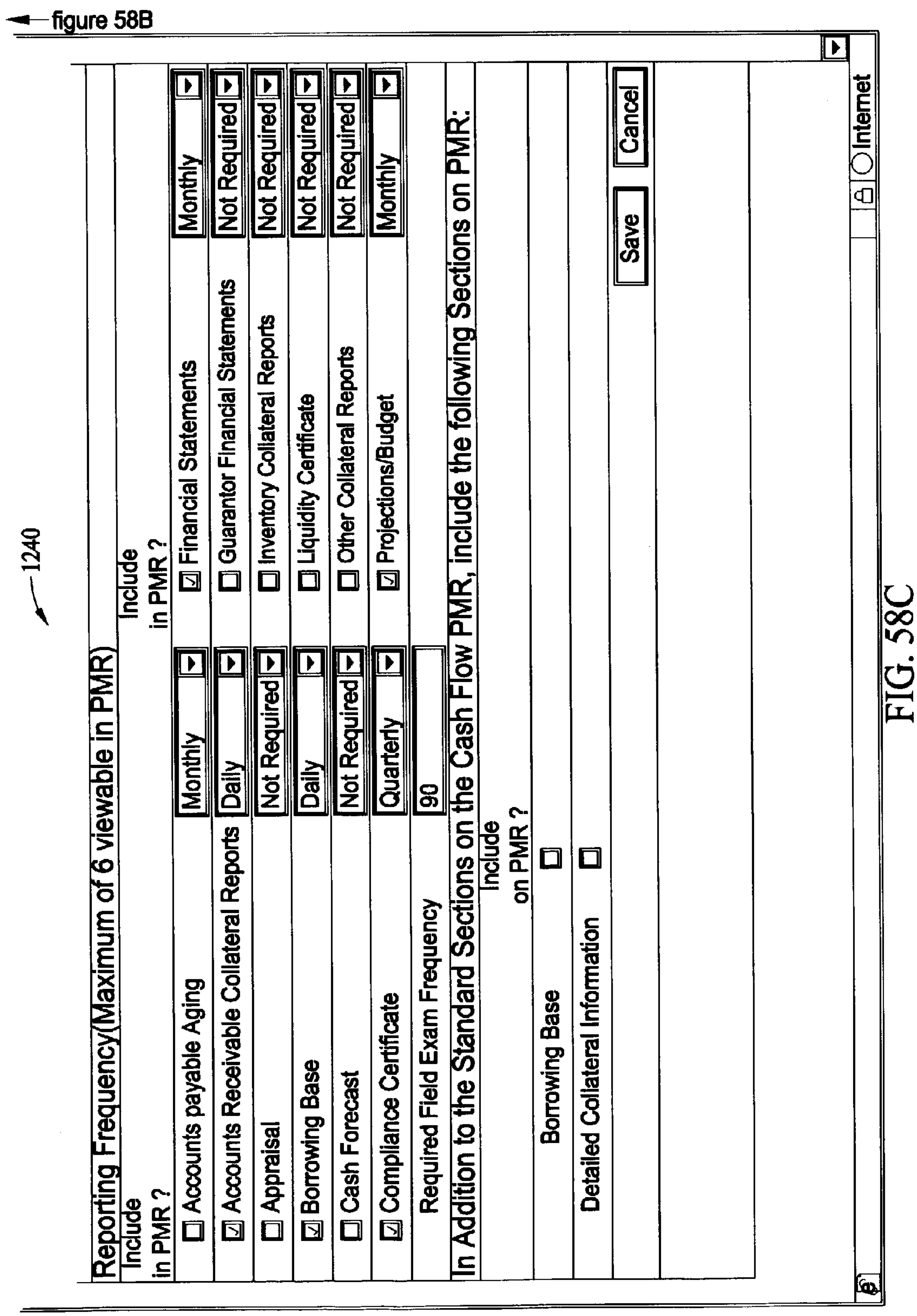

FIGS. 58A, 58B and 58C show an example embodiment of user interface 1240 that displays a screen to be filled out by a user when starting an account setup process. User interface 1240 also displays general information about the account. User interface 1240 is displayed after menu tab Accounts 324 and sub-menu tab Setup 348 are selected by a user. User interface 1240 also includes a navigation bar (not shown) along the left side of user interface 1240 that is common to Setup Section 348.

Figure 59:
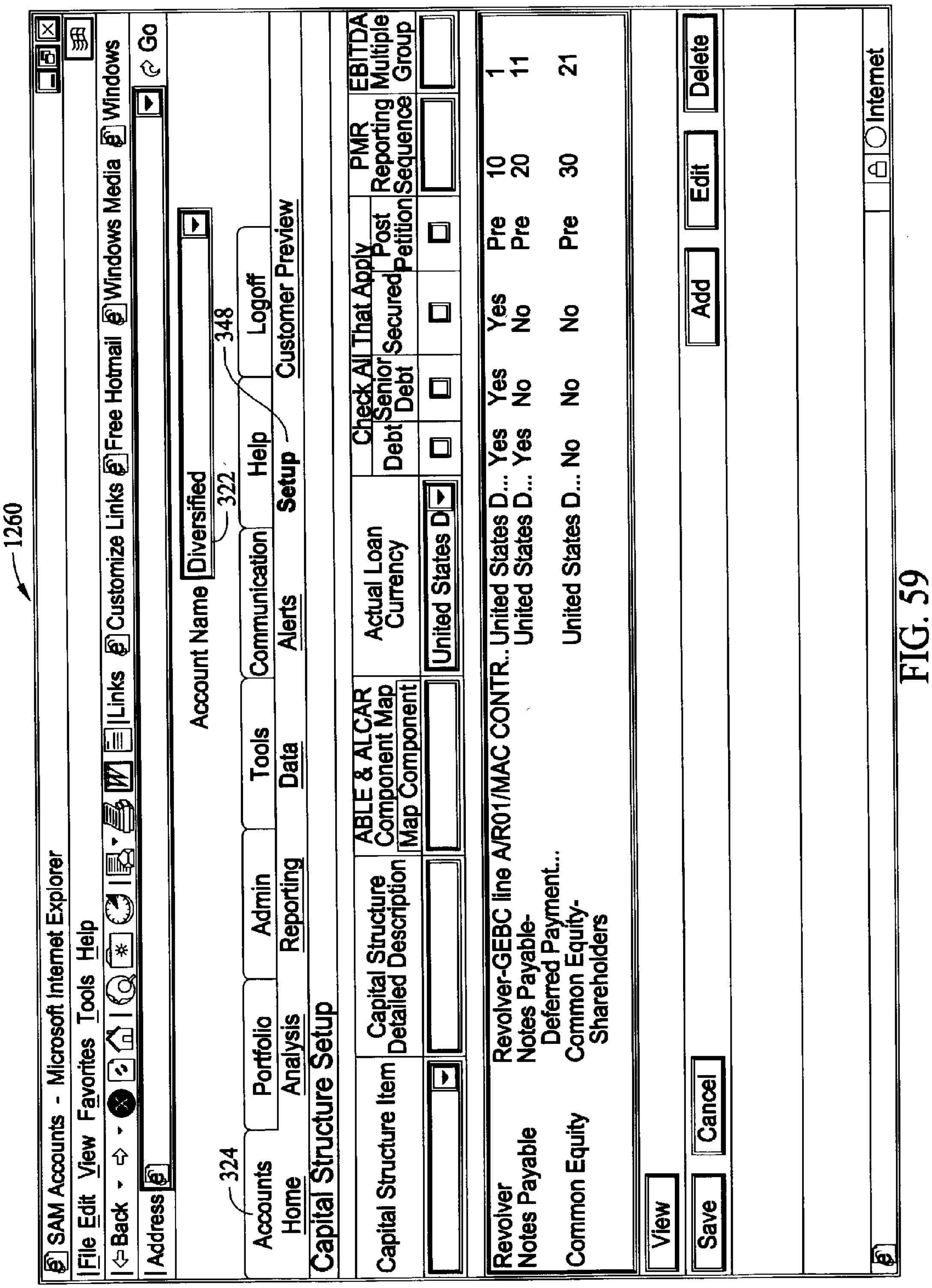
FIG. 59 is an example embodiment of a user interface displaying capital structure setup information for an account in a RMCS.

FIG. 59 is an example embodiment of user interface 1260 that displays a screen for setting up an Analyzed Business's capital structure. User interface 1260 is displayed after menu tab Accounts 324 and sub-menu tab Setup 348 are selected by a user. Actual capital structure amounts are input into RMCS 10 (shown in FIG. 1) through user interface 900 (shown in FIGS. 37A and 37B) over time as actual financial results are reported. User interface 1260 also includes an ABLE & ALCAR Component Map button that enables a user to map information stored within at least one of ABLE, Alcar®, and RMCS 10 (shown in FIG. 1). In the example embodiment, after a user clicks the ABLE & ALCAR Component Map button, a pop-up screen is displayed (not shown in FIG. 59) that enables the user to link information stored in at least one of ABLE, Alcar®, and RMCS 10 such that the information may be accessed, displayed, and utilized by RMCS 10.

FIGS. 58-62 are example embodiments of user interfaces that prompt the user to input information to setup an account, also known as the Analyzed Business, in RMCS 10 (shown in FIG. 1). In the example embodiment and as explained below, these user interfaces drive numerous calculations and decisions made by RMCS 10.

FIG. 58 is an example embodiment of user interface 1240 that displays a screen to be filled out by a user when starting an account setup process. User interface 1240 also displays general information about the account. User interface 1240 is displayed after menu tab Accounts 324 and sub-menu tab Setup 348 are selected by a user. User interface 1240 also includes a navigation bar (not shown) along the left side of user interface 1240 that is common to Setup Section 348.

FIG. 59 is an example embodiment of user interface 1260 that displays a screen for setting up an Analyzed Business's capital structure. User interface 1260 is displayed after menu tab Accounts 324 and sub-menu tab Setup 348 are selected by a user. Actual capital structure amounts are input into RMCS 10 (shown in FIG. 1) through user interface 900 (shown in FIG. 37) over time as actual financial results are reported. User interface 1260 also includes an ABLE & ALCAR Component Map button that enables a user to map information stored within at least one of ABLE, Alcar®, and RMCS 10 (shown in FIG. 1). In the example embodiment, after a user clicks the ABLE & ALCAR Component Map button, a pop-up screen is displayed (not shown in FIG. 59) that enables the user to link information stored in at least one of ABLE, Alcar®, and RMCS 10 such that the information may be accessed, displayed, and utilized by RMCS 10.

Figure 60:
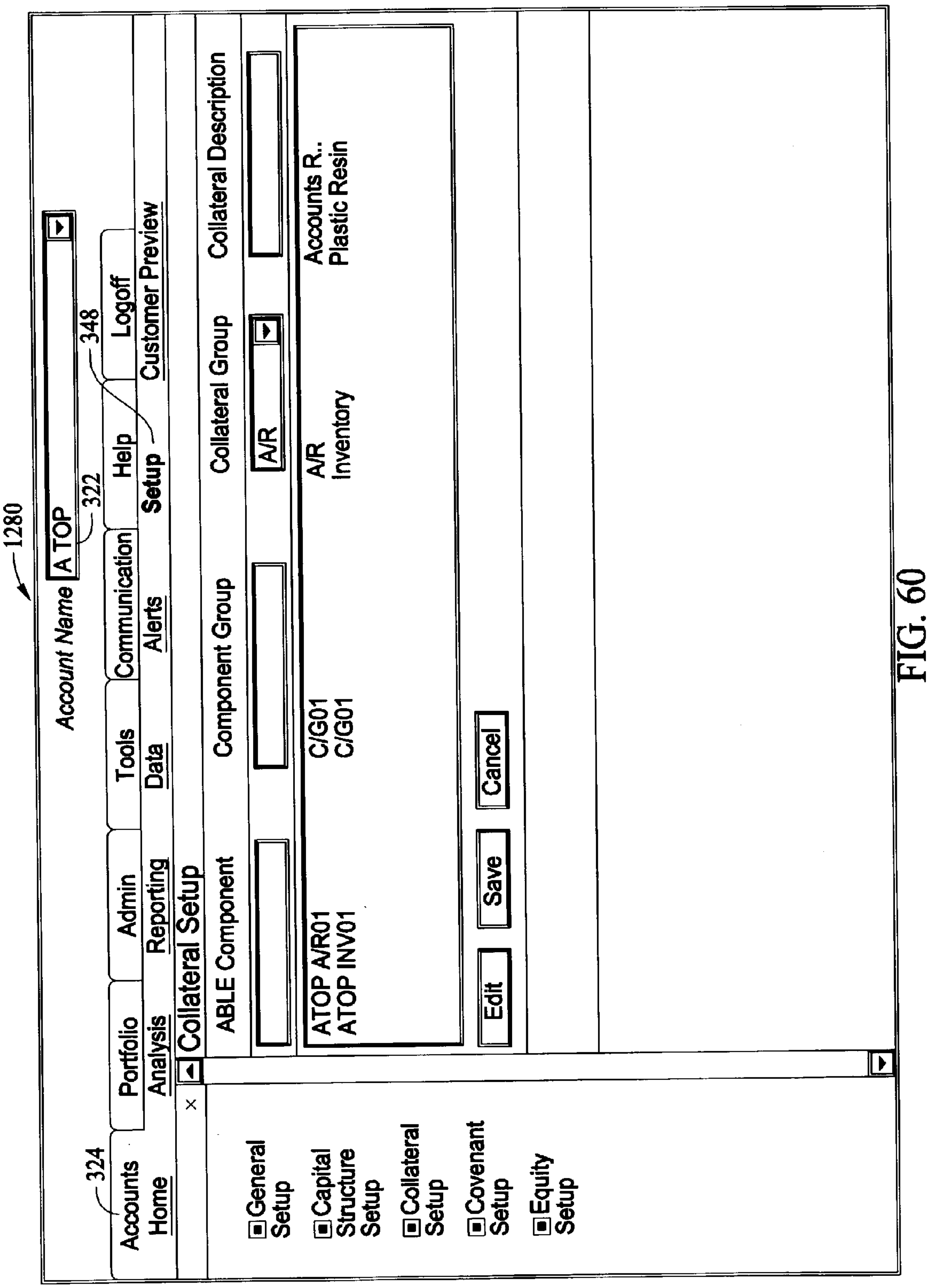
FIG. 60 is an example embodiment of a user interface displaying collateral setup information for an account in a RMCS.

FIG. 60 is an example embodiment of user interface 1280 that displays a screen for setting up an identification of each sub-ledger component by a collateral group. User interface 1280 is displayed after menu tab Accounts 324 and sub-menu tab Setup 348 are selected by a user. In the example embodiment, the subledger system shown is ABLE, a known and commercially available software program. Although ABLE is shown in the example embodiment, RMCS 10 does not require ABLE as it sub-ledger system. Rather, RMCS 10 can utilize and interface with a plurality of known and commercially available sub-ledger systems.

Figure 61:
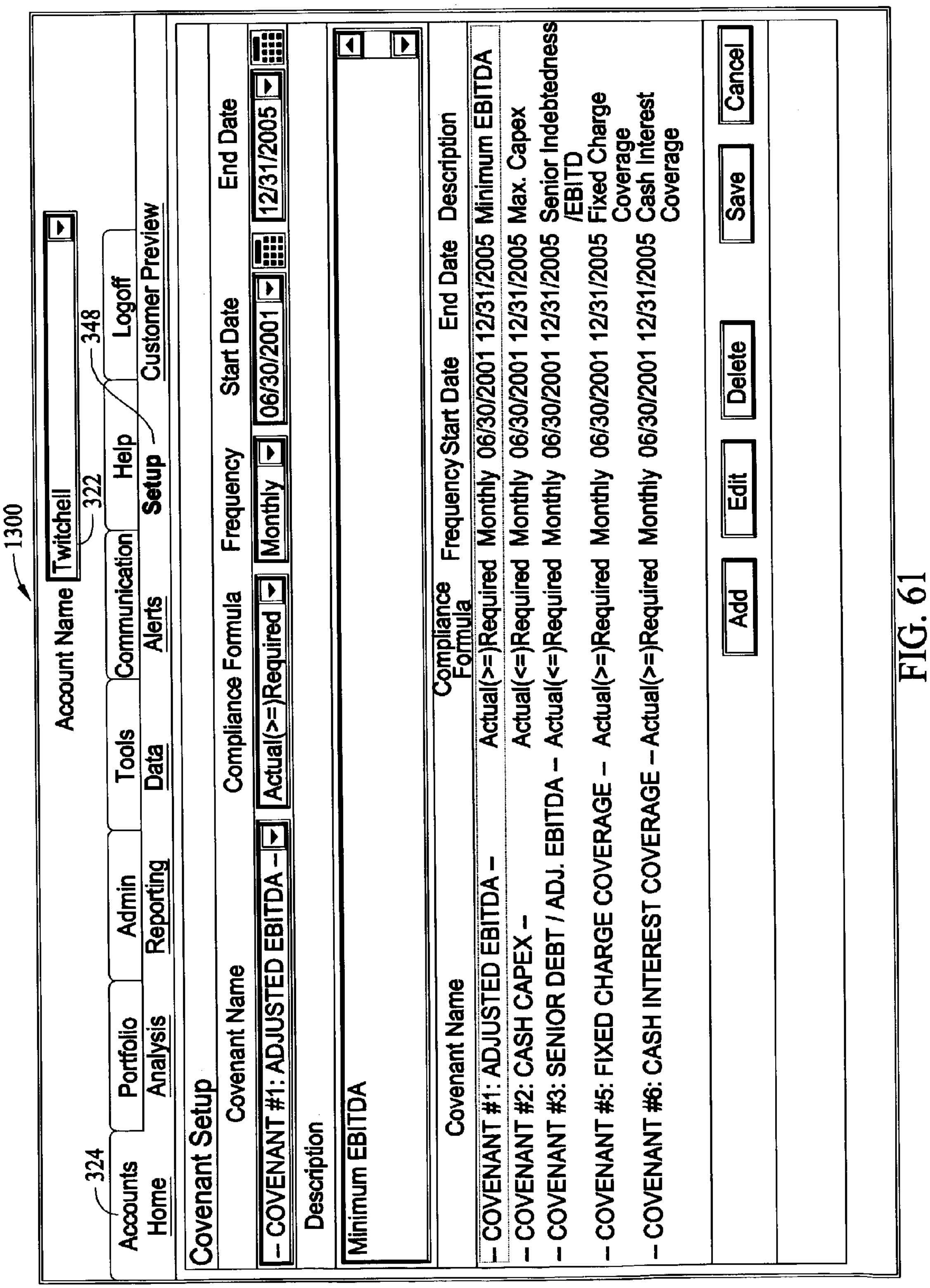
FIG. 61 is an example embodiment of a user interface displaying covenant setup information for an account in a RMCS.

FIG. 61 is an example embodiment of user interface 1300 that illustrates the covenants for a loan for a selected account 322 User interface 1300 is displayed after menu tab Accounts 324 and sub-menu tab Setup 348 are selected by a user. In the example embodiment, all covenants should be setup in RMCS 10 (shown in FIG. 1) during the initial setup process. Actual covenant levels are input into RMCS 10 through user interface 940 (shown in FIGS. 38A and 38B) over time as the actual financial results are reported.

Figure 62A:
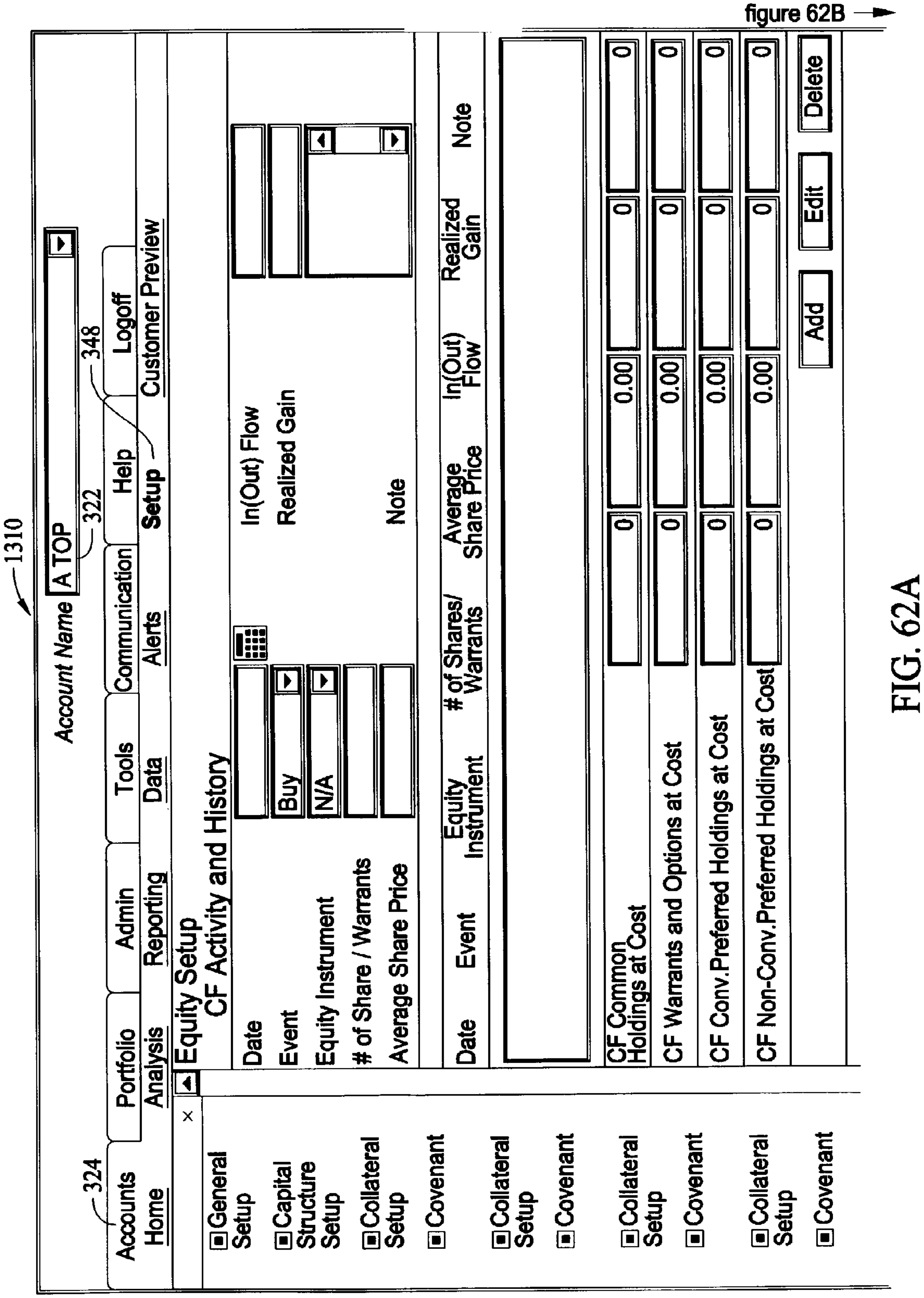
FIGS. 62A and 62B show an example embodiment of a user interface displaying equity setup information and CF Business activity and history for an account in a RMCS.
Figure 62B:
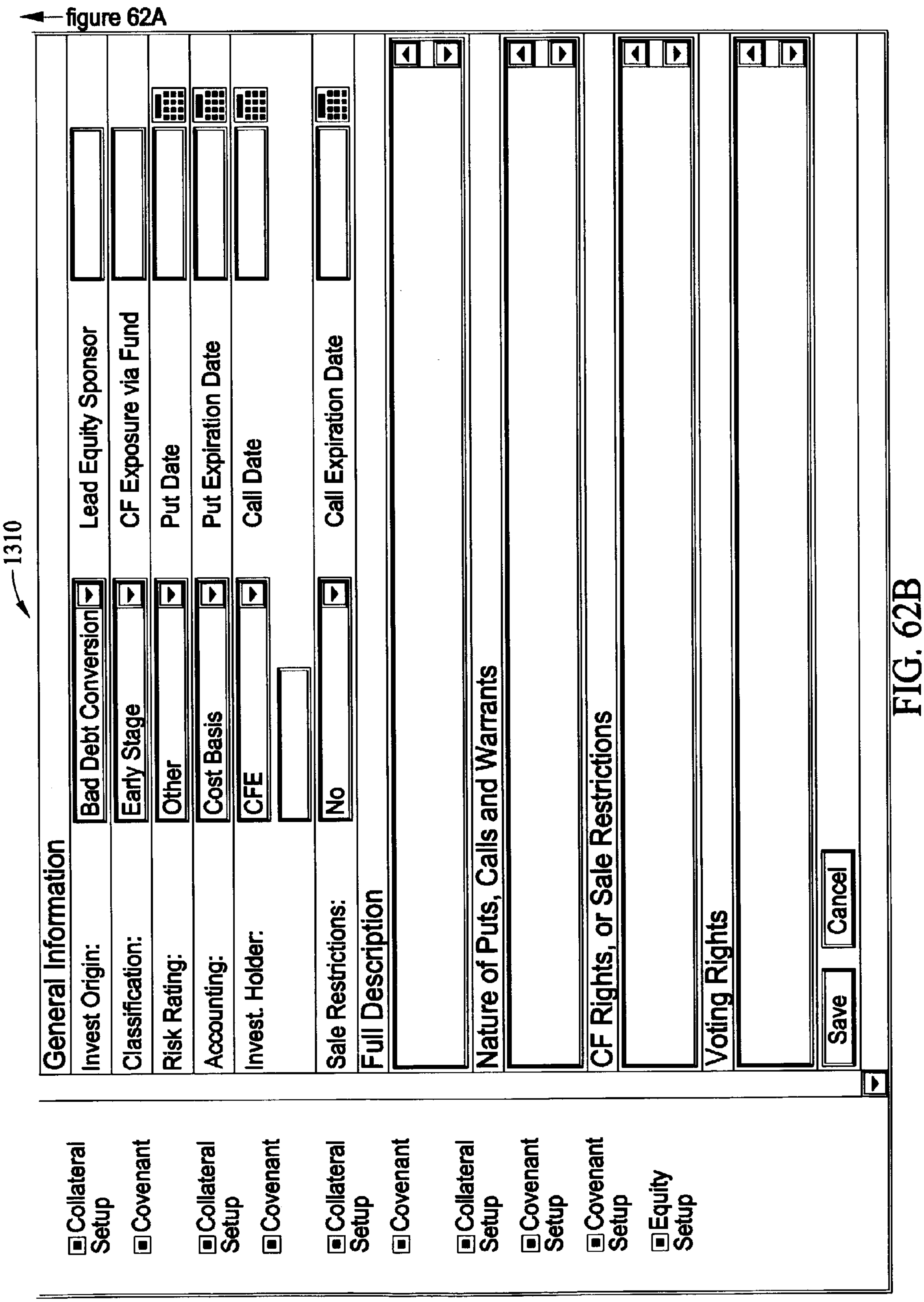

FIGS. 62A and 62B show an example embodiment of user interface 1310 that displays a screen to be completed for deals involving equity investments for selected account 322. User interface 1310 is displayed after menu tab Accounts 324 and sub-menu tab Setup 348 are selected by a user. In the example embodiment, user interface 1310 enables a user to track all transactions involving at least one of common stock, non-convertible preferred stock, convertible preferred stock, a Limited Liability Corporation (LLC), a Limited Partnership (LP) interest, warrants, and options. User interface 1310 does not have to be completed for equity funds.

Figure 63:
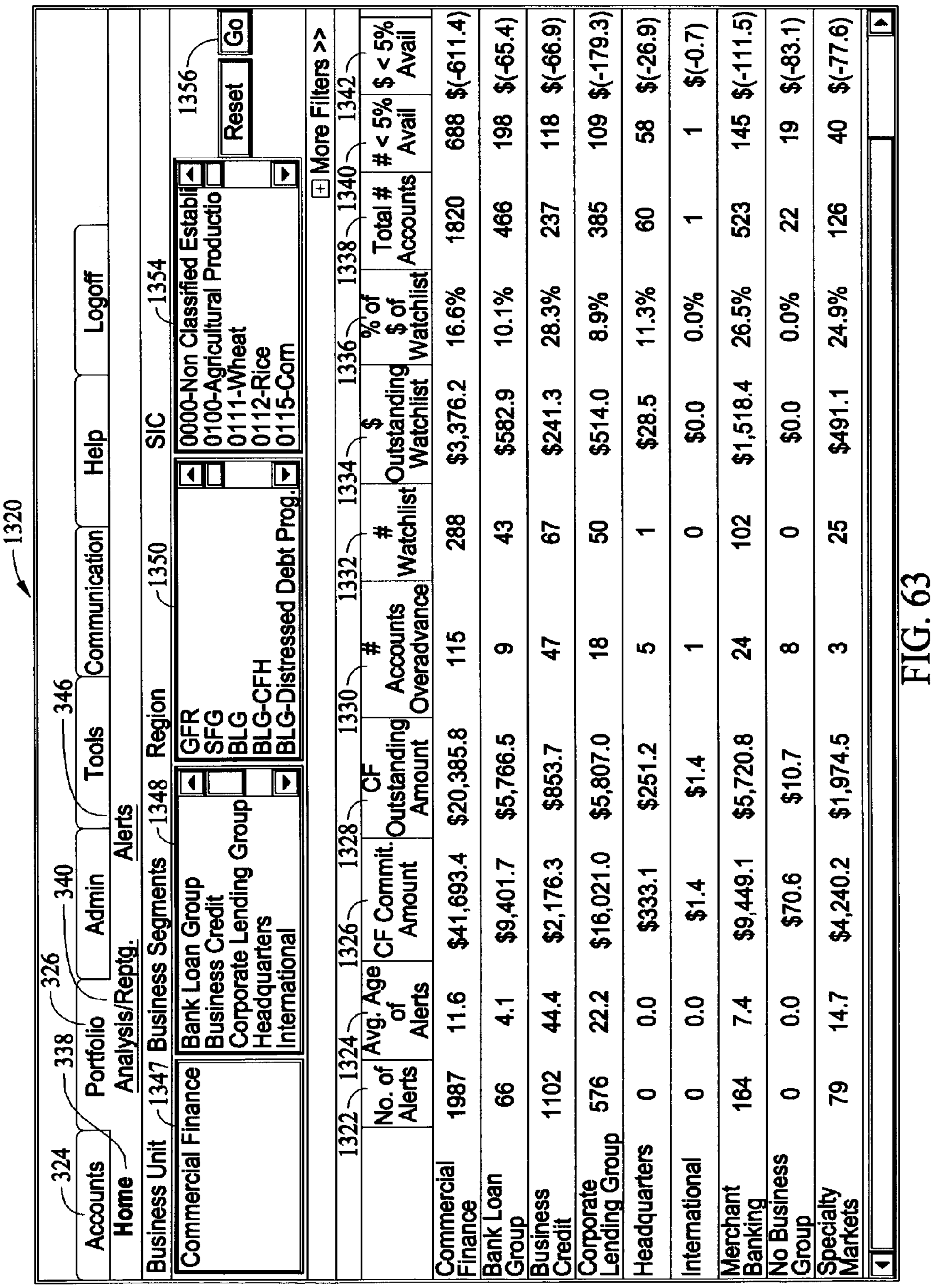
FIG. 63 is an example embodiment of a user interface displaying a portfolio home page in a RMCS.

FIG. 63 is an example embodiment of a user interface 1320 displaying a home page of RMCS 10 (shown in FIG. 1) after a user has logged onto RMCS 10, and selected menu tab Portfolio 326 and sub-menu tab Home 338. User interface 1320 illustrates a summary of RM information 106 (shown in FIG. 3) for all accounts 322 (shown in FIGS. 6A and 6B), or Analyzed Businesses, within the Commercial Finance Business Unit for which the user is responsible as an account manager or a manager of account managers (i.e., a Team Leader) or other upper management. As such, the most senior management of the CF Business have access to an entire account portfolio of the organization. In an example embodiment, for team leaders, user interface 1320 displays all accounts for all of the account managers that the team leader manages. For portfolio mangers or above, user interface 1320 displays all accounts associated with the team leaders they manage. In the example embodiment, user interface 1320 also displays sub-menu tabs located below menu tab Portfolio 326. The sub-menu tabs include at least one of Home 338, Analysis/Report 340, and Alerts 346. The sub-menu tabs further enable the user to navigate RMCS 10.

When menu tab Portfolio 326 and sub-menu tab Home 338 are selected, user interface 1320 displays a summary of RM information 106 in tabular form for each accounts 322 for which the user is responsible. In the example embodiment, the table includes at least the following column headers: No. of Alerts 1322, Avg. Age of Alerts 1324, CF Commit Amount 1326, CF Outstanding Amount 1328, # Accounts Overadvance 1330, # Watchlist 1332, $ Outstanding Watchlist 1334, % of $ of Watchlist 1336, Total # Accounts 1338, #<5% Avail 1340, $<5% Avail 1342, # Amendments (not shown), and # Default Accounts 1346 (not shown). In the example embodiment, each column is sortable by ascending or descending order. Additionally, each column header is a link, when selected, displays another screen that provides additional information relating to the selected column header. In the example embodiment, user interface 1320 also displays a Business Unit data box 1347, a Business Segment data box 1348, a Region data box 1350, a SIC data box 1354, and a Go button 1356.

These data boxes (e.g., Business Unit data box 1347, Business Segment data box 1348, Region data box 1350, and SIC data box 1354) are "filters" that allow the user to drill down on information displayed on user interface 1320. As discussed below, these filters are also displayed on numerous other user interfaces with RMCS 10 so that a user may drill down on information displayed on the particular user interface.

RMCS 10 allows a business engaging in complex deals, such as commercial financing, mergers, acquisitions and real estate transactions, to collect, manage, store and disseminate RM information among internal deal teams and selected outside deal teams to facilitate a more accurate and efficient analysis of the risks associated with a deal and to facilitate management of workload and personnel. In one embodiment, RMCS 10 also includes a unit of measure assigned to each deal within RMCS 10 wherein the unit of measure, referred to herein as a deal workload factor, represents an amount of work a user may be required to devote to a deal and is based on at least one of a type of the deal, risks associated with the deal, and a progress status of the deal. As a deal is assigned to a user within RMCS 10, the deal workload factor assigned to that deal is also assigned to the user. In one embodiment, RMCS 10 totals the workload amount for each user, based on each deal assigned to that user, and displays it to a predesignated party within RMCS 10. The predesignated party may designate a maximum workload amount that may be assigned to any one user. The workload of each user may then be managed by RMCS 10.

Figure 64:
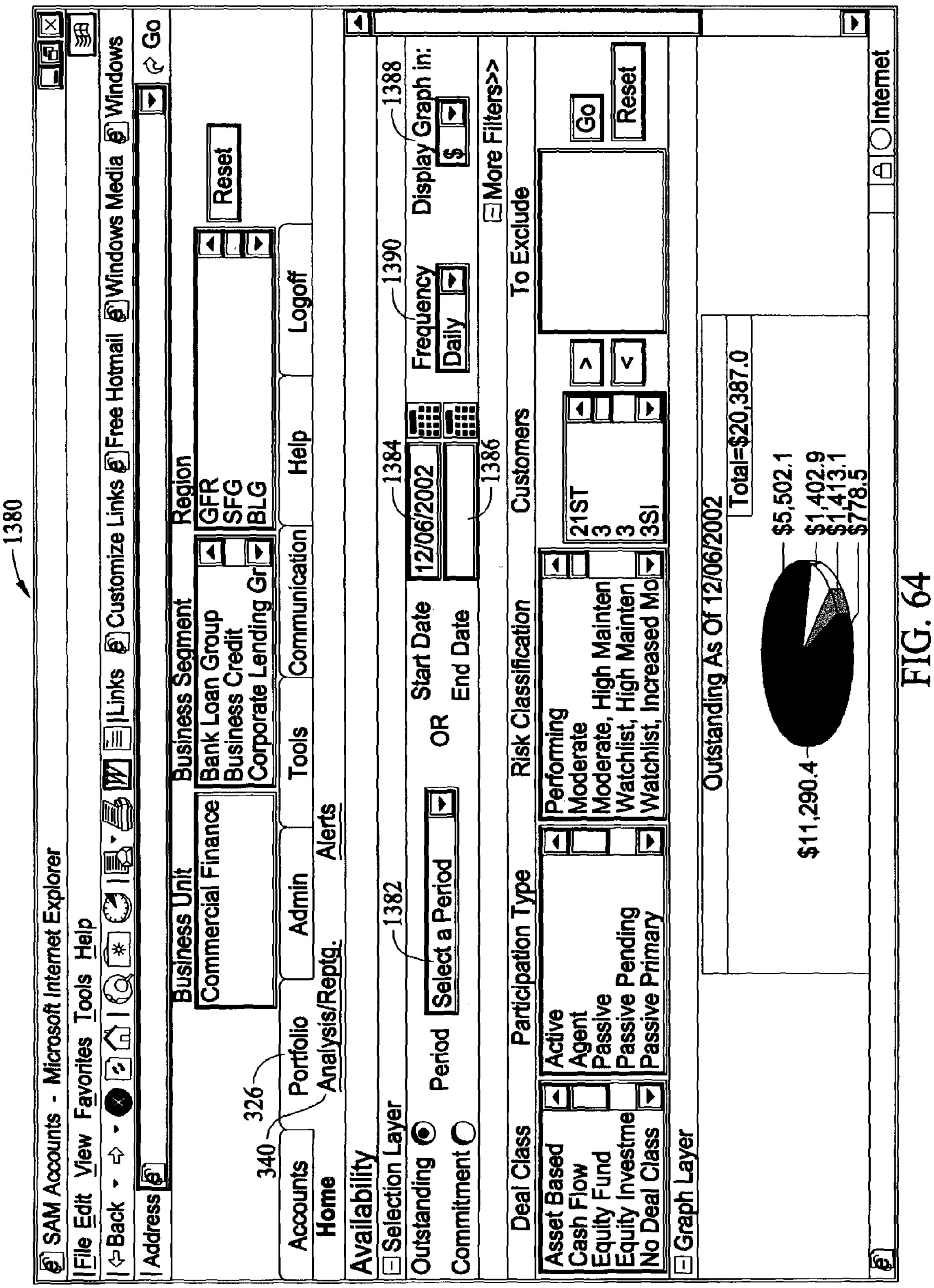
FIG. 64 is an example embodiment of a user interface displaying availability information for a portfolio in a RMCS.

FIG. 64 is an example embodiment of a user interface 1380 displaying an analysis of availability for a portfolio, which is displayed after menu tab Portfolio 326 and sub-menu tab Analysis/Report 340 are selected by a user or after Availability is selected from a navigation bar (not shown in FIG. 64) located along the left side of user interface 1380. User interface 1380 displays a graphical or tabular analyses of availability for the selected Business Segment Name pull-down list. The analysis enables the user to assess liquidity trends being experienced across the portfolio. In the example embodiment, user interface 1380 displays a Period pull-down field 1382, a Start Date data field 1384, an End Date field 1386, a Display. Graph In pull-down field 1388, and a Frequency pull-down field 1390. User interface 1380 also displays the filters at the top of the page, including a Business Unit filter, a Business Segment filter and a Region filter. Additional filters are also displayed on user interface 1380 including a Deal Class filter, a Participation Type filter, a Risk Classification filter, a Customers filter, and a To Exclude filter.

User interface 1380 displays financial information in at least one of tabular and graphical form. In the example embodiment, a pie chart is displayed. The financial information supporting the pie chart may also be displayed by clicking on the pie chart or by clicking a particular piece of the pie chart. Additionally, in the example embodiment, tabular illustrations of the financial information are also active such that a user may click on a link included within a tabular illustration to drill down on the financial information supporting that specific entry.

Figure 65A:
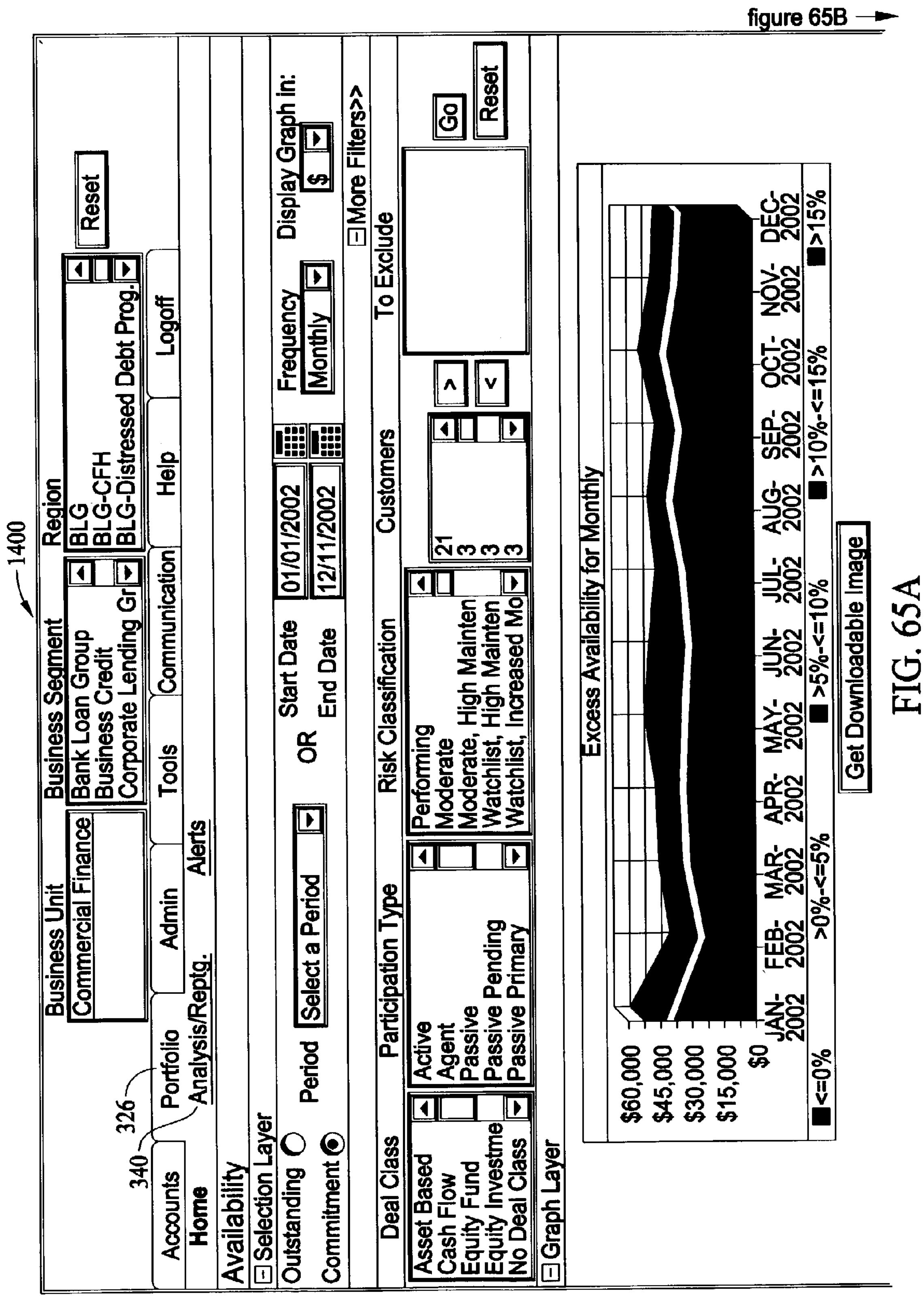

FIGS. 65A and 65B show an example embodiment of a user interface 1400 that also displays an analysis of availability for a portfolio, which is displayed after menu tab Portfolio 326 and sub-menu tab Analysis/Report 340 are selected by a user. User interface 1400 displays at least one of graphical and tabular analyses of availability for the portfolio. The analysis enables the user to assess liquidity trends being experienced across a selected portfolio. User interface 1400 also includes the filters at the top of the page, including a Business Unit filter, a Business Segment filter and a Region filter, that enable a user to control the information displayed. Additional filters are also displayed on user interface 1400 including a Deal Class filter, a Participation Type filter, a Risk Classification filter, a Customers filter, and a To Exclude filter. The filters enable the user to control the information displayed on user interface 1400.

Figure 66A:
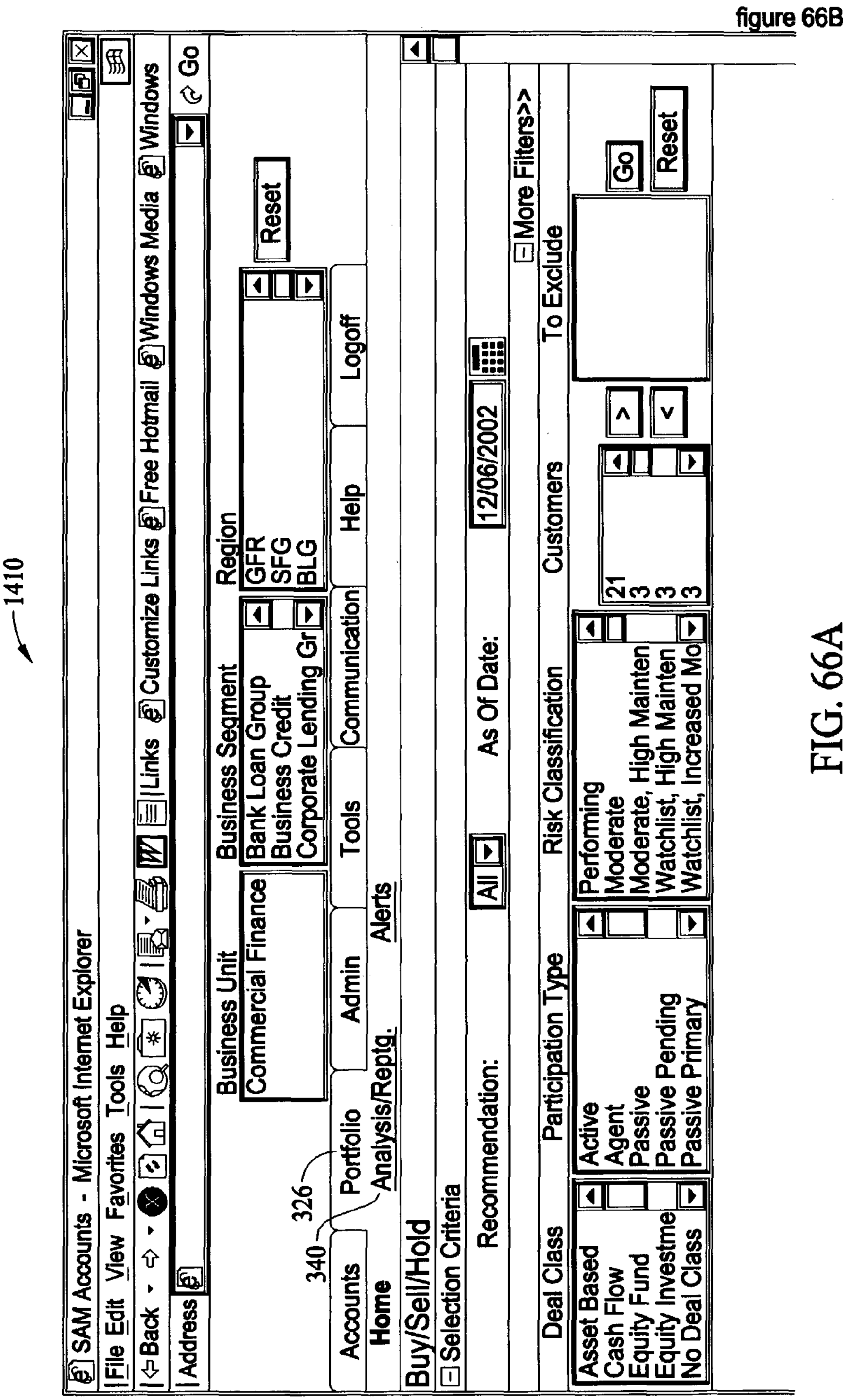

FIGS. 66A and 66B show an example embodiment of a user interface 1410 displaying a summary of buy, sell, and hold recommendations made in the portfolio of a selected Business Unit, Business Segment, and Region. User interface 1410 is displayed after menu tab Portfolio 326 and sub-menu tab Analysis/Report 340 are selected by a user. The analysis enables the user to review buy, sell, hold recommendations across a selected portfolio. User interface 1410 also includes the filters at the top of the page, including a Business Unit filter, a Business Segment filter and a Region filter, that enable a user to control the information displayed. Additional filters are also displayed on user interface 1410 including a Deal Class filter, a Participation Type filter, a Risk Classification filter, a Customers filter, and a To Exclude filter. The filters enable the user to control the information displayed on user interface 1410.

Figure 67:
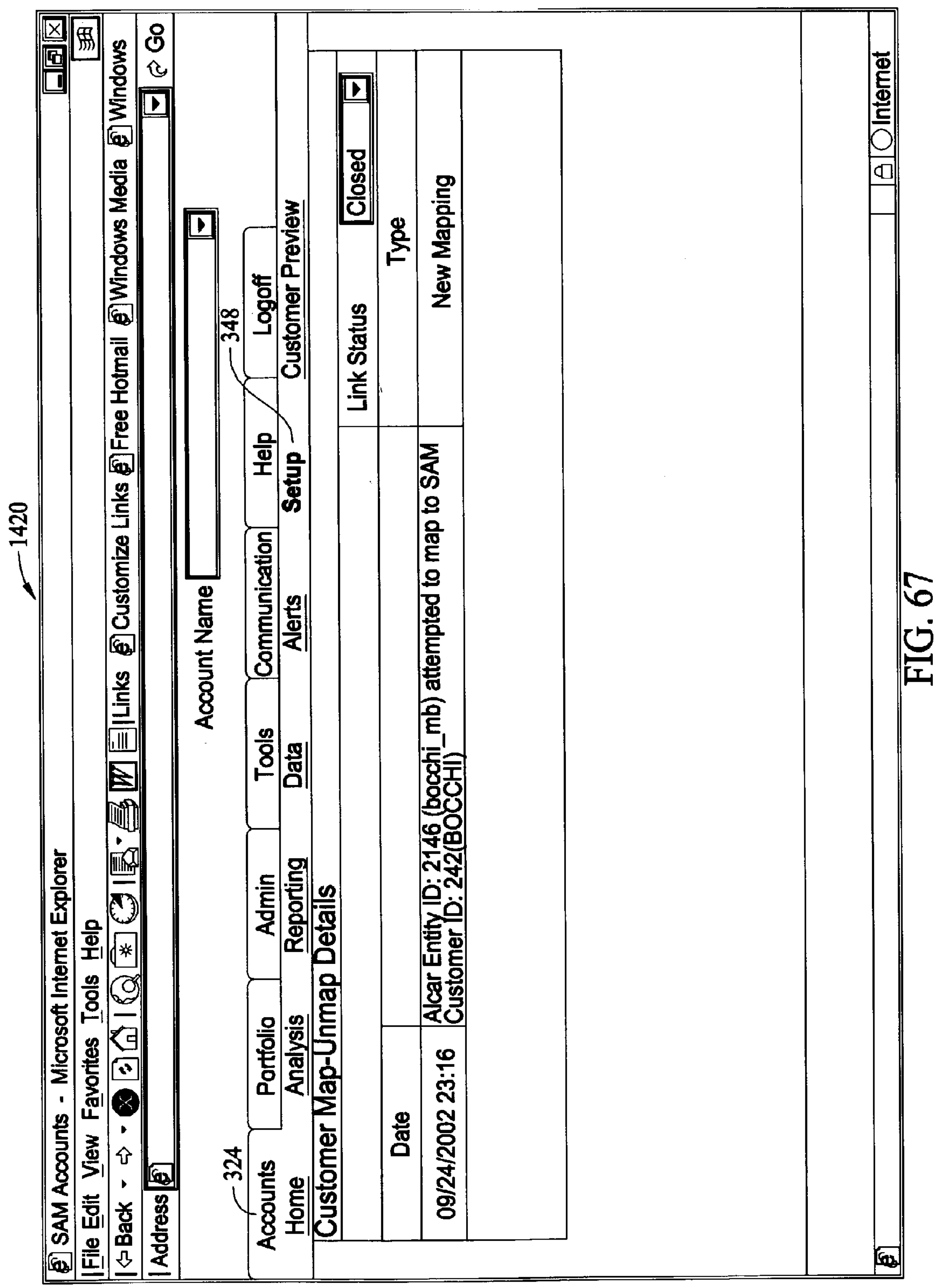
FIG. 67 is an example embodiment of a user interface displaying customer map/unmap details for a portfolio in a RMCS.

FIG. 67 is an example embodiment of a user interface 1420 displaying a customer map-unmap details page after menu tab Accounts 324 and sub-menu tab Setup 348 are selected by a user. User interface 1420 displays the mapping of an entry between RMCS 10 (shown in FIG. 1) and Alcar®.

Figure 68A:
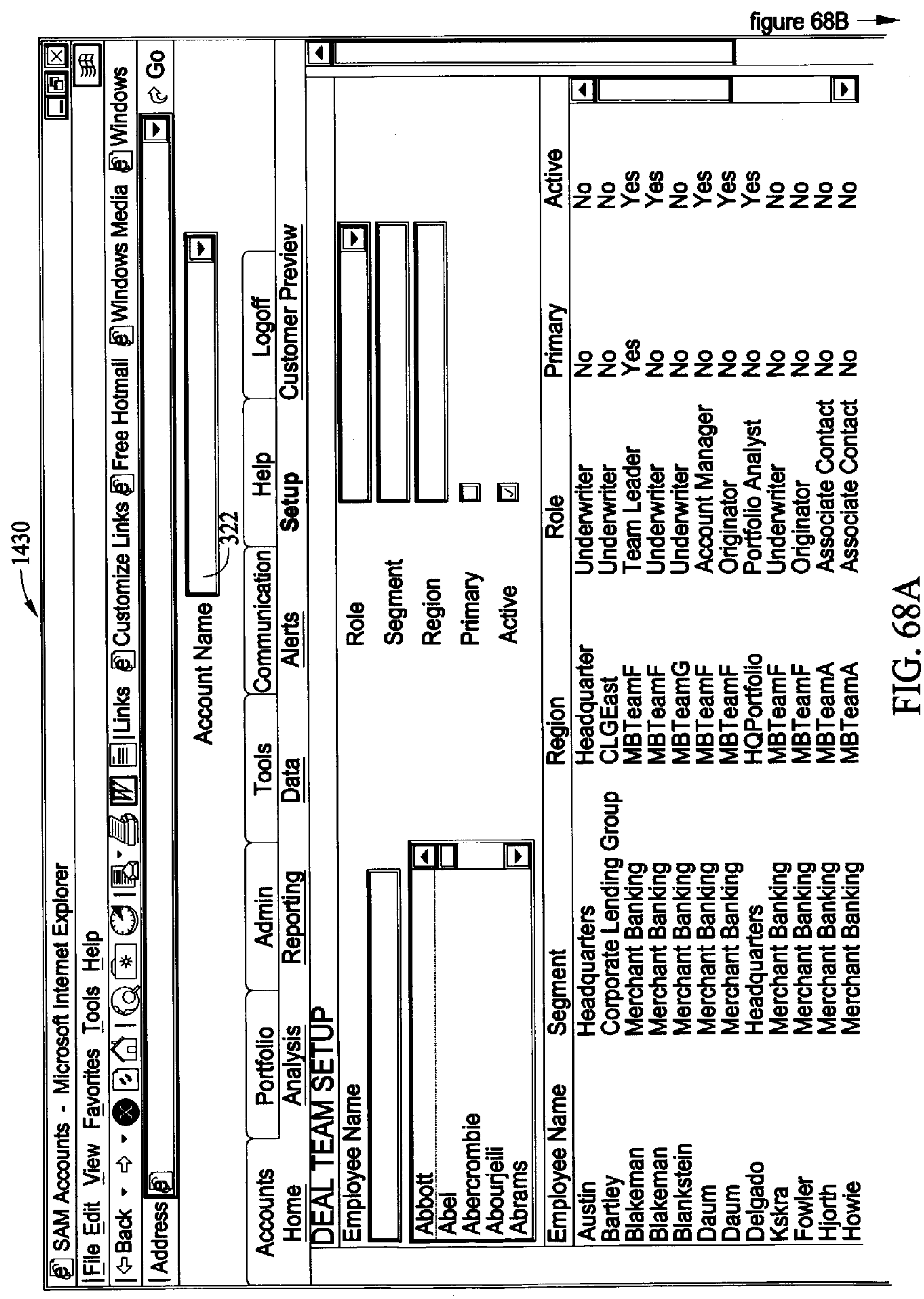
FIGS. 68A and 68B show an example embodiment of a user interface displaying deal team setup information for an account in a RMCS.
Figure 68B:
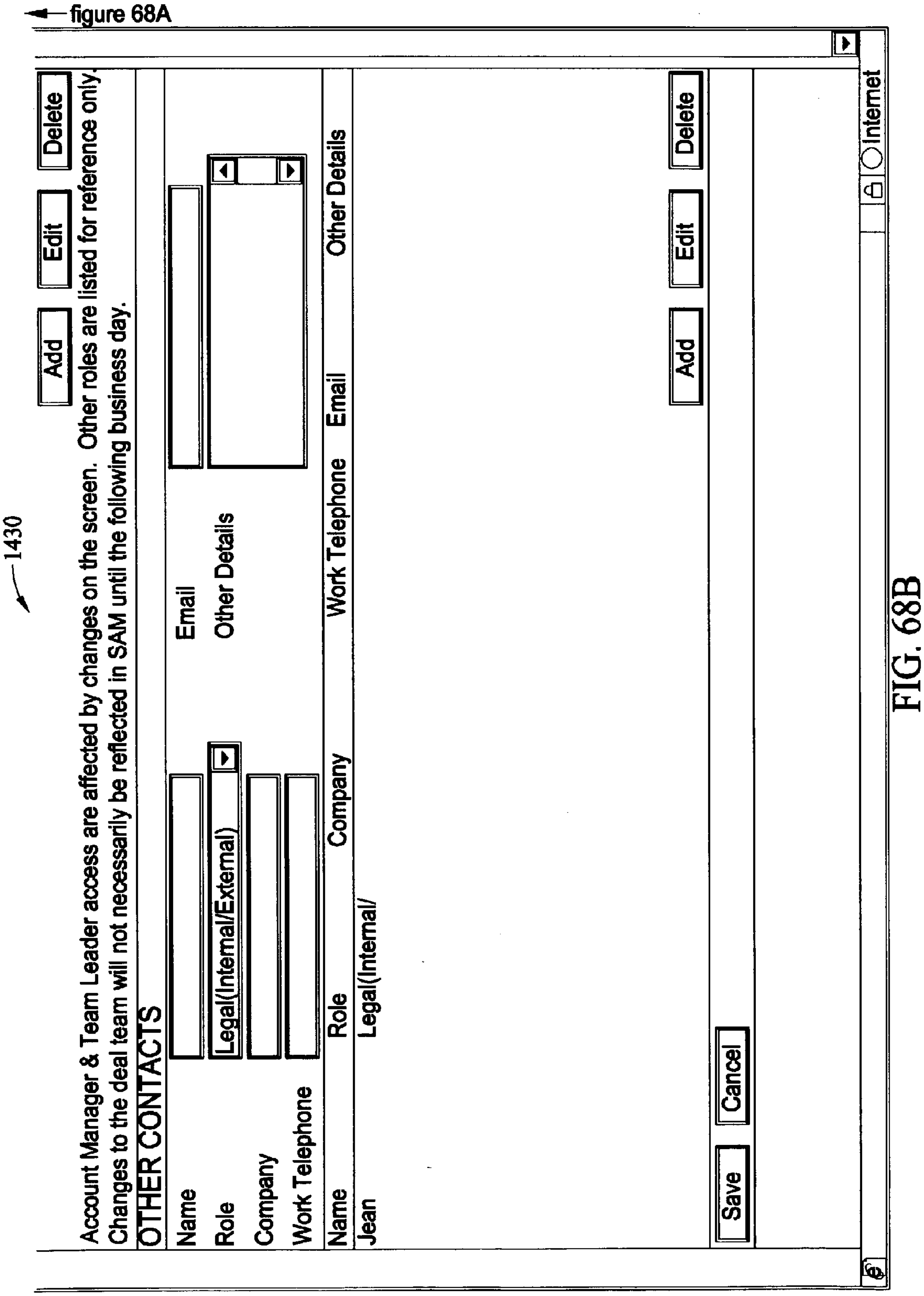

FIGS. 68A and 68B show an example embodiment of a user interface 1430 displaying a deal team setup page. The deal team is also displayed on user interface 1210 (shown in FIG. 56). User interface 1430 enables a user to setup a deal team for a particular deal involving selected account 322 including the setting up of the role of each person on the deal team.

Figure 69:
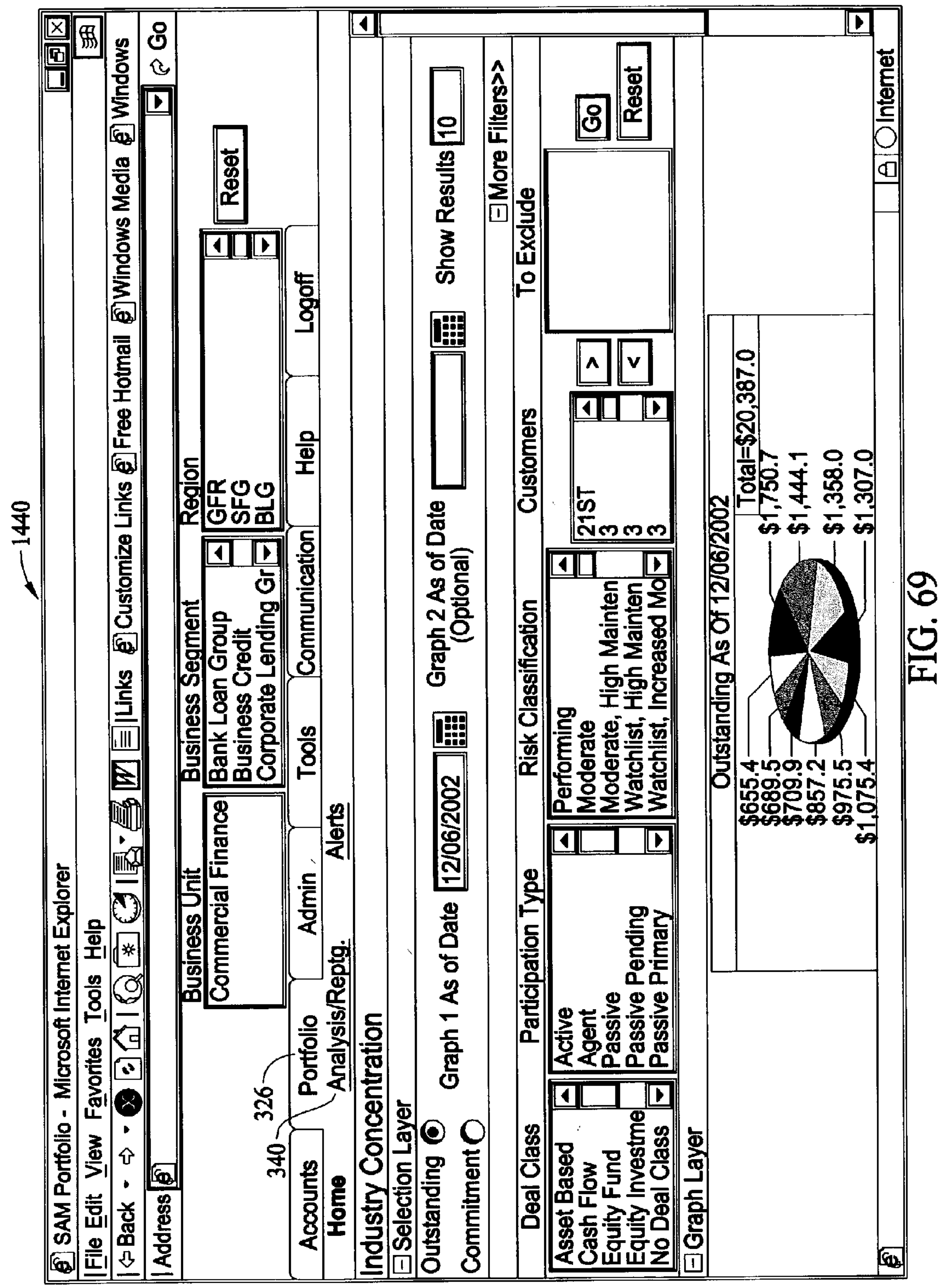
FIG. 69 is an example embodiment of a user interface displaying industry concentration trends for a portfolio in a RMCS.

FIG. 69 is an example embodiment of a user interface 1440 displaying a breakdown of a portfolio by industry concentration. User interface 1440 is displayed after menu tab Portfolio 326 and sub-menu tab Analysis/Report 340 are selected by a user. User interface 1440 also includes the filters at the top of the page, including a Business Unit filter, a Business Segment filter and a Region filter, that enable a user to control the information displayed. Additional filters are also displayed on user interface 1440 including a Deal Class filter, a Participation Type filter, a Risk Classification filter, a Customers filter, and a To Exclude filter. The analysis enables the user to access industry concentrations for the entire portfolio and display them in at least one of graphical and tabular form. In the example embodiment, a pie chart is displayed. The financial information supporting the pie chart may also be displayed by clicking on the pie chart or by clicking a particular piece of the pie chart. Additionally, tabular illustrations of financial information (not shown) are also active such that a user may click on a link included within a tabular illustration to drill down on the financial information supporting that specific entry.

Figure 70A:
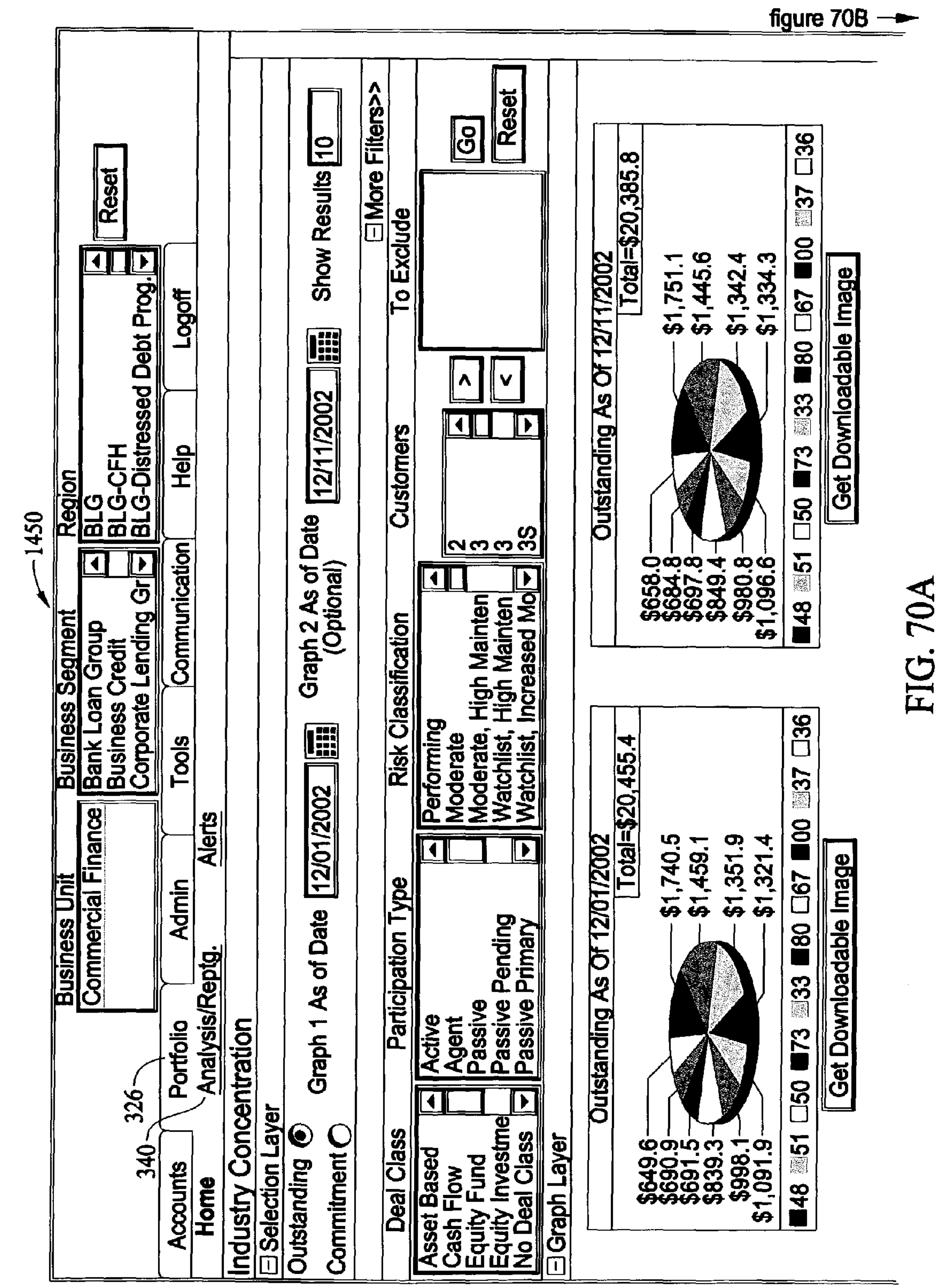

FIGS. 70A and 70B show an example embodiment of a user interface 1450 that displays an industry concentration comparison of a portfolio at two different points in time. User interface 1450 is displayed after menu tab Portfolio 326 and sub-menu tab Analysis/Report 340 are selected by a user. The financial information supporting the pie charts may also be displayed by clicking on the pie charts or by clicking a particular piece of the pie charts. Additionally, the tabular illustrations are also active such that a user may click on a link included within a tabular illustration to drill down on the financial information supporting that specific entry.

Figure 71:
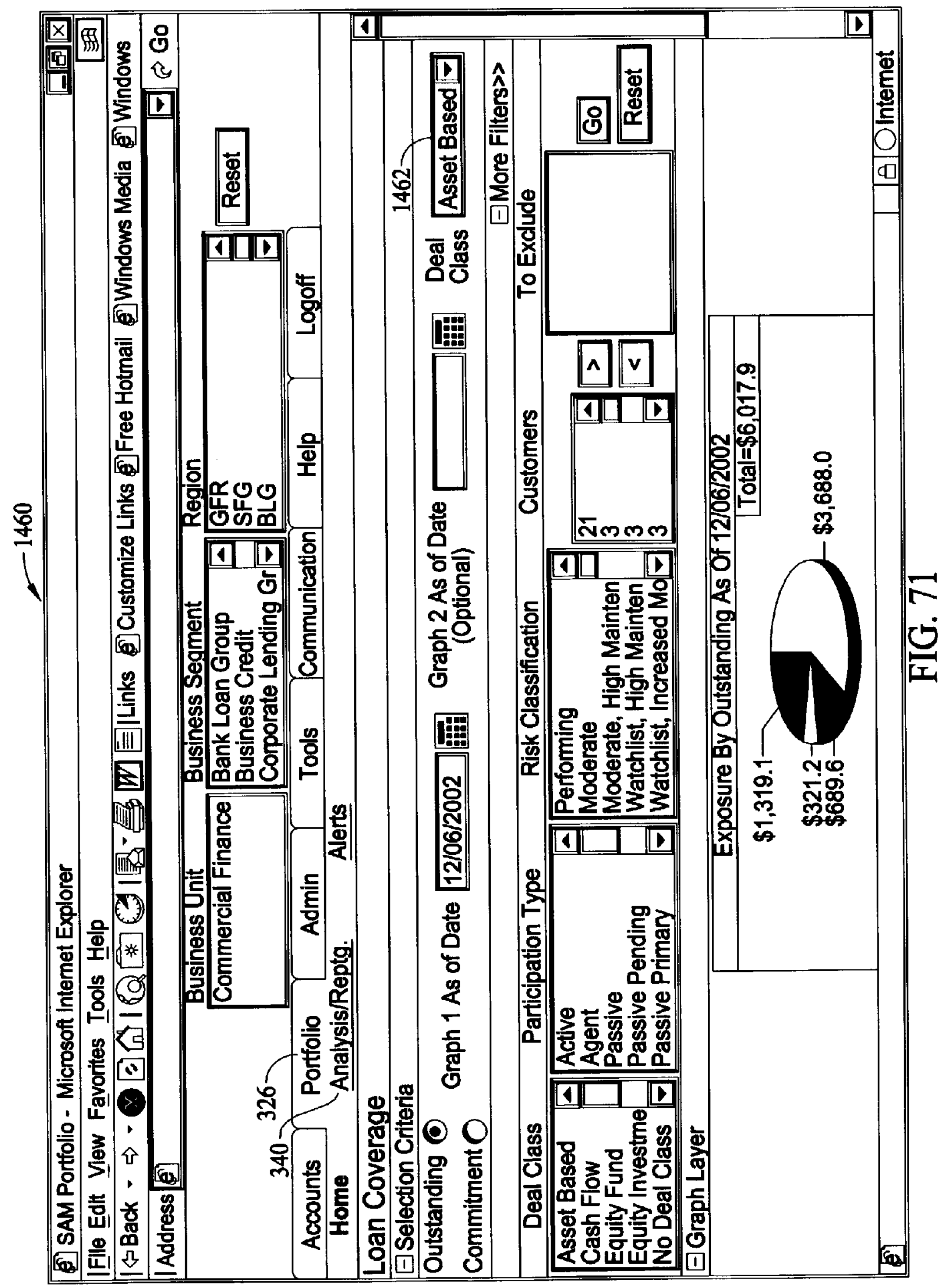
FIG. 71 is an example embodiment of a user interface displaying loan coverage information for a portfolio in a RMCS.

FIG. 71 is an example embodiment of a user interface 1460 displaying a portfolio stratified by liquidation values for a Business Unit, Business Segment, and Region. User interface 1460 is displayed after menu tab Portfolio 326 and sub-menu tab Analysis 340 are selected by a user. In the example embodiment, user interface 1460 includes a Deal Class pull-down field 1462, which includes Asset Based (shown in FIG. 71), Equity, and Cash Flow as well as ALL. In addition, a pie chart illustrating Loan Coverage Multiples (LCM) of the example portfolio is displayed. The user can then click on the pie chart to drill down to a list of accounts, then to an account, and then to a PMR. User interface 1460 includes the filters at the top of the page, including a Business Unit filter, a Business Segment filter and a Region filter, that enable a user to control the information displayed. Additional filters are also displayed on user interface 1440 including a Deal Class filter, a Participation Type filter, a Risk Classification filter, a Customers filter, and a To Exclude filter. User interface 1460 allows the user to display the information in at least one of tabular and graphical form.

Figure 72:
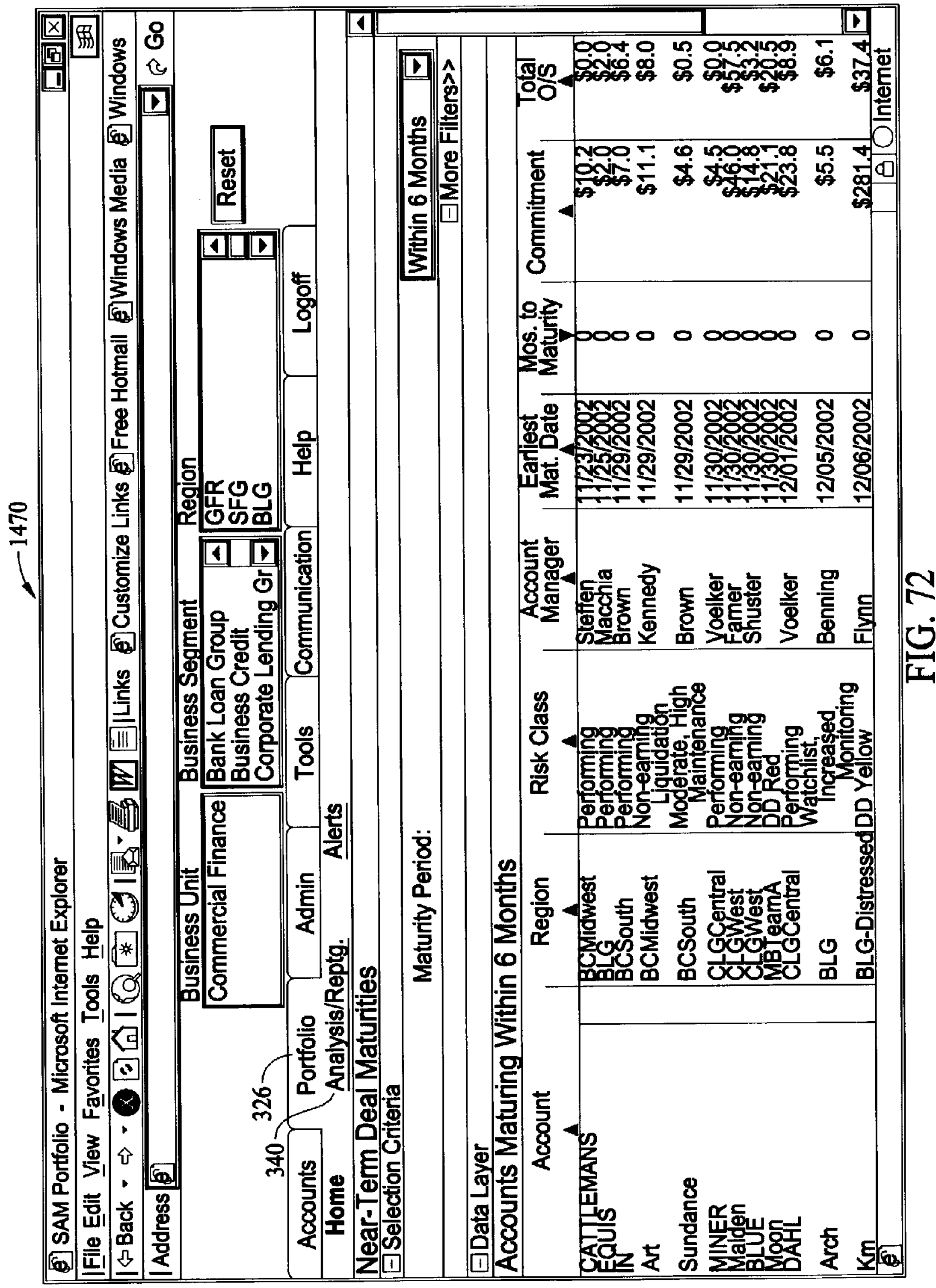
FIG. 72 is an example embodiment of a user interface displaying near term deal maturities for a portfolio in a RMCS.

FIG. 72 is an example embodiment of a user interface 1470 displaying a list of accounts in a portfolio by maturity date for a Business Unit, Business Segment and Region. User interface 1470 enables a user to quickly identify which accounts need to be focused on to prevent unwanted portfolio run-off. User interface 1470 displays the accounts that are scheduled to mature within the time horizon selected. In the example embodiment, if an account has multiple maturity dates, the earliest maturity date will be displayed. User interface 1470 is displayed after menu tab Portfolio 326 and sub-menu tab Analysis/Report 340 are selected by a user. In addition, a user may click on the account to drill down to the Account Retention Plan shown in FIGS. 41A, 41B, 41C and 41D.

Figure 73:
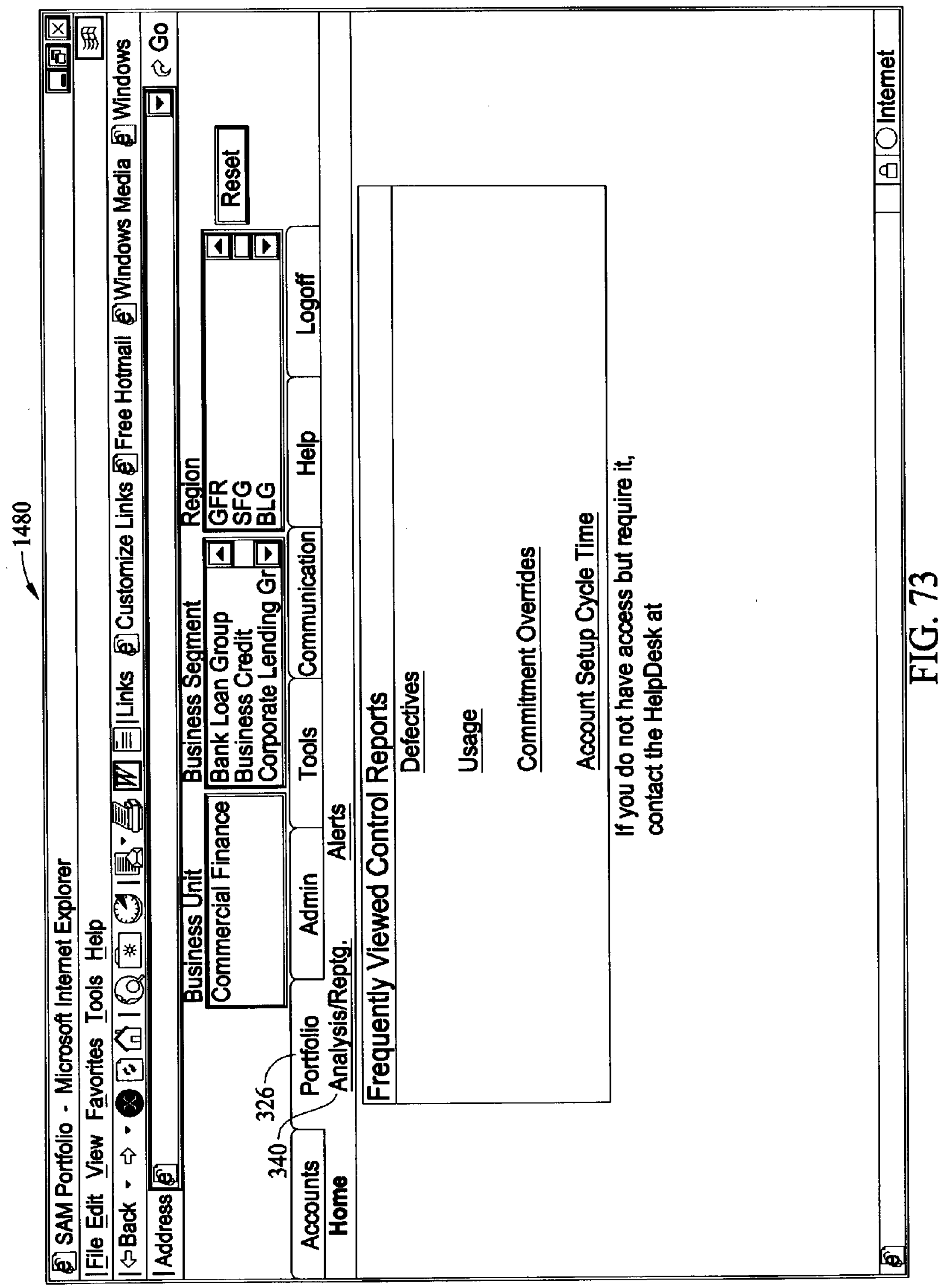
FIG. 73 is an example embodiment of a user interface displaying frequently viewed control reports within a portfolio in a RMCS.

FIG. 73 is an example embodiment of a user interface 1480 that displays frequently viewed control reports by Business Unit, Business Segment, and Region. User interface 1480 is displayed after menu tab Portfolio 326 and sub-menu tab Analysis/Report 340 are selected by a user. User interface 1480 includes the filters at the top of the page, including a Business Unit filter, a Business Segment filter, and a Region filter, that enable a user to control the information displayed.

Figure 74A:
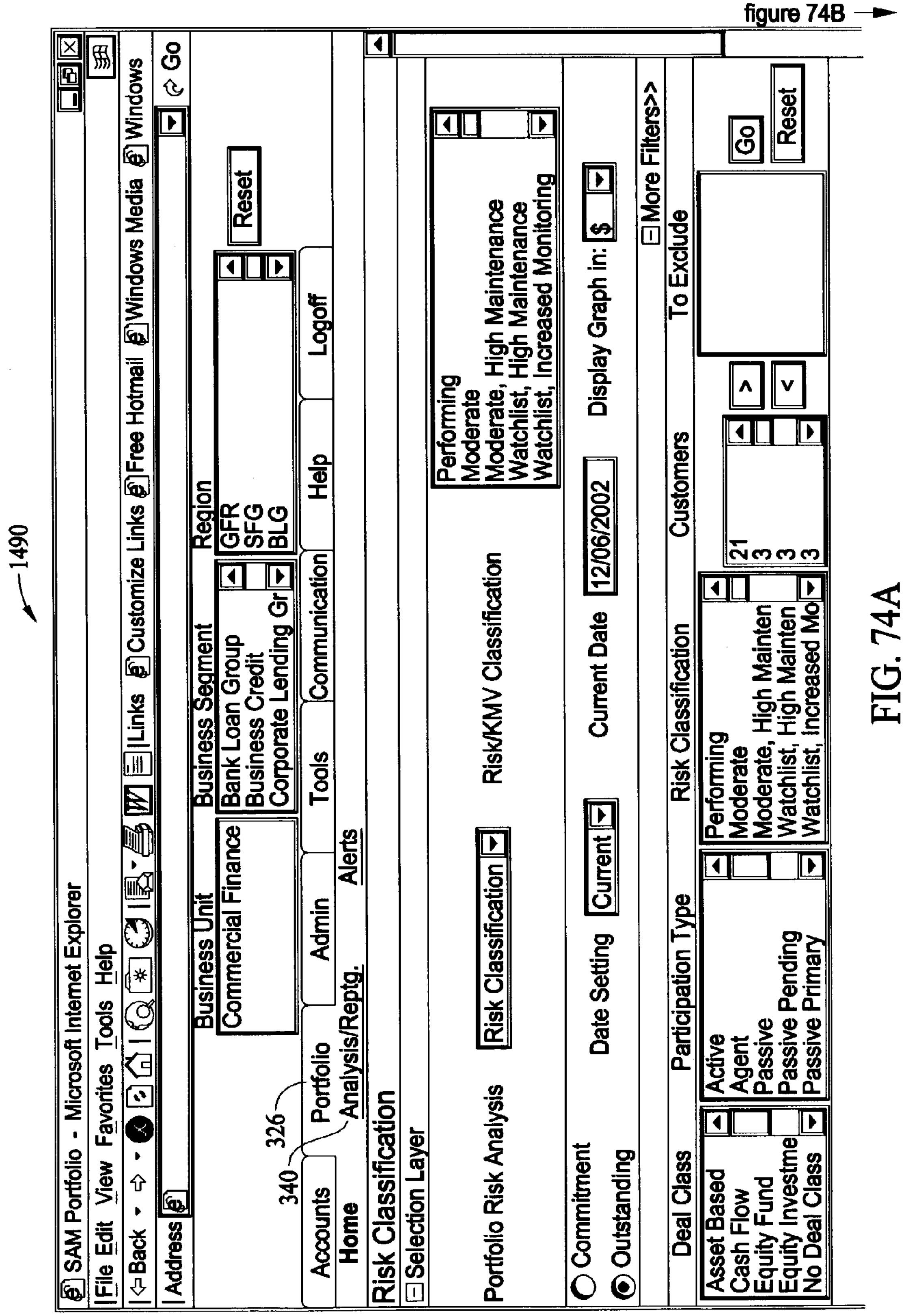
FIGS. 74A and 74B show an example embodiment of a user interface displaying risk classification for a portfolio in a RMCS.
Figure 74B:
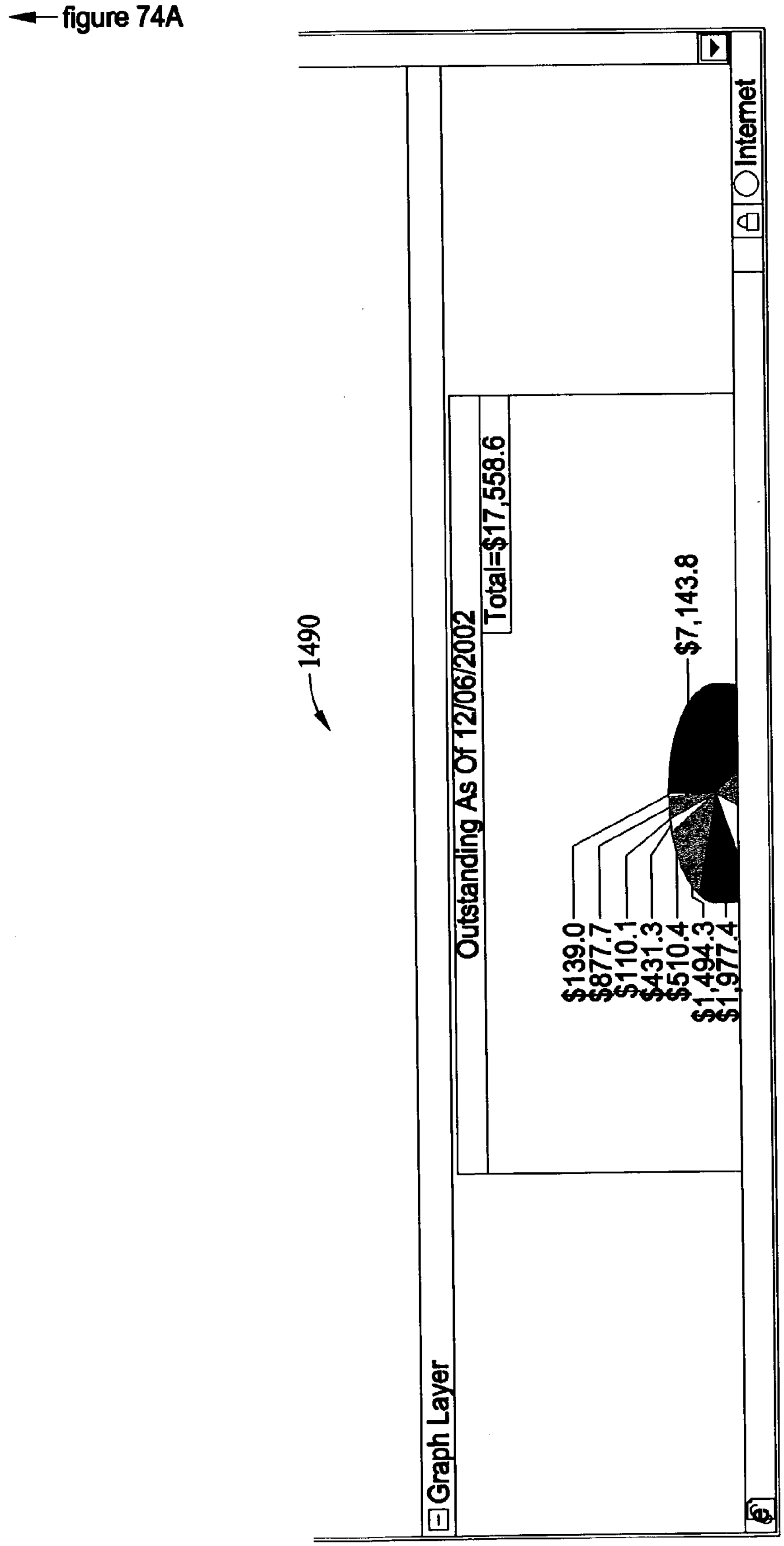

FIGS. 74A and 74B show an example embodiment of a user interface 1490 that illustrates a graphical display of a portfolio by risk classification by a Business Unit, Business Segment, and Region. User interface 1490 is displayed after menu tab Portfolio 326 and sub-menu tab Analysis/Report 340 are selected by a user. User interface 1490 includes the filters at the top of the page, including a Business Unit filter, a Business Segment filter and a Region filter, that enable a user to control the information displayed. Additional filters are also displayed on user interface 1490 including a Deal Class filter, a Participation Type filter, a Risk Classification filter, a Customers filter, and a To Exclude filter. User interface 1490 enables the user to display risk classifications for an entire portfolio, and display them in at least one of graphical and tabular form. In the example embodiment, a pie chart is displayed. The financial information supporting the pie chart may also be displayed by clicking on the pie chart or by clicking a particular piece of the pie chart. Additionally, tabular illustrations of financial information (not shown) are also active such that a user may click on a link included within a tabular illustration to drill down on the financial information supporting that specific entry.

Figure 75A:
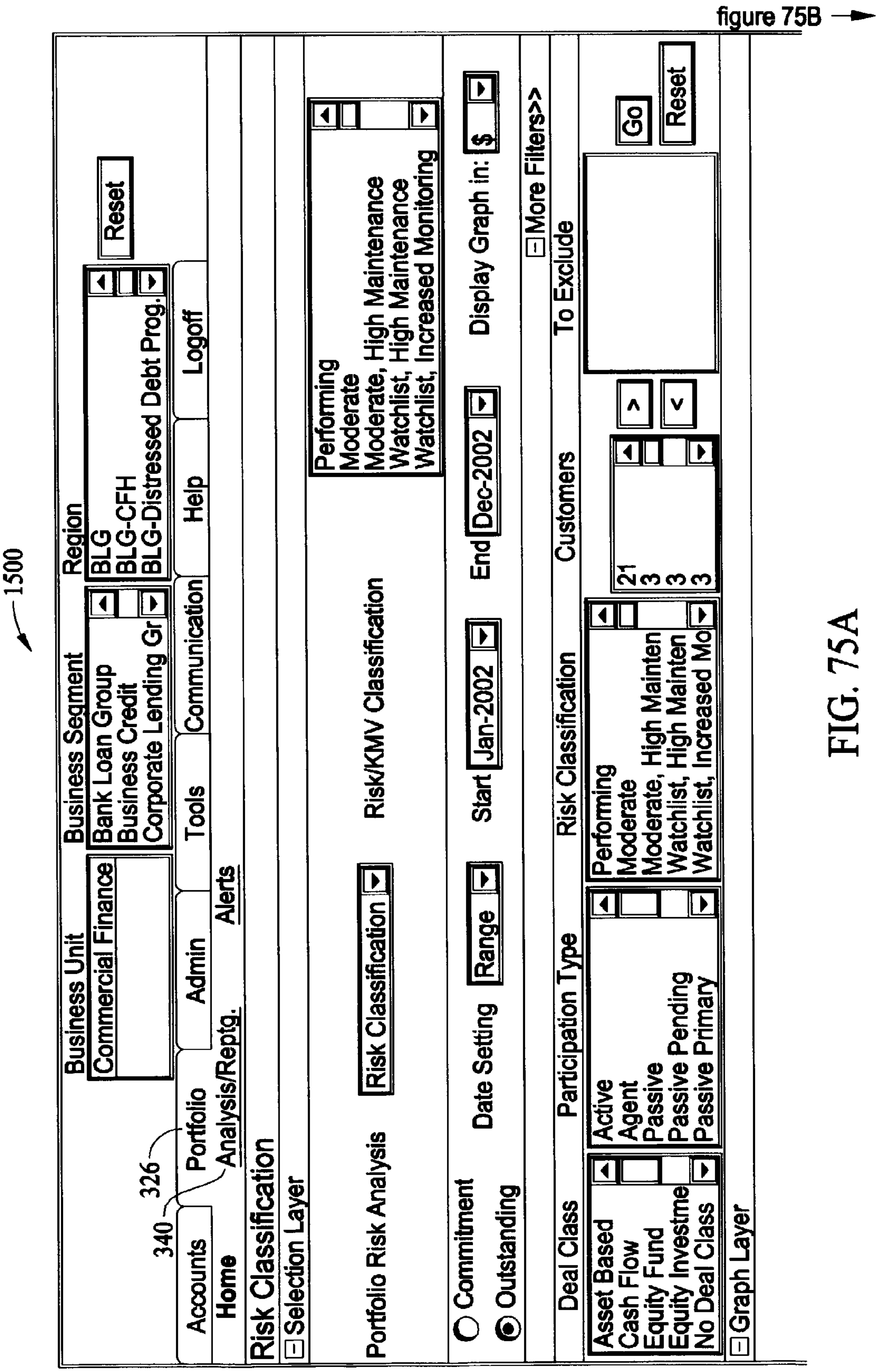

FIGS. 75A and 75B show another example embodiment of a user interface 1500 that illustrates a graphical display of a portfolio by risk classification for a Business Unit, Business Segment, and Region. User interface 1500 is displayed after menu tab Portfolio 326 and sub-menu tab Analysis/Report 340 are selected by a user. User interface 1500 includes the filters at the top of the page, including a Business Unit filter, a Business Segment filter and a Region filter, that enable a user to control the information displayed. Additional filters are also displayed on user interface 1500 including a Deal Class filter, a Participation Type filter, a Risk Classification filter, a Customers filter, and a To Exclude filter. User interface 1500 enables the user to display risk classifications for an entire portfolio, and display them in at least one of graphical and tabular form. In the example embodiment, an area graph is displayed. In the example embodiment, a user may click on an entry included within the data table to drill down on the financial information supporting the selected entry. In at least one other embodiment, a user may click on the area graph or a particular portion of the area graph to further display the supporting information.

Figure 76:
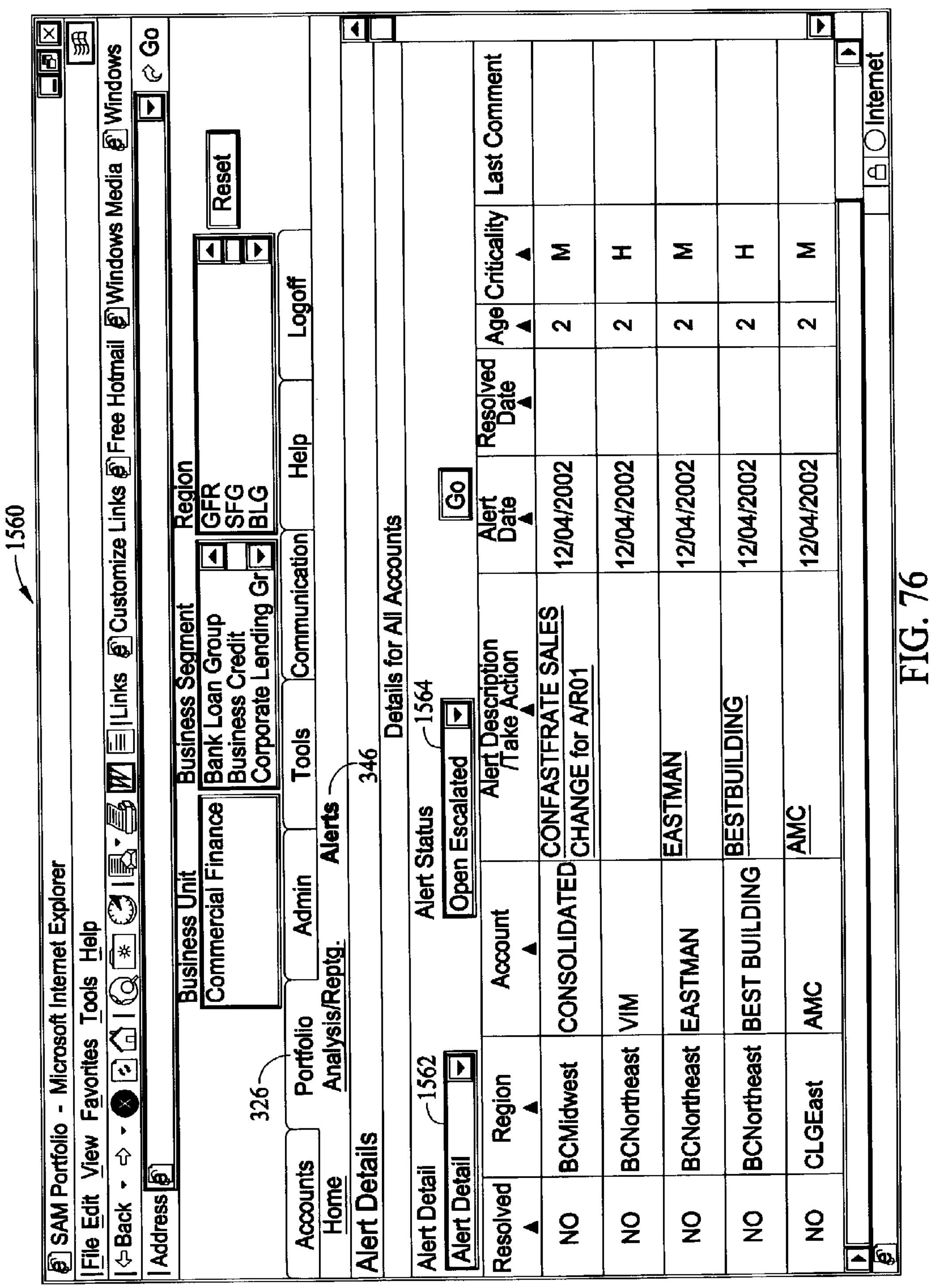
FIG. 76 is an example embodiment of a user interface displaying alert details for a portfolio in a RMCS.

FIG. 76 is an example embodiment of a user interface 1560 displaying a summary of outstanding alerts for all accounts illustrated on user interface 320 (shown on FIGS. 6A and 6B). User interface 1560 is displayed after menu tab Portfolio 326 and sub-menu tab Alerts 346 are selected by a user. In the example embodiment, user interface 1560 illustrates at least two alerts including: Informative Alerts and Action Alerts. An Informative Alert is an alert sent to an account manager within the CF Business to notify the account manager of possible changes in the overall deal that include, but are not limited to, the credit structure, collateral performance, risk ratings, and financial performance of the Analyzed Business. An Action Alert is an alert that requires action. An Action Alert is sent to the account manager to notify the account manager that the user has been instructed to take some action. Additionally, in the example embodiment, user interface 1560 permits the alerts to be escalated to a series of upper management layers within the CF Business such that, after a specified period of time or when an informative alert has exceeded a certain threshold, an alert will automatically be sent to the various layers of upper management based on the severity of the alert. Also, in the example embodiment, user interface 1560 illustrates whether an action alert has been resolved or when an informative alert has been acknowledged by an account manager. An action alert may be resolved when the necessary information is received by the CF Business and RMCS 10 (shown in FIG. 1) is updated with respect to the information received. An informative alert may be resolved when the account manager acknowledges the alert. Additionally, with respect to either type of alert, the account manager can record comments that can be tracked over time and senior management can review, add, delete, and evaluate such comments to more senior management or refer them back to the account manger for further follow up. In the example embodiment, user interface 1560 displays an Alert Detail pull-down field 1562, which includes at least one of Alert Detail, Alerts by Account, and Alerts by Type, and an Alert Status pull-down field 1564. User interface 1560 includes the filters at the top of the page, including a Business Unit filter, a Business Segment filter and a Region filter, that enable a user to control the information displayed.

Figure 77:
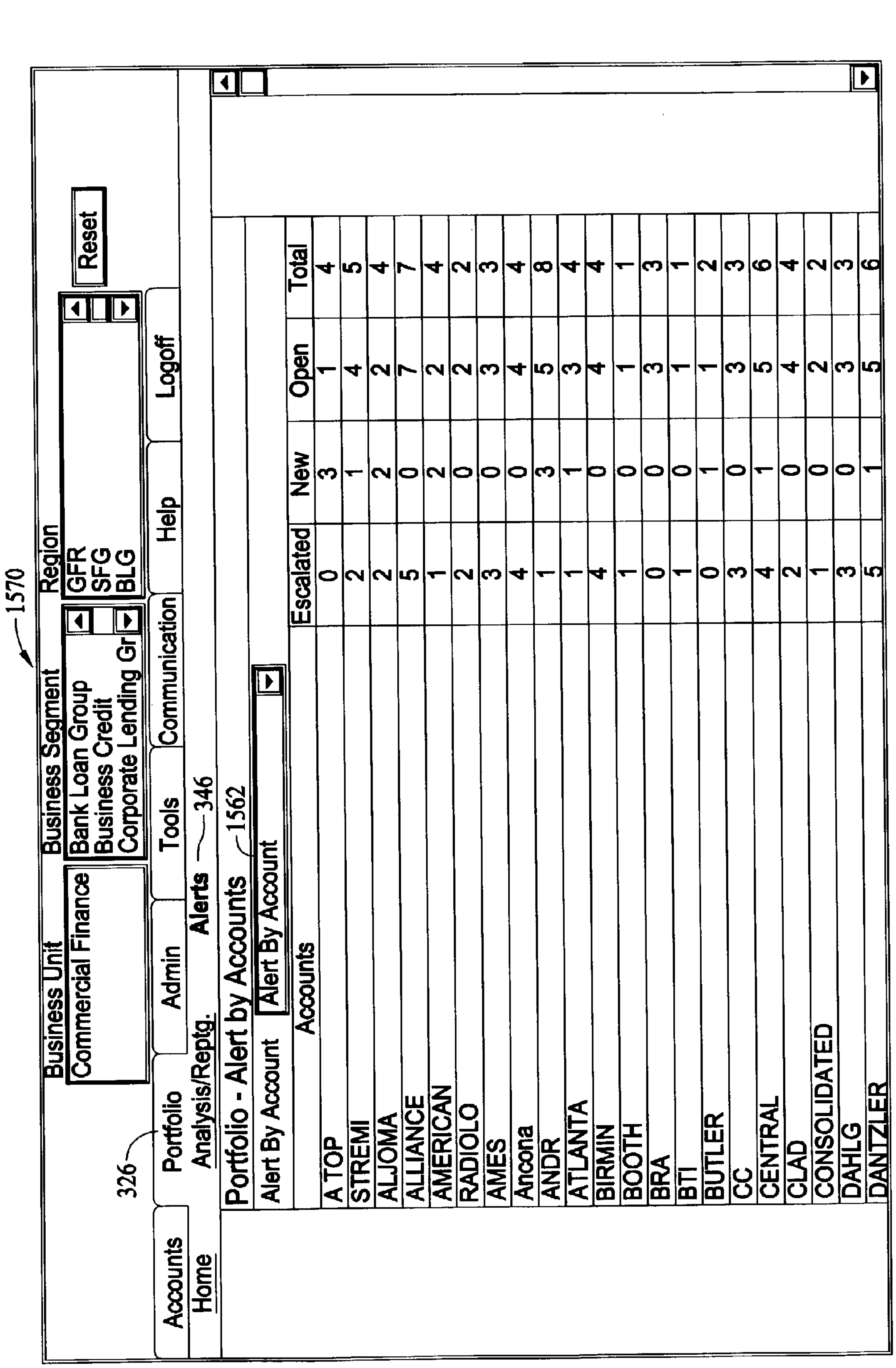
FIG. 77 is an example embodiment of a user interface displaying alerts by account for a portfolio in a RMCS.

FIG. 77 is an example embodiment of a user interface 1570 displaying a summary of outstanding alerts by account. User interface 1570 is displayed after menu tab Portfolio 326 and sub-menu tab Alerts 346 are selected by a user, and after Alerts by Account is inputted into Alert Detail pull-down field 1562 (shown in FIG. 76).

Figure 78:
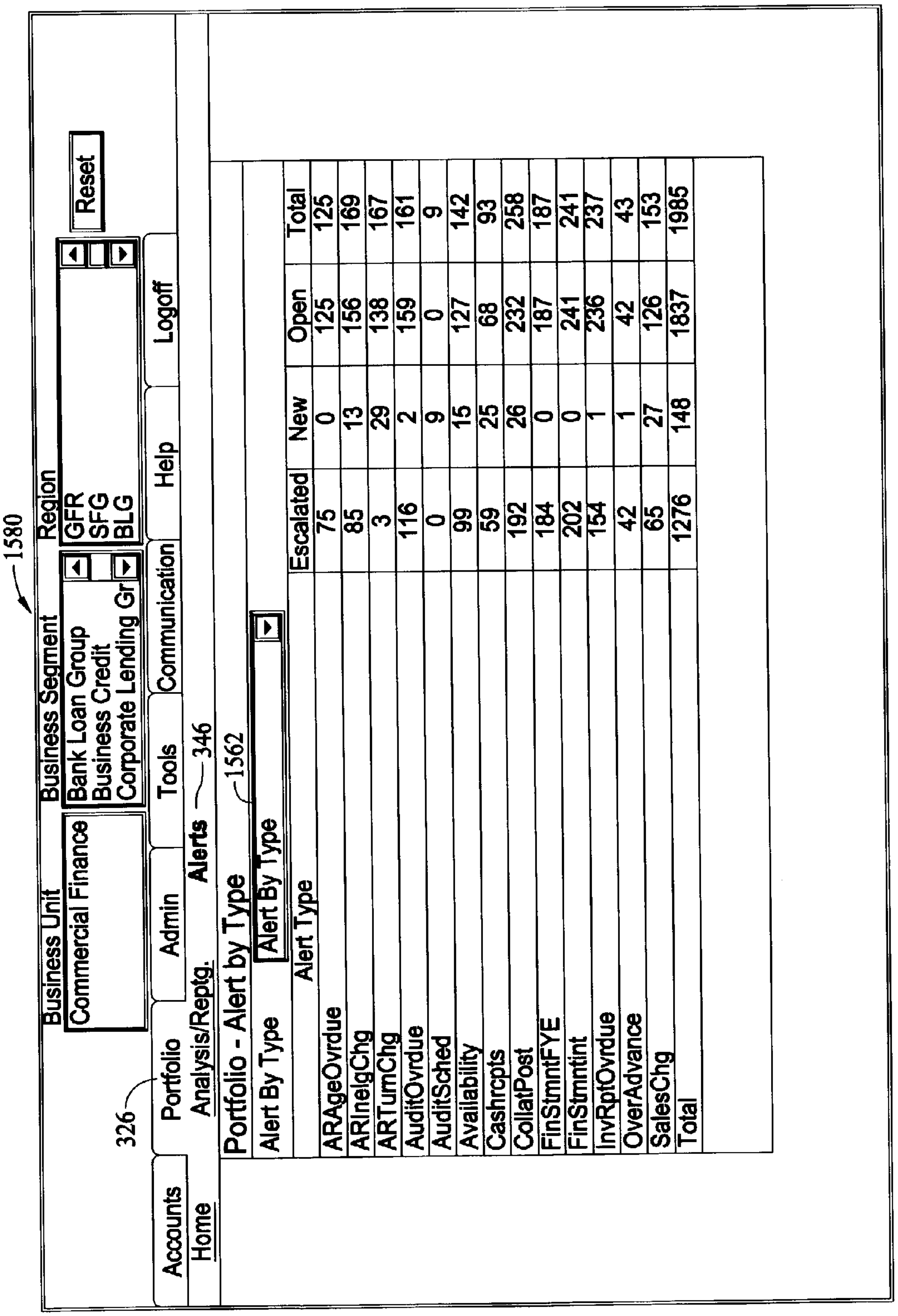
FIG. 78 is an example embodiment of a user interface displaying alerts by type for a portfolio in a RMCS.

FIG. 78 is an example embodiment of a user interface 1580 displaying a summary of outstanding alerts by type for a Business Unit, Business Segment, and Region. User interface 1580 is displayed after menu tab Portfolio 326 and sub-menu tab Alerts 346 are selected by a user, and after Alerts by Type is inputted into Alert Detail pull-down field 1562 (shown in FIG. 76).

Figure 79:
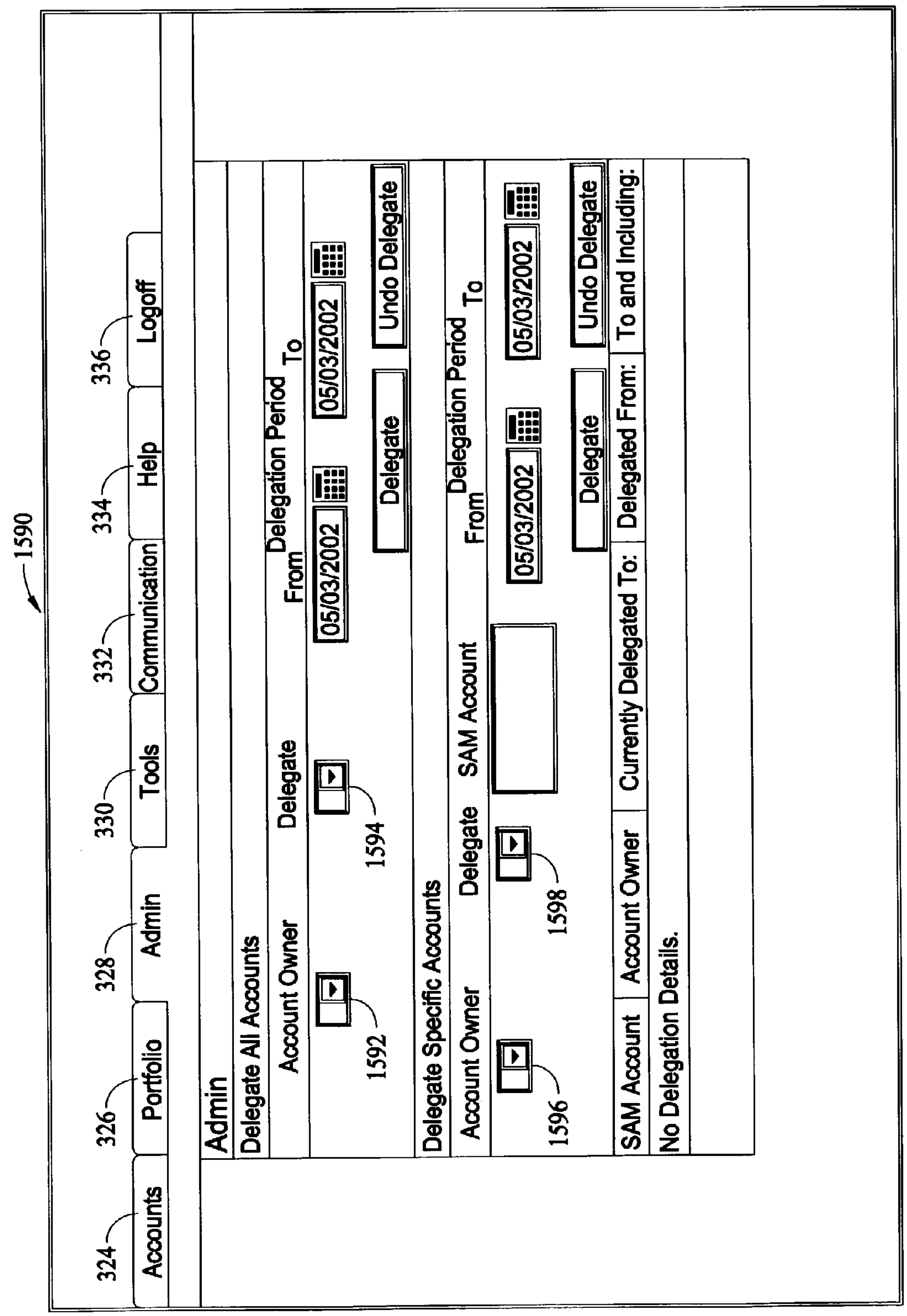
FIG. 79 is an example embodiment of a user interface displaying an administrative home page in a RMCS.

FIG. 79 is an example embodiment of a user interface 1590 displaying a home page of RMCS 10 (shown in FIG. 1) after a user has logged onto RMCS 10 and selected menu tab Admin 328. User interface 1590 enables a user to delegate an account to another user. The account may be delegated to another user when: the account manager requests someone to cover the account while the account manager is outside of the office or unavailable for a period of time, or the person who provides coverage is not part of the deal team. In the example embodiment, a team leader and an account manager will receive an electronic message from RMSC 10 when an account is delegated so that the team leader can monitor the activity on the account.

In an example embodiment, user interface 1590 illustrates a plurality of menu tabs including at least one of Accounts 324, Portfolio 326, Admin 328, Tools 330, Communication 332, Help 334, and Logoff 336. Although tabs are shown in the example embodiment, pull-down lists, check boxes, and other means for inputting this information could also be used. These menu tabs enable the user to navigate RMCS 10. In addition, user interface 1590 also illustrates an Account Owner pull-down field for All Accounts 1592, a Delegate pull-down field for All Accounts 1594, an Account Owner pull-down field for Specific Accounts 1596, and a Delegate pull-down field for Specific Accounts 1598.

Figure 80:
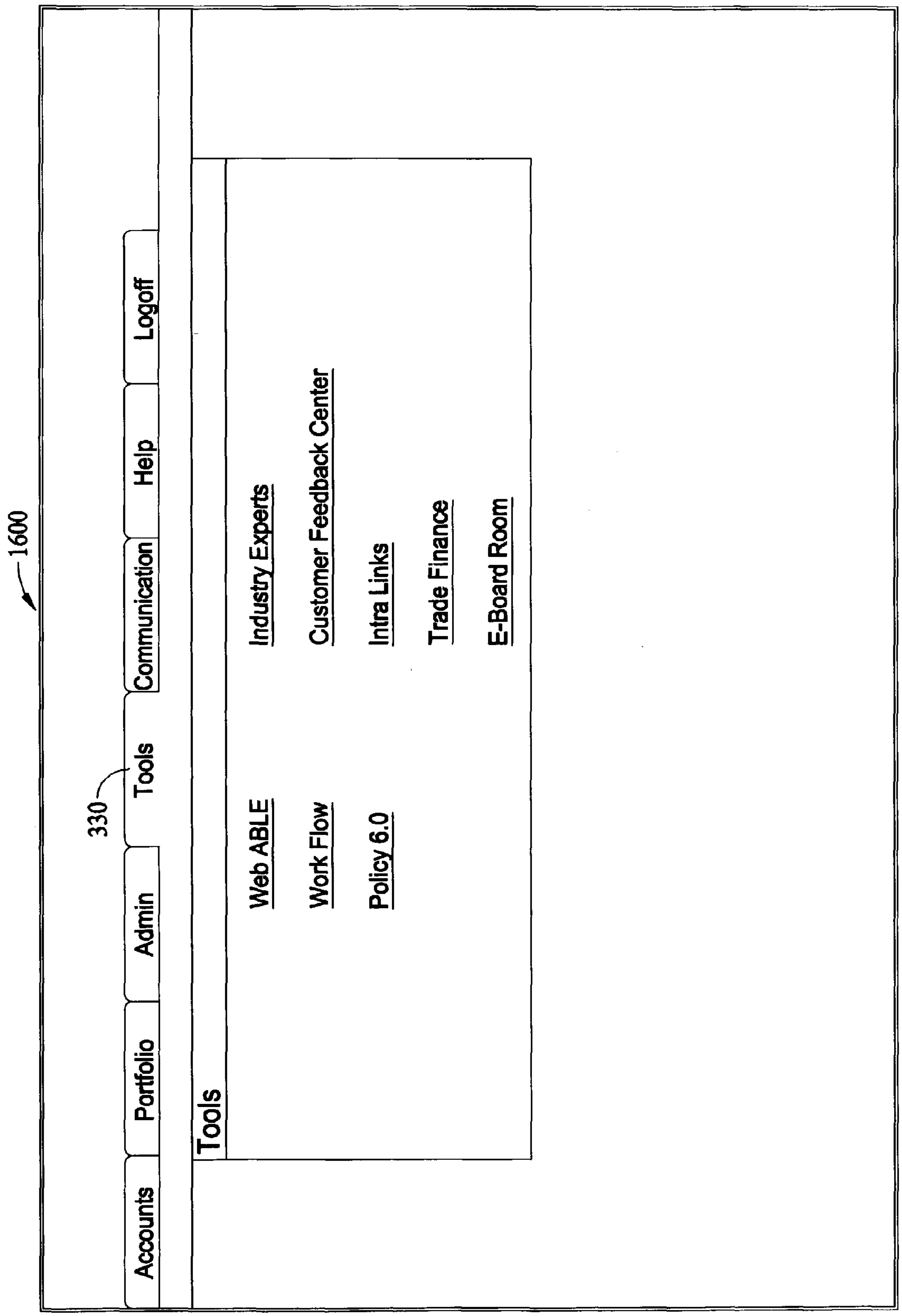
FIG. 80 is an example embodiment of a user interface displaying a tools home page in a RMCS.

FIG. 80 is an example embodiment of a user interface 1600 displaying a home page of RMCS 10 (shown in FIG. 1) after a user has logged onto RMCS 10 and selected menu tab Tools 330. User interface 1600 includes a plurality of links that may be utilized by the user including at least one of Web ABLE, Work Flow, Policy 6.0, Industry Experts, Customer Feedback Center, Intra Links, Trade Finance, and E-Board Room. The links provided are those that are typically used in underwriting and commercial finance. Additional links may be provided as required by users of the system. The links listed herein are for example purposes.

Figure 81:
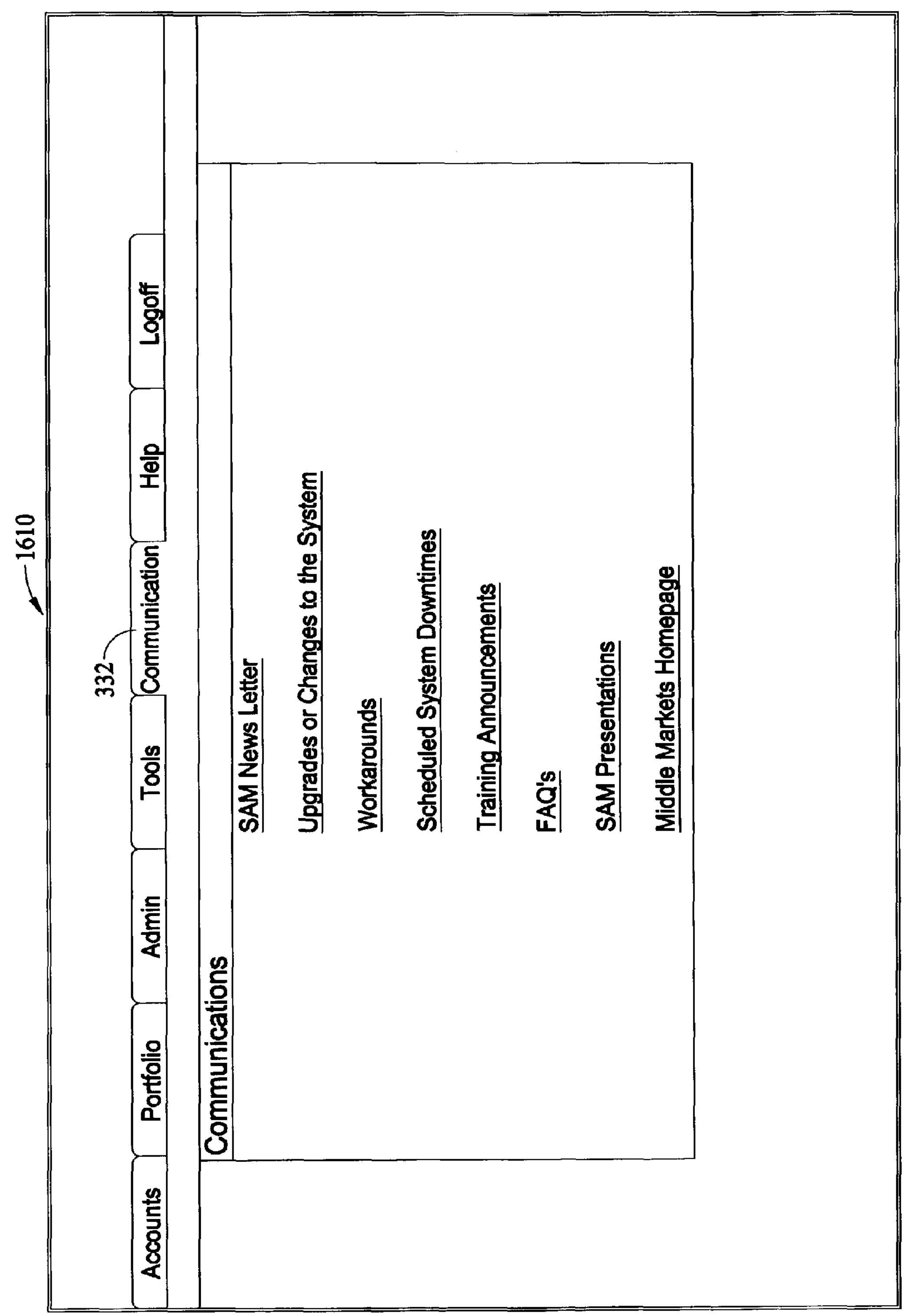
FIG. 81 is an example embodiment of a user interface displaying a communication home page in a RMCS.

FIG. 81 is an example embodiment of a user interface 1610 displaying a home page of RMCS 10 (shown in FIG. 1) after a user has logged onto RMCS 10 and selected menu tab Communication 332. User interface 1610 displays a summary of communications from risk leaders and from a system administrator.

Figure 82:
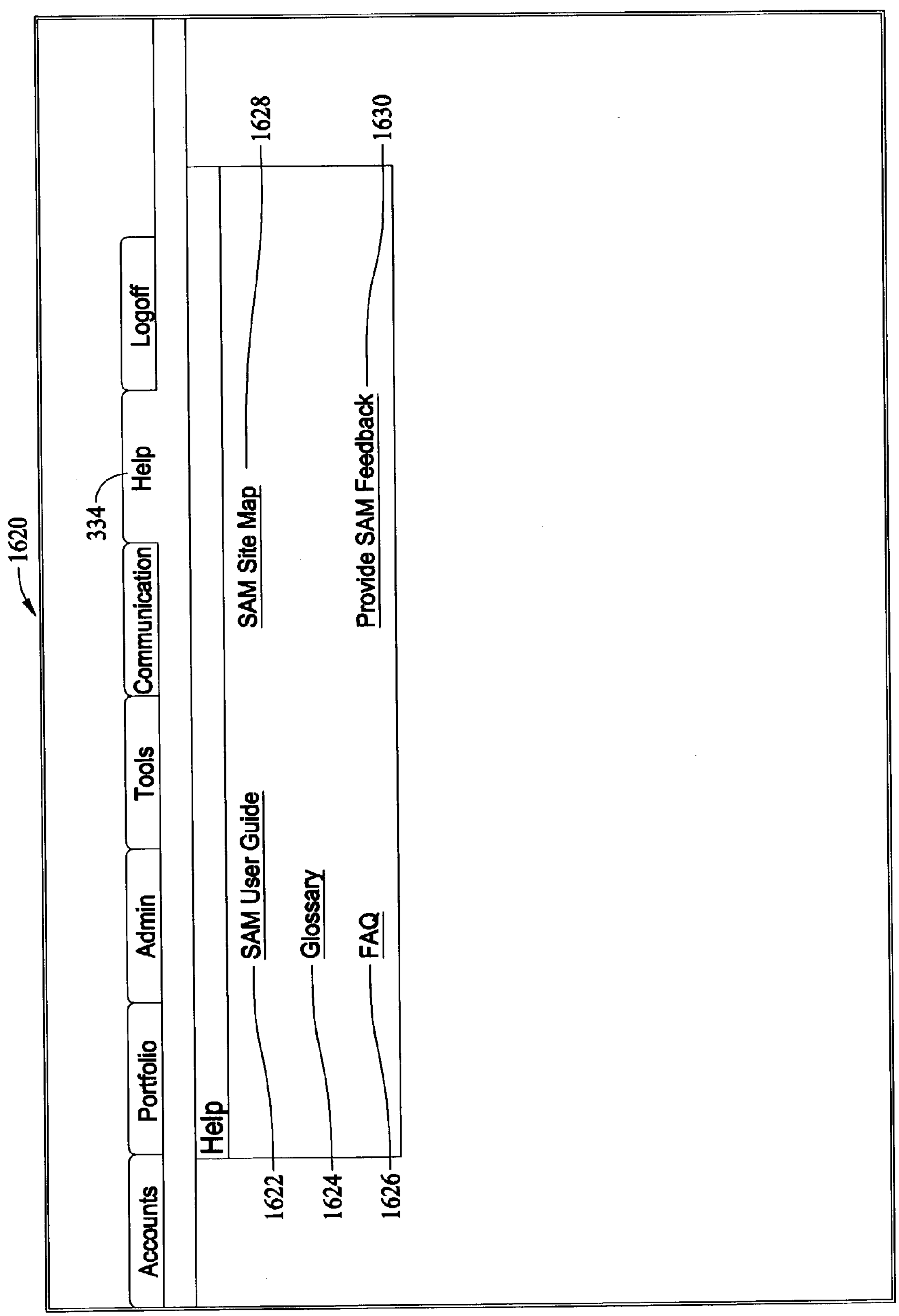
FIG. 82 is an example embodiment of a user interface displaying a help home page in a RMCS.

FIG. 82 is an example embodiment of a user interface 1620 displaying a home page of RMCS 10 (shown in FIG. 1) after a user has logged onto RMCS 10 and selected menu tab Help 334. User interface 1620 displays additional information relating to RMCS 10. In the example embodiment, user interface 1620 includes a user guide link. 1622, a glossary of defined terms link 1624, a frequently asked questions link 1626, a site map link 1628, and a feedback link 1630.

Figure 83:
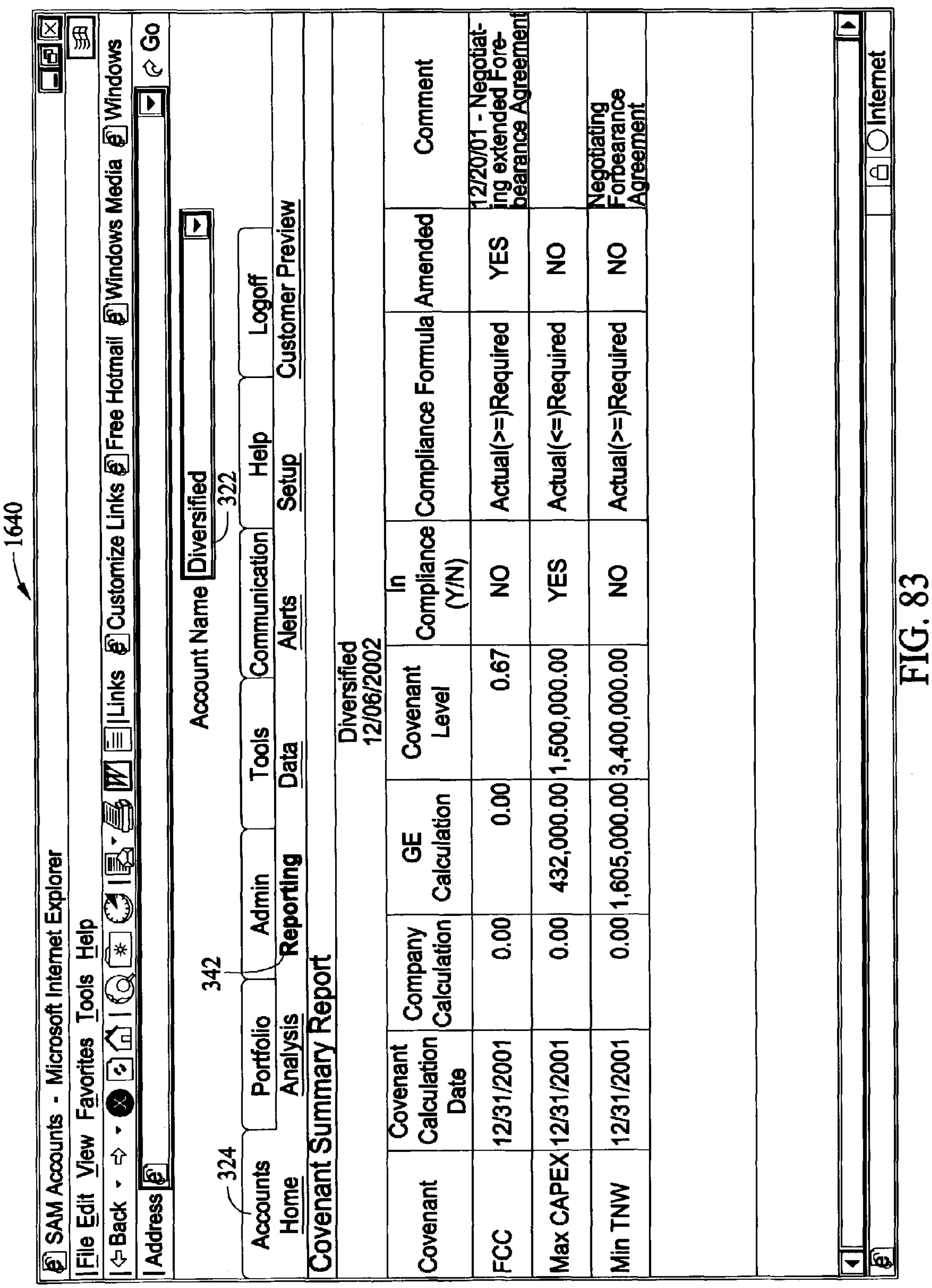
FIG. 83 is an example embodiment of a user interface displaying a covenant summary report page in a RMCS.

FIG. 83 is an example embodiment of a user interface 1640 displaying a covenant summary report for selected account 322, which is displayed after menu tab Accounts 324 and sub-menu tab Reporting 342 are selected by a user. User interface 1640 displays a chart for a selected account that includes at least one of the following column headers: covenant, covenant calculation date, company calculation, CF Business calculation, covenant level, in compliance, compliance formula, amended, and comment.

RMCS therefore better enables a business engaging in complex deals, such as commercial financing, mergers, acquisitions and real estate transactions, to collect, manage, store and disseminate RM information among internal deal teams and selected outside deal teams so as to facilitate a more accurate and efficient analysis of the risks associated with a deal and to facilitate management of workload and personnel. More specifically, RMCS enables the CF Business to input RM information on a single occasion and into a single computer workstation that may be located at various locations, permits the various internal deal teams within the CF Business to share RM information when conducting a due diligence analysis and to continue account management of the Analyzed Business, and enables the CF Business to provide RM information to outside deal teams, like outside legal counsel, during the due diligence analysis. The RMCS also enables a user to monitor a plurality of accounts included in a portfolio, and monitor a plurality of portfolios. Additionally, the RMCS enables a deal team leader to manage a workload of an account manager as well as enabling a senior risk officer to manage a workload of team leaders. The RMCS therefore permits the CF Business to devote more time to analyzing RM information and conducting the due diligence analysis, and less time entering, checking and reporting data.

While the invention has been described in terms of various specific embodiments, those skilled in the art will recognize that the invention can be practiced with modification within the spirit and scope of the claims.

What is claimed is:

1. A method for managing business information by a first business entity using a server system including a processor and coupled to a centralized database and at least one client system, said method comprising:

receiving at the server system business information relating to a plurality of second business entities from the client system;

storing the business information received at the server system in the centralized database;

tracking the business information stored in the centralized database;

updating the centralized database periodically with newly received business information to maintain the business information;

providing the business information in response to an inquiry;

selecting for analysis a second business entity from the plurality of second business entities stored in the database;

analyzing, by the processor, the selected second business entity to determine whether to engage in a deal with the selected second business entity, the deal including the first business entity at least one of providing financing to the selected second business entity and acquiring the selected second business entity;

engaging in the deal with the selected second business entity by at least one of the first business entity providing financing to the selected second business entity and the first business entity acquiring the selected second business entity, the deal further including at least one deal covenant relating to a future financial performance of the selected second business entity, wherein the at least one covenant includes terms agreed to by both the first business entity and the selected second business entity;

monitoring the business information of the selected second business entity after the first business entity engages in the deal with the selected second business entity including monitoring the future financial performance of the selected second business entity and determining whether the selected second business entity has violated any of the deal covenants; and generating an alert to notify the first business entity when the monitored future financial performance of the selected second business entity meets a predetermined threshold amount and when the selected second business entity violates one of the deal covenants.

2. A method in accordance with claim 1 wherein receiving business information comprises receiving risk management (RM) information, RM information comprising business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition for each second business entity.

3. A method in accordance with claim 1 further comprising notifying a predesignated party of a review of the business information by a user.

4. A method in accordance with claim 3 wherein notifying the predesignated party comprises transmitting an electronic message to an account manager from at least one member of a deal team notifying the account manager that a review of the business information for the second business entity by the deal team has occurred, and notifying the account manager of the deal team's findings and recommendations relating to the review of the business information.

5. A method in accordance with claim 3 wherein notifying the predesignated party comprises transmitting an electronic message to at least one of an account manager, a team leader, a portfolio manager, and a senior risk manager from at least one of a member of a deal team, an account manager, a team leader, a portfolio manager, and a senior risk manager.

6. A method in accordance with claim 3 wherein notifying the predesignated party comprises transmitting an electronic message to at least one of a team leader, a portfolio manager, and a senior risk manager from at least one member of a deal team notifying at least one of the team leader, the portfolio manager, and the senior risk manager that a review of the business information for a selected group of the second business entities by the deal team has occurred, and providing the deal team's findings and recommended actions to be taken based on the review of the business information.

7. A method in accordance with claim 1 wherein receiving business information comprises receiving at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition for each second business entity.

8. A method in accordance with claim 1 wherein receiving business information comprises receiving business information through the client system for review by a user.

9. A method in accordance with claim 1 wherein receiving business information comprises importing business information from a plurality of computer programs through the client system.

10. A method in accordance with claim 1 wherein tracking business information comprises:

compiling a plurality of data reports that includes at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of each second business entity; and compiling a plurality of data reports that includes at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of at least one of a selected group of second business entities and selected industry benchmarks.

11. A method in accordance with claim 1 wherein tracking business information comprises:

compiling a plurality of data reports that includes a selected subset of at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of each second business entity; and compiling a plurality of data reports that includes a selected subset of at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of at least one of a selected group of second business entities and selected industry benchmarks.

12. A method in accordance with claim 1 wherein tracking business information comprises:

exporting business information relating to at least one of the second business entities by a user from the centralized database to at least one other computer program for at least one of review and analysis; and exporting business information relating to at least one selected group of the second business entities by a user from the centralized database to at least one other computer program for at least one of review and analysis.

13. A method in accordance with claim 1 wherein tracking business information further comprises linking documents to at least one of the second business entities and a selected group of the second business entities such that a user can access the documents during a review of the second business entities.

14. A method in accordance with claim 1 wherein providing business information comprises:

displaying designated second business entities on the client system for at least one of a senior risk manager, portfolio manager, team leader, an account manager, internal deal team members, and outside deal team members; and receiving an inquiry from the client system regarding at least one of the second business entities and a selected group of the second business entities.

15. A method in accordance with claim 1 wherein providing business information comprises:

displaying information on the client system regarding at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, and an equity valuation for each second business entity and a selected group of the second business entities; and receiving an inquiry from the client system regarding at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, and an equity valuation for each second business entity and a selected group of the second business entities.

16. A method in accordance with claim 1 wherein providing business information comprises:

accessing the centralized database;

searching the database regarding the specific inquiry;

retrieving information from the database; and transmitting the retrieved information to the client system for display by the client system.

17. A method in accordance with claim 1 wherein providing business information comprises providing at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, and an equity valuation for each second business entity and a selected group of the second business entities.

18. A method in accordance with claim 1 further comprising connecting the client system and the server system via a network that includes one of a wide area network, a local area network, an intranet and the Internet.

19. A method in accordance with claim 1 further comprising:

assigning a workload factor to the deal, the workload factor representing an amount of work a user associated with the first business entity would likely devote to at least one of completing the deal and monitoring the business information of the selected second business entity after the deal has been completed, wherein the workload factor is based on at least one of a type of the deal, risks associated with the deal, and a progress status of the deal; and managing a workload of the user associated with the first business entity based on the assigned workload factor.

20. A method in accordance with claim 19 wherein managing a workload of the user further comprises designating a maximum workload amount that may be assigned to the user wherein a workload amount directly relates to the workload factors assigned to each deal.

21. A method in accordance with claim 1 wherein monitoring the business information further comprises:

transmitting business information for another second business entity for storage within the database after the first business entity has entered into a deal with the other second business entity, and monitoring the transmitted business information of the other second business entity including monitoring the future financial performance of the other second business entity and determining whether the other second business entity has violated any deal covenants.

22. A method for managing risk management (RM) information by a first business entity using a server system including a processor and coupled to a centralized database, at least one managerial user system, and at least one client system, said method comprising:

receiving at the server system RM information relating to a plurality of second business entities through the client system, the RM information including at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition of each second business entity;

storing RM information received at the server system in the centralized database;

tracking RM information stored in the centralized database;

updating the centralized database periodically with newly received RM information to maintain RM information;

providing RM information in response to an inquiry;

selecting for analysis a second business entity from the plurality of second business entities stored in the database;

analyzing, by the processor, the RM information for the selected second business entity to determine whether to engage in a deal with the selected second business entity, the deal including the first business entity at least one of providing financing to the selected second business entity and acquiring the selected second business entity;

engaging in the deal with the selected second business entity by at least one of the first business entity providing financing to the selected second business entity and the first business entity acquiring the selected second business entity, the deal further including at least one deal covenant relating to a future financial performance of the selected second business entity, wherein the at least one covenant includes terms agreed to by both the first business entity and the selected second business entity;

monitoring the RM information of the selected second business entity after the first business entity engages in the deal with the selected second business entity including monitoring the future financial performance of the selected second business entity and determining whether the selected second business entity has violated any of the deal covenants; and providing an electronic report of the monitored RM information from the client system to the managerial user system, which includes at least one of a summary of RM information reviewed, and findings and recommended actions to be taken based on the RM information.

23. A method in accordance with claim 22 further comprising managing a workload of a user by a predesignated party based on at least one deal assigned to the user.

24. A method in accordance with claim 22 wherein receiving RM information comprises receiving at least one account from a user through the client system, each account includes RM information for a selected second business entity such that the financial condition of each second business entity may be analyzed by the first business entity.

25. A method in accordance with claim 22 wherein tracking RM information comprises:

compiling a plurality of data reports that includes at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of each second business entity;

compiling a plurality of data reports that includes a selected subset of at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of each second business entity;

exporting RM information from the centralized database by a user to at least one other computer program for review; and linking documents to at least one of the second business entities such that a user can access the documents during a review of the second business entities.

26. A method in accordance with claim 22 wherein tracking RM information comprises:

compiling a plurality of data reports that includes at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of a selected group of the second business entities;

compiling a plurality of data reports that includes a selected subset of at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of the selected group of the second business entities;

exporting RM information relating to a selected group of second business entities selected by a user from the centralized database to at least one other computer program for review; and linking documents to the selected group of second business entities such that a user can access the documents during a review of the second business entities.

27. A method in accordance with claim 22 wherein providing an electronic report comprises transmitting an electronic report to the managerial user system from at least one member of an internal deal team including a summary of the review of RM information, and the deal team's findings and recommendations such that managerial oversight of the RM information and electronic data interchange between a user, the first business entity, and the second business entity are facilitated.

28. A method for managing risk management (RM) information for a first business entity using a web-based system including a server system including a processor and coupled to a centralized database and at least one client system, said method comprising:

receiving at the server system RM information relating to a plurality of second business entities from a user through the client system, the RM information including at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition of each second business entity;

storing RM information received at the server system in the centralized database;

tracking RM information including compiling data reports, exporting RM information, and linking documents to at least one of the second business entities;

updating the centralized database with RM information including adding and deleting information to revise existing RM information;

providing RM information including at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition of each second business entity, in response to an inquiry, including downloading requested information from the server system and displaying requested information on the client system, the inquiry including utilizing at least one pull-down lists, check boxes, radio buttons, and hypertext links;

selecting for analysis a second business entity from the plurality of second business entities stored in the database;

analyzing, by the processor, the RM information for the selected second business entity to determine whether to engage in a deal with the selected second business entity, the deal including the first business entity at least one of providing financing to the selected second business entity and acquiring the selected second business entity;

engaging in the deal with the selected second business entity by at least one of the first business entity providing financing to the selected second business entity and the first business entity acquiring the selected second business entity, the deal further including at least one deal covenant relating to a future financial performance of the selected second business entity, wherein the at least one covenant includes terms agreed to by both the first business entity and the selected second business entity;

reviewing the RM information of the selected second business entity after the first business entity engages in the deal with the selected second business entity including monitoring the future financial performance of the selected second business entity and determining whether the selected second business entity has violated any of the deal covenants;

notifying a user through an electronic message of the results of the review of RM information, including findings and recommended actions to be taken based on the RM information; and providing a report of the review results by transmitting an electronic report to the managerial user system, which includes a summary of the review of RM information, and an internal deal team's findings and recommendations such that managerial oversight of the RM information and electronic data interchange between a user, the first business entity, and the second business entity are facilitated.

29. A network based system for managing business information by a first business entity, said system comprising:

a client system comprising a browser;

a centralized database for storing information;

a server system configured to be coupled to said client system and said database, said server system comprising a processor configured to:

receive business information relating to a plurality of second business entities from said client system;

store said business information in said centralized database;

track said business information;

update said centralized database periodically with newly received business information to maintain said business information;

provide said business information in response to an inquiry by a user;

select for analysis a second business entity from the plurality of second business entities stored in the database;

analyze the selected second business entity to determine whether to engage in a deal with the selected second business entity, the deal including the first business entity at least one of providing financing to the selected second business entity and acquiring the selected second business entity;

store deal information in the database representing the first business entity engaging in the deal with the selected second business entity by at least one of the first business entity providing financing to the selected second business entity and the first business entity acquiring the selected second business entity, the deal further including at least one deal covenant relating to a future financial performance of the selected second business entity, wherein the at least one covenant includes terms agreed to by both the first business entity and the selected second business entity;

monitor the business information of the selected second business entity after the first business entity engages in the deal with the selected second business entity including monitoring the future financial performance of the selected second business entity and determining whether the selected second business entity has violated any of the deal covenants; and notify users electronically of a review of the business information by a deal team, including said deal team's findings and recommended actions to be taken based on the review of said business information.

30. A system in accordance with claim 29 wherein said business information comprises risk management (RM) information, said RM information comprising at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition for each second business entity.

31. A system in accordance with claim 29 wherein said client system further comprises at least one of:

a displaying component for displaying at least one of a pull-down list, a check box, radio buttons, and hypertext link options relating to the business information;

a sending component to send an inquiry to said server system so that said server system can process and download the requested information to said client system;

a collection component for collecting business information from users into said centralized database;

a tracking component for tracking business information;

a displaying component for displaying business information for at least one second business entity and a selected group of said second business entities;

a receiving component for receiving an inquiry from said client system regarding at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, and an equity valuation for at least one second business entity and the selected group of second business entities;

an accessing component for accessing said centralized database and causing the retrieved information to be displayed on said client system; and a notifying component for electronically notifying users that a review of said business information by a deal team has occurred, and of said deal team's findings and recommended actions to be taken based on said review of said business information.

32. A system in accordance with claim 29 wherein said server system further comprises a receiving component for receiving an inquiry to provide information from one of a plurality of users.

33. A system in accordance with claim 29 wherein said server system further comprises a processing component for searching and processing received inquiries against said database containing information collected by said collection component, and for tracking said business information.

34. A system in accordance with claim 29 wherein said server system further comprises a retrieving component to retrieve business information from said database.

35. A system in accordance with claim 29 wherein said server system further comprises an information fulfillment component that downloads the requested information after retrieving from said database.

36. A system in accordance with claim 29 wherein said server system further comprises a receiving component that receives an inquiry from said client system regarding at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition of at least one of each second business entity and a selected group of said second business entities.

37. A system in accordance with claim 29 wherein said server system further comprises at least one of a receiving component that receives information directly through said client system, and a receiving component that receives information in a pre-determined format established for inputting said business information.

38. A system in accordance with claim 29 wherein said server system further comprises a tracking component that accomplishes at least one of:

compiling a plurality of data reports that includes at least one of accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other reports relating to the financial condition of each second business entity;

compiling a plurality of data reports that includes a selected subset of at least one of accounts payable, accounts receivable, said availability analysis, said covenant compliance, coverage ratios, financial statements, financial statement and availability projections, said capital structure, income statements, said inventory, said leverage analysis, said loan profile, collateral, guarantors, machinery and equipment, real estate, said liquidation value, amortization information, said capital raising history, said equity valuation, and other reports relating to the financial condition of each second business entity;

compiling a plurality of data reports that includes at least one of accounts payable, accounts receivable, said availability analysis, said covenant compliance, coverage ratios, financial statements, financial statement and availability projections, said capital structure, income statements, said inventory, said leverage analysis, said loan profile, collateral, guarantors, machinery and equipment, real estate, said liquidation value, amortization information, said capital raising history, said equity valuation, and other reports relating to the financial condition of a selected group of said second business entities;

compiling a plurality of data reports that includes a selected subset of at least one of accounts payable, accounts receivable, said availability analysis, said covenant compliance, coverage ratios, financial statements, financial statement and availability projections, said capital structure, income statements, said inventory, said leverage analysis, said loan profile, collateral, guarantors, machinery and equipment, real estate, said liquidation value, amortization information, said capital raising history, said equity valuation, and other reports relating to the financial condition of the selected group of said second business entities;

exporting said business information relating to each second business entity by a user from said centralized database to at least one other computer program for review;

exporting said business information relating to said selected group of said second business entities selected by a user from said centralized database to at least one other computer program for review;

linking documents to at least one second business entity such that a user can access said documents during a review of said second business entities; and linking documents to said selected group of said second business entities such that a user can access said documents during a review of said second business entities.

39. A system in accordance with claim 29 wherein said server system further comprises a tracking component that manages a workload of a user based on the deals assigned to said user.

40. A system in accordance with claim 29 wherein said server system further comprises a notifying component that notifies a user via transmitting an electronic message to said client system of a review of said business information by said deal team, including said deal team's findings and recommended actions to be taken based on said review of said business information.

41. A network based system for managing, storing, and disseminating risk management (RM) information enabling a first business entity to analyze a plurality of second business entities, said system comprising:

a client system comprising a browser;

a managerial user system comprising a browser;

a centralized database for storing information; and a server system configured to be coupled to said client system, said managerial user system, and said database, said server system comprising a processor configured to:

receive RM information from said client system, said RM information comprising at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition of each second business entity;

store RM information in the centralized database;

track RM information;

update said centralized database periodically with newly received RM information to maintain RM information;

provide RM information in response to an inquiry;

select for analysis a second business entity from the plurality of second business entities stored in the database;

analyze the RM information of the selected second business entity for determining whether to engage in a deal with the selected second business entity, the deal including the first business entity at least one of providing financing to the selected second business entity and acquiring the selected second business entity;

store deal information in the database representing the first business entity engaging in the deal with the selected second business entity by at least one of the first business entity providing financing to the selected second business entity and the first business entity acquiring the selected second business entity, the deal further including at least one deal covenant relating to a future financial performance of the selected second business entity, wherein the at least one covenant includes terms agreed to by both the first business entity and the selected second business entity;

monitor the RM information of the selected second business entity after the first business entity engages in the deal with the selected second business entity including monitoring the future financial performance of the selected second business entity and determining whether the selected second business entity has violated any of the deal covenants;

notify a user electronically of the results of a review of RM information; and provide an electronic report of said review results to said managerial user system, which includes a summary of said RM information reviewed, and findings and recommended actions to be taken based on said review of said RM information.

42. A system in accordance with claim 41 wherein providing RM information comprises:

displaying designated second business entities on said client system for at least one of a team leader, a portfolio manager, an account manager, a senior risk manager, at least one internal deal team member, and at least one outside deal team member; and receiving an inquiry from said client system regarding at least one of said second business entities and a selected group of said second business entities.

43. A system in accordance with claim 41 wherein said server system further comprises a receiving component that receives an inquiry from said client system regarding certain topics including at least one of business information, accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, an equity valuation, and other documents and information relating to the financial condition of each second business entity and a selected group of second business entities.

44. A system in accordance with claim 41 wherein said server system further comprises a processing component that cross-references RM information including compiling data reports, exporting RM information, and linking documents to at least one of said second business entities.

45. A system in accordance with claim 41 wherein said server system further comprises a notifying component that notifies users by transmitting an electronic report from said server system of a review of said RM information by a deal team, including said deal team's findings and recommendations relating to said review of said RM information.

46. A system in accordance with claim 41 wherein said server system further comprises a providing component that provides an electronic report to said managerial user system by transmitting an electronic report to said managerial user system from at least one member of a deal team comprising a summary of said review of RM information, including said deal team's findings and recommended actions to be taken, such that managerial oversight of the RM information and electronic data interchange between a user, the first business entity, and the second business entity are facilitated.

47. A non-transitory computer readable medium including a computer program embodied thereon for managing risk management (RM) information by a first business entity analyzing a plurality of second business entities, said program comprising a code segment that receives RM information and then, when executed by a processor, causes the processor to:

maintain a database by adding, deleting and updating RM information;

provide users with access to RM information;

generate data reports based on RM information for each of the plurality of second business entities and a selected group of the plurality of second business entities;

compile a plurality of data reports for each of the second business entities and the selected group of second business entities including data reports showing accounts payable, accounts receivable, an availability analysis, a covenant compliance, coverage ratios, financial statements, financial statement and availability projections, a capital structure, income statements, an inventory, a leverage analysis, a loan profile, collateral, guarantors, machinery and equipment, real estate, a liquidation value, amortization information, a capital raising history, and an equity valuation;

select for analysis a second business entity from the plurality of second business entities stored in the database;

analyze the RM information for the selected second business entity for determining whether to engage in a deal with the selected second business entity, the deal including the first business entity at least one of providing financing to the selected second business entity and acquiring the selected second business entity;

store deal information in the database representing the first business entity engaging in the deal with the selected second business entity by at least one of the first business entity providing financing to the selected second business entity and the first business entity acquiring the selected second business entity, the deal further including at least one deal covenant relating to a future financial performance of the selected second business entity, wherein the at least one covenant includes terms agreed to by both the first business entity and the selected second business entity;

monitor the RM information of the selected second business entity after the first business entity engages in the deal with the selected second business entity including monitoring the future financial performance of the selected second business entity and determining whether the selected second business entity has violated any of the deal covenants;

generate an alert to notify the first business entity when the monitored future financial performance of the selected second business entity meets a predetermined threshold amount and when the selected second business entity violates one of the deal covenants;

link documents to the selected second business entity such that a user can access said documents during a review of said second business entity;

notify a user of a review of RM information of the selected second business entity by a deal team member; and provide a report comprising a summary of said review of RM information, including said deal team's findings and recommendations.

48. A non-transitory computer readable medium in accordance with claim 47, wherein the computer program further comprises a code segment that, when executed by the processor, causes the processor to prompt a predesignated party to manage a workload of a user based on at least one deal assigned to said user.

49. A non-transitory computer readable medium in accordance with claim 47, wherein the computer program further comprises a code segment that, when executed by the processor, causes the processor to provide at least one of an option to filter and sort RM information based on at least one of business information, accounts payable, accounts receivable, said availability analysis, said covenant compliance, coverage ratios, financial statements, financial statement and availability projections, said capital structure, income statements, said inventory, said leverage analysis, said loan profile, collateral, guarantors, machinery and equipment, real estate, said liquidation value, amortization information, said capital raising history, and said equity valuation for at least one of each second business entities and said selected group of second business entities.

50. A non-transitory computer readable medium in accordance with claim 47, wherein the computer program further comprises a code segment that, when executed by the processor, causes the processor to generate a display of at least one business information, accounts payable, accounts receivable, said availability analysis, said covenant compliance, coverage ratios, financial statements, financial statement and availability projections, said capital structure, income statements, said inventory, said leverage analysis, said loan profile, collateral, guarantors, machinery and equipment, real estate, said liquidation value, amortization information, said capital raising history, and said equity valuation for at least one of each second business entity and said selected group of second business entities.

51. A non-transitory computer readable medium in accordance with claim 47, wherein the computer program further comprises a code segment that, when executed by the processor, causes the processor to:

access said database;

search said database in response to an inquiry;

retrieve information from said database;

cause retrieved information to be displayed on a client system;

notify a user of a review of said RM information; and cause a report summarizing the review of RIM information to be transmitted.

52. A non-transitory computer readable medium in accordance with claim 47, wherein the computer program further comprises a code segment that, when executed by the processor, causes the processor to monitor the security of the system by restricting access to authorized individuals.

53. A non-transitory computer readable medium in accordance with claim 47, wherein the computer program further comprises a code segment that, when executed by the processor, causes the processor to cross-reference existing RM information with newly received RM information.

* * * * *